United States Patent [19]

Ohba et al.

[11] Patent Number: 5,757,738
[45] Date of Patent: May 26, 1998

[54] LIBRARY APPARATUS

[75] Inventors: Yoshifumi Ohba; Manabu Kobayashi; Kenji Nakajima, all of Kawasaki; Masayoshi Tanaka, Yashiro-machi; Tsuyoshi Miura, Yashiro-machi; Kazuyuki Mikawa, Yashiro-machi; Masaaki Hashizume, Yashiro-machi; Koji Yasuda, Yashiro-machi, all of Japan

[73] Assignees: Fujitsu Limited, Kawasaki; Fujitsu Peripherals Limited, Kato-gun, both of Japan

[21] Appl. No.: 501,556

[22] Filed: Jul. 12, 1995

[30] Foreign Application Priority Data

| Jul. 27, 1994 | [JP] | Japan | 6-174999 |
| Dec. 26, 1994 | [JP] | Japan | 6-321952 |
| Dec. 28, 1994 | [JP] | Japan | 6-326951 |

[51] Int. Cl.$^6$ .................................................. G11B 17/22
[52] U.S. Cl. .......................... 369/34; 369/37; 312/9.31; 414/273
[58] Field of Search .................. 369/36, 34, 37, 369/38, 40, 30; 360/98.05, 98.06, 98.04, 98.07; 312/9.31, 9.29; 414/225, 226, 273, 280

[56] References Cited

U.S. PATENT DOCUMENTS

| 4,538,253 | 8/1985 | Ishibashi et al. | 369/34 |
| 4,878,137 | 10/1989 | Yamashita et al. | 369/36 |
| 4,903,252 | 2/1990 | Tanaka et al. | 369/36 |
| 4,981,409 | 1/1991 | Hirose et al. | 414/225 |
| 5,353,269 | 10/1994 | Kobayashi et al. | 369/36 |
| 5,546,315 | 8/1996 | Kleinschnitz | 369/34 |

FOREIGN PATENT DOCUMENTS

| 0013806 | 8/1980 | European Pat. Off. . |
| 0277634 | 7/1988 | European Pat. Off. . |
| 0537357 | 4/1993 | European Pat. Off. . |
| 0613143 | 8/1994 | European Pat. Off. . |
| 0620553 | 10/1994 | European Pat. Off. . |
| 0622797 | 11/1994 | European Pat. Off. . |
| 59-180853 | 10/1984 | Japan . |
| 63-46655 | 2/1988 | Japan . |
| 03-3209664 | 9/1991 | Japan . |
| 3259450 | 11/1991 | Japan . |
| 4087056 | 3/1992 | Japan . |
| 4281261 | 10/1992 | Japan . |
| 05-307819 | 11/1993 | Japan . |
| 8707423 | 12/1987 | WIPO . |

OTHER PUBLICATIONS

IBM Technical Disclosure Bulletin, vol. 37, No. 5, published May 1994 "Disk Input/Output Station for Rotating Tray Carousel".

Yamada et al, "Automated Optical Mass Storage Systems with 3-Beam magneto-Optical Disk Drives", Symposium on Mass Storage Systems, 000272139, Oct. 7, 1991, pp. 149-154.

"F6445 Optical Disk Library System," Fujitsu, 44, 5, pp. 455-462 (Sep., 1993).

*Primary Examiner*—Tan Dinh
*Attorney, Agent, or Firm*—Greer, Burns, & Crain, Ltd.

[57] ABSTRACT

A library apparatus for storage media such as optical disks includes a rotatable cell drum having several columns of cells for storing the storage media, a load/unload device for inserting and removing cartridges one at a time, at least one drive for reading from or writing to selected media, and an accessor which moves the storage media between the load/unload device and the cell drum, and between the cell drum and the drive. The load/unload device rotates in a collinear arrangement with the cell drum, and can rotate in unison with the cell drum, or independently of the cell drum. The collinear arrangement of the cell drum and the load/unload device reduces the overall size of the library.

39 Claims, 77 Drawing Sheets

FIG. 38 CARTRIDGE UNLOADING

| TRAYS | ROTATION DIR. OF DRUM | DIRECTION OF CARTRIDGE TRANS. | ROTATIONAL DIR. OF DRUM AT INITAILIZATION | STOP POSITION |
|---|---|---|---|---|
| 26-1 | CW<br>A=1 | OP→ACC<br>B=0 | CW<br>A=1 | A=1, B=0 |
| 26-1 | CCW<br>A=0 | ACC→OP<br>B=1 | CW<br>A=1 | A=1, B=1 |
| 26-2 | CCW<br>A=0 | OP→ACC<br>B=0 | CCW<br>A=0 | A=0, B=0 |
| 26-2 | CW<br>A=1 | ACC→OP<br>B=1 | CCW<br>A=0 | A=0, B=1 |

FIG. 44

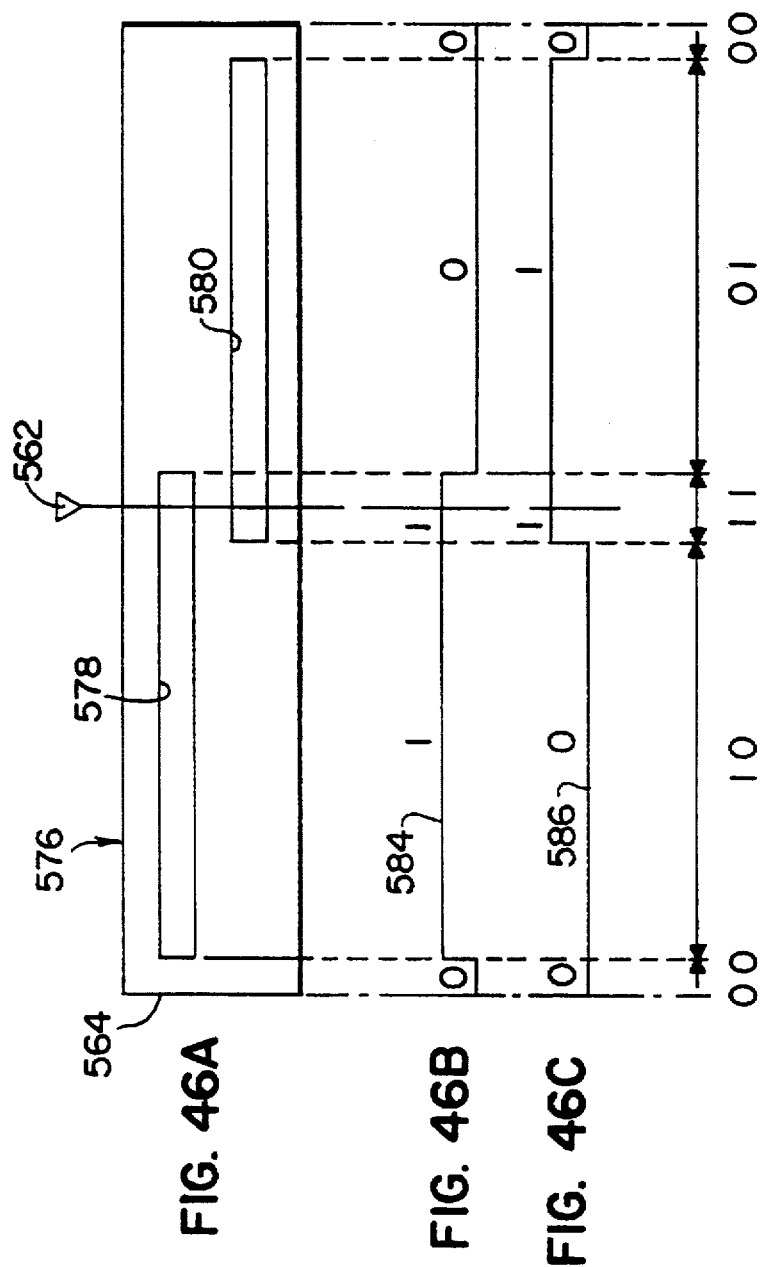

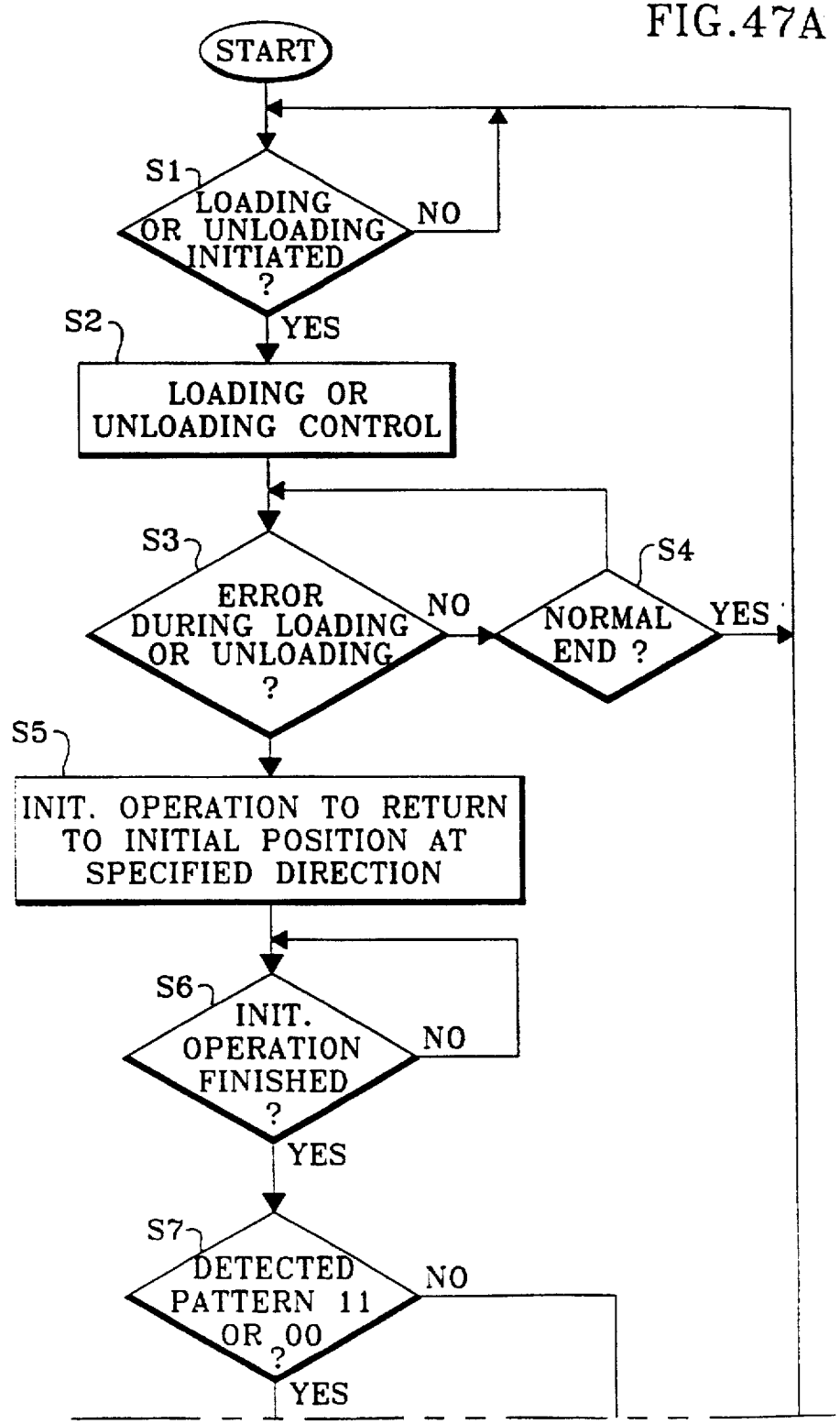

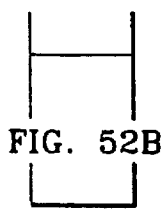
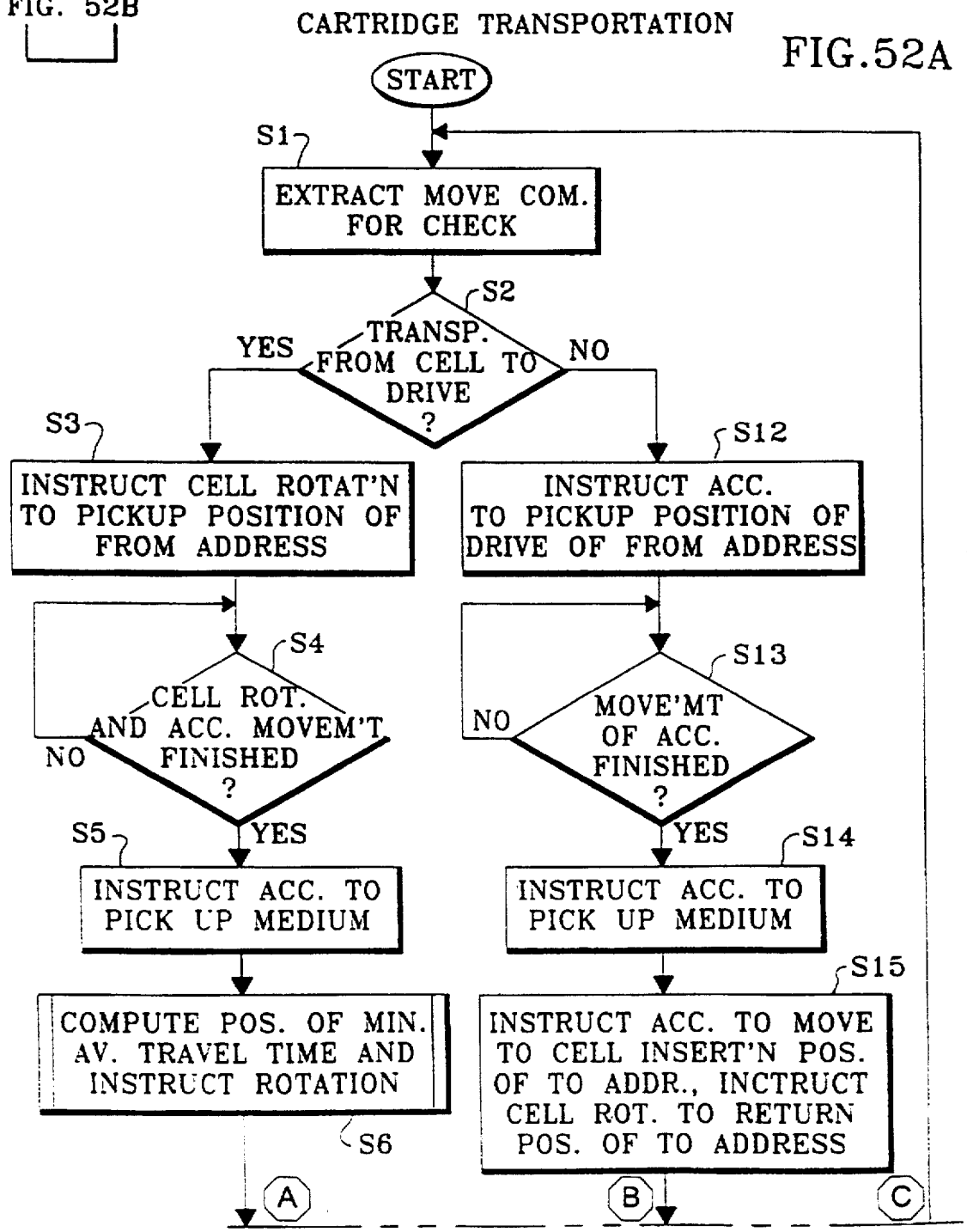

COMPOSITION PROCESS OF POSITION OF MINIMUM AVERAGE TRAVEL TIME

FIG. 62
(PRIOR ART)
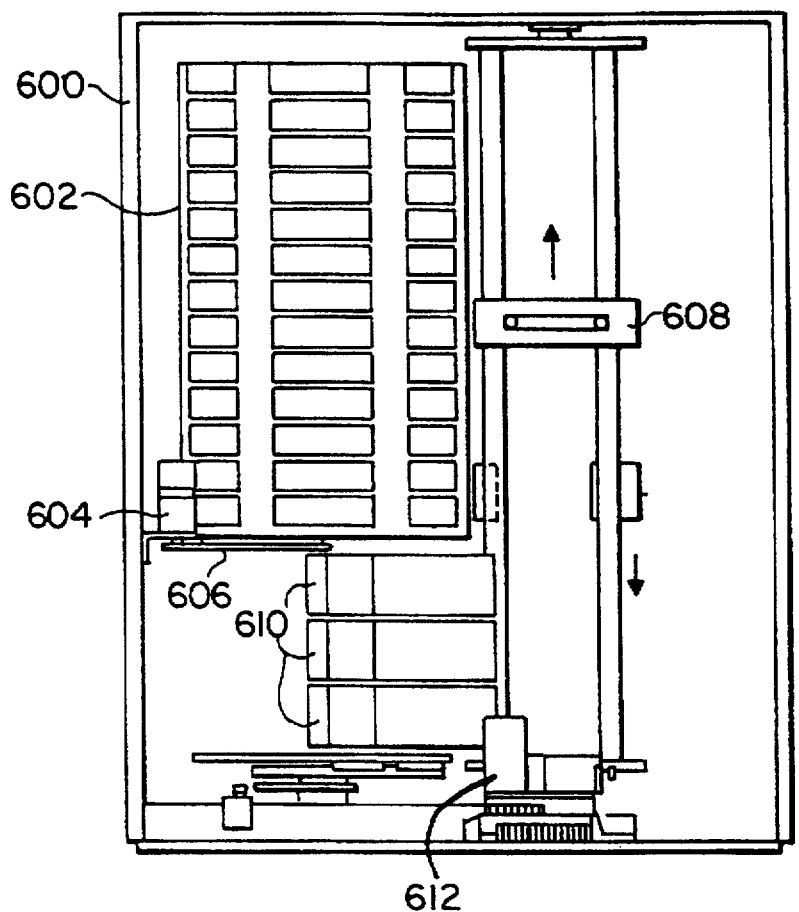
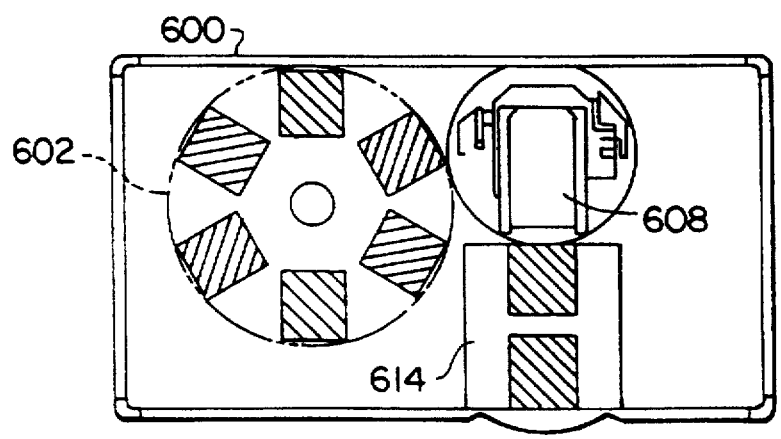
FIG. 63
(PRIOR ART)

FIG. 68A
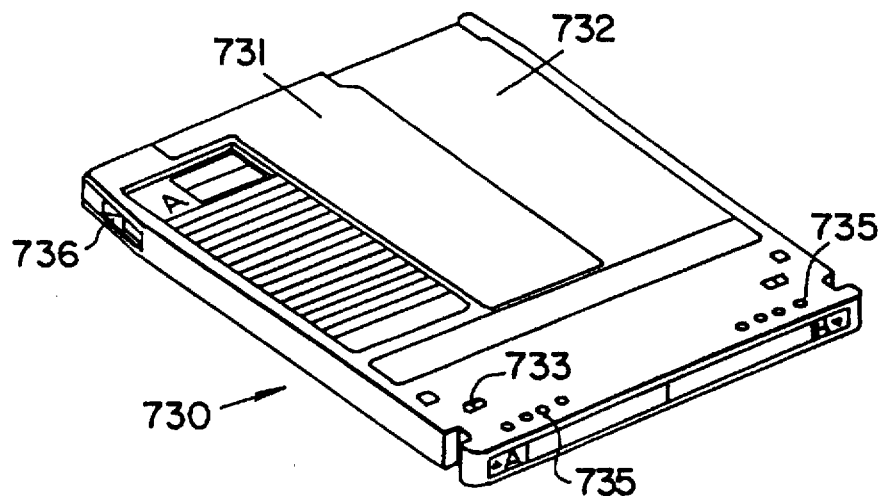
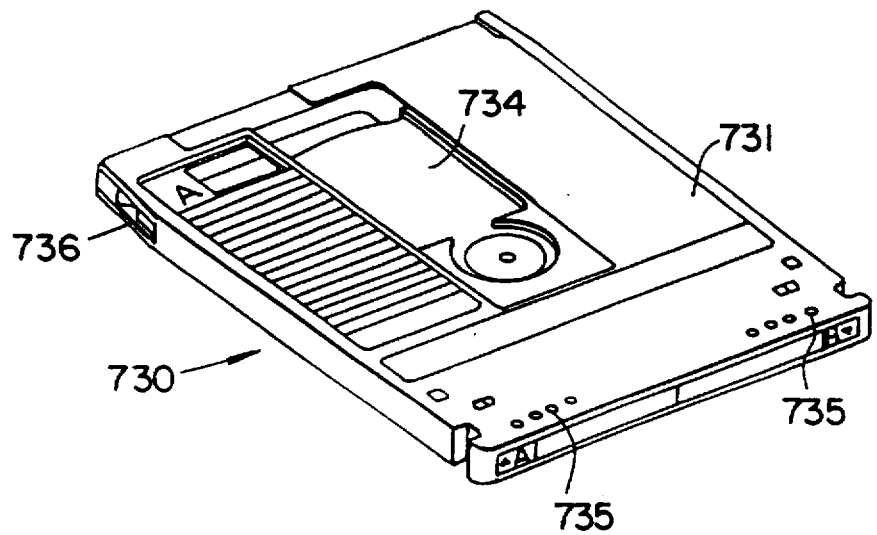
FIG. 68B

FIG. 71
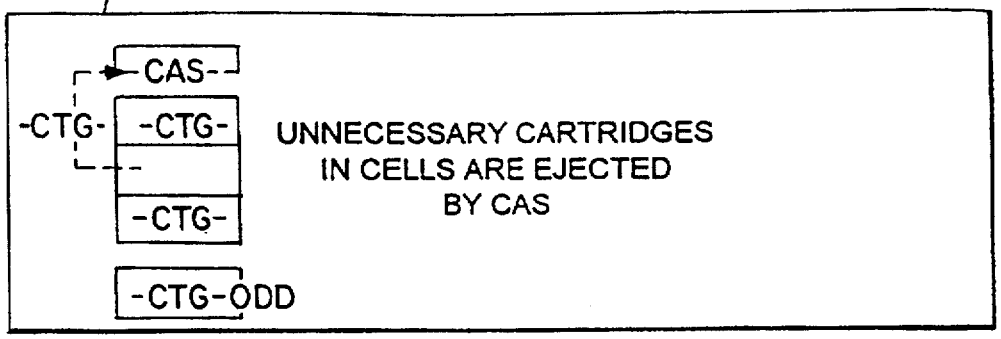
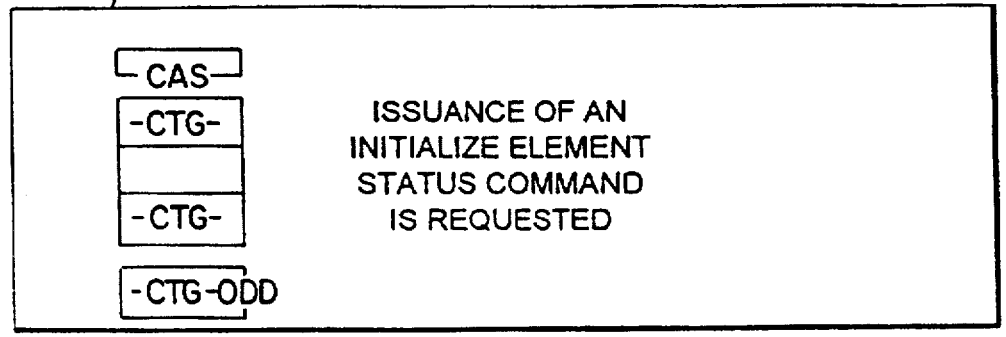
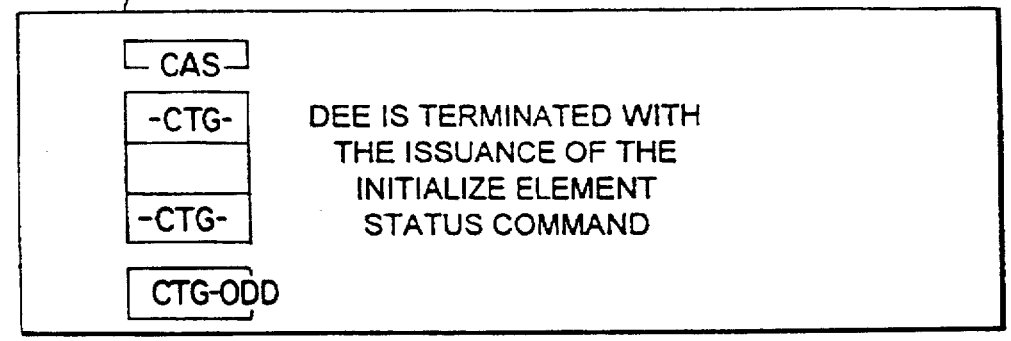
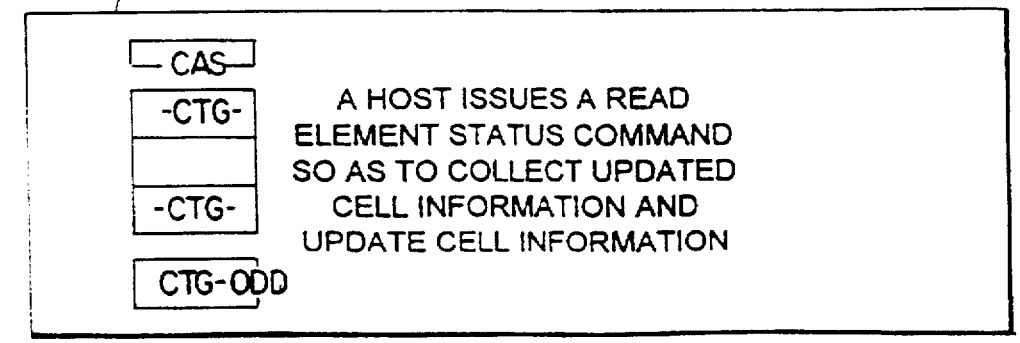

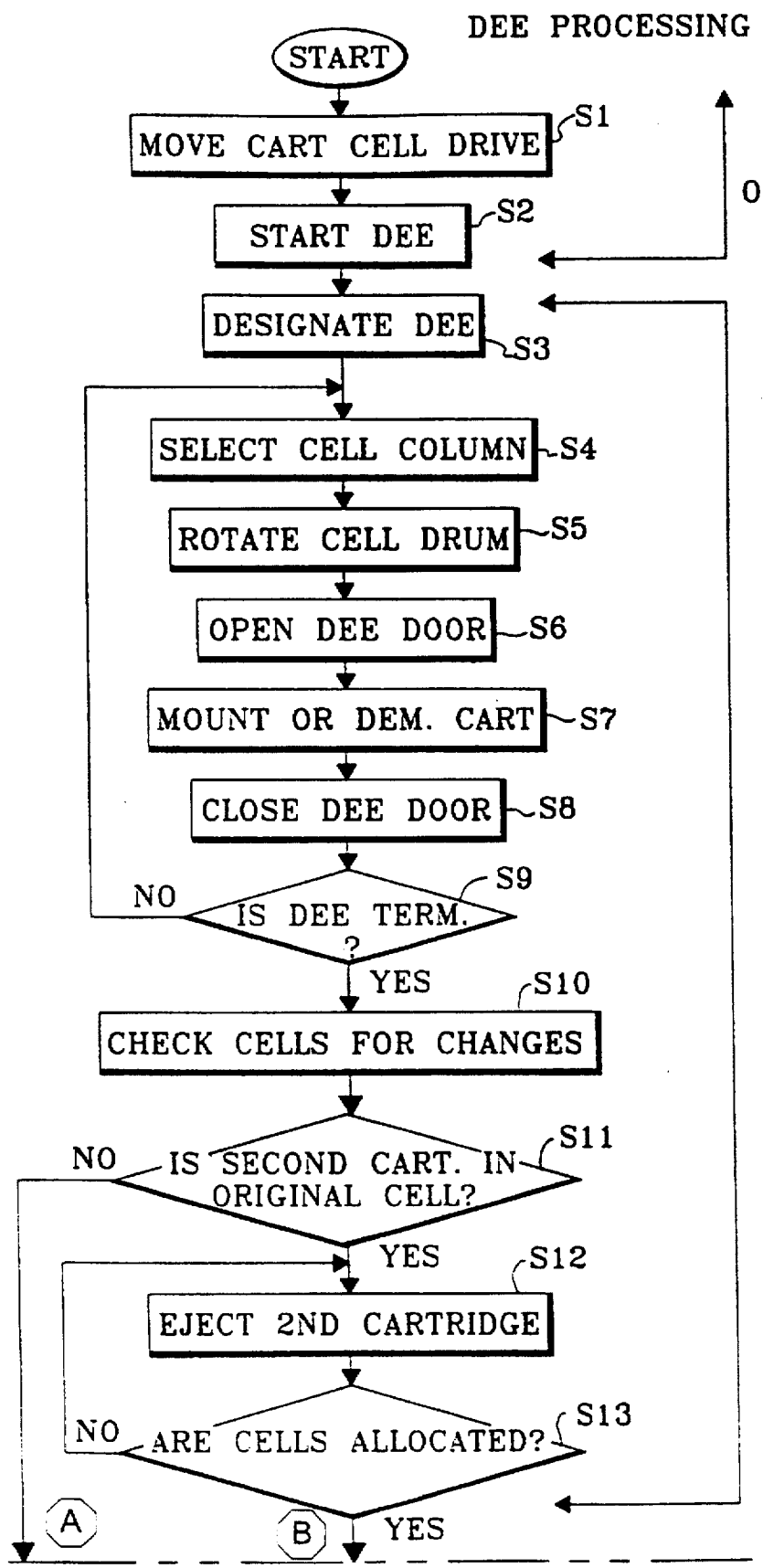

FIG. 82A
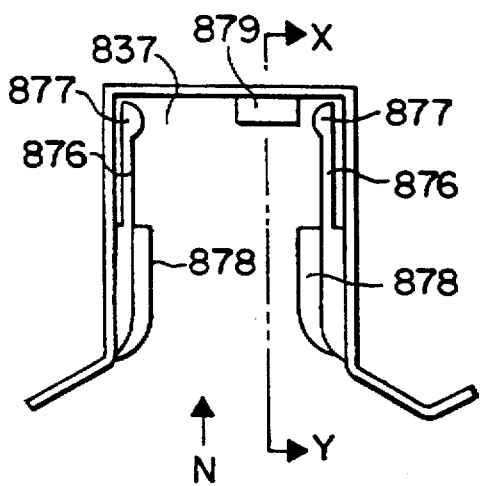
FIG. 82B
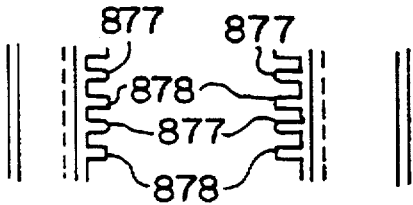
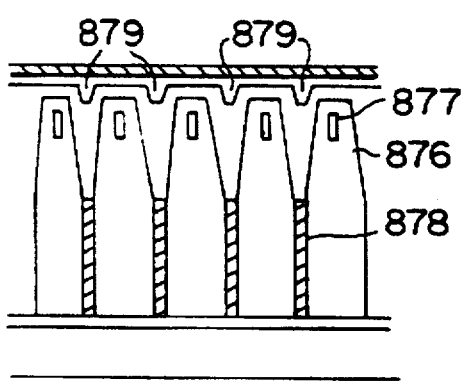
FIG. 82C
FIG. 83A
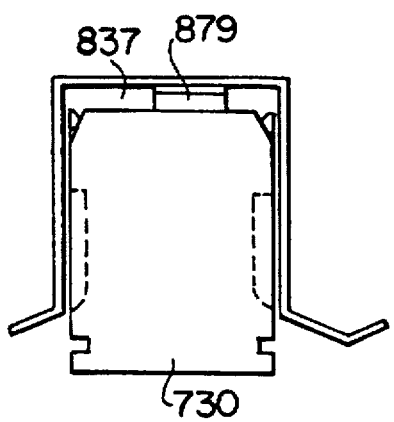
FIG. 83B
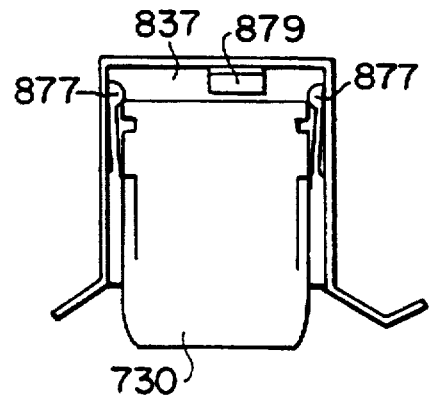
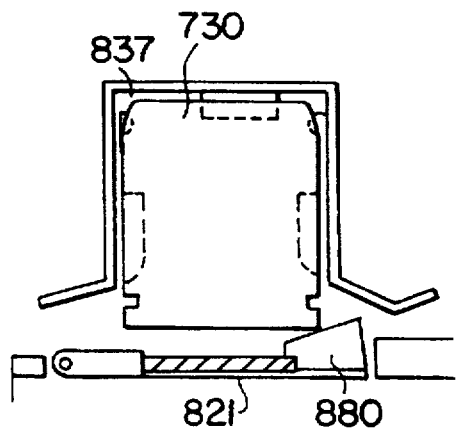
FIG. 83C

LIBRARY APPARATUS

The present invention relates to a library apparatus that accommodates a large number of storage media such as optical disk cartridges, magnetic tape cartridges or the like. More particularly, this invention relates to a library apparatus that transports a storage medium between an insertion and ejection device and a rotating cell drum, and between the rotating cell drum and a drive. This invention also relates to library apparatus in which multiple storage media can be directly inserted or removed from the rotating cell drum, without using the insertion/ejection device.

As information storage apparatus handles an increasing amount of data, the number of files increases, requiring a large quantity of storage media. A library apparatus is commercially available to cope with this situation. The library apparatus functions like an automated warehouse that handles and manages a number of storage media.

FIG. 62 shows the interior of a conventional library apparatus. FIG. 63 is its plan view. A cell drum 602 freely rotates in a cabinet 600. The cell drum 602 has, on its drum surface, cells vertically arranged for accommodating medium cartridges therein. The cell drum 602 is coupled to a motor 604 via a reduction gear mechanism 606, and is driven around its vertical axis.

Disposed beside the cell drum 602 is an accessor 608 which is moved vertically by a motor 612. Disposed beneath the cell drum 602 are several drives 610 that perform recording/reproduction onto a medium cartridge. A load/unload block 614 is mounted in front of the accessor 608.

When an operator presses an insertion key on the operation panel with a medium cartridge set in the load/unload block 614, the medium cartridge is transported to the pickup position of the accessor 608. The accessor 608 picks up the medium cartridge from the load/unload block 614, and rotates to its insertion position toward the cell drum 602. The cell drum 602 is rotated so that the cell having a destination address faces the insertion position of the accessor 608. The accessor 608 then places the medium cartridge into the specified cell of the drum.

The unloading operation of the medium cartridge from the drum 602 is the opposite of the above loading operation. The loading operation or the unloading operation may be performed between the load/unload block 614 and a drive 610. In normal operation, the medium cartridge is transported from a From Address to a To Address, which are issued as command parameters along with a move command by a host computer.

In the conventional library apparatus, the accessor 608 must be moved and rotated to transport the medium cartridge between the cell drum 602 and the load/unload block 614 because the load/unload block 614 is spaced apart from the cell drum 602. To this end, the conventional library apparatus is equipped with a revolving mechanism in addition to a descending/ascending mechanism and is thus complex in its construction. The space required for the load/unload block 614 enlarges the overall size of the apparatus. Thus, there is a need for library apparatus which provides improved data retrieval for large quantities of data such as multi-media data, image data and graphic data. Particularly needed is a library apparatus that requires a relatively small installation space yet has a large capacity for storage media.

The load/unload block 614 is essentially a mechanism which loads or unloads the medium cartridges one at a time. Only when the accessor 608 has picked the medium cartridge from the tray of the load/unload block 614 is the load/unload block 614 available for the next cartridge medium. This is cumbersome and time-consuming. Thus, there is also a need for library apparatus which loads and unloads multiple medium cartridges simultaneously.

Accordingly, it is an object of the present invention to provide a library apparatus which is of a compact and simple design as a result of integrating the cell drum and the load/unload mechanism.

It is another object of the present invention to provide a library apparatus which directly loads or unloads a plurality of cartridge media in or from the cell drum, without using the load/unload block.

Because of its high inertia, the cell drum 602 has to be driven by the motor 604 with a reduction ratio of 1/40 through 1/100. To this end, a reduction gear mechanism 604 made of high-performance, backlash-free reduction gears, such as harmonic drive gears has been conventionally employed, but this is an expensive solution. Ordinary gears or timing belts can be used, but generally speaking, a reduction ratio of about 1/6 is the highest gear ratio that is used with ordinary gears or timing belts. Three stages or more of reduction are thus required. If three stages of gear reduction are employed, the backlash of each stage is added, thereby resulting in a large backlash. This is problematic. If timing belts are used in three stages of reduction, stretch and backlash of the belts are also of concern.

In view of these problems, it is yet another object of the present invention to provide a library apparatus which allows the cell drum to be driven by a timing belt without significant belt stretch and backlash problems.

In the conventional library apparatus, when the movement of a medium cartridge from the cell drum 602 to the drive 610 is ordered, the cell drum 602 is revolved and stopped where the cartridge is aligned with the pickup position of the accessor 608. The accessor 608 picks up the medium cartridge from the cell drum 608, and transports it to a selected drive 610.

The cell drum 602 remains stationary while the accessor 608 transports the medium cartridge. When both the cell drum 602 and the accessor 608 are operative to perform a pickup operation, and when the time the cell drum 602 takes to complete its action is longer than the time the accessor 608 takes to complete its action, the accessor 608 is forced to wait after the completion of its action until the cell drum 602 completes its action. As a result, the overall time for transportation is prolonged.

It is yet another object of the present invention to provide a library apparatus which reduces the time required for the transportation of the medium cartridge by allowing the cell drum to move beforehand in its idling time during which the cell drum otherwise remains stationary.

FIGS. 84A and 84B are explanatory diagrams showing another conventional optical disk library. FIG. 84A shows the outer appearance of the library, while FIG. 84B shows the interior thereof.

In FIGS. 84A and 84B, reference numeral 702 denotes a housing, 701 denotes a cartridge port, 704 denotes a light emitting diode (hereinafter LED), 705 denotes a liquid crystal display (hereinafter LCD) panel, and 706 denotes a cartridge access station (hereinafter CAS). Reference numeral 708 denotes a cartridge stowage, 709 denotes a drive (optical disk drive), and 710 denotes an accessor. Reference numeral 711 denotes a power supply, 712 denotes a filter, 713 denotes a fan, 714 denotes a guide shaft, 715 denotes an accessor control printed circuit board, and 717 denotes a guide rail.

As illustrated, the optical disk library has the housing 702. The cartridge port 701 is formed as part of (on the front surface) the housing 702. The LEDs 704 and LCD panel 705 are arranged in the vicinity of the cartridge port 701.

In the housing 702, the CAS 706, guide rails 717, cartridge stowage 708, optical disk drive 709, accessor 710, power supply 711, filter 712, fan 713, guide shafts 714, and accessor control printed circuit board 715 are incorporated.

The optical disk library shown in FIG. 84 has one optical disk drive 709, although optical disk libraries having two or more optical disk drives are known. The optical disk drive 709 (optical disk unit) records or reproduces data in or from an optical disk cartridge. The cartridge stowage 708 has numerous cells (for stowing optical disk cartridges). Each cell stows one optical disk cartridge.

The CAS 706 carries an optical disk cartridge inserted through the cartridge port 701 to a position at which the cartridge is handed to the accessor 710, or receives a used optical disk cartridge from the accessor 710, carries it to a predetermined position, and then ejects it to the outside through the cartridge port 701. The CAS 706 is motor-driven and movable along the guide rails 717 in the directions of arrows.

The accessor 710 is raised or lowered along the guide shafts 714 by driving a motor in an accessor driving mechanism (not shown). The accessor 710 accesses the CAS 706, cartridge stowage 708, or optical disk drive 709 and carries an optical disk cartridge. The cartridge port 701 is used to insert an optical disk cartridge from the outside of the housing or eject a used optical disk cartridge to the outside.

The LEDs 704 serve as light emitters for indicating different states of the library (for example, a power-on state, an online state, and a busy state) or for giving an alarm. The LCD panel 705 displays various messages.

The operation of the optical disk library of FIG. 84 will be described. The optical disk drive 709 is assigned a number (address) such as 01 or 02. In this example, since only one drive is included, the number 01 alone is used. The cartridge stowage 708 has numerous cells. The cells are assigned numbers (addresses) such as 01, 02, 03, etc., to perhaps 32.

When an operator inserts optical disk cartridges one by one through the cartridge port 701, the CAS 706 moves along the guide rails 717 to carry a loaded optical disk cartridge to a predetermined position, and hands it to the accessor 710. On receipt of an optical disk cartridge handed by the CAS 706, the accessor 710 carries it to a specific place, for example, a designated cell (for example, cell 01) in the cartridge stowage 708.

For recording or reproducing data in or from an optical disk cartridge, the accessor 710 removes an optical disk cartridge from a designated cell (for example, cell 02) in the cartridge stowage 708, carries it, and loads it on a designated optical disk drive (in this example, drive 01).

Thereafter, when data recording or reproducing for a medium in the optical disk cartridge is completed, the accessor 710 unloads the optical disk cartridge from the optical disk drive (drive 01), carries it, and mounts it in the cell (for example, cell 02) in the cartridge stowage 708 in which the optical disk cartridge has been stowed.

For ejecting a used optical disk cartridge to the outside, the accessor 710 demounts the optical disk cartridge from a designated cell (for example, cell 03) in the cartridge stowage 708 and hands it to the CAS 706. Thereafter, the CAS 706 moves along the guide rails 717 so as to carry the received optical disk cartridge to the predetermined position, and then ejects it to the outside through the cartridge port 701. As mentioned above, optical disk cartridges are automatically installed, removed, or preserved, for recording or reproducing data.

The aforesaid optical disk library is relatively compact and inexpensive, but it has several problems. The cells in the cartridge stowage are arranged in a single column, and not many optical disk cartridges can therefore be stowed. Also, for mounting or demounting optical disk cartridges, the optical disk cartridges must be inserted or ejected one by one through the cartridge port (CAS). Inserting or removing the optical disk cartridges is therefore quite time-consuming.

For overcoming this drawback, a drum-shaped rotatable cell drum can be used to stow many optical cartridges, and a direct entry/exit (hereinafter DEE) feature described herein is incorporated. The DEE feature makes it possible to manually or automatically insert or remove several optical disk cartridges at a time directly in or from the cell drum.

In this case, the optical disk library is connected to a host computer and controlled under the host computer. However, since the DEE feature is used to directly insert or remove the optical disk cartridges simultaneously, in no particular order, the host computer must perform complex processing.

As for the jobs to be processed by the host computer, when the DEE feature is used to manually or automatically insert or remove optical disk cartridges simultaneously, the host computer collects cell information concerning a cell drum (information concerning the presence or absence of a cartridge) or updates cell information that is managed by the host computer.

Consequently, the running time of a job under the host computer gets longer and the number of software packages to be developed becomes larger. Unacceptably high labor and time are required for development of the necessary software. This leads to an increase in the overall cost of producing the library.

For performing DEE processing in the optical disk library, the host computer and optical disk library are mutually taken offline (in other words, the host computer and optical disk library are disconnected from each other). The host computer cannot therefore be aware of the fact that DEE is under way in the optical disk library. The host computer may therefore make unsuccessful attempts to access the optical disk library. Thus, processing efficiency is poor.

When using the DEE feature, optical disk cartridges are generally stowed in cells at random. In this case, the accessor may have to move unnecessarily long distances to find some cartridges. This results in a longer access time. For example, it takes time to load an optical disk cartridge which is stowed in a cell located far away from an optical disk drive, onto the optical disk drive.

The present invention attempts to solve the aforesaid problems underlying the prior art. An object of the present invention is to provide a library that uses a cell drum capable of stowing many cartridge-type recording media, that has a DEE feature for manually or automatically inserting or removing cartridge-type recording media simultaneously, and that automatically performs DEE processing and updates cell information thereafter, to simplify jobs run by a host computer, shorten the running time of the jobs, and reduce the number of software packages to be developed.

Another object of the present invention is to allow a host computer to always be aware of the fact that DEE processing is under way in a library and to thus improve the processing efficiency of the host computer.

Yet another object of the present invention is to automatically sort cartridge type recording media newly inserted during DEE processing and to thus improve the efficiency of processing to be performed in a library after insertion of media into the library.

Yet another object of the present invention is to provide a compact and inexpensive library that offers a large-capacity cartridge stowage, enables simultaneous manual or automatic insertion or removal of cartridges, and enjoys improved safety and reliability.

Another object of the present invention is to make it possible to simultaneously insert or remove cartridges in or from a cartridge stowage directly, manually or automatically, to guarantee safety during the insertion and removal processes, using locking mechanisms, and to reliably prevent incorrect insertion or mounting of a cartridge in the library.

SUMMARY OF THE INVENTION

In keeping with one aspect of this invention, a library apparatus for storage media such as optical disk cartridges includes a rotatable cell drum having several columns of cells for the storage media, a load/unload device for inserting and removing storage media one at a time, at least one drive for reading from or writing to selected media, and an accessor which moves the storage media between the load/unload device and the cell drum, and between the cell drum and the drive. The load/unload device rotates in a collinear arrangement with the cell drum, and can rotate in unison with the cell drum, or independently of the cell drum. The collinear arrangement of the cell drum and the load/unload device reduces the overall size of the library.

A direct entry/exit (DEE) door exposes several cells in the cell drum when the door is open. The DEE door is provided so that several storage media can be placed in or removed from the cell drum at once, either manually or automatically. The library apparatus automatically rearranges the storage media to fill the cells nearest the drive, which reduces the time required to locate storage media in the cell drum and place them in the drive. A locking mechanism locks the DEE door when the cell drum rotates, and locks the cell drum when the DEE door is open. Each cell in the cell drum has a skew mounting preventing mechanism and inverse mounting preventing mechanism which prevent incorrect mounting of a cartridge in the cell drum.

BRIEF DESCRIPTION OF THE DRAWINGS

The above mentioned and other features of this invention and the manner of obtaining them will become more apparent, and the invention itself will be best understood by reference to the following description of an embodiment of the invention taken in conjunction with the accompanying drawings, in which:

FIG. 44 is a diagram showing the state of the rotational direction flag A and the transport direction flag B.

FIGS. 46(A), 46(B) and 46(C) are explanatory views showing the sensor patterns and detected signals of the mechanism of FIG. 45.

FIGS. 47(A) and 47(B) are a flow diagram showing the initialization process that is performed against an error stop during loading and unloading, using the sensor of FIG. 45.

FIGS. 52(A) and 52(B) are a flow diagram showing the cartridge transportation process.

FIG. 62 is an explanatory view showing the interior structure of a conventional library apparatus.

FIG. 63 is a plan view showing the interior of the structure shown in FIG. 62.

FIGS. 68(A) and 68(B) are explanatory diagrams showing an optical disk used in the apparatus of this invention.

FIG. 71 is a second explanatory diagram concerning DEE processing in accordance with the invention.

FIGS. 82(A), 82(B) and 82(C) are explanatory diagrams showing a cartridge incorrect mounting preventing mechanism in accordance with the invention.

FIGS. 83(A), 83(B) and 83(C) are additional explanatory diagrams showing the cartridge incorrect mounting preventing mechanism in accordance with the invention.

DETAILED DESCRIPTION

Figure 1A:
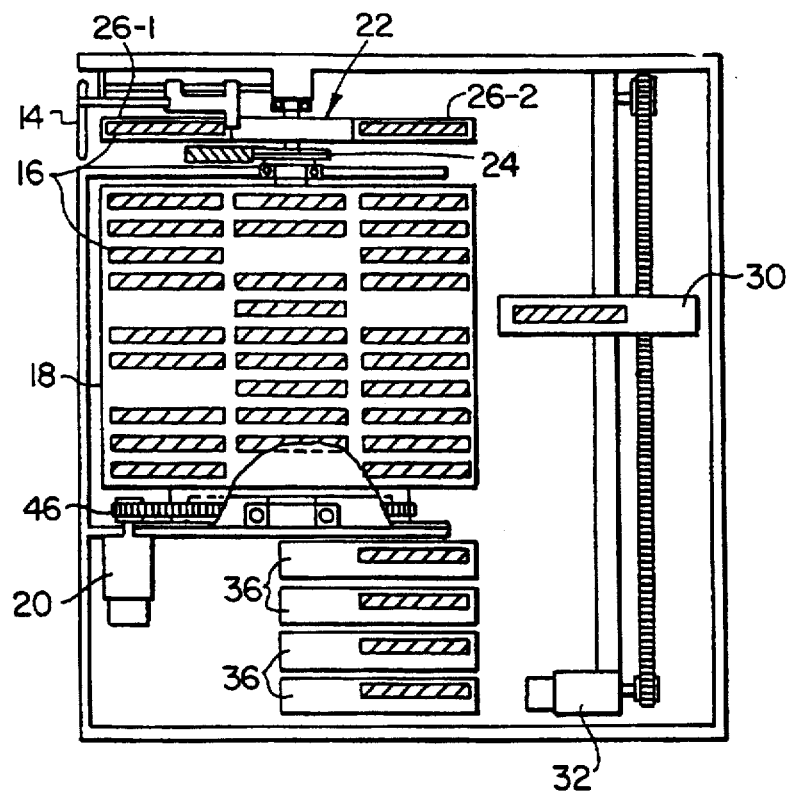
FIGS. 1(A) and 1(B) are explanatory diagrams of the principles of the present invention.

By way of overview, a library apparatus includes load/unload means 22 (FIG. 1) disposed collinearly with rotating storage means (hereinafter referred to as a "cell drum") 18.

The cell drum 18 has on its drum surface a plurality of columns, each having a plurality of cells for accommodating storage media. The load/unload means 22 transports storage media 16 between a load/unload opening 14 and an load/unload position of an accessor 30.

Also provided are driving means 20, 46 for rotating the cell drum 18, reproducing means (drive) 36 for at least reproducing information on the storage media 16, and medium transport means (hereinafter referred to as the "accessor") 30 for transporting the storage medium 16 between the cell drum 18 and the reproducing means 36.

The load/unload means 22 is disposed above the cell drum 18 in a manner that both are collinear. The load/unload means 22 has a pair of medium trays 26 on its circumferential portion, one tray angularly spaced 180° from the other along a line that runs radially across the axis of rotation of the cell drum 18. Alternatively, the load/unload means 22 may be provided with four medium trays 26 with each tray angularly spaced 90° from the next.

The load/unload means 22 may be rigidly and collinearly supported on the cell drum 18, and both may be integrally rotated by the driving means 20, 46.

Alternatively, the load/unload means 22 may be connected to the cell drum 18 by a clutch means 24. With the clutch means 24 provided, the load/unload means 22 is integrally rotated with the cell drum 18 by allowing the clutch means 24 to connect both to load or unload the storage media 16. During the rest of the time, the clutch means 24 disengages the load/unload means 22 from the cell drum 18 to suspend its operation.

The clutch means 24 is constructed of a gear clutch mechanism. For example, the clutch means 24 is constructed of a first gear 62 (FIG. 11) rigidly attached to the axis of rotation of the cell drum 18, a second gear 64 rigidly attached to the axis of rotation of the load/unload means 22 and closely disposed to the first gear in a manner that both gears are collinear, a clutch gear 66 for transmitting rotation by engaging with both the first gear 62 and the second gear 64, and a gear clutch switching mechanism for switching the clutch gear 66 between its engagement position and disengagement position.

The clutch switching mechanism includes an arm member 68 pivotally supported at one end and supporting a clutch gear 66 on its other end, a spring member 76 for urging the arm member 68 in the direction that allows the clutch gear 66 to be disengaged, and an electromagnetic solenoid 44 which, when conducting, urges the arm member 68 toward the engagement position of the clutch gear 66.

In the clutch gear mechanism, the number of teeth of the first gear 62 is set be equal to the number of teeth of the second gear 64 to achieve a gear ratio of 1. Alternatively, a gear ratio of other than 1 may be set by combining integrally with the clutch gear 66 (FIG. 15) a first idler gear 80 that is in mesh with the first gear 62 and a second idler gear 82 that is in mesh with the second gear 64.

Provided further are a ring member 90 (FIG. 18) which is collinear with and integrally rotated with the load/unload means 22 (not shown in FIG. 18), and which has notches 92-1 and 92-2 on its internal circumference in the positions corresponding to the cell columns of the storage media, and, on an extension of the arm member 68, a roller 94 that rolls on the inner circumference of the ring member 90.

In the above clutch gear mechanism, where the roller 94 is engaged with one of the notches 92-1, 92-2 in the course of rotation of the ring member 90, the clutch gear 66 is put out of engagement with the first and second gears 62, 64, and where the roller 94 is out of the notches 92-1 and 92-2 in the course of rotation of the ring member 90, the clutch gear 66 is put into engagement with the first and second gears 62, 64. In this arrangement, the arm member 68 of the switching mechanism is driven to the clutch connection position by an actuator (electromagnetic solenoid) only while the roller 94 is out of the notches 92-1, 92-2.

It is also contemplated that the load/unload means 22 may be offset from the axis of rotation of the cell drum 18 by the clutch means 24.

The driving means of the cell drum 18 is driven by a timing belt 46 that couples a driving pulley 104 (FIG. 22), which transmits reduced rotation of a motor 20 (FIG. 21), to the cell drum 18. The timing belt 46 is attached, at its one point, to the cell drum 18 (FIG. 22), and rotates back and forth, or clockwise and counterclockwise in a reciprocating action within a predetermined angle of rotation θ, equal to or smaller than 360°, for example 0° to 270° or 0° to 180°.

Figure 23:
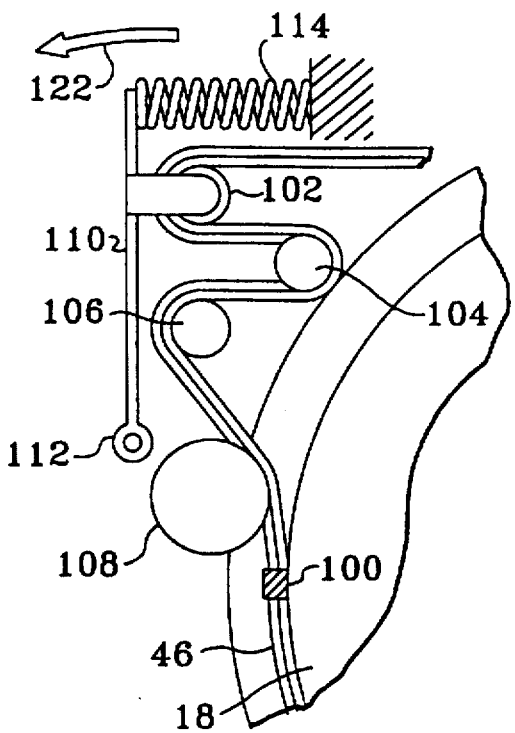
FIG. 23 is an explanatory view showing the operation of the tension mechanism of FIG. 22.

Referring to FIG. 23, a tension mechanism is provided to keep belt tension constant to compensate for stretch of the timing belt 46. The tension mechanism includes a pivotally movable arm member 110 that supports one of a plurality of idle pulleys coupled with the timing belt 46 and a spring member 114 that urges the arm 110 to tension the timing belt 46.

The cell drum 18 has a ring-shaped sensor member 116 (FIG. 24) for position sensing. The sensor member 116 is provided with rectangular slits 126-1, 126-2, 126-3 and 126-4 indicative of the positions of the cell columns of the cell drum 18 and a home position edge 124 (FIG. 25) indicative of the absolute reference position of the cell drum 18. In the present invention, the home position edge 124 is preferably located at the belt position that results in equal belt stretches in the reciprocating rotation of the timing belt 46.

Figure 24:
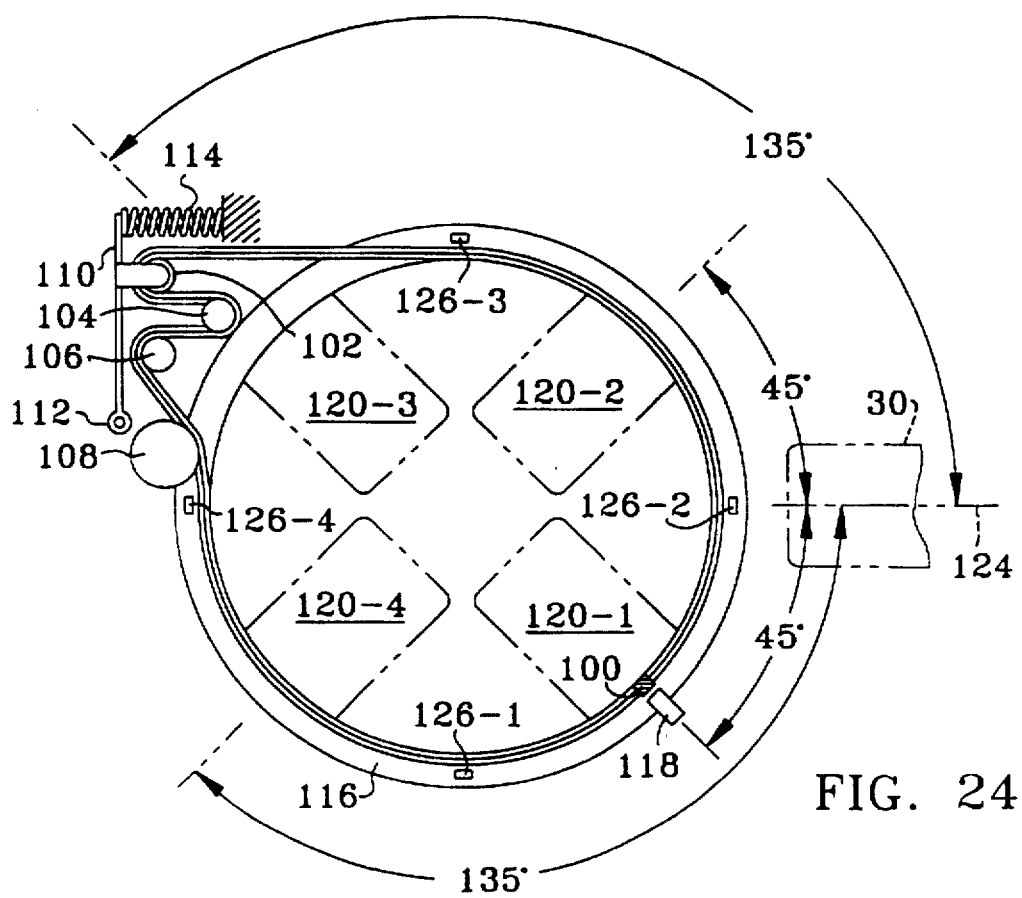
FIG. 24 is an explanatory view showing a position sensing mechanism of the cell drum having a sensor plate.
Figure 25:
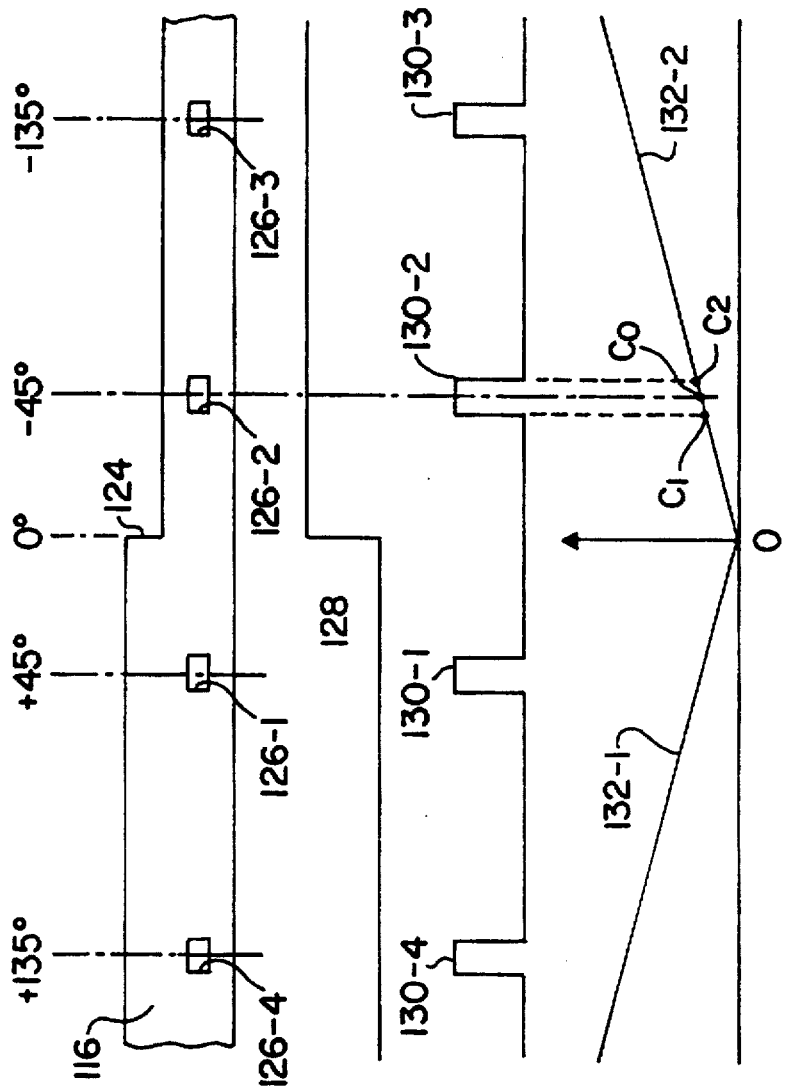
FIGS. 25(a), 25(B), 25(C) and 25(D) are explanatory views showing the sensor plate, detected signals and position fixing of the mechanism of FIG. 24.

The rectangular slits 126-1 to 126-4 and the home position edge 124 of the sensor member 116 are detected by a sensor 118 (FIG. 24). The home position edge 124 indicative of the absolute reference position may also be located at the belt fixed position where stretch of the timing belt 46 is at a minimum.

Also provided in addition to the sensor 118 are a pulse generator block 508 (FIG. 26) for generating pulses proportional to the rotation of the cell drum 18, a counter block 510 for counting the output pulses of the pulse generator 508, and reset means for setting the absolute reference position by resetting the counter block 510 in response to the sensing of the home position edge 124 by the sensor 118.

In a measurement adjustment mode set up as one of several self-diagnostic processes at the startup of the apparatus, two counts are provided by the counter block 510 when the sensor 118 detects two edge detection outputs from a rectangular slit 126-1, 126-2, 126-3 or 126-4. The two counts are averaged to determine the center position of the rectangular slit as the cell column position, and the resulting cell column position is stored.

In normal rotation of the cell drum 18, position control means 550 compares the counts provided by the counter block 510 with the stored cell column position provided the measurement adjustment means 560, and position-controls a particular cell column of the cell drum 18 against the accessor 30.

In the case where the load/unload means 22 is collinearly attached to the cell drum 18, the load/unload control is performed as follows. When the loading of a storage medium inserted into the load/unload means 22 to a specified cell position in the cell drum 18 is instructed, under control of loading control means 196 (FIG. 39), the cell drum 18 is rotated by 180°, the accessor 30 draws the storage medium from the load/unload means 22 and transports it to the specified cell, and the cell drum 18 rotates until the cell column to which the specified cell belongs faces the insertion position of the accessor 30.

When the unloading of the storage medium from the specified cell in the cell drum 18 is instructed, under control of the unloading control means 198, the accessor 30 moves to the specified cell, the cell drum 18 rotates until the cell column to which the specified cell belongs faces the insertion position of the accessor 30 in order to pick up the storage medium from the specified cell, the accessor 30 transports the picked storage medium to the load/unload means 22 to insert it into the load/unload means 22, and the cell drum 18 rotates 180° after insertion to allow the storage medium to be pulled out of the load/unload means 22.

Loading control and unloading control between the load/unload means 22 and the reproducing means 36 are carried out in the same manner as above.

In the case where the load/unload means 22 is coupled to the cell drum 18 via the clutch means 24, the cell drum 18 is rotated by 180° with the clutch means 24 engaged, to load or unload the storage medium.

If, in the course of loading control by the loading control means 196, the accessor 30 fails to pick up the storage medium from the load/unload means 22 and ends with an unsuccessful result, error recovery means 204 (FIG. 1) causes the cell drum 18 to rotate further by 180° with the clutch means 24 engaged, and prepares the cell drum 18 so that the storage medium can be pulled out of the load/unload means 22.

Provided further are a door 14 for closing or opening the load/unload opening, an opening switch (not shown in FIG. 1) for instructing opening of the door, a sensor (not shown in FIG. 1) for sensing insertion of the storage medium into the load/unload means 22 and for sensing the closing action of the door following insertion of the storage medium, means 194 for issuing storage medium transportation instructions to the loading control means 196 in response to the sensed output by the sensor, and means for opening the door when the storage medium is unloaded by the unloading control means 198.

Provided further is a medium position determining block 570 (FIG. 39) for determining the position of the cartridge in the load/unload block 22 that is rotated integrally with the cell drum 18 with the clutch means 24 in its engaged state under control of the loading control means 196 or the unloading control means 198. The medium position determining block 570 includes a first register 572 for storing rotation information indicative of the rotational direction (CW or CCW) of the load/unload block 22 during loading or unloading, and a second register 574 for storing transport direction information indicative of the starting point and destination point of the medium based on a loading or unloading instruction. The medium position determining block 570 determines the current position of the storage medium based on stored information in the first and second registers 572, 574.

Alternatively, the current position of the cartridge may be determined by allowing a sensor 582 (FIG. 45) to sense sensor patterns 578, 580 that represent the angle of rotation of the load/unload device 22. The library apparatus according to the present invention further has position initializing means 566 (FIG. 39) which causes the cell drum 18 to rotate back to its predetermined initial position for positioning in succession to an error-triggered suspension of the load/unload device 22 when an occurrence of an error in the cell drum 18 suspends the load/unload device 22 while it is in motion. When the position initializing means 566 causes the cell drum 18 to rotate for initialization, the storage medium in the load/unload device 22 may be at its starting point or destination point. The medium position determining block 570 facilitates the management of the memory medium in either event.

Figure 1B:
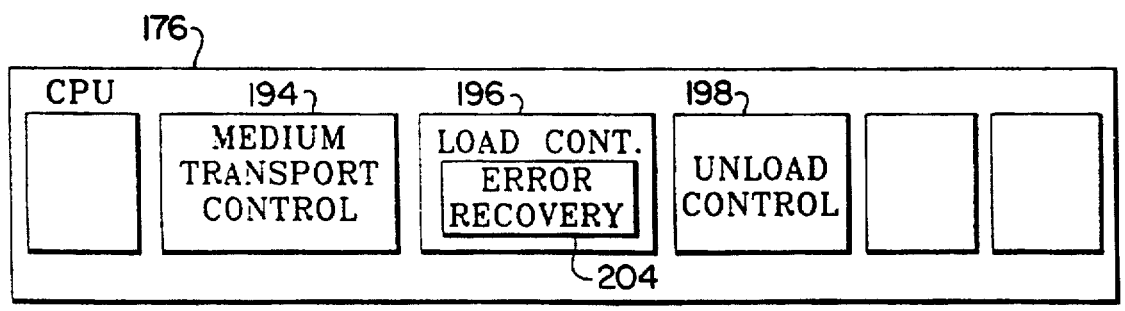

The library apparatus according to the present invention includes medium transport control means 194 (FIG. 1(B)) which performs optimum control in which, when transportation of the storage medium between the cell drum 18 and the reproducing means 36 is instructed, the storage medium is shifted from a From Address to a To Address by means of rotational motion of the cell drum 18 and transport motion of the accessor 30. When the accessor 30 remains stationary, the cell drum 18 is rotated until it is positioned to its optimum position for the next transportation of a medium.

For example, during the idling time of the cell drum 18 in which the accessor 30 is still in motion for transportation of the medium, the cell drum 18 is rotated to a position from which the average time required to travel to the pickup position of each cell is minimized.

Specifically, the sum of the products of the access occurrences, in which cell columns in the cell drum 18 are moved to the medium pickup position (C0, C1, ..., Cn-1), and the respective position numbers designating the cell positions (0, 1, ..., n-1), namely (C0.0+C1.1+...+Cn-1.n-1) is determined. The sum of the product is divided by the sum of the total number of accesses (C0+C1+...+Cn-1) to determine position number (M) representing the position of the minimum average traveling time. Since the calculated value may include a fraction, it is rounded off to the nearest whole number to determine the position number (M) which produces the minimum traveling time.

The predicted rotation time T1 of the cell drum 18 from the position (M) to transport the next medium, and the predicted transportation time T2 by the accessor 30 are calculated. When the rotation time T1 exceeds the transportation time T2, the cell drum 18 is rotated so that the cell column to which the next specified cell belongs is set to be closer to the insertion position of the accessor 30 by one cell column.

When an error occurs in the control of cell drum 18 during the transportation of a medium by the accessor 30, the medium transport control means 194 records an error until the accessor 30 completes the transportation of the medium, and reports the error to a host machine when the accessor 30 completes the transportation.

In the case where the load/unload means 22 is coupled with the cell drum 18 via the clutch means 24 in the library apparatus of the present invention, disengagement or engagement of the clutch means 24 changes inertia loading. To cope with this, there is provided servo means, wherein optimum servo gains (K1, K2, K3) are set up in servo control of a predetermined inertia loading (Je). In response to an actual inertia loading (J), correction is made by multiplying servo gains (K1, K2, K3) by (Je/J) and the corrected servo gains are set.

Specifically, based on inertia loading (J1) with the clutch means 24 disengaged, servo gains (K1, K2, K3) are modified by multiplying themselves by (Je/J1), and resulting servo gains (K11, K12, K13) are set. Further, based on inertia loading (J2) with the clutch means 24 engaged servo gains (K1, K2, K3) are modified by multiplying themselves by (Je/J2), and resulting servo gains (K21, K22, K23) are set.

The servo means is PID servo means provided with integral control with integral gain (K1), derivative control with derivative gain (K2), and proportional control (K3) with proportional gain (K3).

Specifically, the position servo includes a position sensor for sensing position P, a coefficient setter for performing correction by multiplying the sensed position P by a coefficient N2, a proportional element for setting the proportional gain K2, a current converter for generating a current signal I proportional to the proportional gain K2 of the proportional element, and a load which is subjected to positional change according to an acceleration (Kt/J) responsive to inertia loading (J) driven by the output current of the current converter. Thus, the coefficient N2 of the coefficient setter is multiplied by (Je/J).

The speed servo includes a speed sensor for sensing speed Q, a coefficient setter for performing correction by multiplying the sensed speed Q by a coefficient N3, a derivative element for setting the derivative gain K3, a current converter for generating a current signal I proportional to the derivative gain K3 of the derivative element, and a load which is subjected to a speed according to an acceleration (Kt/J) responsive to inertia loading (J) driven by the output current of the current converter. Thus, the coefficient N3 of the coefficient setter is multiplied by (Je/J).

Advantages of these aspects of the library apparatus of the present invention can already be seen based on the foregoing overview, while advantages of other aspects of the invention will become apparent later. The load/unload device that rotates around its vertical axis of rotation collinearly with the cell drum, and the rotation of the cell drum, can be used to drive the load/unload device. The present invention thus has the advantages of smaller size, accurate positioning, substantial cost reduction, enhanced reliability and ease of use, and thus offers improved overall performance of the library apparatus, without the need for conventional driving blocks and control blocks for the load/unload device.

By employing a timing belt that is fixed to one point on the cell drum for driving purposes, the driving mechanism is simplified and a cost reduction is achieved. The tension mechanism resolves the stretch problem of the timing belt, improving reliability in positioning accuracy.

By providing a home position edge indicative of the absolute reference position on the sensor member where both clockwise and counterclockwise stretches are equal or where the belt is fixed where a resulting stretch is minimum, the absolute reference position is accurately detected, and an improved homing accuracy results.

By performing measurement adjustment in the initialization phase, each cell column position relative to the absolute reference position is accurately determined based on the home position edge and the rectangular slits indicative of the cell column positions. Even if the timing belt stretches, homing accuracy of the cell drum is easily improved.

By taking advantage of the idling time during which the cell drum would ordinarily remain stationary, the cell drum is pre-positioned to an orientation which is likely to shorten the next traveling time of the cell drum. This arrangement improves the transportation time characteristic of the cartridge in the library apparatus. Even in the case of an error, the transportation of the cartridge is less affected by the error.

Where the connection or disconnection between the cell drum and the load/unload block changes inertia loading, the optimum servo gains are set by changing servo loop parameters at the initialization phase. Thus, the optimum servo gain setting is maintained.

Figure 2:
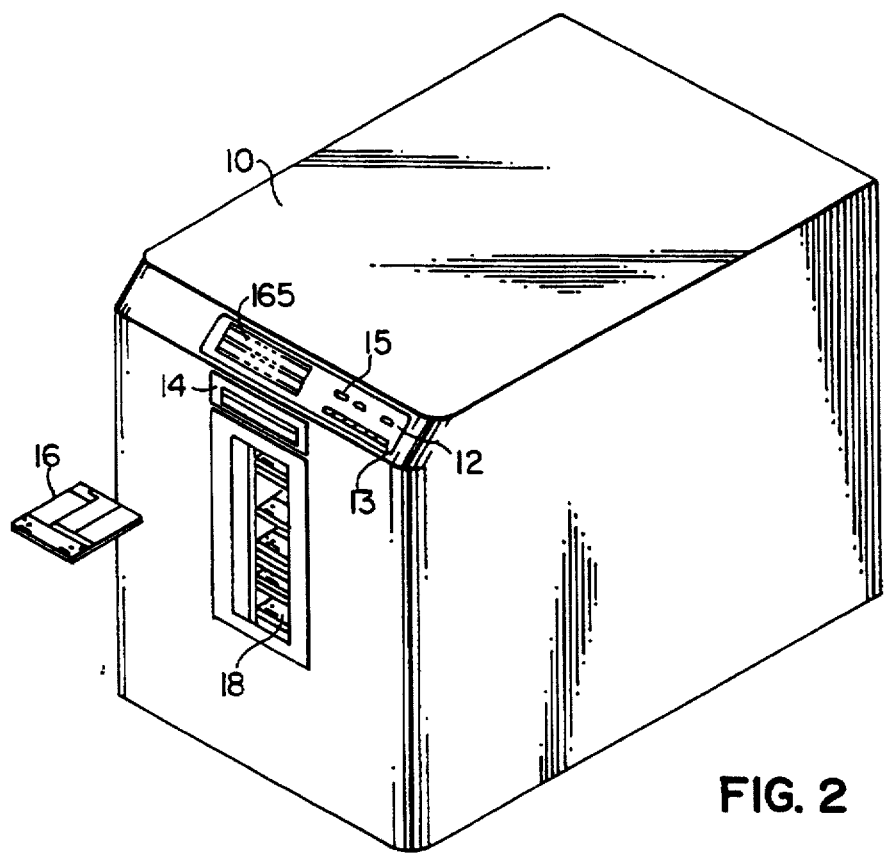
FIG. 2 is a perspective view of the library apparatus of the present invention.

The foregoing and other aspects of this embodiment of the invention will now be described in greater detail under the following headings:

1. General arrangement
2. Cartridge load/unload mechanism
3. Cell drum driving mechanism
4. Load/unload control
5. Initialization control at load/unload error-triggered suspension
6. Cartridge transport control at input/output
7. Optimum servo control of drum rotation
8. Additional aspects of the invention
9. Cartridge sorting
10. DEE processing
11. Cell drum/DEE door interlocks and skew prevention 1. General arrangement FIG. 2 is a general view of a library apparatus 10 according to the present invention. The apparatus 10 is a box-like cabinet and is sized so that it may be placed under an ordinary work table. An operation panel 12 is disposed on the top-front portion of the main unit 10. Disposed on the operation panel 12 are a message display screen 165 and a array of indicator lamps 13 and operation switches 15. A load/unload door 14 is disposed below the operation panel 12.

The load/unload door 14 is opened when a door-open switch on the operation panel 12 is pressed. With the door opened, a cartridge 16 is inserted. In this embodiment, the cartridge 16 contains an optical disk which is optically readable and writable.

A cartridge holder portion 19 equipped with a door is mounted below the load/unload door 14. An operator may manually or automatically store in the cartridge holder block 19 cartridges to be inserted into internal disk drives or pulled out of the library apparatus.

Figure 3:
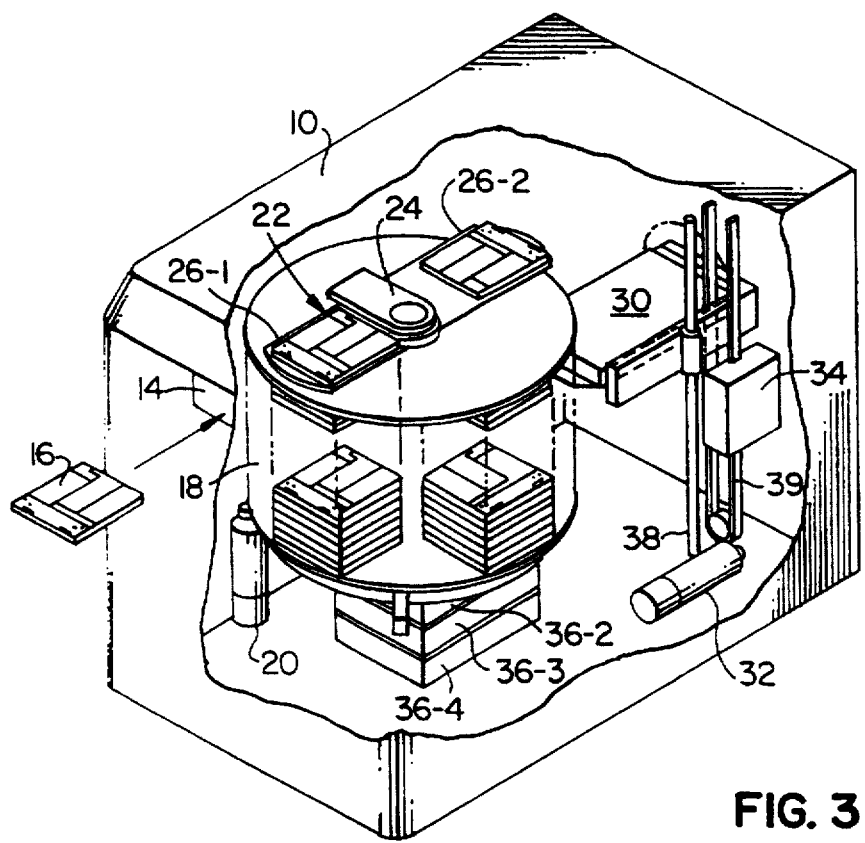
FIG. 3 is a partially cutaway perspective view showing the interior structure of the library apparatus of FIG. 2.

FIG. 3 shows the interior construction of the library apparatus with a portion of the case of the main unit 10 broken away. The apparatus main unit 10 has inside a cell drum 18 that functions as rotating and storage means. Belt-driven by a motor 20, the cell drum 18 rotates around its vertical axis of rotation. The cell drum 18 has cells vertically arranged for storing. In this embodiment, the cell drum 18 has four cell columns, angularly 900° spaced apart with each other around the drum surface.

A load/unload block 22 is collinearly disposed above the cell drum 18. The load/unload block 22 is generally a rectangular member, and is provided with trays 26-1, 26-2 for holding cartridges 16 on both ends. In this embodiment, the load/unload block 22 is connected to the axis of rotation of the cell drum 18 via a clutch block 24. When the clutch block 24 is engaged, the load/unload block 22 is collinearly but separately moved with the cell drum 18. When the clutch block 24 is disengaged, the load/unload block 22 remains stationary even if the cell drum 18 is rotating.

Disposed beside the cell drum 18 is an accessor 30 which functions as a medium transport means. The accessor 30 is slidably supported by a rail 38 in a manner that allows the accessor 30 to descend or ascend. A motor 32 is mounted below the rail 18, and rotation of the motor 32 is transmitted to a timing belt 39. The timing belt 39 is a loop belt, though its top portion is broken away in the view, and connected at its one side to the accessor 30, and provided with a balanced weight 34 on its other side. By allowing the motor 32 to drive the timing belt 39, the accessor 30 descends or ascends along the rail 38.

Disposed below the cell drum 18 are optical disk drive units 36-1 through 36-4 that function at least as reproducing means. The top optical disk drive unit 36-1 is not seen in FIG. 3.

When the operator inserts the cartridge with the load/unload door 14 opened, the inserted cartridge is received by the tray 26-1 of the load/unload block 22, which faces the operator. Upon completion of the insertion of the cartridge, the clutch block 24 puts the cell drum 18 and the load/unload block 22 into engagement. With the motor 20 rotating, the load/unload block 22 rotates integrally with the cell drum 18 by 180° to the position facing the accessor 30.

After rotation of the load/unload block 22, the clutch block 24 is disengaged. The accessor 30 then descends to the pickup position of the load/unload block 22 to pick up the inserted cartridge. After disengagement of the clutch block 24, the cell drum 18 rotates until the cell column to which the target cell belongs comes to the insertion position of the accessor 30. When the rotation of the cell drum 18 is complete, the accessor 30 moves to the target cell position of the cell column, and the cartridge is inserted into the target cell. This completes the cartridge loading operation.

A cartridge may be directly inserted into any of the optical disk drive units 36-1 through 36-4. The unloading operation of a cartridge from the cell drum 18 or any of the optical disk drive units 36-1 through 36-4 is the opposite of the loading operation just described.

Figure 4:
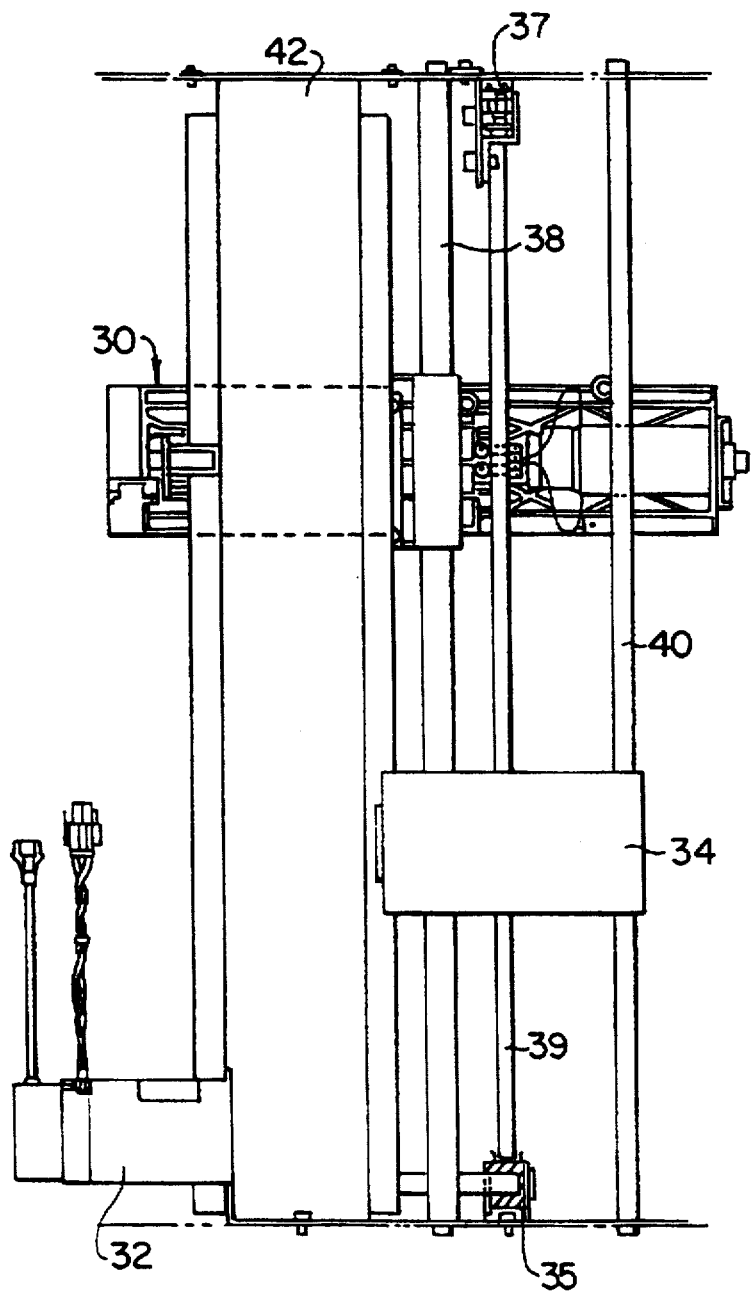
FIG. 4 is an explanatory view showing the driving mechanism of the accessor of the apparatus of FIG. 2.

FIG. 4 shows the accessor 30 of FIG. 3. The accessor 30 is slidably supported by two rails 38, 40 and a support frame 42 in a manner that allows the accessor 30 to vertically move. The motor 32 is mounted below the support frame 42, and the rotation of the motor 32 is transmitted to a drive gear pulley 35 via a reduction gear mechanism. The timing belt 39 couples the drive gear pulley 35 to the top gear pulley 37.

The timing belt 39 is attached at its one side of two parallel linear portions to the accessor 30, and is attached at its other side to the balance weight 34. The accessor 30 contains a robot hand mechanism that moves horizontally to pick up and insert a medium.

Figure 5:
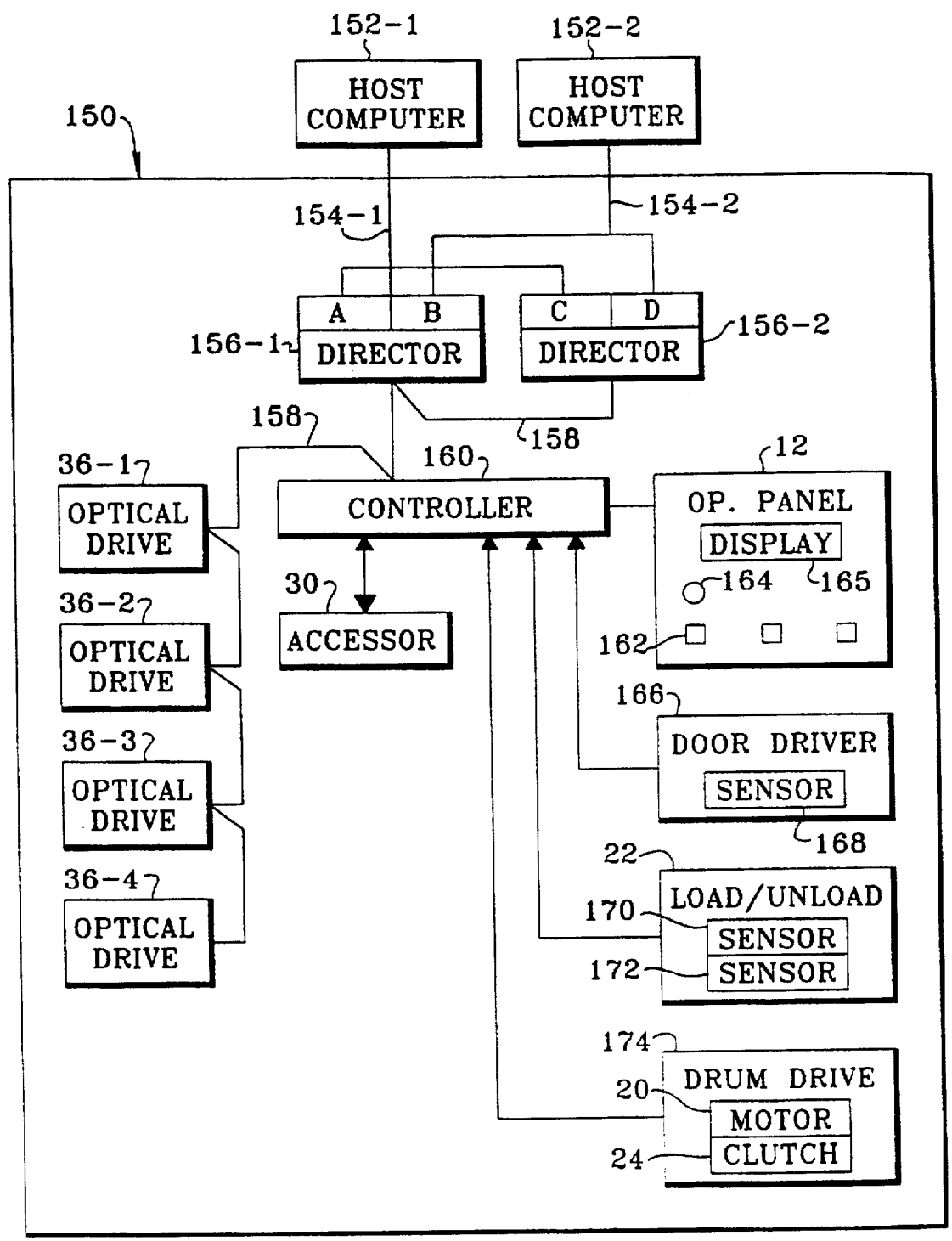
FIG. 5 is a block diagram showing the hardware structure of the library apparatus of the present invention.

FIG. 5 shows the hardware structure of the library apparatus of the present invention along with host computers. Library apparatus 150 is provided with directors 156-1, 156-2, which are connected to host computers 152-1, 152-2 via channel buses 154-1, 154-2, such as block multiplexer channel interfaces.

The directors 156-1, 156-2 are both accessible to the host computers 152-1, 152-2. That is, the host computer 152-1 has two paths that have access to channel A of the director 156-1 and channel C of the director 156-2 using the channel interface 154-1. Similarly, the host computer 152-2 has two paths that have access to channel B of the director 156-1 and channel D of the director 156-2 using the channel path 152-2.

A controller 160 is connected to the directors 156-1, 156-2. In this embodiment, four optical disk drive units 36-1 through 36-4 are provided. SCSI (small computer system interface) bus 158 is used to interconnect the directors 156-1, 156-2, the controller 160, and the optical disk drive units 36-1 through 36-4.

The optical disk drive units 36-1 through 36-4 have insertion/ejection capabilities, and can record and reproduce data from a disk medium. Connected to the controller 160 are the accessor 30, the operation panel 12, door driving block 166, load/unload block 22 and drum driving block 174. The operation panel 12 has a message display screen 162 and the door-open switch 162.

The door driving block 166 has a door sensor 168. As shown in FIG. 3, the load/unload block 22 has two trays 26-1, 26-2, and the trays 26-1, 26-2 are equipped with the respective cartridge sensors 170, 172 (FIG. 5). The drum driving block 174 is provided with the motor 20 and the clutch block 24.

Figure 6:
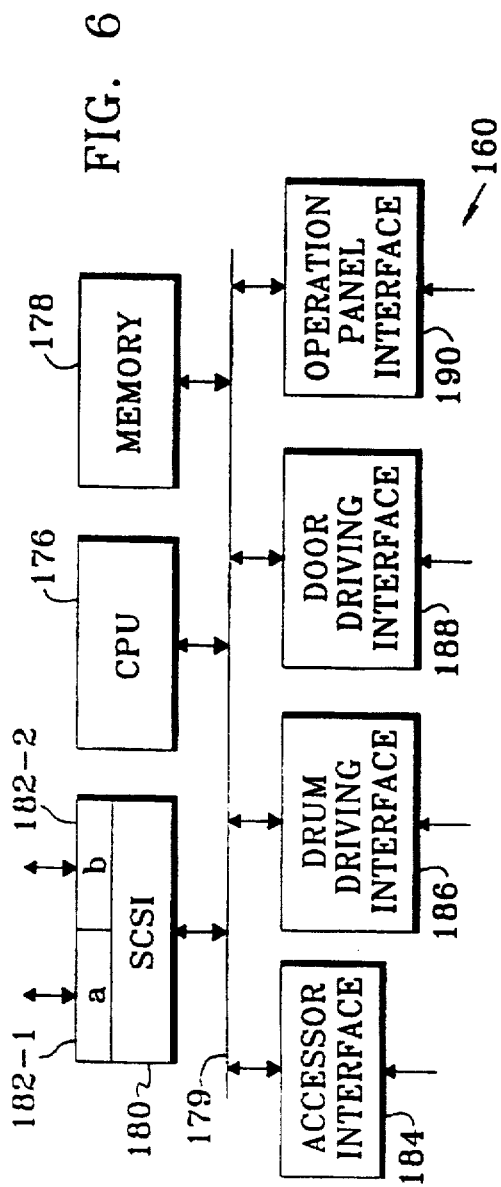
FIG. 6 is a block diagram showing the hardware structure of the controller of the structure shown in FIG. 5.

FIG. 6 shows the hardware structure of the controller 160 of FIG. 5. The controller 160 has CPU 176 as a control means. A memory 178 is connected to the CPU 176 via an internal bus 179. The memory 178 contains a ROM for storing permanently a control program, and a DRAM used as data memory. A SCSI controller 180 is connected to the CPU 176. The SCSI controller 180 has two connection ports 182-1, 182-2, to which SCSI interface bus 158 (FIG. 5) is connected.

Provided as device interfaces subordinate to the CPU 176 are an accessor interface 184 (FIG. 6), a drum driving interface 186, a door driving interface 188, and an operation panel interface 190.

Figure 7:
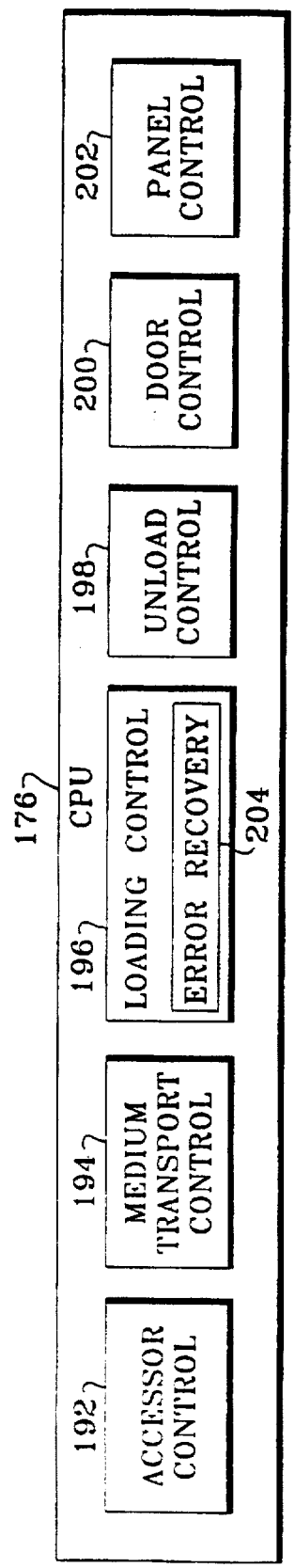
FIG. 7 is a block diagram showing the functions of the controller of FIG. 5.

FIG. 7 illustrates a diversity of control functions of the CPU 176 required in the library apparatus according to the present invention. Under program control of the CPU 176 are an accessor control block 192, the medium transport control block 194, the loading control block 196, the unloading control block 198, a door control block 200 and a panel control block 202. The loading control block 196 is provided with the error recovery block 204. A diversity of control functions performed by the CPU 176 are discussed in more detail later.

2. Cartridge load/unload mechanism

Figure 8:
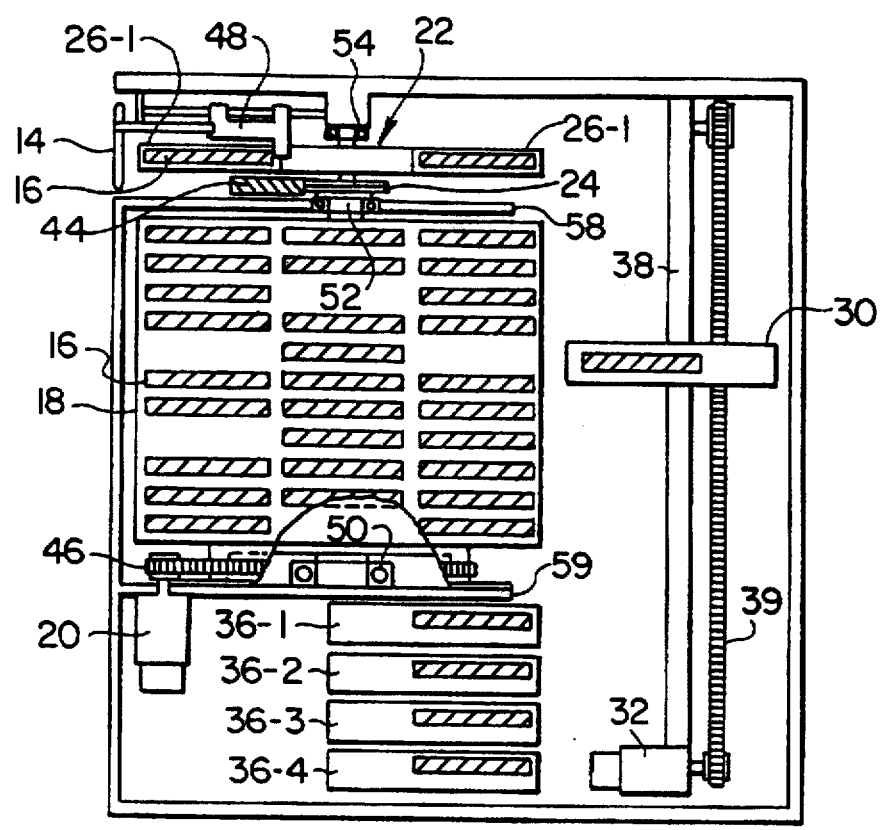
FIG. 8 is a diagram showing the interior structure of the library apparatus.
Figure 9:
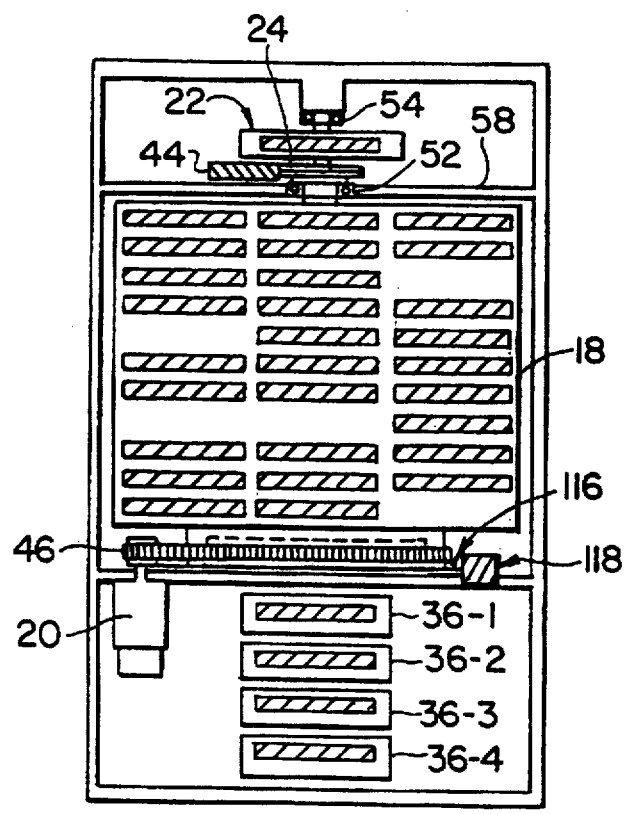
FIG. 9 is a side view of the apparatus of FIG. 8.

FIG. 8 shows the interior construction of the library apparatus of the present invention, and FIG. 9 is a side view of the interior construction. Like numerals in FIG. 1 refer to like parts in FIGS. 8 and 9.

The cell drum 18 is supported at a bearing 50 mounted in a lower support plate 59 and at a bearing 52 mounted in the upper support plate 58, in a manner that the cell drum 18 is rotatable around its own vertical axis of rotation. The motor 20 is mounted in one corner of the lower plate 59 from below, and the motor 20 has a built-in reduction gear mechanism. Its gear-reduced rotation is transmitted to the timing belt 46.

Assuming that the overall reduction ratio from the motor 20 to the cell drum 18 is 1/100, the gear reduction mechanism of the motor 20 reduces by 1/10, and the timing belt 46 reduces by 1/10. The timing belt 46 is coupled to the bottom portion of the cell drum 18. As will be described later, the timing belt 46 is anchored to the cell drum 18 at one point.

The load/unload block 22 is supported by a bearing 54 in a rotatably free manner above the cell drum 18. The clutch block 24 is provided between the load/unload block 22 and the top of the axis of rotation of the cell drum 18. The clutch block 24 projects from the clutch solenoid 44. The load/unload block 22 has two cartridge trays 26-1, 26-2, spaced apart 180°.

The load/unload door 14 is provided in front of the load/unload block 22. The load/unload door 14 is connected to a door open-close block 48. The door open-close block 48 is driven to the right by an actuator such as an electromagnetic solenoid, causing the door 14 to open. The cartridge 16 represented by a hatched portion in the figure is inserted with the door 14 opened. This insertion presses the open-close block 48, thereby causing the door 14 to close as shown.

Disposed below the cell drum 18 are the optical disk drive units 36-1 through 36-4. Beside the cell drum 18, the accessor 30 is slidably supported by the rail 38 in a manner that allows the accessor 30 to vertically move. The accessor 30 is driven vertically upward and downward by the timing belt 39 coupled to the motor 32.

FIGS. 8 and 9 show that each of the cell drum 18, the load/unload block 22, the accessor 30 and the optical disk drive units 36-1 through 36-4 is loaded with respective cartridges, each represented by a hatched rectangle.

Figure 10:
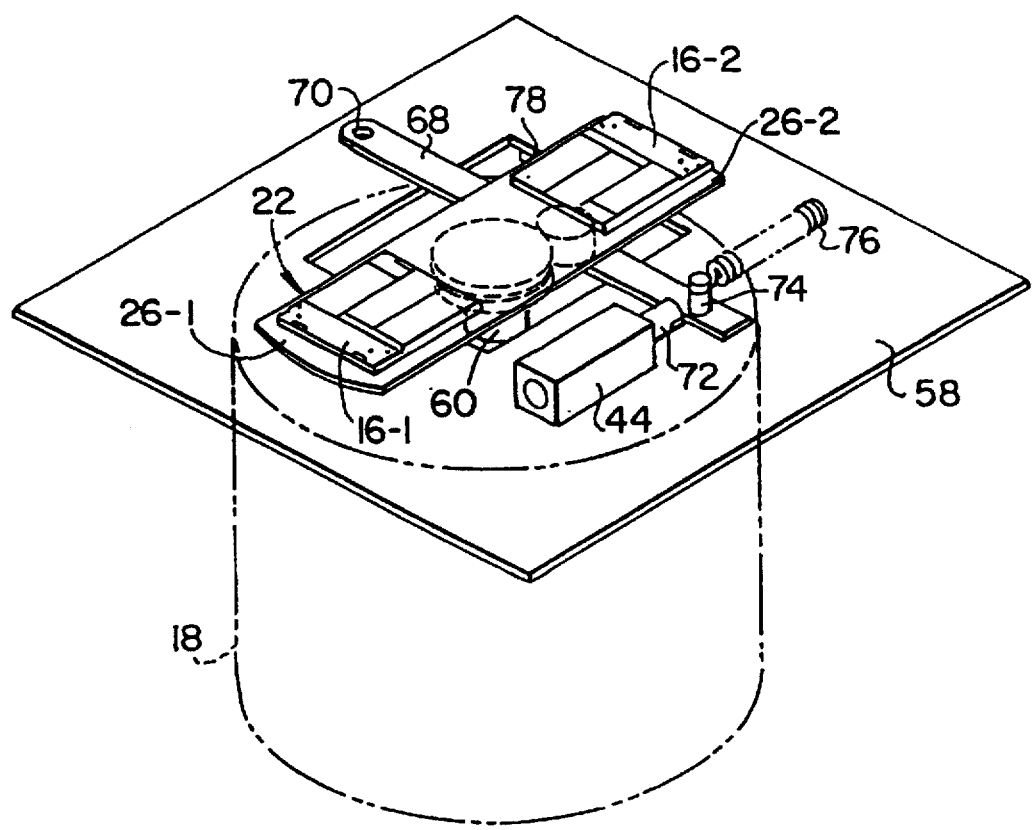
FIG. 10 is a perspective diagram showing a portion of the apparatus of FIG. 2, including the load/unload block and a clutch mechanism.

FIG. 10 shows the load/unload mechanism. A rectangular opening 78 is disposed in the center of the upper support plate 58 above the cell drum 18. A fixed shaft 60 of the cell drum 18 projects through the rectangular opening 78, and the load/unload block 22 is mounted on this projected portion.

Figure 11:
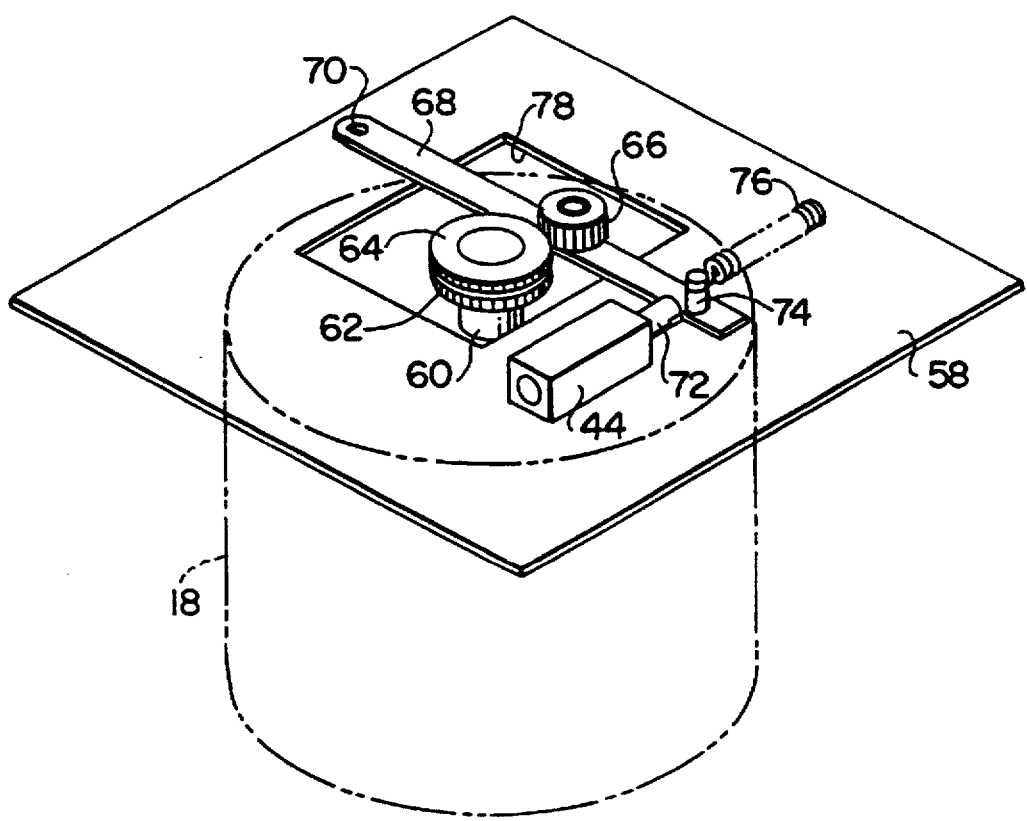
FIG. 11 is a diagram of the apparatus of FIG. 10, showing the clutch mechanism disengaged.

FIG. 11 shows the detail of the clutch mechanism with the load/unload block 22 of FIG. 10 removed. A gear 62 is rigidly attached to the end of the shaft 60 of the cell drum 18. A gear 64 that is attached to the load/unload block 22 is disposed above the gear 62 with a predetermined gap allowed therebetween. Both the gears 62 and 64 are collinearly arranged, and have the identical number of teeth. A clutch gear 66 that has a length covering both gears 62 and 64 is arranged against both the gears 62 and 64. The clutch gear 66 is freely rotatably supported by an arm 68 that is pivotally freely supported at its axis hole 70 onto the support plate 58.

The rod 72 of the electromagnetic solenoid 44 is linked to one end of the arm 68. A pin 74 is attached to the end of the arm 68 where the rod 72 is connected, and a pulling spring 76 is linked between the pin 74 and a fixed point. In FIG. 11, the electromagnetic solenoid 44 is inactive. The arm 68 is pivoted counterclockwise about the axis hole 70 by the force of the pulling spring 76, pulling the clutch gear 66 out of engagement with the gears 62, 64 for clutch disengagement.

Figure 12:
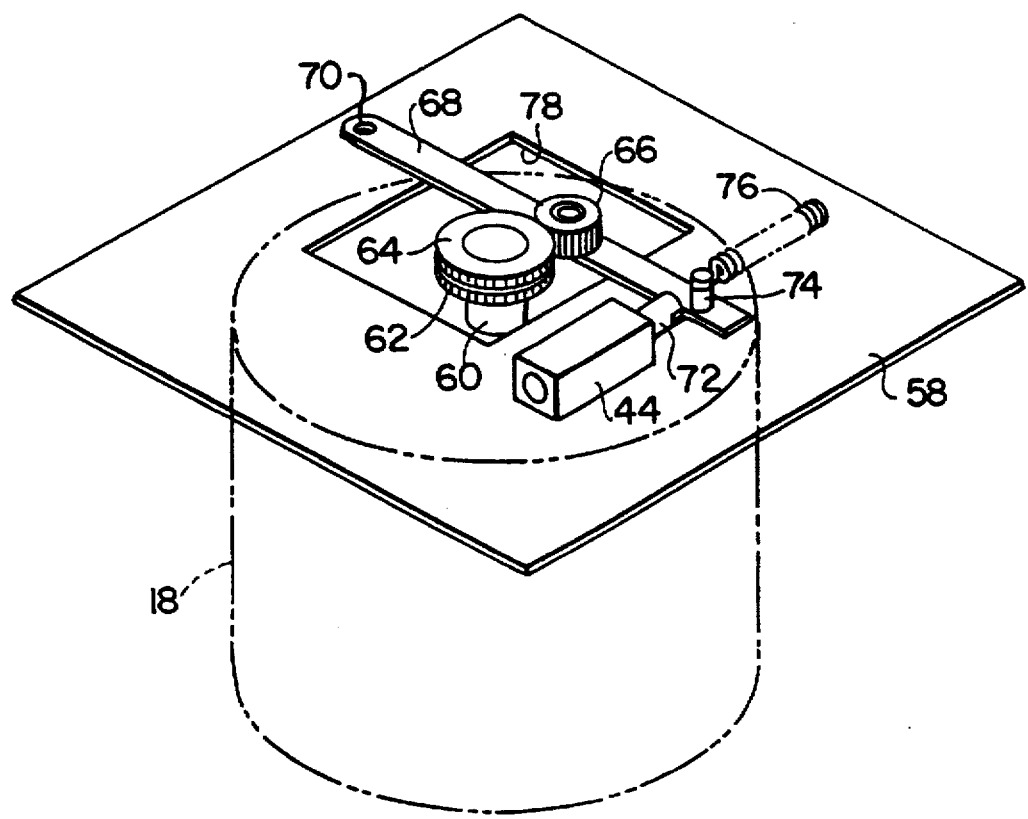
FIG. 12 is another diagram of the apparatus of FIG. 10, showing the clutch mechanism engaged.

FIG. 12 illustrates the clutch in an engaged state. Namely, when the electromagnetic solenoid is conducting, the rod 72 is drawn, and the arm 68 is pivoted clockwise about its axis hole 70 against the pulling spring 76, pulling the clutch gear 66 into engagement with the gears 62, 64. In this manner, the rotation of the gear 62 with the cell drum 18 is transmitted to the gear 64 via the clutch gear 66, and the load/unload block 22 attached to the gear 64 is driven in integral rotation with the cell drum 18.

Figure 13:
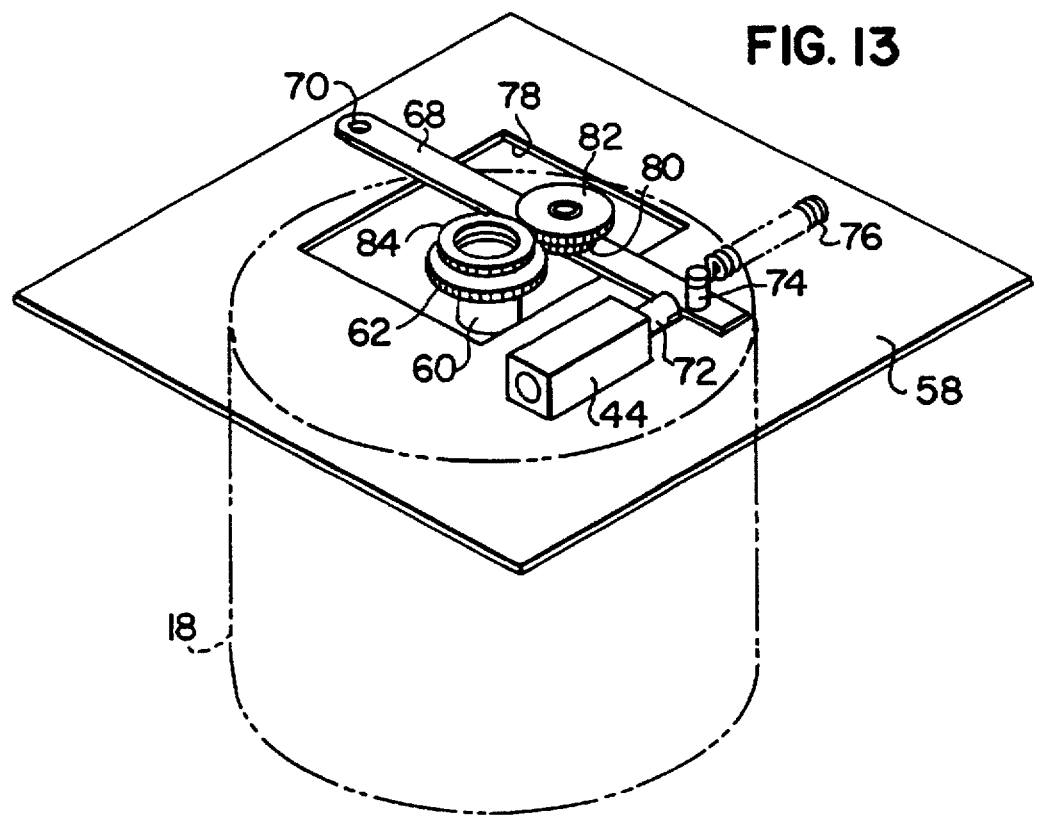
FIG. 13 is a diagram of another embodiment of the clutch mechanism of FIG. 10, having a gear ratio other than 1.

FIG. 13 shows another embodiment of the clutch mechanism according to the present invention. In the embodiment in FIG. 11, the reduction ratio in the clutch mechanism is 1. In the embodiment of FIG. 13, the reduction ratio is 1:n. In the clutch mechanism of this embodiment, gear 84 attached to the load/unload side is disposed above the gear 62 attached to the end of the shaft 60 of the cell drum 18 with a predetermined space allowed therebetween, and both gears are different in the number of teeth. Idler gears 80, 82, which move together, are employed as clutch gears.

Figure 14:
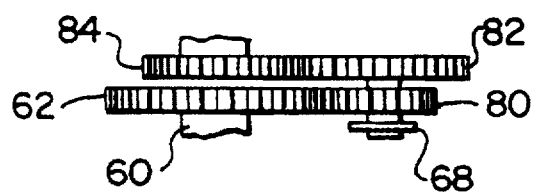
FIG. 14 is an explanatory view showing the gear clutch portion of FIG. 13.

FIG. 14 shows the clutch gear mechanism of FIG. 13. A pair of clutch gears 80, 82 are disposed on the arm 68. The gear 62 of the shaft 60 of the cell drum 18 is engaged with the idler gear 80. The gear 84 of the load/unload block 22 is engaged with the idler gear 82.

Let Z1 represent the number of teeth of the gear 62, Z2 the number of teeth of the idler gear 80, Z3 the number teeth of the idler gear 82, and Z4 the number of teeth of the gear 84.

The rotation of the cell drum 18 is multiplied by $(Z2 \times Z4)/(Z1 \times Z3)$ times. For example, assuming that the idler gear 80 has half the number of teeth of the gear 62, and that the idler gear 82 and the gear 84 has the same number of teeth, the rotation of the cell drum 18 is doubled when transmitted to the load/unload block 22.

Figure 15:
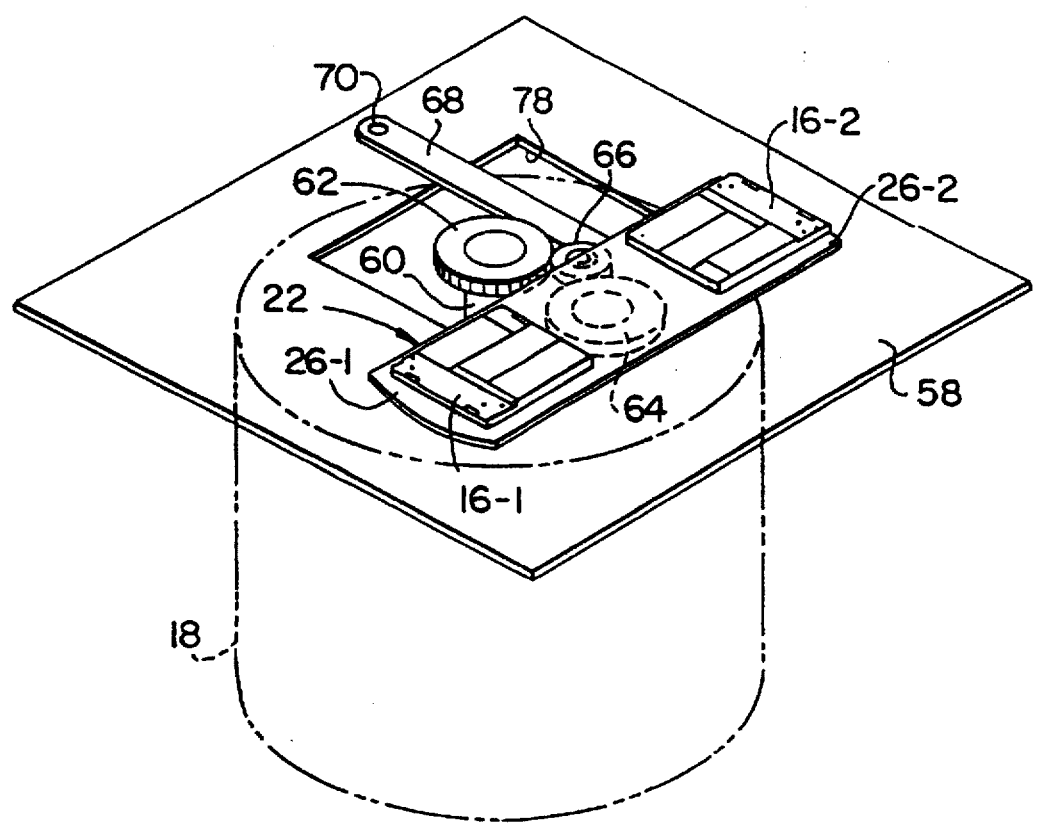
FIG. 15 is an explanatory view showing an embodiment of the load/unload mechanism offset against the cell drum.
Figure 16:
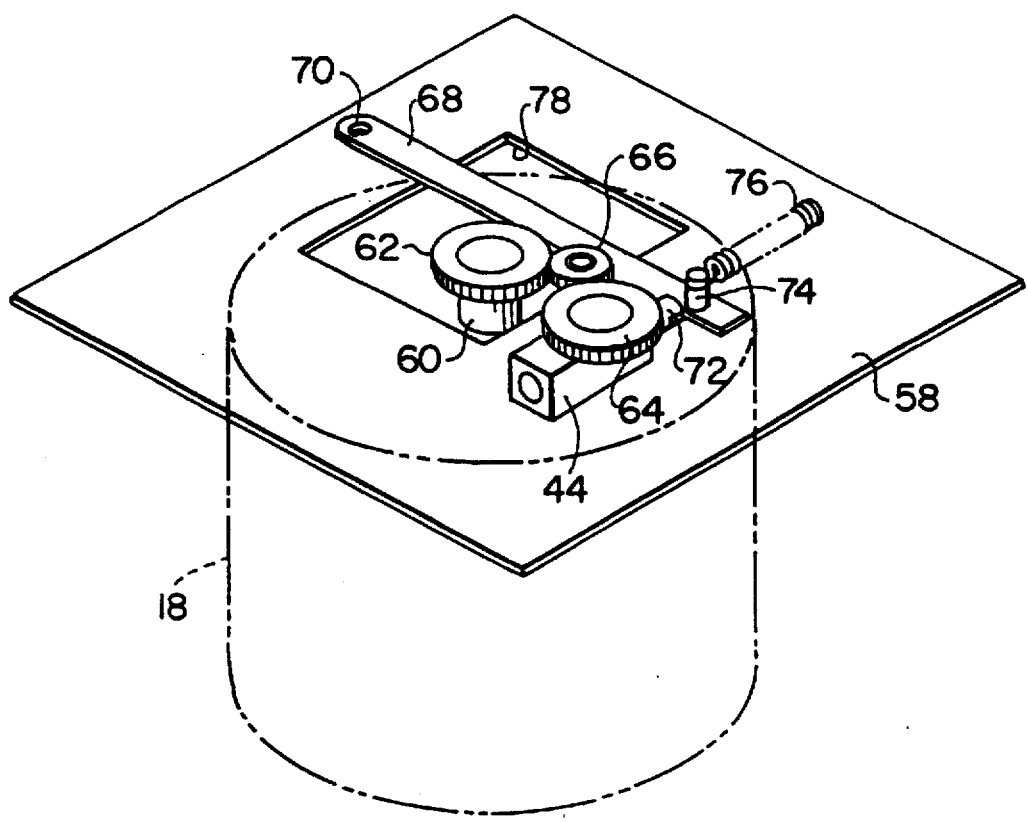
FIG. 16 is an explanatory view showing the clutch mechanism of FIG. 15.

FIGS. 15 and 16 show another embodiment of the clutch mechanism of the present invention. In this embodiment, the load/unload block 22 is mounted in an offset position off the axis of rotation of the cell drum 18. In this clutch mechanism, the clutch gear 66, engaged by the electromagnetic solenoid 44, is disposed between the gear 62 of the cell drum 18 and the gear 64 of the load/unload block 22 that is offset.

Figure 17:
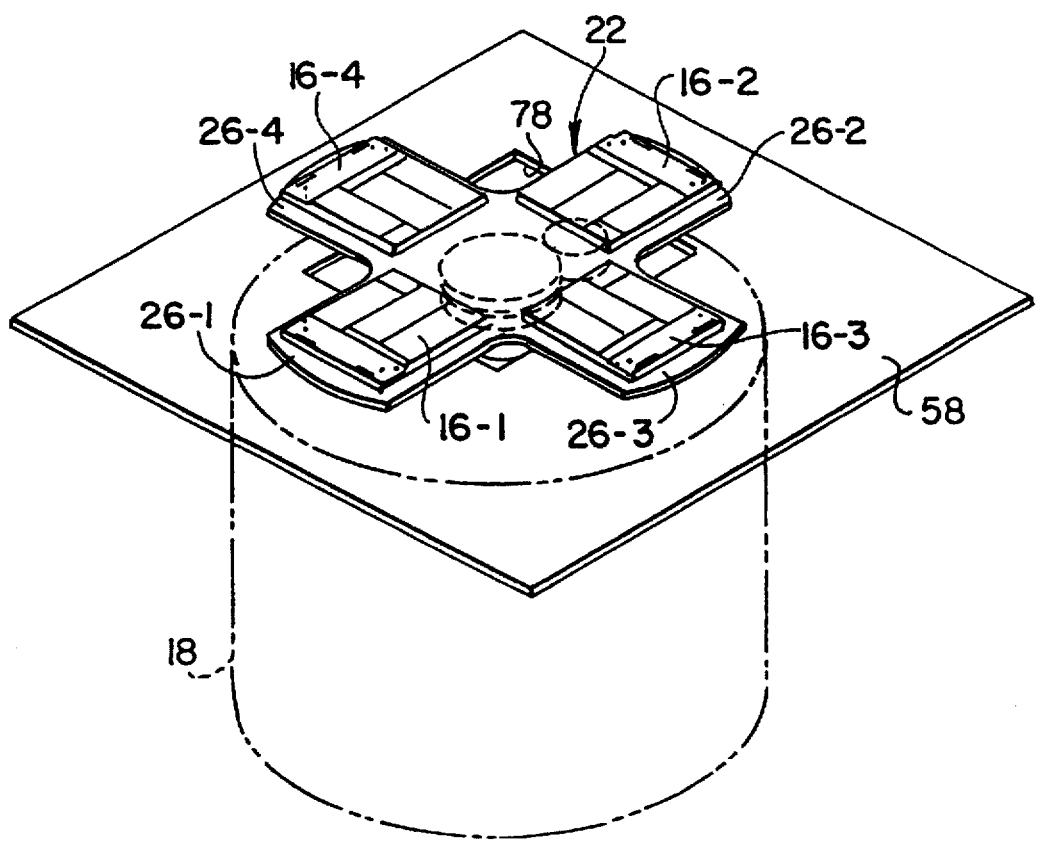
FIG. 17 is a diagram showing the load/unload mechanism with four trays.

FIG. 17 is another embodiment of the load/unload block 22 according to the present invention. In this embodiment, the load/unload block 22 is provided with four trays 26-1 through 26-4, spaced apart 90° around the axis of rotation of the load/unload block 22 in a cross pattern. Since the present embodiment is provided with four trays 26-1 through 26-4, 90° spaced apart, loading and unloading operations are performed by rotating the cell drum 18 in steps of 90° with the clutch mechanism engaged.

Figure 18:
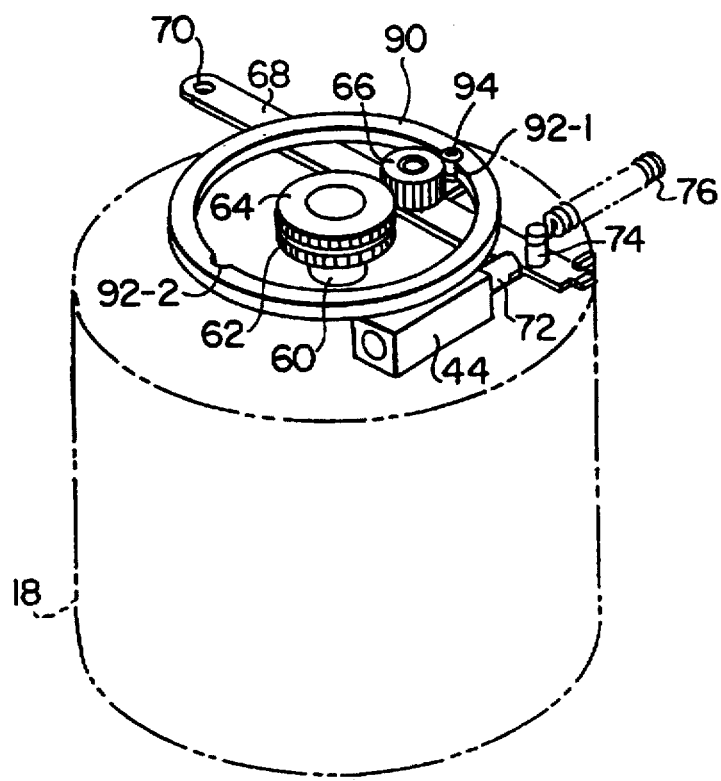
FIG. 18 is an explanatory view of a clutch mechanism with a detent ring.

FIG. 18 is yet another embodiment of the clutch mechanism of the present invention. In the above-described embodiments of the clutch mechanism, the electromagnetic solenoid 44 must always be energized to engage the clutch. In contrast, the embodiment in FIG. 18 allows the electromagnetic solenoid 44 to conduct only for the initial engagement. Once the clutch is engaged, engagement can be maintained even if power to the electromagnetic clutch 44 is turned off a moment after the start of the rotation.

Figure 20A:
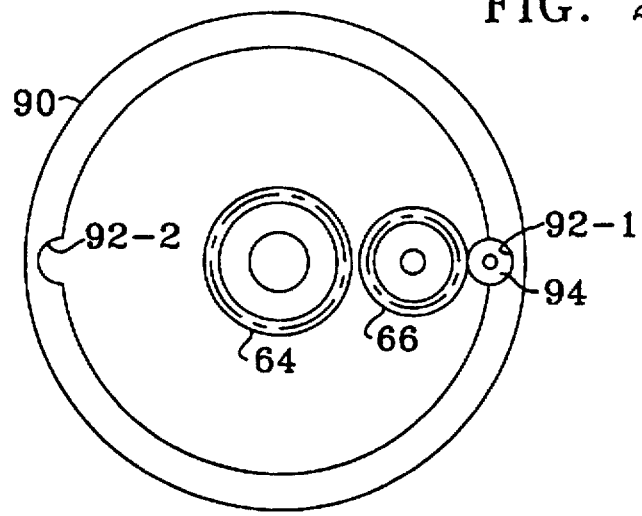
FIG. 20(A) is a plan view showing the clutch of FIG. 18 disengaged.
Figure 20B:
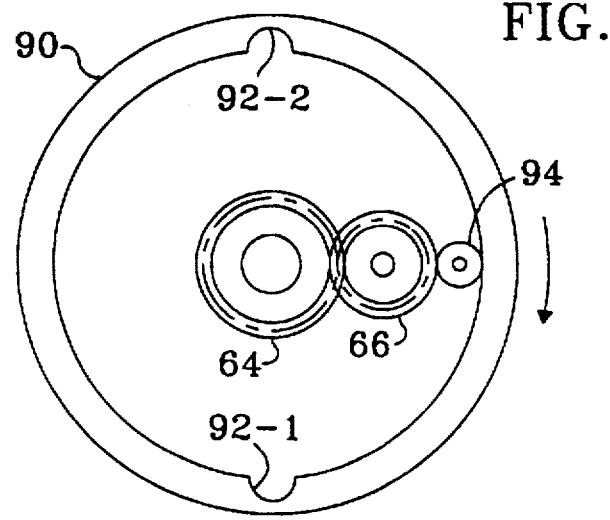
FIG. 20(B) is a plan view showing the clutch of FIG. 18 engaged.

The embodiment in FIG. 18 has the detented ring member 90, which rotates in integral motion with the load/unload block 22 above the detent ring member 90. The detent ring 90 is provided with round notches 92-1, 92-2 at the positions corresponding to the trays 26-1, 26-2 spaced apart 90° on the load/unload block 22, as shown in FIG. 20(A) and 20(B). The arm 68 that supports the clutch gear 66 is provided with a roller 94 that is engaged or disengaged with the round notches 92-1, 92-2, depending on the position of the ring 90.

FIG. 18 shows the disengaged state in which the clutch gear 66 disconnects the gear 62 from the gear 64. In this case, the electromagnetic solenoid 44 is off, and the roller 94 supported by the arm 68 is in engagement with one of the round notches 92-1 of the detent ring 90. This stage is best seen from the plan view in FIG. 20(A).

Figure 19:
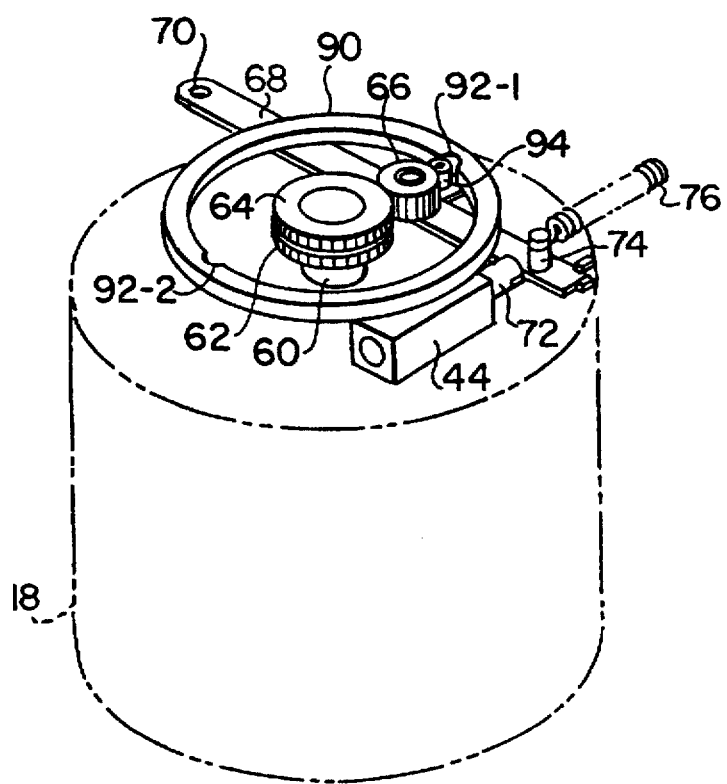
FIG. 19 is an explanatory view showing the engaged state of the clutch of FIG. 18.

FIG. 19 shows the state in which the electromagnetic solenoid 44 of FIG. 18 is conducting. The conducting electromagnetic solenoid 44 pulls the rod 72, the arm 68 is clockwise pivoted about its axis hole until the clutch gear 66 is meshed with the gears 62, 64, and clutch engagement is thus established. The roller 94, now out of the round notch 92-1, is in its rolling position along the inner circumference of the detent ring 90.

The cell drum 18 is rotated in the clutch engagement state. The load/unload block 22 is also rotated by means of the clutch engagement, and the detent ring 90 is rotated as well. When the round notch 92-2 of the detent ring 90 is sufficiently far from the roller 94, the clutch gear 66 is continuously engaged with the gears 62, 60 by means of the force of the pulling spring 76 because the roller 94 is kept in contact with the inner circumference of the detent ring 90 even when the electromagnetic solenoid 44 is deactivated.

The plan view in FIG. 20(B) shows the detent ring 90 in the clutch engagement state, in which case the electromagnetic solenoid 44 may be deactivated. When the detent ring 90 rotates by 180° and the roller 94 reaches the notch 92-2, the force of the pulling spring 76 draws the roller 94 into the notch 92-2 automatically separating the clutch gear 66 from the gears 62, 64, thereby transitioning to the clutch disengagement state.

Figure 21:
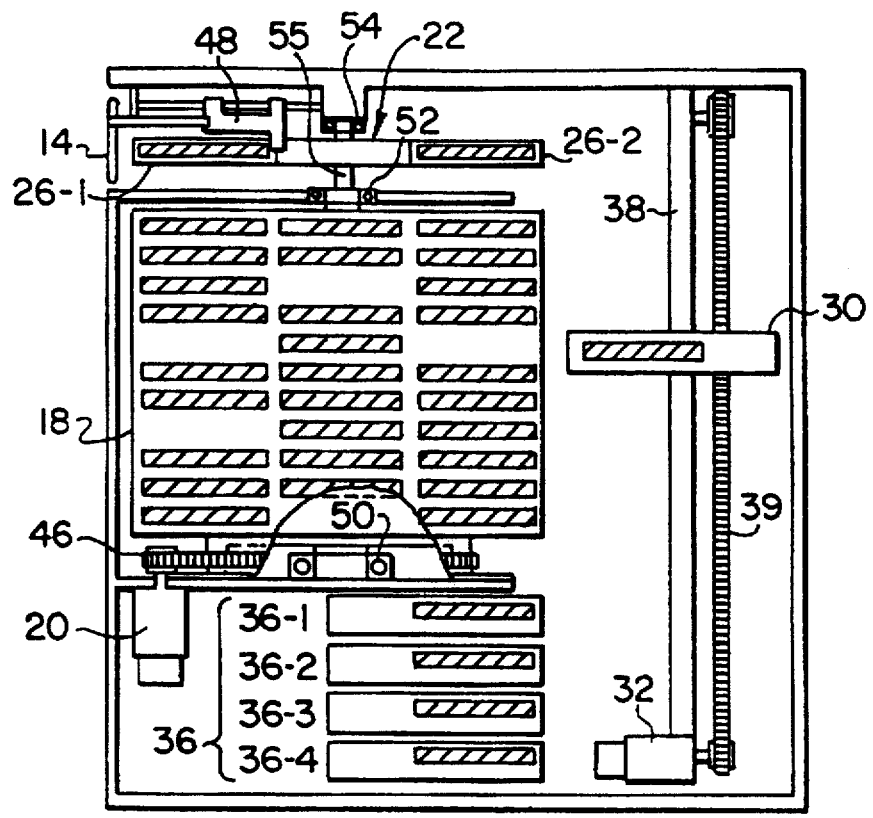
FIG. 21 is an explanatory view showing another embodiment wherein the load/unload mechanism is fixed to the cell drum.

FIG. 21 is another embodiment of the medium load/unload mechanism of the present invention. In the embodiments just described, the load/unload block 22 is connected to the cell drum 18 via the clutch block 24. In this embodiment, the load/unload block 22 is directly and collinearly connected to the axis of rotation of the cell drum 18. In other words, the load/unload block 22 is rigidly attached to the axis of rotation 55 of the cell drum 18, and thus both are rotated integrally.

In such an arrangement, no clutch mechanism is provided, and thus the internal structure is accordingly simplified. Since no clutch is provided, the load/unload block 22 is rotated during transportation of a cartridge between the cell drum 18 and any of the optical disk drive units 36-1 through 36-4. There is no difference between the rotation of the cell drum 18 for loading or unloading operations, and rotation of the cell drum 18 for drive insertion and ejection operations. The rest of the construction remains unchanged from the embodiments which employ a clutch mechanism.

3. Cell drum driving mechanism

Figure 22:
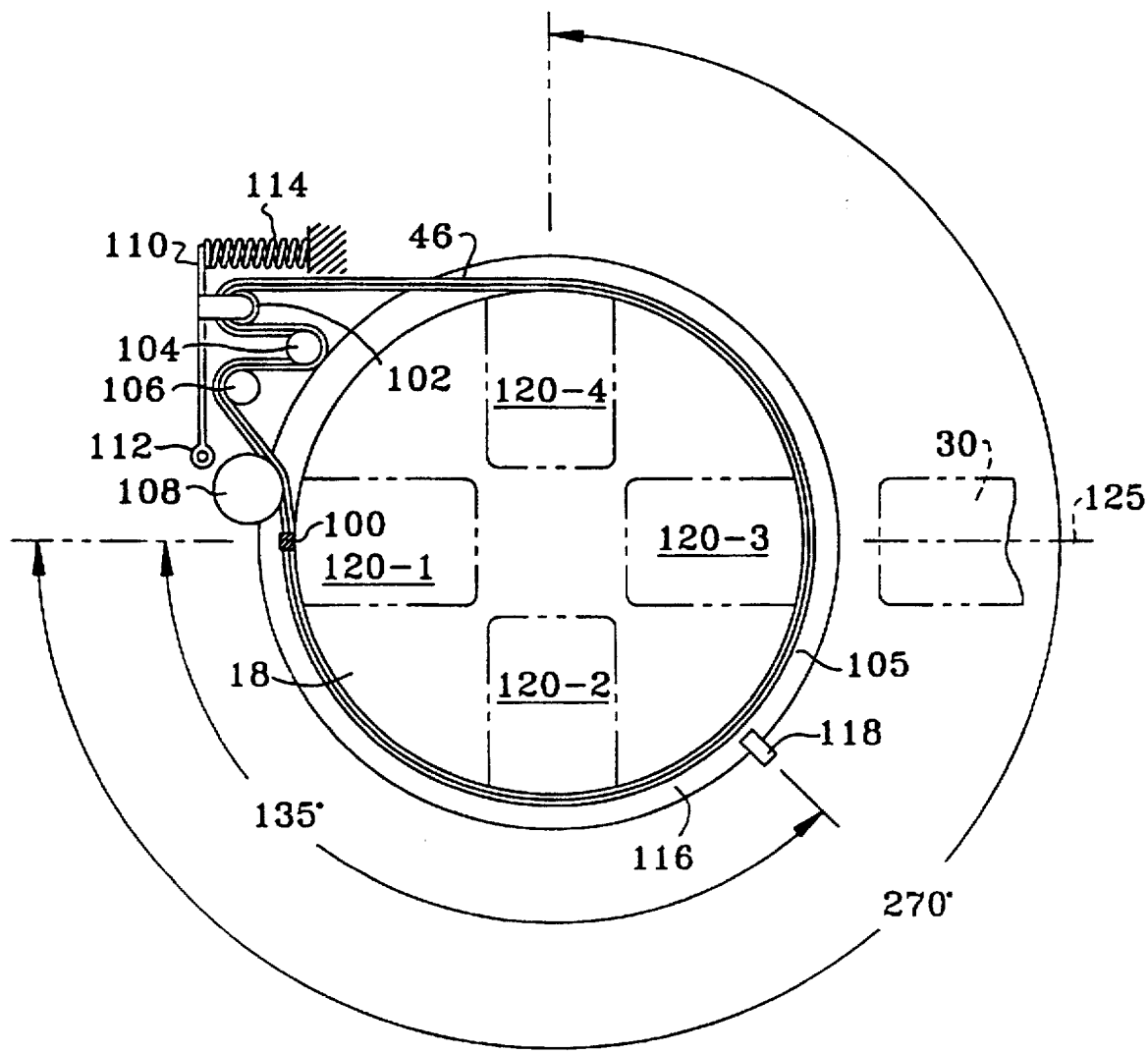
FIG. 22 is an explanatory view showing a belt driving mechanism for rotating the cell drum with four cell columns over a range of 270°.

FIG. 22 shows the driving mechanism of the cell drum 18 employing the timing belt 46 according to the present invention. The timing belt 46 is wrapped around a pulley portion 105 formed on the bottom portion of the cell drum 18 with the cogged side of the belt 46 out. The timing belt 46 is anchored to the cell drum 18 at a fixed point 100 on the left-hand side of the drum 18. Disposed at the top-left portion of the cell drum 18 is a motor driving pulley 104 with which the cogged side of the timing belt 46 is meshed.

Disposed on opposing sides of the motor drive pulley 104 are pulleys 102 and 106. A gear pulley 108 is disposed next to the pulley 106. Both pulleys 106 and 108 have axes of rotation anchored to fixed points. In contrast, the pulley 102 has its axis of rotation supported by the arm 110. The arm 110 is pivotally supported by an axis 112 shown below in the figure, and a compression spring 114 is disposed between the top end of the arm 110 and a fixed point.

Therefore, the arm 110 is urged by the compression spring 114 in a counterclockwise direction about the fixed axis 112. The pulley 102, the arm 110 and the compression spring 114 constitute a tension mechanism acting on the timing belt 46. When the arm 110 is pivoted counterclockwise by the compression spring 114, the pulley 102 tensions the belt 46 against the fixed side of the pulley portion 105 of the cell drum 18 and the motor gear pulley 104.

As a result, a constant tension determined by the force of the compression spring 114 is exerted on the timing belt 46. Although the timing belt 46 stretches as it ages, the resulting stretch of the belt is absorbed by the counterclockwise pivotal motion of the arm 110. The compression spring 114 thus exerts a constant tension to the timing belt 46 until it is fully extended to its natural length.

FIG. 23 shows the tension mechanism in which the timing belt 46 is stretched. In response to stretching of the timing belt 46, the force of the compression spring 114 is exerted on the arm 110 so that the arm 110 is pivoted about the fixed axis 112 counterclockwise and the pulley 102 is pulled outward. Thus, stretching of the belt is absorbed, and a constant tension determined by the force of the compression spring 114 is exerted on the belt.

Returning again to FIG. 22, a ring-shaped sensor plate 116 is integrally attached to the bottom of the pulley portion 105 of the cell drum 18. A position sensor 118 is disposed at a fixed position relative to the sensor plate 116. The position sensor 118 may be any appropriate sensor type such as a transmission type photodetector sensor having a light emitter and a photosensitive element, or a reflective-type optical sensor.

The position sensor 118 is mounted at the angularly center position of a rotation range of 270° of the cell drum 18, namely at 135° from the timing belt's fixed point 100 to the cell drum 18. The position of the sensor 118 is where a substantial balance is established between clockwise and counterclockwise stretchings of the timing belt 46 when the motor drive pulley 104 tensions the timing belt 46 wrapped around the cell drum 18 over an angular range of 270°.

FIG. 24 shows the relationship between the sensor plate 116 attached to the cell drum 18 and the position sensor 118. The cell drum 18 has four columns of cells 120-1 through 120-4 vertically arranged, and each cell column has to be positioned to the accessor 30 in the course of rotation of the cell drum 18. The mounting position of the position sensor 118 is 450 clockwise apart from the mounting position of the accessor 30. The position of the fixed point 100 of the timing belt 46 relative to the position sensor 118 is referred to as the absolute reference position in the rotation of the cell drum 18.

With respect to the absolute reference position, the necessary angle of rotation of each cell column to be positioned to the mounting or home position 124 of the accessor 30 is a 45° counterclockwise rotation for the cell column 120-1, a 45° clockwise rotation for the cell column 120-2, a 135° clockwise rotation for the cell column 120-3, or a 135° counterclockwise rotation for the cell column 120-4. To position each of the cell columns 120-1 through 120-4 to the mounting position 125 of the accessor 30, the sensor plate 116 is provided with rectangular slits 126-1 through 126-4.

FIG. 25(A) shows the sensor plate 116 of FIG. 24 linearly developed onto a plane for convenience of explanation. The sensor plate 116 is provided with a home position edge 124 indicative of the absolute reference position 0°. An assumption is made that any angle of counterclockwise rotation with respect to the home position edge is positive and that any angle of clockwise rotation is negative. The rectangular slit 126-1 indicative of the position of the cell column 120-1 is formed +45° apart from the home position edge, and the rectangular slit 126-4 indicative of the position of the cell column 120-4 is formed +135° apart from the home position edge.

Similarly, the rectangular slit 126-2 indicative of the position of the cell column 120-2 is formed −45° apart from the home position edge 124, and the rectangular slit 126-3 indicative of the position of the cell column 120-3 is formed −135° apart from the home position edge 124. The home position edge 124 and the rectangular slits 126-1 through 126-4 on the sensor plate 116 are separately sensed, and thus the position sensor 118 is provided with two different sensor blocks, one for sensing the home position edge 124 and the other for sensing the rectangular slits 126-1 through 126-4.

FIG. 25(B) shows a detected signal 128 the position sensor 118 gives at the home position edge 124. The detected signal 128 of the home position edge 124 is assumed to be a photoelectric output provided by a transmission-type photodetector. With the cell drum 18 rotating clockwise, for example, the output remains at a low level until the home position edge 124 passes the position sensor 118; when the home position edge has passed, the output is transitioned to a high level.

FIG. 25(C) shows rectangular slit detected signals 130-4, 130-1, 130-2 and 130-3 when the rectangular slits 126-4, 126-1, 126-2 and 126-3 have sequentially passed the position sensor 118 with the cell drum 18 rotating clockwise. Thus obtained are the rectangular slit detected signals 130-1 through 130-4, each of which rises at one edge and falls at the other edge of each of the rectangular slits 126-1 through 126-4.

FIG. 25(D) illustrates the angular positioning of the cell drum 18 based on the home position edge signal 128 and the rectangular slit detected signals 130-1 through 130-4. To sense the angular position of the cell drum 18, the controller 176 is provided with the function shown in FIG. 26.

Figure 26:
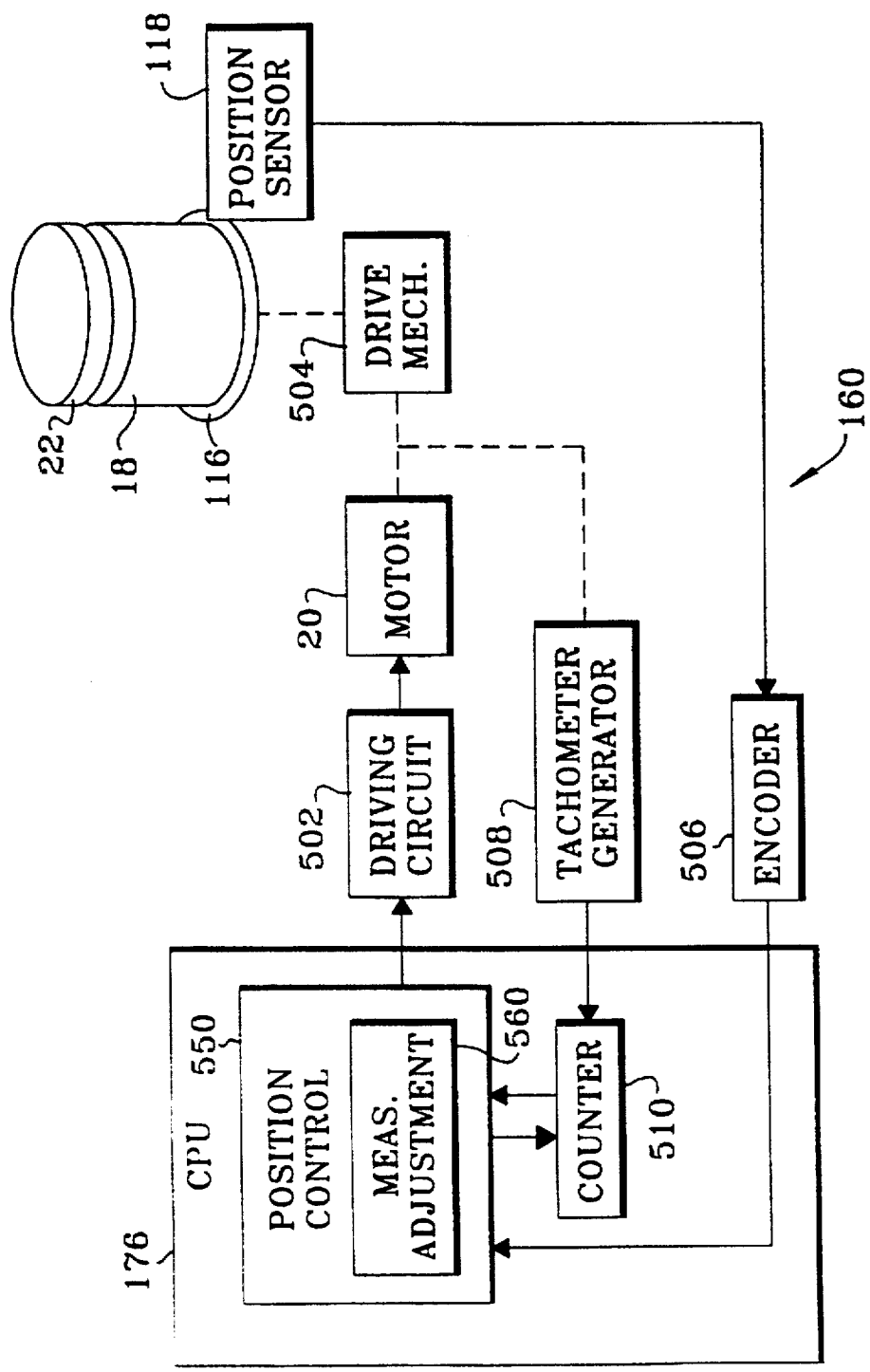
FIG. 26 is a block diagram showing the construction of the apparatus for the cell drum positioning control.

In FIG. 26, CPU 176 includes a positioning control block 550 which performs positioning control of the cell column of the cell drum 18 with respect to the accessor 30. The control signal from the positioning control block 550 is fed to the motor 20 via a driving circuit 502, thereby driving the cell drum 18 by means of a driving mechanism 504 having the timing belt.

The motor 20 is provided with a tachometer pulse generator 508 that outputs a pulse signal proportional to the rotational speed of the motor 20. The pulse signals from the tachometer generator 508 are counted by a counter block 510 in the CPU 176. On the other hand, the detected signals from the home position edge 124 and the rectangular slits 126-1 through 126-4 provided by the position sensor 118 with the sensor plate 116 are fed to the positioning control block 550 via an encoder 506.

Upon receiving the home position edge signal 128 from the encoder 506, a reset block in the positioning control block 550 resets the counter block 510, resetting the count to the absolute reference position =0. The counter block 510 now counts pulses in a clockwise or counterclockwise rotation of the cell drum 18 with respect to the absolute reference position =0. The count at the counter block 510 represents the angular position of the cell drum 18 with respect to the absolute reference position given at the home position edge.

FIG. 25(D) shows a change of the count at the counter block 510 of FIG. 26. The count is reset to 0 by the home position edge signal 128 at the home position edge 124. The count increases with the cell drum 18 rotating counterclockwise as shown by a line 132-1, and increases with the cell drum 18 rotating clockwise as shown by a line 132-2.

The measurement adjustment block 560 in the positioning control block 550 in FIG. 26 determines cell column position based on the count that represents the position of each of the rectangular slits 126-1 through 126-4 relative to the absolute reference position 0. The measurement adjustment block 560 calculates the position of each of the rectangular slits 126-1 through 126-4 and stores the measured positions. This is performed as one of initialization processing items which are to be done at the startup of the library apparatus at power on.

As shown in FIG. 25(D), which illustrates the case of the rectangular slit 126-2, the measurement processing by the measurement adjustment block 560 obtains a count C1 at the rising edge and a count C2 at the falling edge, of the rectangular slit detected signal 130-2 in FIG. 25(C) when the cell drum 18 is rotated during measurement adjustment process. The medium value C0 is determined by averaging the counts C1, C2. The determined value C0 is stored as the position information of the cell column 120-2 based on the rectangular slit 126-2. The same procedure is applied to the other slits 126-1, 126-3, and 126-4.

Figure 27:
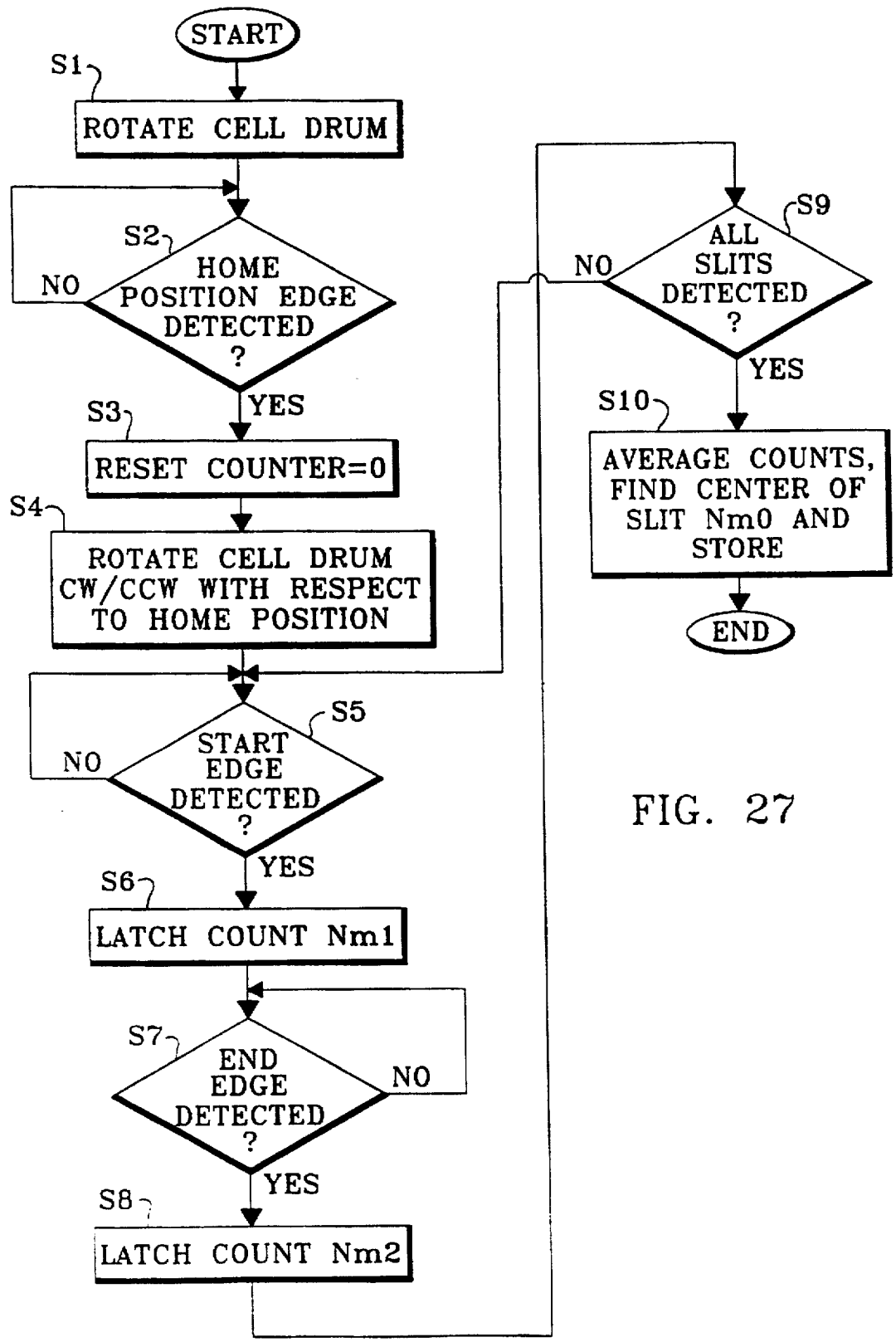
FIG. 27 is a flow diagram showing the measurement adjustment process at initialization.

FIG. 27 shows the measurement adjustment processing of the cell columns 120-1, 120-2, 120-3 and 120-4 by the measurement adjustment block 560 of FIG. 26. At step S1, the cell drum 18 is rotated in an arbitrary direction, and at step S2, whether or not the home position edge 124 is detected is checked. When the home position edge 124 is detected, the program goes to step S3, where the counter 510 is reset to the absolute reference position =0.

The program goes to step S4, where the cell drum 18 is rotated clockwise and counterclockwise within a range of +/−135° with respect to the home position edge 124. In the course of this rotation, the detection of the start edge of a slit is monitored at step S5, and if detected, the program goes to step S6, where a count Nn1 is latched. n is an integer representing a slit number as in n=1, 2, 3, . . .

At step S7, the end edge of the same slit is detected. When detected, a count Nn2 is latched as step S8. At step S9, a determination is made of whether all the slits are detected or not. Steps S5 through S8 are repeated until all the slits are detected. When all the slits are detected, the program goes to step S10. At step S10, NnO indicative of the center position of each rectangular slit is calculated by averaging the counts at the start edge and end edge of each slit, and is then stored as the position of each cell column.

When the measurement adjustment block 560 measures and stores the values indicating the positions of the cell columns 120-1 through 120-4 in the initialization processing as described above, positioning control is performed to position the specified cell column of the cell drum 18 to the accessor 30 as follows: in normal operation, the positioning control block 550 is supplied with the control command that instructs the cell drum 18 to rotate to a particular cell position based on the transportation instruction of a cartridge; the target cell column position value is compared with the count at the counter 510 indicative of the current position of the cell drum 18; and the motor 20 is driven by the drive circuit 502 so that the difference between the count at the counter 510 and the target cell column position value, which represents an angular positional error, is 0.

Figure 28:
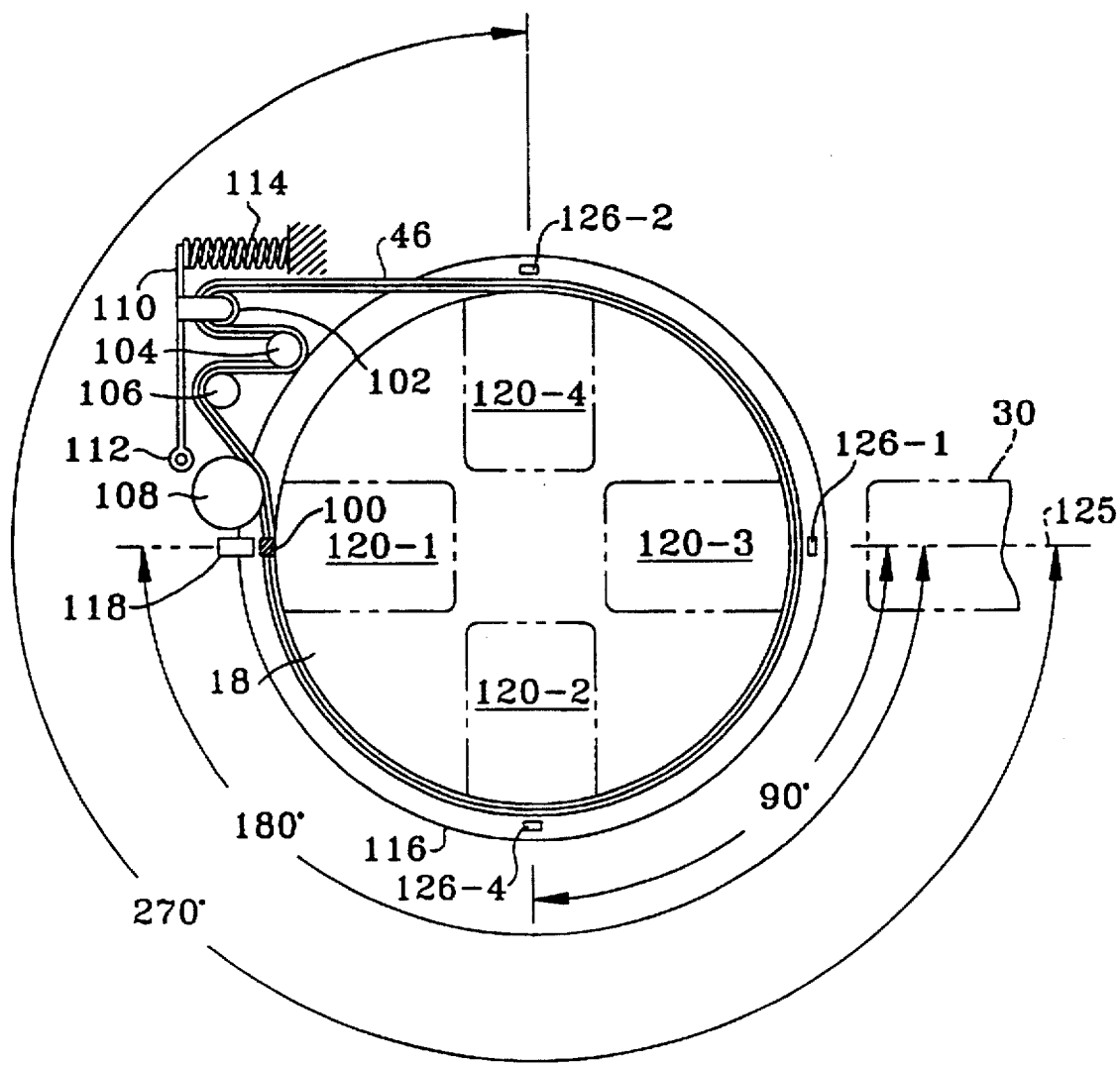
FIG. 28 is an explanatory view showing another embodiment of the cell drum sensing mechanism using the sensor plate.

FIG. 28 shows an embodiment wherein the cell drum 18 having four cell columns is driven by the timing belt 46 over an angular range of 270°, and the position sensor 118 is mounted on the limit where the cell drum 18 with its belt fixed point 100 stops clockwise rotation. This limit is employed as the absolute reference position.

The position of the fixed point 100 beyond which the timing belt 46 is unable to turn is the minimum stretching point in a low-rigidity timing belt 46. By mounting the position sensor 118 to this position to detect the absolute reference position, variations in the absolute reference position due to stretching of the timing belt 46 is kept to a minimum.

In this case, to position the cell columns 120-1 through 120-4 to the mounting position 125 of the accessor 30, the direction and angle of rotation of each cell column is as follows:

Cell column 120-1 =a 180° counterclockwise rotation

Cell column 120-2 =a 90° counterclockwise rotation

Cell column 120-3 =a 0° rotation, the absolute reference position

Cell column 120-4 =a 270° counterclockwise rotation The rectangular slits 126-1 through 126-4 are formed on the sensor plate 116 so that the cell columns 120-1 through 120-4 are positioned to the mounting position 125 of the accessor 30.

Figures 29A, 29B, 29C, 29D:
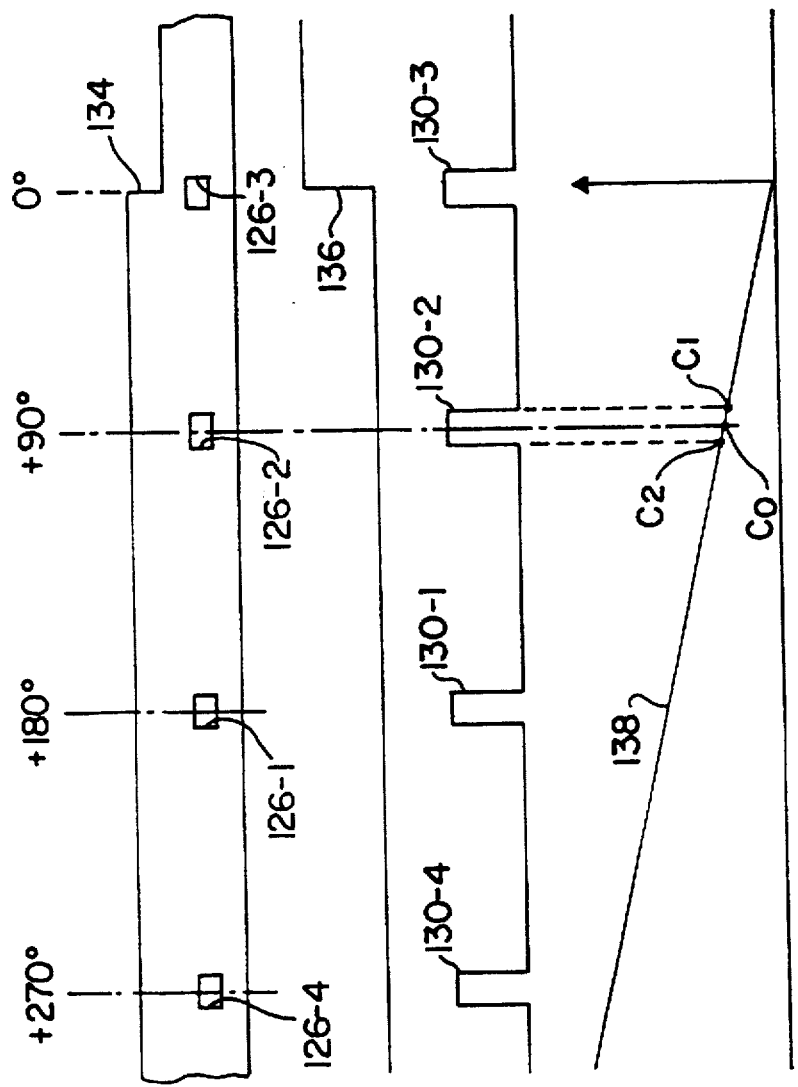
FIGS. 29(A), 29(B), 29(C) and 29(D) are explanatory views showing the sensor plate, detected signals and position fixing method of the mechanism of FIG. 28.

FIG. 29(A) shows the sensor plate 116 of FIG. 28 linearly developed onto a plane for convenience of explanation. A home position edge 134 indicative of 0° as the absolute reference position is provided. The rectangular slit 126-3 indicative of the position of the cell column 120-3 is disposed at the position of the home position edge 134. The rectangular slit 126-2 indicative of the position of the cell column 120-2 is formed +90° counterclockwise apart from the home position edge 134.

The rectangular slit 126-1 indicative of the position of the cell column 120-1 is formed +180° counterclockwise apart. Furthermore, the rectangular slit 126-4 indicative of the position of the cell column 120-4 is formed +270° counterclockwise apart. FIG. 29(B) shows the detected signal 136 of the home position edge 134 with the cell drum 18 rotating counterclockwise. FIG. 29(C) shows the detected signals 130-1 through 130-4 of the rectangular slits 126-1 through 126-4, respectively.

A line 138 in FIG. 29(D) shows a change of the count at the counter block 510 in FIG. 26 according to the output of the position sensor 118 installed at the position shown in FIG. 28. In this embodiment, again, the measurement adjustment block 560, in its initialization processing, measures and stores the positions of the cell columns 120-1 through 120-4 based on the rectangular slit detected signals 130-1 through 130-4. In the case of the rectangular slit 126-2 illustrated, the medium value C0 is determined by averaging the count C1 at the rising edge and the count C2 at the falling edge of the detected signal 130-2, and this is stored as indicative of the position of the cell column 120-3.

Figure 30:
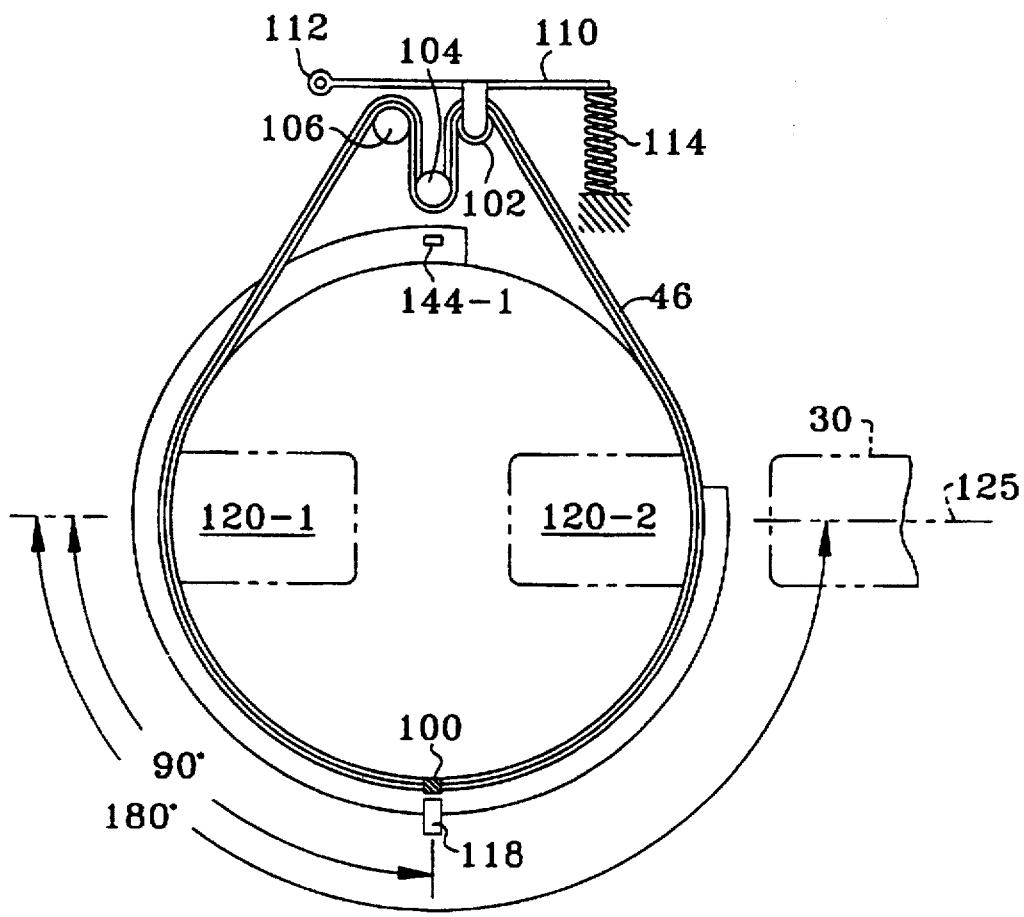
FIG. 30 is an explanatory view showing the belt driving mechanism for rotating the cell drum with 2 cell columns over a range of 180°.

FIG. 30 shows another embodiment of the drum driving mechanism of the present invention. In this embodiment, the cell drum 18 has two cell columns, and the cell drum 18 is driven by the timing belt 46 over an angular range of 180°.

The cell drum 18 has the cell columns 120-1 and 120-2, spaced 180° apart, and 90° from the sensor 118. The timing belt 46 is anchored to the cell drum 18 at the fixed point 100. The timing belt 46 has a 180° angular range of rotation with respect to the fixed point 100. The motor drive pulley 104 that is driven by the motor 20 with a reduction is mounted on the other side diagonally opposite to the portion of the cell drum 18 where the timing belt 46 is wrapped.

Disposed on opposing sides of the motor drive pulley 104 are pulleys 102 and 106. The axis of rotation of the pulley 106 is anchored at a fixed point. The pulley 102, the arm 110 and the compression spring 114 constitute a tension mechanism. Under the force of the compression spring 114, the arm 110 pivots about the fixed axis 112, thereby allowing the pulley 102 to place tension on the timing belt 46.

The cell drum 18 is provided with a sensor plate 140, to which the position sensor 118 is referenced. As in the embodiment in FIG. 24, the position sensor 118 is mounted at the center of the angular range of rotation of 180° of the cell drum 18. This is employed as the absolute reference position. To position the cell columns 120-1 and 120-2 to the position 125 of the accessor 30, the direction and angle of rotation of each cell column is as follows.

Cell column 120-1 =a 180° counterclockwise rotation

Cell column 120-2 =a 0°, the absolute reference position

Figure 31A:
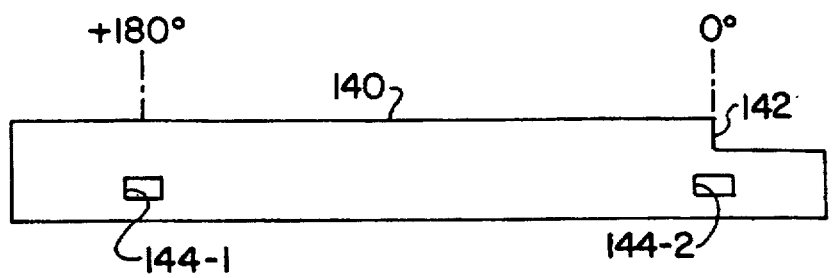
FIGS. 31(A), 31(B), 31(C) and 31(D) are explanatory views showing the sensor plate, detected signals and position fixing method of the mechanism of FIG. 30.

FIG. 31(A) shows the sensor plate 140 of FIG. 30 linearly developed onto a plane. A home position edge 142 indicative of the absolute reference position is provided on the sensor plate 140. The rectangular slit 144-2 indicative of the position of the cell column 120-2 at the home position edge 142. The rectangular slit 144-1 indicative of the position of the cell column 120-1 is formed +180° clockwise apart from the home position edge 142.

Figure 31B:
Figure 31C:
Figure 31D:
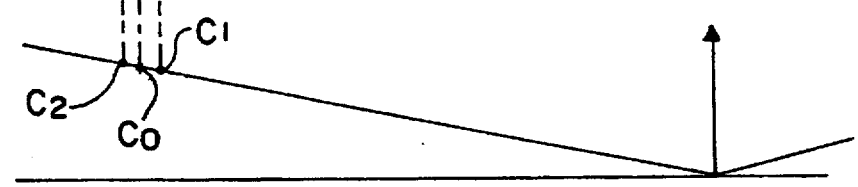

FIG. 31(B) shows the detected signal 146 of the home position edge 142 of the sensor plate 140. FIG. 31(C) shows the detected signals 146-1 and 146-2 of the rectangular slits 144-1 and 144-2. In this embodiment, again, the measurement adjustment block 560 in CPU 176 in FIG. 26, in its initialization processing, determines the counts C1, C2 at the rising and falling edges of the rectangular slit detected signal, for example, 146-1, based on the home position edge signal 146 and the rectangular slit detected signals 146-1, 146-2 provided by the position sensor 118, determines the medium value C0 by averaging counts C1, C2, and stores C0 as indicative of the position of the cell column 120-1.

In the embodiment in FIG. 30, the position sensor 118 is mounted at the position where clockwise and counterclockwise stretchings of the timing belt 46 are balanced, and this position is employed as the absolute reference position. Alternatively, like the embodiment in FIG. 28, the sensor 118 may be mounted at the limit where the timing belt 46 is stopped, and this minimum belt stretching position may be employed as the absolute reference position.

4. Load/unload control

Figure 32:
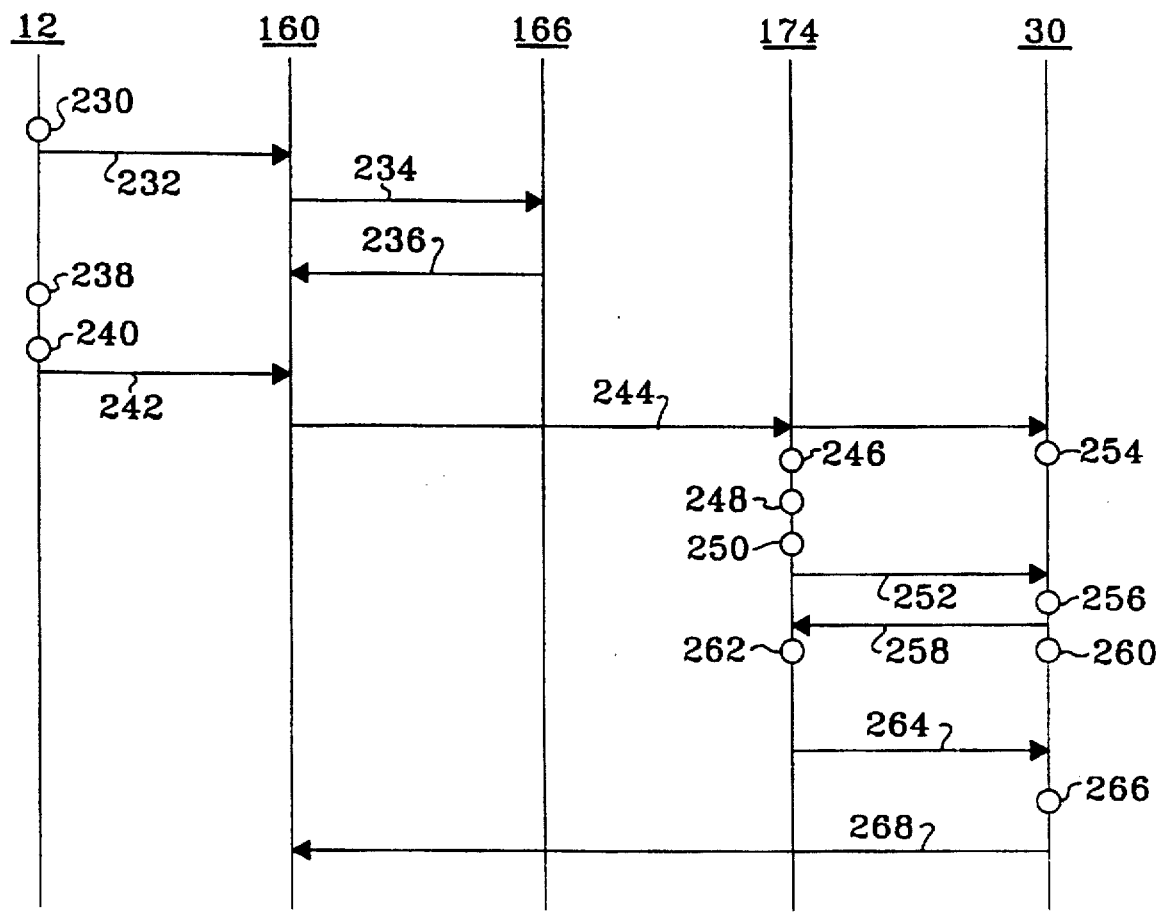
FIG. 32 is a timing diagram showing the control operation when a single cartridge is loaded.

FIG. 32 is a timing diagram illustrating the cartridge loading operation by the loading control block 196 in CPU 176 in FIG. 7. An operator performs an open operation 230 to the door-open switch 162 (FIG. 5) on the operation panel 12. A switch control signal 232 is sent to the controller 160, which in turn issues a door-open instruction 234 to the door driving block 166, causing the load/unload door 14 (FIG. 2) to open.

When the door is opened, a door-open end status 236 is returned to the controller 160. When the operator performs a cartridge loading operation 238, the load/unload door 14 which was opened is closed. At the same time, the cartridge sensor mounted on the load/unload block 22 detects the loading of the cartridge, and a door closing and cartridge loading signal 242 are sent to the controller 160.

Upon receiving the detected signal 242 about the cartridge loading and the door closing, the controller 160 issues a cartridge transport instruction 244 to the drum driving block 174 and the accessor 30. This transport instruction is performed in a command format, and contains To Address and From Address as command parameters.

In the library apparatus of the present invention, addresses are pre-defined, for example, for each cell of each cell column in the cell drum 18. These addresses are generally called cell addresses.

Specifying a From Address and To Address is sufficient to perform a cartridge transport instruction without knowledge of a starting unit and destination unit. Such transport instructions using cell addresses are applied to From Addresses and To Addresses as command parameters which the host computers supplies in connection with a move command.

Upon receiving the cartridge transport instruction 244 by the controller 160, the drum driving block 174 performs clutch engagement 246 to connect the cell drum 18 to the load/unload block 22, then allows the cell drum 18 to rotate by a 180° rotation 248, and performs clutch disengagement 250. The cartridge placed on the tray of the load/unload block 22 is moved to the accessor 30 through the series of steps of clutch engagement 246, 180° drum rotation 248, and clutch disengagement 250. After clutch disengagement 250, a loading end notice 252 is issued to the accessor 30.

Upon receiving the cartridge transport instruction 244 by the controller 160, the accessor 30 starts movement 254 from the current position to the load/unload position where the load/unload block 22 is set up. When the accessor 30 completes the movement to the load/unload position and receives a load end notice 252 from the drum driving block 174, the accessor 30 performs a cartridge pickup operation 256. After the cartridge pickup operation 256, the accessor 30 issues a pickup end notice 258 to the drum driving block 174.

Upon receiving it, the drum driving block 174 performs a drum rotation 262 so that the cell column to which the cell specified by the To Address according to the transport instruction 244 is positioned to the accessor 30. When the drum rotation 262 by the drum driving block 174 is complete, a rotation end notice 264 is issued to the accessor 30. Upon receiving the rotation end notice 264, the accessor 30 inserts the cartridge into the target cell, namely, the To Address specified by the transport instruction 244. When the insertion is complete, a transport end notice 268 is issued to the controller 160. This signals device end, and completes the loading operation.

Figure 33:
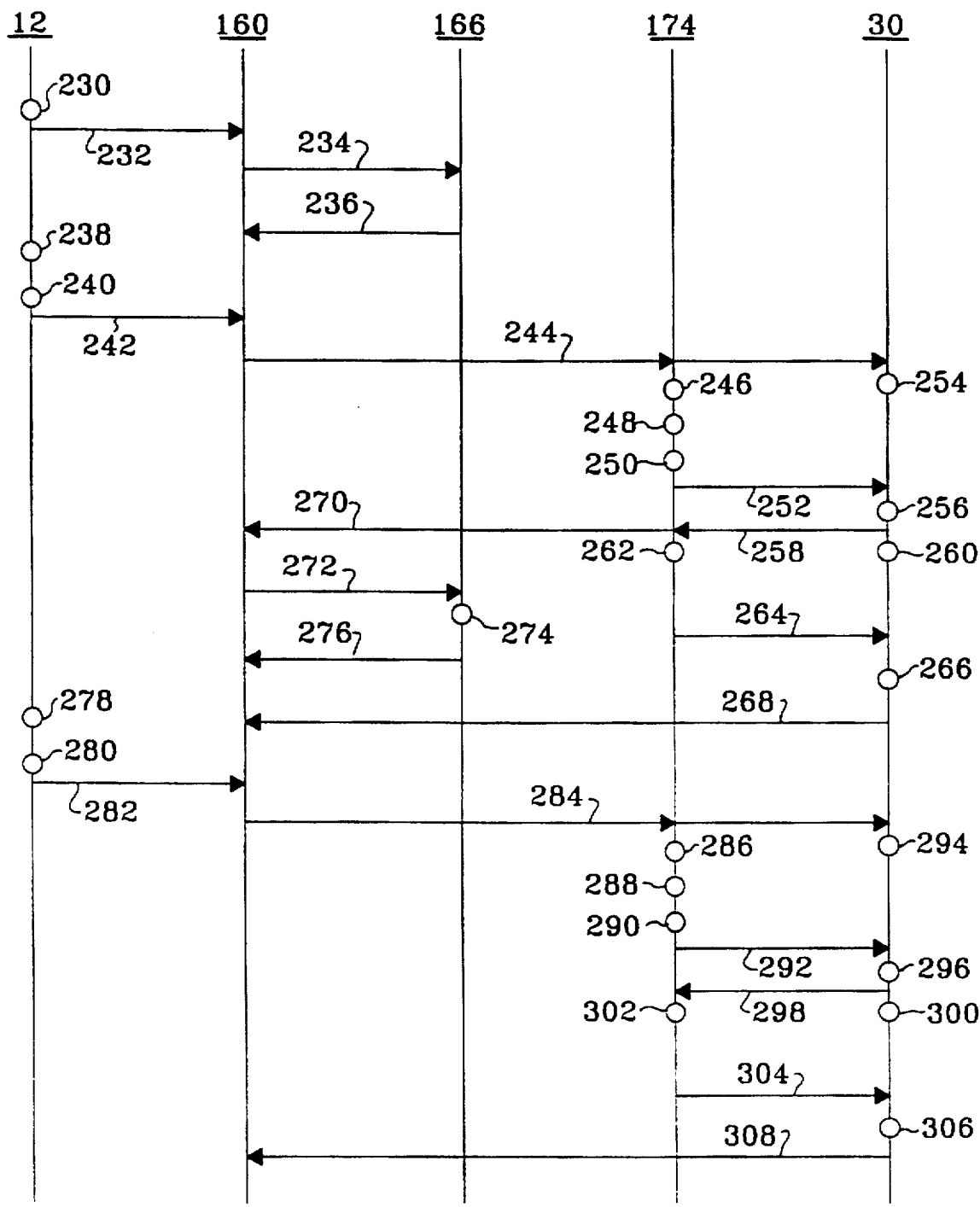
FIG. 33 is a timing diagram showing the control operation when cartridges are loaded in succession.

FIG. 33 illustrates the operation in which both trays of the load/unload block 22 remain empty and two cartridges are inserted in succession. The sequence from the door-open switch operation 230 on the operation panel 12 for the insertion of the first cartridge until the transport end notice 268, followed by the cartridge insertion to the target cell by the accessor 30 remains unchanged from that in FIG. 32.

To load the second cartridge in succession, when loading the first cartridge, the accessor 30 performs a cartridge pickup operation 256 to the load/unload block 22, while issuing a pickup end notice 258 to the drum driving block 174 and issuing a pickup end notice 270 to the controller 160. In response to the pickup end notice 270 for the first cartridge from the accessor 30, the controller 160 gives a door-open instruction 272 to the door driving block 166. In response, the door driving block 166 opens the door to let the second cartridge in.

When the controller 160 receives the door-open end notice 272, an indicator lamp indicative of permitted cartridge insertion on the operation panel 12 is lit. In response, the operator performs the insertion of the second cartridge 278 on the operation panel 12. When the second cartridge is inserted, the door closing operation 280 is performed, the insertion of the cartridge is detected by the sensor of the tray, and the door closing and cartridge detected signal 282 are sent to the controller 160.

Since the accessor 30 has received the transport end notice 268 of the first cartridge, the controller 160 issues a transport instruction 284 for the second cartridge to the drum driving block 174 and the accessor 30. In response, both the drum driving block 174 and the accessor 30 perform the same loading operation as for the first cartridge. When the accessor 30 issues a transport end notice 308, the controller 160 completes the cartridge loading operation.

Figure 34:
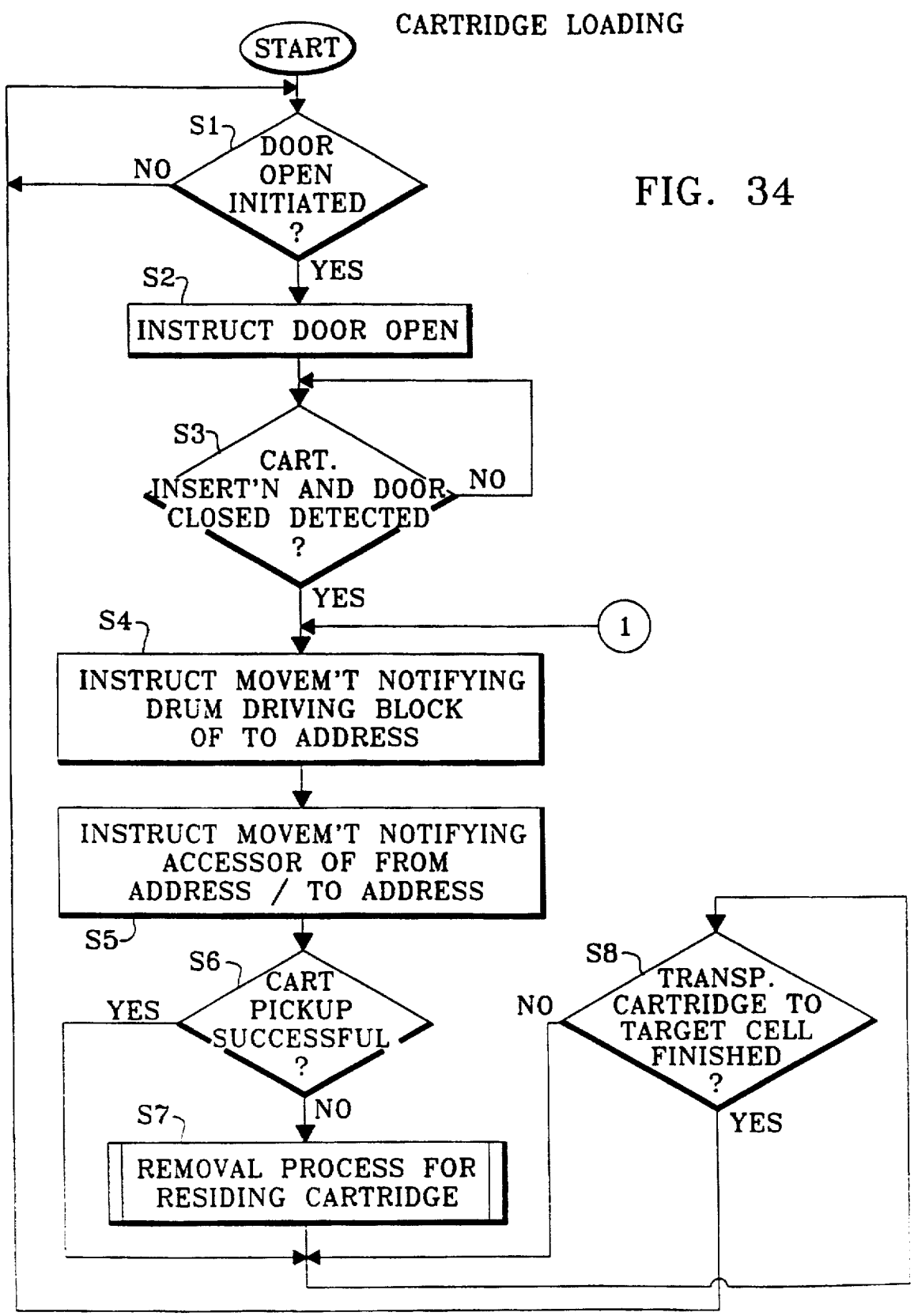
FIG. 34 is a flow diagram for the cartridge loading process.

The flow diagram in FIG. 34 illustrates the cartridge loading processing by the loading control block that carries out the operation illustrated in FIGS. 32 and 33. A determination is made of whether or not a door-open operation is initiated at step S1. If a door-open operation is initiated, an open-door operation is instructed. At step S3, cartridge insertion and door closing are monitored. When both are detected, the program goes to step S4, where the drum driving block 166 is notified of a To Address and a transport is instructed.

At step S5, the accessor 30 is notified of the To Address and From Address to instruct the transport. At step S6, a determination is made of whether the accessor 30 has successfully picked up the inserted cartridge from the load/unload block 22. If picking up has been successful, the program goes to step S8. After the accessor 30 completes the transport to the target cell in the cell drum 18, the program returns to step S1.

On the other hand, if the accessor 30 fails to pick up the cartridge from the tray of the load/unload block 22, the unsuccessful finish is reported to the controller 160. In this case, the program goes to S7, where the residing cartridge retrieval processing is performed. The residing cartridge retrieval processing is performed as the error recovery function 204 of the loading control block 196 in FIG. 7.

Figure 35:
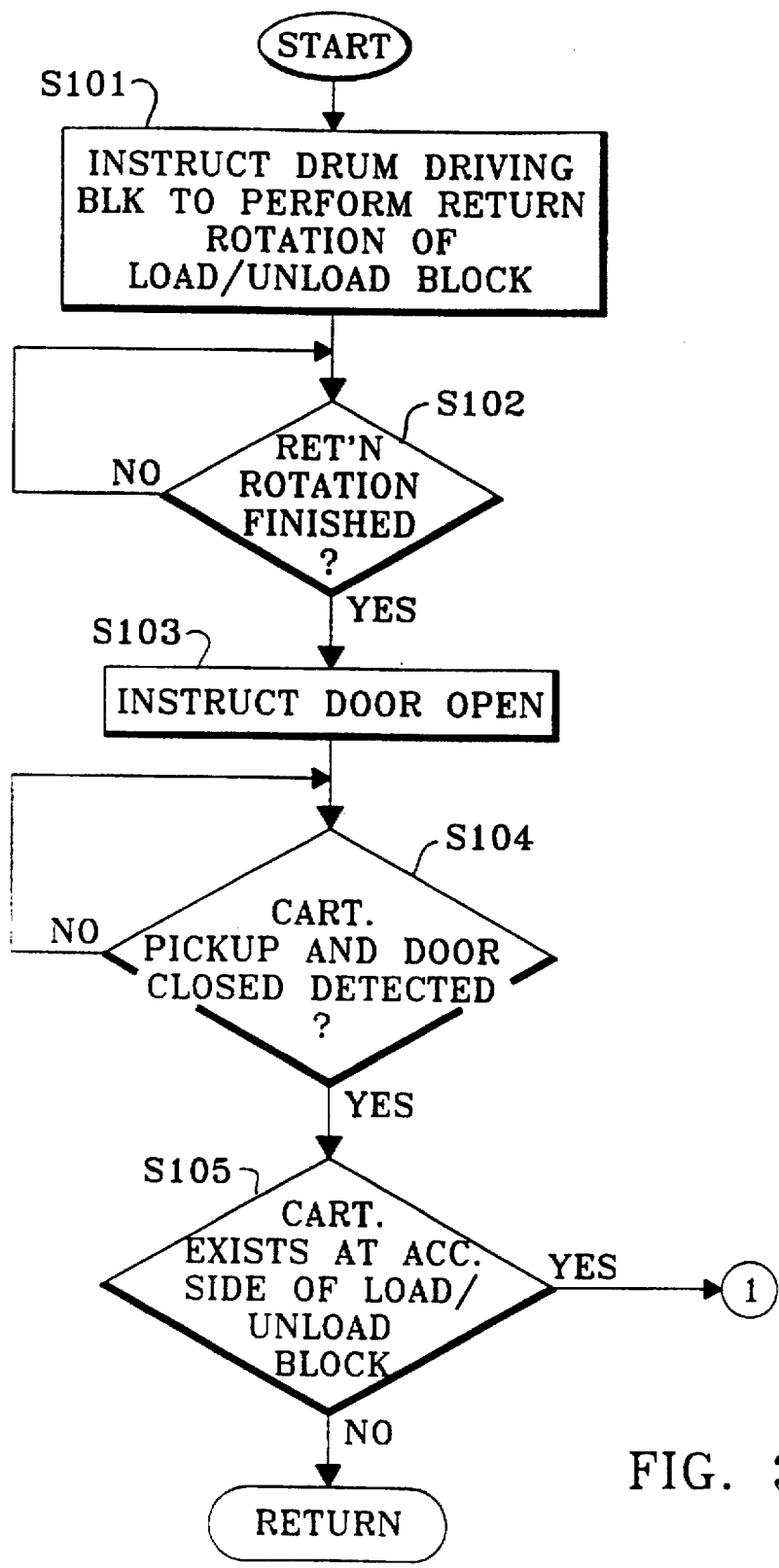
FIG. 35 is a flow diagram for the residing cartridge removal process when an error takes place.

FIG. 35 shows the residing cartridge retrieval processing of the error recovery block 204. At step S101, a return rotation of the load/unload block 22 is instructed to the drum driving block 174. In response, the drum driving block 174 causes the cell drum 18 to rotate by 180° with the clutch engaged, and moves the cartridge of the pickup which has been aborted to the load/unload side. At step S102, if the end of the return rotation of the load/unload block is determined, a door open is instructed at step S103, and the operator is allowed to pull the aborted cartridge out.

In this case, the operation panel presents an alarm indicative of a loading error when the picking up by the accessor is unsuccessful. The message display screen indicates that the aborted cartridge is returned. The operator may be thus properly alerted for him to pull the returned cartridge out.

When the removal and door close are detected at step S104, the error recovery processing of residual cartridge retrieval is now complete. The program goes to step S105, where a determination is made of whether a newly inserted cartridge exists on the load/unload block 22 at its side facing the accessor 30. If a newly inserted cartridge exists, the program returns to step S4 in FIG. 34, and a transport of the cartridge to the next target cell is instructed. If no cartridge exists, the program returns to the main routine in FIG. 34.

In the above loading controls, the destination is a specified cell in the cell drum 18. Alternatively, the destination may be any of drive units 36-1 through 36-4. In this case, with the clutch engaged, the load/unload block 22 is rotated toward the accessor, and the move processing of the accessor alone follows. This operation does not need rotation of the cell drum with the clutch disengaged for the insertion of a cartridge into a cell.

Figure 36:
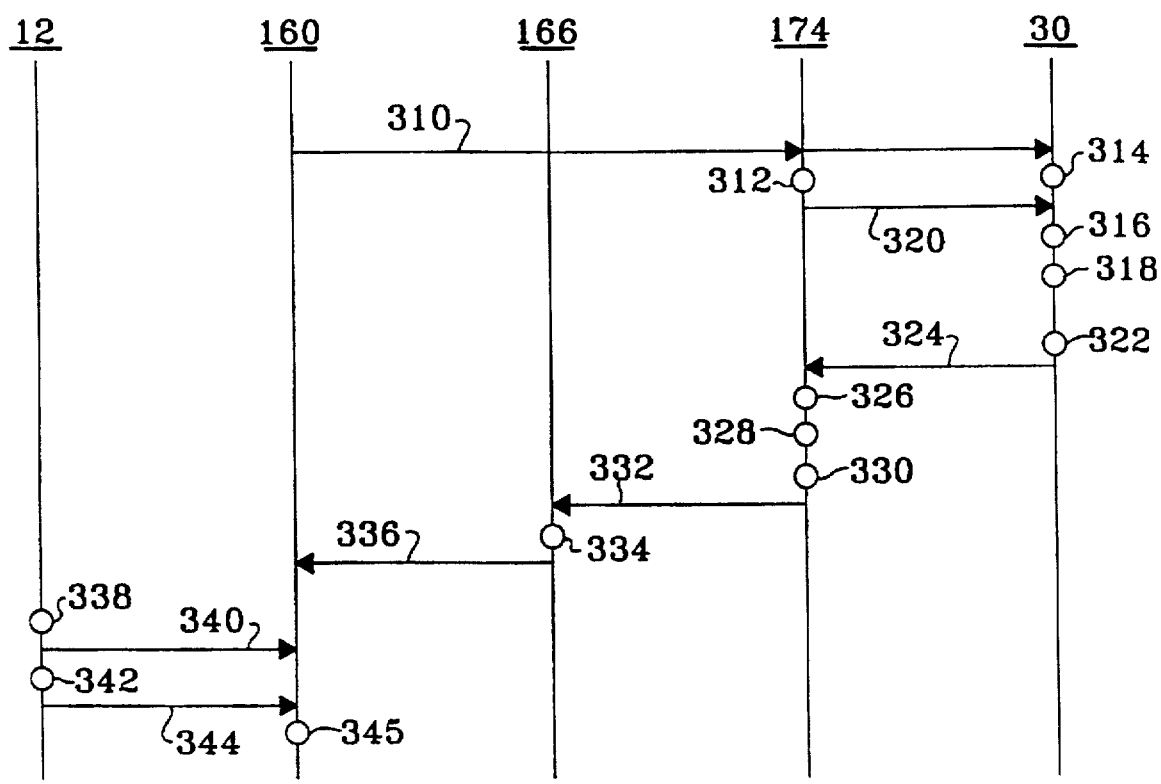
FIG. 36 is a timing diagram showing the cartridge unloading control operation.

FIG. 36 is a timing diagram showing the cartridge unloading operation under control of the unloading control block 198 in CPU 176 in FIG. 7. The unloading operation is performed by allowing the controller 160 to issue an unload instruction 310 to the drum driving block 174 and the accessor 30. Through the host computers or switching operation on the operation panel 12, the controller 160 is allowed to issue the unload instruction.

The unload instruction 310 contains a From Address and a To Address as command parameters. Specified as From Addresses may be cell addresses in the cell drum 18 or cell addresses of the optical disk drive units 36-1 through 36-4. Specified as To Addresses are cell addresses of empty trays of the load/unload block 22.

Upon receiving the unload instruction 310 from the controller 160, the drum driving block 174 performs drum rotation 312 so that the cell column to which the target cell specified by the From Address is positioned to the accessor 30. When drum rotation ends, a rotation end notice 320 is issued to the accessor 30.

Receiving the unload instruction 310, the accessor 30 starts movement 314 to the height of the target cell in the vertical direction. After the movement, the accessor 30 recognizes the drum rotation end notice 320 from the drum driving block 174, and then performs a cartridge pickup operation 316 from the cell drum 18, and starts a movement 318 toward the load/unload position. When the movement to the load/unload position ends, the accessor 30 performs a cartridge insertion 322 to an empty tray of the load/unload block 22 that faces the accessor 30.

When the cartridge insertion ends, an insertion end notice 324 is issued to the drum driving block 174. In response, the drum driving block 174 performs clutch engagement 326, performs a 180° rotation 328 to the cell drum 18, also rotating the cartridge on the tray of the load/unload block 22 facing the accessor 30 to the load/unload side, and disengages the clutch after the rotation at 330. When the drum driving block 174 completes the return rotation of the load/unload block, a door-open instruction 332 is given to the door driving block 166, causing the door driving block 166 to perform a door-open operation 334.

When the door-open operation 334 ends, a transport end notice 336 is issued to the controller 160, and the operator is allowed to remove the unloaded cartridge. When the operator performs a cartridge removal 338, a cartridge removal notice 340 based on the sensor is issued to the controller 160. When the controller 160 receives a detection notice 344 of the door closing 342, verification for the absence of a cartridge is performed to end the unloading operation.

Figure 37:
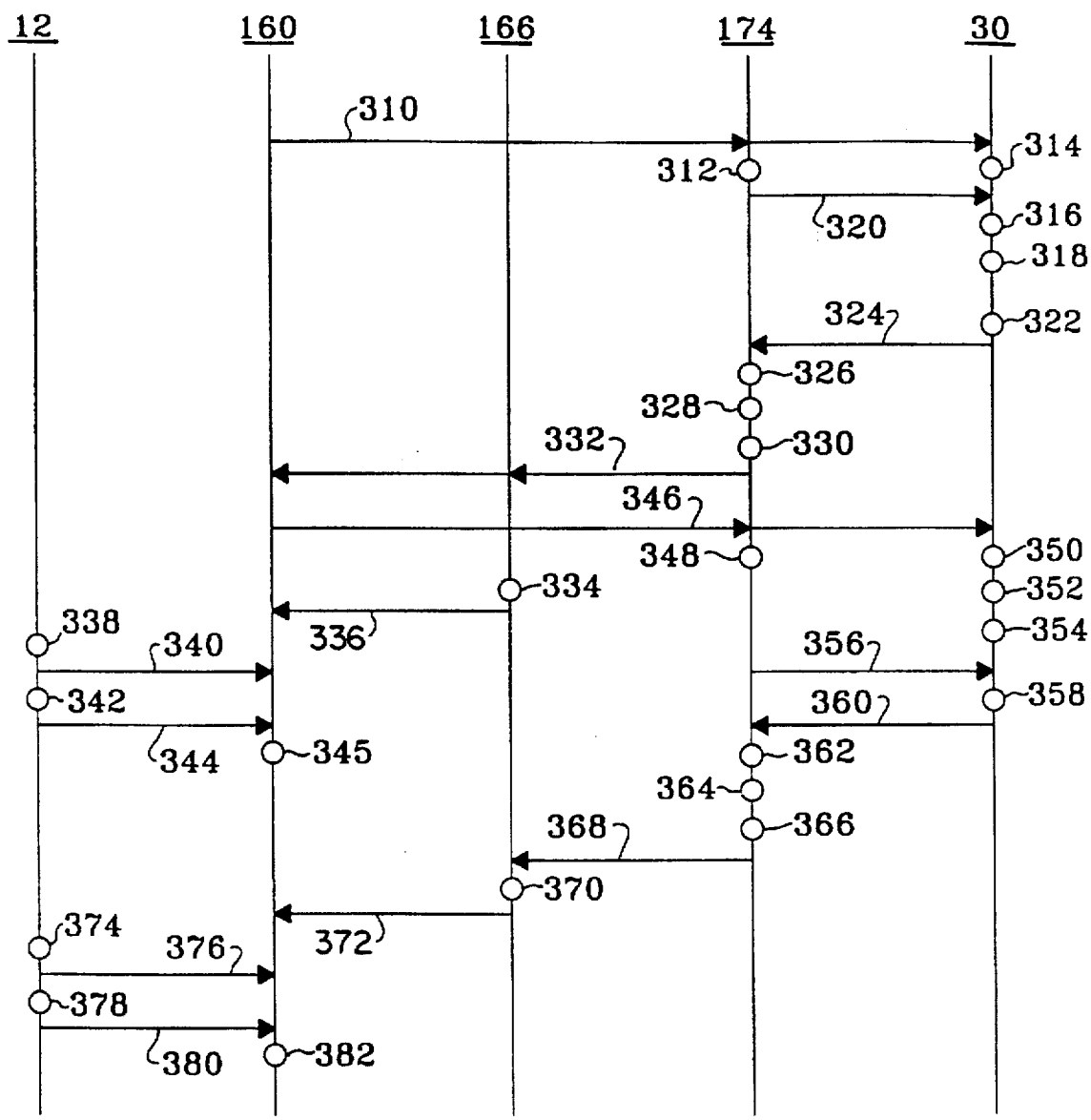
FIG. 37 is a timing diagram showing the unloading control operation of cartridges in succession.

FIG. 37 is a flow diagram illustrating the unloading operation of a second cartridge in succession to the first cartridge unloading operation. The sequence of the second cartridge unloading operation, from the unloading instruction 310 to the verification step 345 confirming the absence of a cartridge, remains unchanged from that in the unloading operation in FIG. 36.

In the first cartridge unloading operation, when the door open instruction 332 is issued to the door driving block 166 following the rotation of the unloaded cartridge to the load/unload opening by the drum driving block 174, the door open instruction 332 is also issued to the controller 160. Upon receiving the open-door instruction 332, the controller 160 recognizes that the cell drum and the accessor side of the load/unload block are empty and issues an unload transport instruction 346 for unloading the next cartridge, to the drum driving block 174 and the accessor 30.

In response to the second cartridge unload instruction 346, the drum driving block 174 and the accessor 30 start the unloading operation in the same manner as in the first cartridge unloading process, and unloading steps 348 through 382 are performed.

Figure 38:
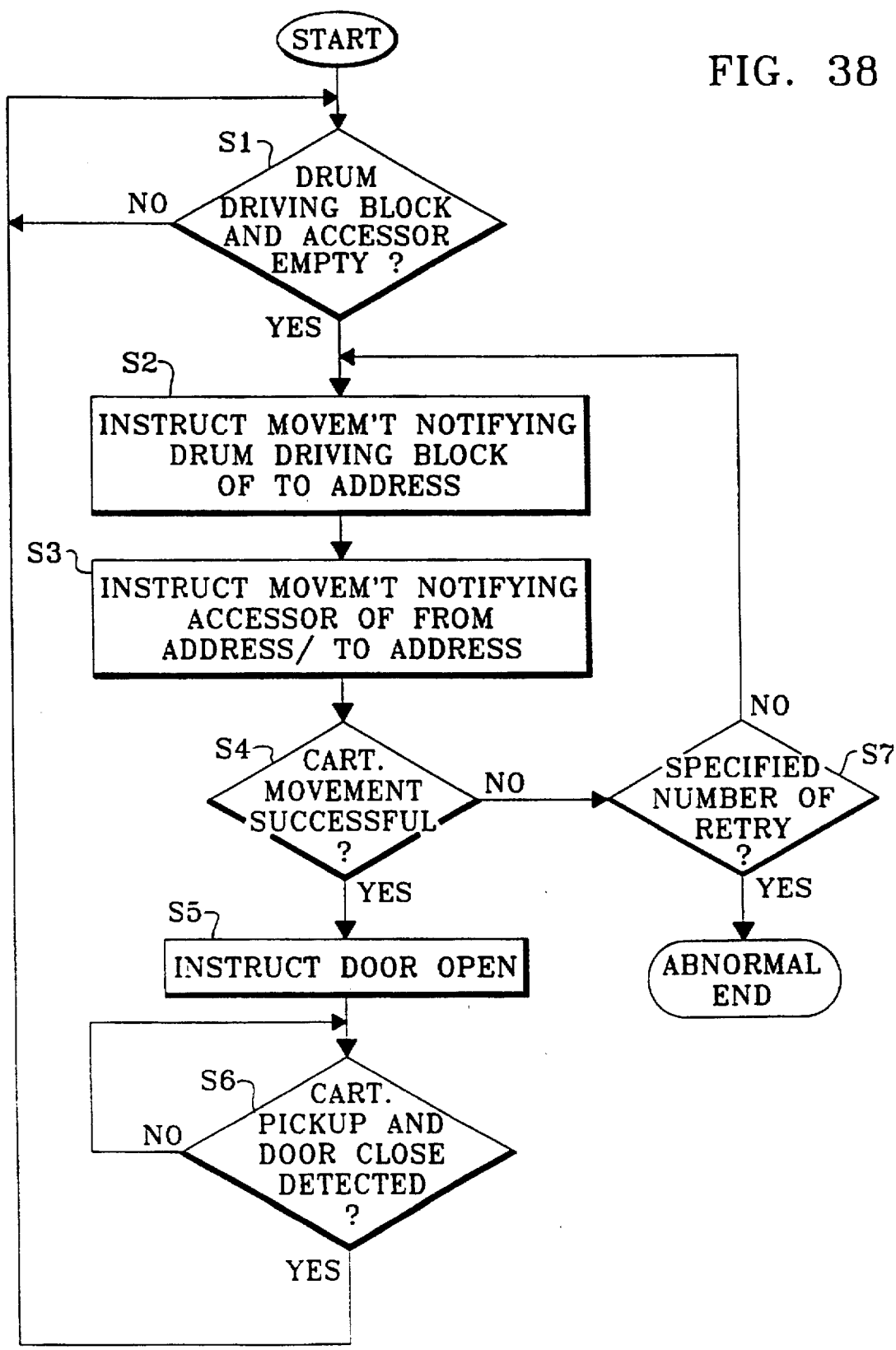
FIG. 38 is a flow diagram showing the cartridge unloading process.

The flow diagram in FIG. 38 shows the cartridge unloading processing operation of the unloading processing block that performs the unloading operation shown in FIGS. 36 and 37. At step S1, it is determined whether or not the drum driving block 174 and the accessor 30 are empty. If empty, the drum driving block 174 is notified of the From Address at step S2 to issue an instruction to rotate the cell drum 18 to the position of the accessor 30.

At step S3, the accessor 30 is notified of the From Address and To Address, and is moved to the To Address of the target cell column in the cell drum. The accessor 30 picks up the cartridge, and moves it to the load/unload block 22 specified by the From Address.

At step S4, a determination is made of whether a series of cartridge transport steps are successful or not. If successful, the door open instruction is issued at step S5. At step S6, cartridge removal and door closing are detected to end the series of steps.

When the transport processing of the unloaded cartridge ends abnormally at step S4, the unloading process based on the unloading transport instructions, steps S2, S3 are repeated until the specified number of retries. When the error is not recovered even after the specified number of retries, the program ends abnormally.

The above unloading operation is used when the cartridge is unloaded from the cell drum 18. The unloading operation may also be used when a cartridge is unloaded from any of the optical disk drive units 36-1 through 36-4 upon completion of recording or reproducing.

5. Initialization control at load/unload error-triggered suspension

As shown in FIG. 3, the library apparatus of the present invention causes the load/unload block 22 to rotate integrally with the cell drum 18 by means of the clutch block 24 in order to transport a cartridge inserted through the load/unload door 14 to the accessor 30 and transport a cartridge from the accessor 30 to the load/unload door 14. In the loading operation or unloading operation, the load/unload block 22 is rotated by 180° by the cell drum 18.

In the course of the above operation, however, the 180° rotation of the load/unload block 22 in integral motion with the cell drum 18 will be forced to stop if the cell drum 18 is stopped due to some error. The cartridge cannot reach the accessor 30 or the load/unload door 14 as its destination. To recover, the library apparatus of the present invention is provided with an initialization function to return the cell drum 18 to a predetermined initial position.

Figure 39:
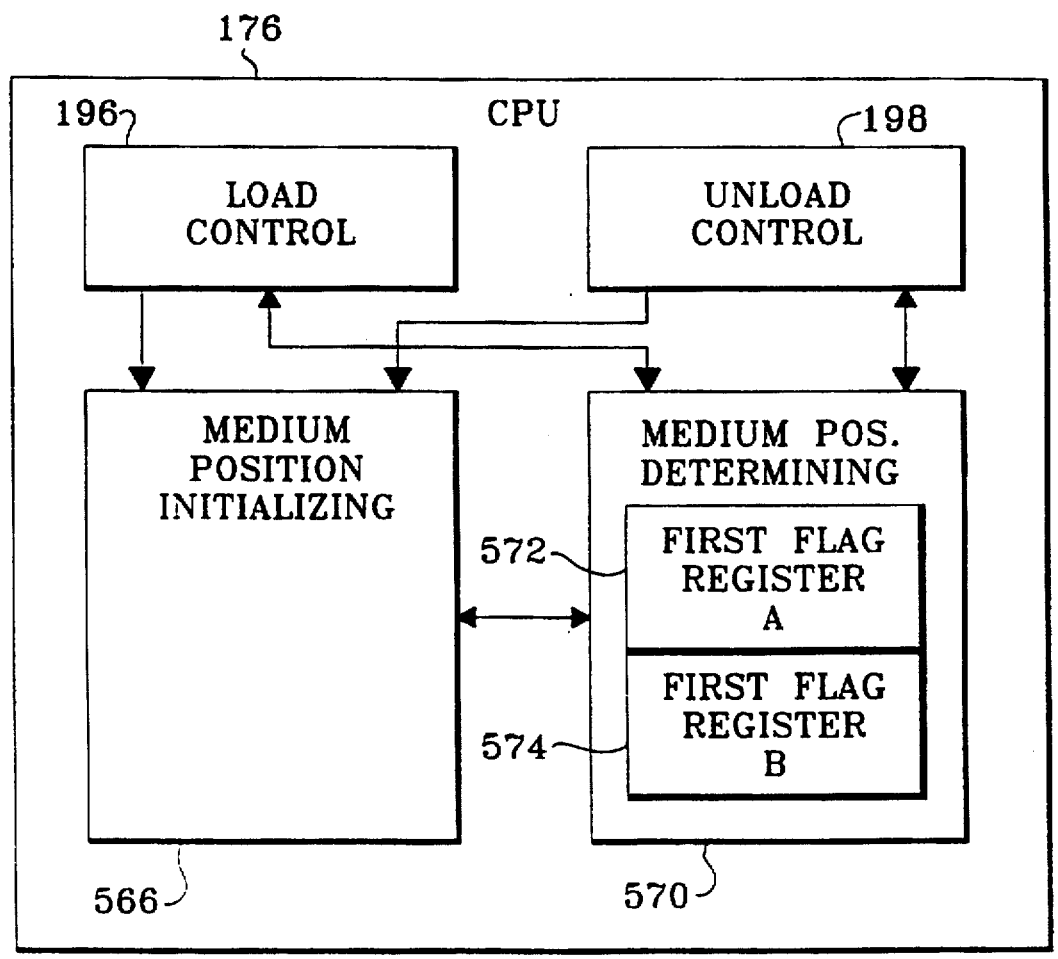
FIG. 39 is a block diagram showing the initialization function when an error stop takes place during the cartridge loading/unloading operation.

FIG. 39 shows an embodiment in which a medium position initializing block 566 is provided in the CPU 176 of the controller in FIG. 7 in order to force the loading control block 196 and the unloading control block 198 to return the cell drum 18 to the predetermined initial position.

When the medium position initializing block 566 receives an error notice indicative of a stop of rotation of the cell drum 18 on its way to its destination, from the loading control block 196 or the unloading control block 198, the medium position initializing block 566 performs an initialization driving to move the cell drum 18 to its predetermined initial position, namely the original position. Because of this initialization process, the position where the cell drum 18 is forced to stop due to an error is determined and control of the cell drum 18 from the occurrence of the error thereafter is facilitated.

The direction of rotation in the initialization operation by the medium position initializing block 566 is predetermined and is in the counterclockwise direction (CCW direction) in this embodiment. When the cell drum 18 is initialized by the medium position initializing block 566, one cartridge from one of the two trays of the load/unload block 22 stays at its destination which the cartridge was to move to or original position before the occurrence of the error because the clutch 24 remains engaged.

Since the cartridge position is unknown, after initialization a medium position determining block 570 is provided in the embodiment in FIG. 39. Referring to the medium position determining block 570, the loading control block 196 and the unloading control block 198 can determine whether the cartridge from the load/unload block 22 is already at its intended destination or remains at its original position.

In this embodiment, the medium position determining block 570 includes a first flag register 572 for storing a rotational direction flag A indicative of the direction of rotation of the cell drum 18, and a second flag register 574 for storing a transport destination flag B that indicates whether the transport direction of the cartridge is from the accessor 30 to the load/unload door 14 at the operator side or from the load/unload door 14 at the operator side to the accessor 30.

Figure 40A:
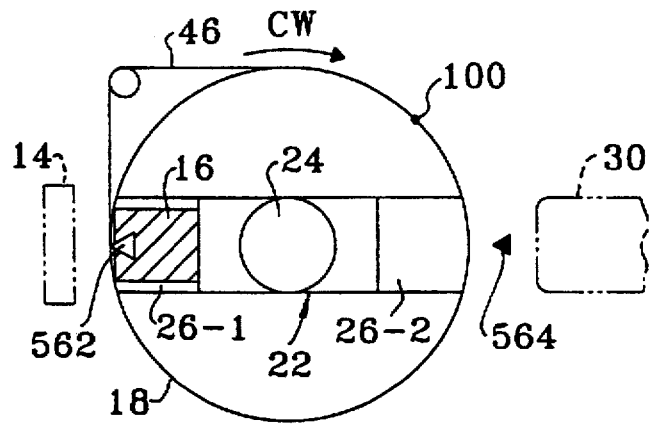
FIGS. 40(A) and 40(B) are explanatory views showing rotation in integral motion with the cell drum when the cartridge is loaded.

FIG. 40 shows the cartridge loading operation. In FIG. 40(A), the cell drum 18 is positioned so that the cartridge 16 on the tray 26-1 of the load/unload block 22 can be rotated by 180° by the timing belt 46 to the position of the accessor 30, diagonally opposite. In this belt position, the drum origin 562, represented by a blank triangle, faces the load/unload door 14. On the other hand, an initial point 564 is set up at the accessor 30 side. The driving mechanism of the cell drum 18 by the timing belt 46 is simplified. Its detail is as shown in FIG. 22. To allow the drum origin 562 of the cell drum 18 to rotate to the accessor 30 by 180°, the fixed point 100 of the timing belt 46 is at 45° with respect to the horizontal in the figure.

Figure 40B:
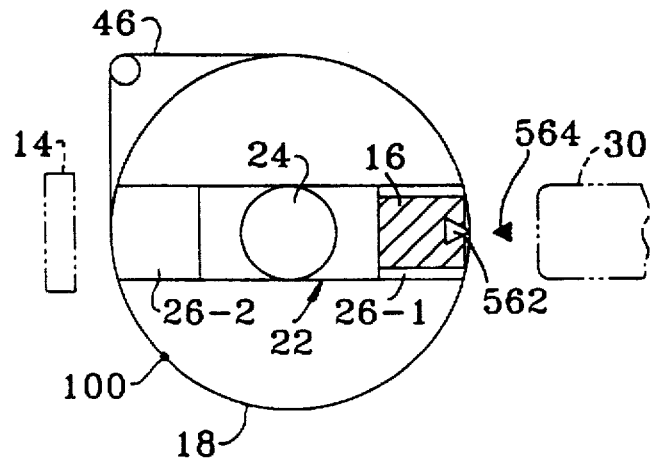

FIG. 40(B) shows the state in which the load/unload block 22 is rotated by 180° in integral motion with the cell drum 18 to the accessor 30 with the clutch 24 engaged. After the 180° rotation, the drum origin 562 of the cell drum 18 is positioned to the initial point 564 set up at the accessor 30 side. The fixed point 100 of the timing belt 46 in FIG. 40(A) is also rotated by 180° as shown in FIG. 40(B).

FIG. 41 shows an initialization operation which is performed following an error-triggered stop which takes place while the cartridge on the tray 26-1 is rotated to the accessor 30 in integral motion with the cell drum 18.

Figure 41A:
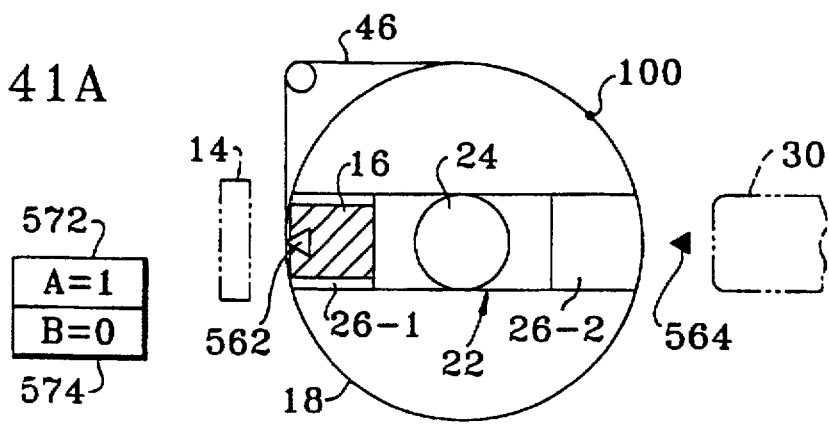
FIGS. 41(A), 41(B) and 41(C) are explanatory views showing the initialization that is performed against an error stop in the course of cartridge loading.

FIG. 41(A) is identical to FIG. 40(A), wherein the drum origin 562 of the cell drum 18 is positioned on the load/unload door 14 at the operator side, and the operator has placed a cartridge 16 on the tray 26-1. In this state, a rotational direction flag A is set in the first flag register 572 in the medium position determining block 570 in FIG. 39. Since the cell drum 18 rotates in a clockwise direction (CW direction) to the accessor 30 in this case, the rotational direction flag is set to A=1. Conversely, when the cartridge is returned from the accessor 30 to the load/unload door 14, the rotational direction of the cell drum 18 is in a counterclockwise direction (CCW direction), causing the rotational direction flag A to be set to A=0.

The transport destination flag B indicative of the transport destination of the cartridge is set to the second flag register 574. In this case, the transport direction of the cartridge is from the operator side to the accessor 30, and the destination flag B is set to B=0. Conversely, when the cartridge is transported from the accessor 30 to the operator side, the destination flag B is set to B=1.

Figure 41B:
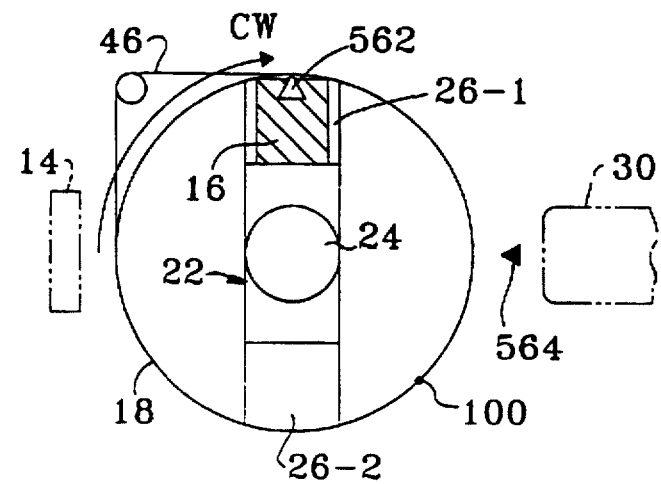

FIG. 41(B) illustrates an error stop state in which some error takes place in the cell drum 18 in its rotation while the load/unload block 22 is rotated clockwise in integral motion with the cell drum 18 with the clutch 24 engaged. In response to an abnormal stop of the cell drum 18, the medium position initializing block 566 in FIG. 39 is activated, performing an initialization operation to force the cell drum 18, suspended in error, to the initial point 564 at the accessor 30.

In the initialization operation of the cell drum 18, the rotational direction flag A in the first flag register 572 in the medium position determining block 570 (FIG. 39) is the same, namely, clockwise direction (CW direction), and A=1 is set. The destination of the cartridge 16 remains unchanged, namely, the accessor 30, so the destination flag B remains the same, B=0.

Figure 41C:
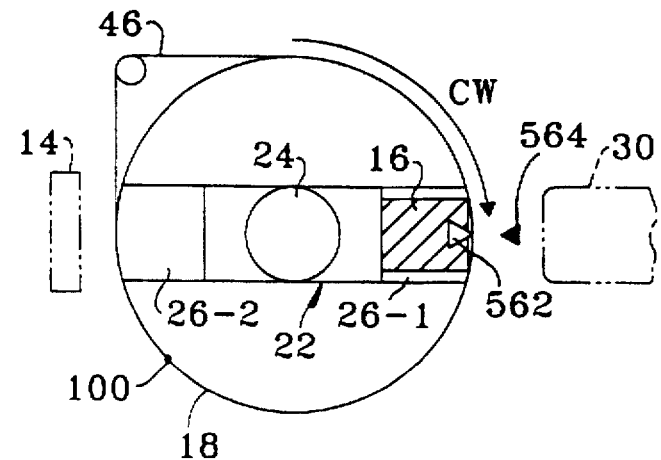

FIG. 41(C) shows the state in which the cell drum 18 is positioned to the initial point 564 through the initialization operation following the error stop. In this state, the first flag register 572 and the second flag register 574 in the medium position determining block 570 are set to A=1 for the direction flag, and B=0 for the destination flag. The initialization operation thus verifies that the cartridge 16 is at the destination position that was intended prior to the occurrence of the error. Since the initialization operation reveals that the cartridge 16 has already been transported to its destination, an unloading operation by the accessor 30 may be activated, next, for example.

FIG. 42 illustrates the case in which the cell drum 18 is suspended in an error in the middle of the unloading operation from the accessor 30 to the operator side.

Figure 42A:
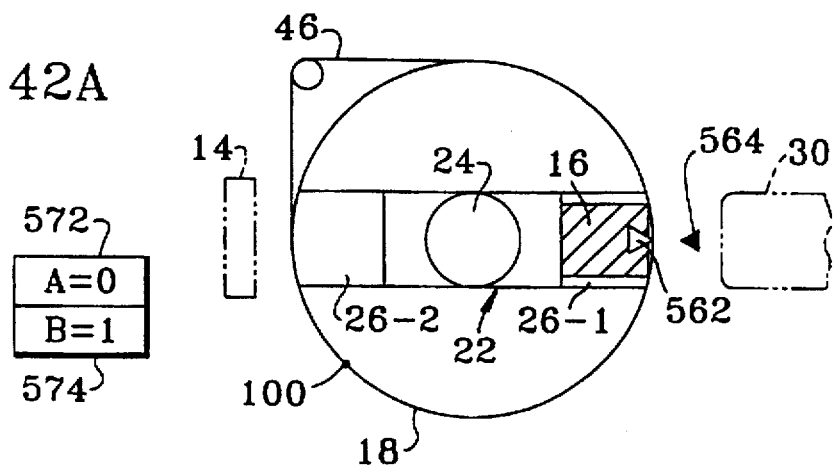
FIGS. 42(A), 42(B) and 42(C) are explanatory views showing the initialization that is performed against an error stop in the course of cartridge unloading.

FIG. 42(A) shows the initialization position for the unloading operation. The drum origin 562 on the cell drum 18 is positioned to the initial point 564 at the accessor 30 side. In this state, the cartridge that has been picked up from the cell drum 18 or any of the optical disk drive units 36-1 through 36-4 and has been brought is inserted into the tray 26-1 of the load/unload block 22.

The rotational direction flag A in the first flag register 572 is set to A=0, since the cell drum 18 is rotated in a counterclockwise direction (CCW direction) in the unloading operation. The destination flag B in the second flag register 574 is set to B=1, since the transport direction is from the accessor 30 to the operator side.

Figure 42B:
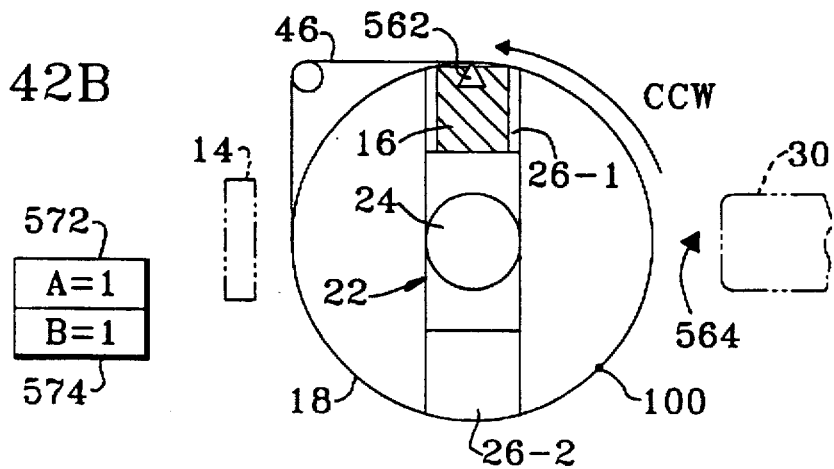

FIG. 42(B) illustrates the state in which the cell drum 18 is suspended due to an error in the course of the transport of the cartridge 16 from the accessor 30 to the operator side. In response to the error stop of the cell drum 18, the medium position initializing block 566 performs an initialization operation. In the initialization operation, the drum origin 562 on the cell drum 18, which is suspended in error, is rotated in a clockwise direction (CW direction) until the drum origin 562 is positioned at the initial point 564 at the accessor 30 side. To this end, in the initialization operation, the rotational direction flag A in the first flag register 572 is set to A=1, indicative of a clockwise direction (CW direction). The transport direction flag B in the second flag register 574 remains unchanged from B=1.

Figure 42C:
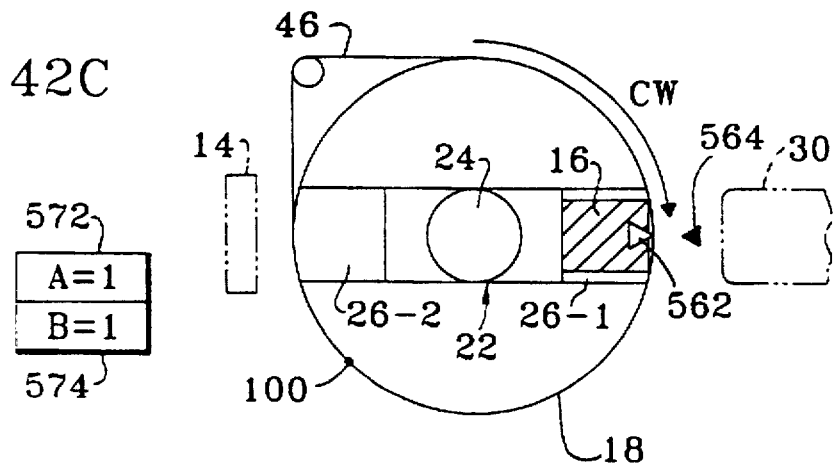

FIG. 42(C) shows the returned state at the initial point. Namely, the initialization operation allows the cell drum 18 to rotate clockwise (CW). Since the clutch 24 remains engaged, the load/unload block 22 is also rotated clockwise (CW), and then returns to the initial point 564. Referring to the first flag register 572 and the second flag register 574, following the initialization operation, A=1, B=1. This reveals that the cartridge 16 has returned back to its original position, the accessor 30. As a result, a retry operation for unloading the cartridge 16 may be initiated again.

Figure 43A:
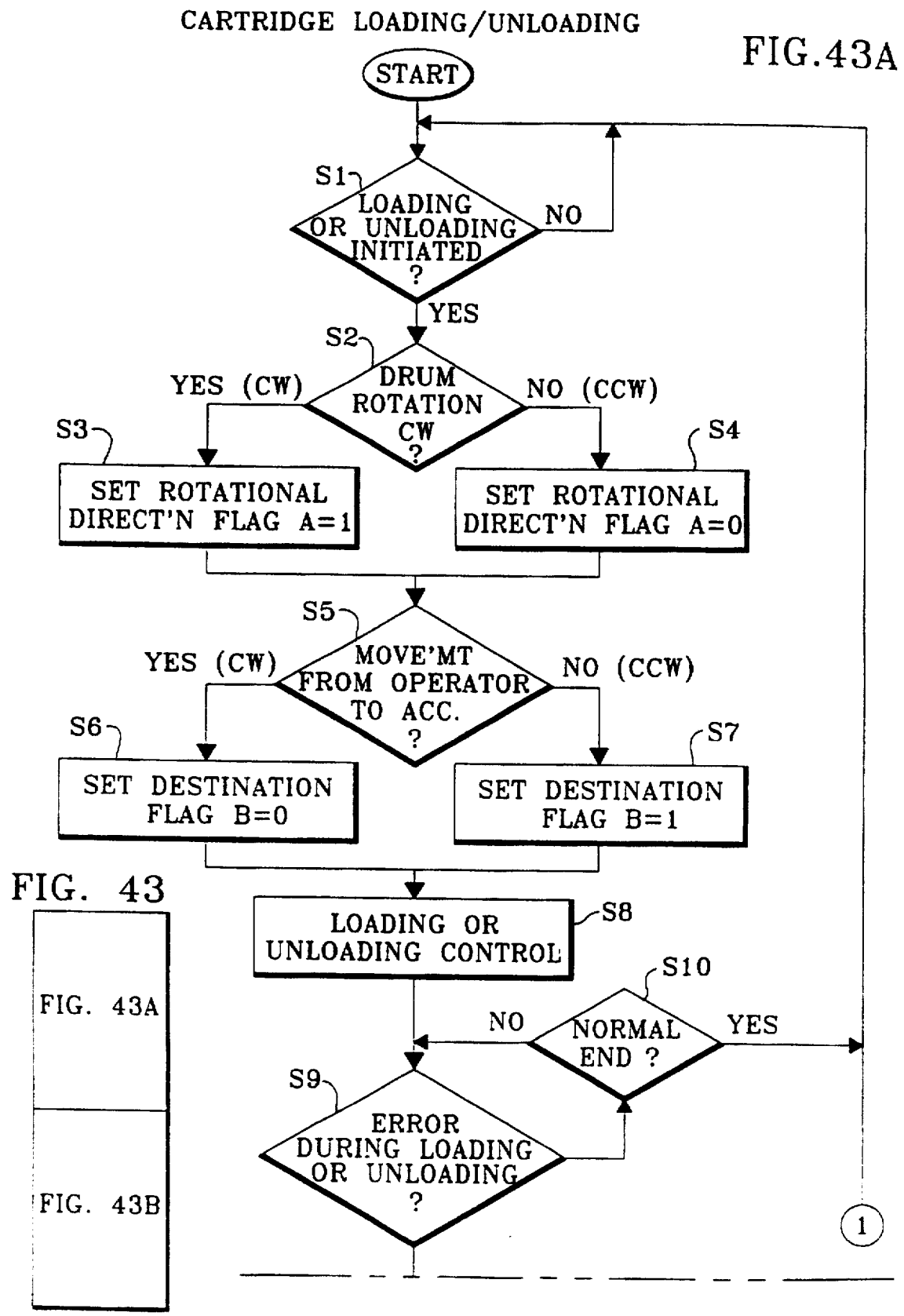
FIGS. 43(A) and 43(B) are a flow diagram showing the initialization process that is performed against an error stop during the cartridge loading and unloading.
Figure 43B:
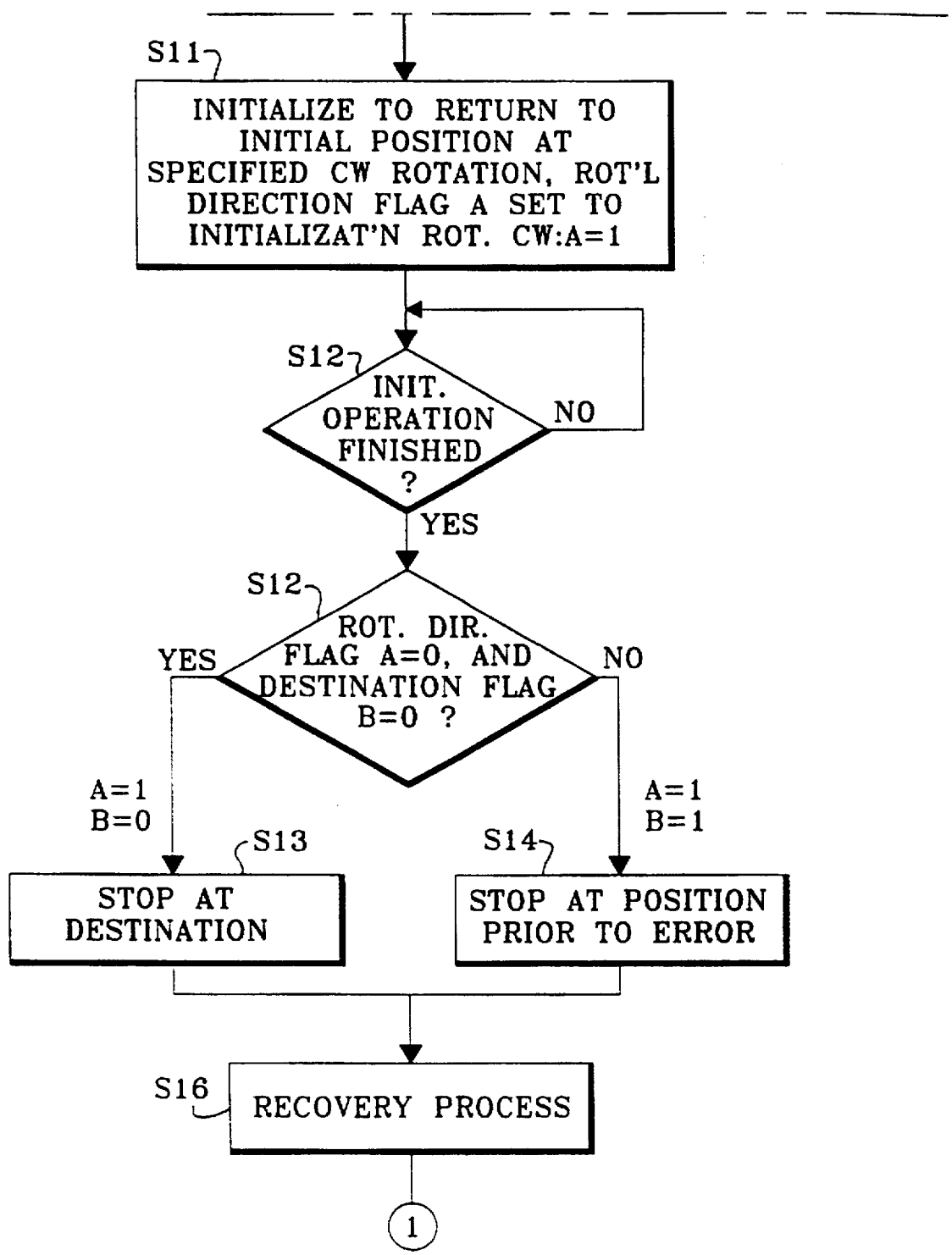

The flow diagram in FIG. 43 illustrates the position determination at the cartridge load/unload and the initialization operation at the error occurrence. First, at step S1, a load instruction or unload instruction is received. At step S2, a determination is made as to whether or not the rotational direction of the cell drum 18 is clockwise (CW). In this embodiment, the loading operation is performed in a clockwise direction (CW direction), and the unloading operation is in a counterclockwise direction (CCW direction).

When step S1 reveals that the instruction received is a load instruction, and when step 2 reveals that the rotational direction of the cell drum is clockwise (CW), the program goes to step S3, where the rotational direction flag A is set as A=1. When the rotational direction is in a counterclockwise direction (CCW direction) in the unloading operation, the program goes to step S4, where the rotational direction flag A is reset as A=0.

At step S5, a determination is made of whether the transport of the cartridge is from the operator side to the accessor 30 or not. When it is from the operator side to the accessor 30, the program goes to step S6, causing the destination flag B to be set to B=0. When it is from the accessor 30 to the operator side, the program goes to step S7, causing the destination flag B to be set to B=1.

At step S8, loading or unloading is performed. The loading control or unloading control is as illustrated in the flow diagrams in FIGS. 34 and 38. The program goes to step S9, where a determination is made of whether the cell drum 18 is suspended in error in the course of loading control or unloading control. If an error stop takes place, the program goes to step S11 thereafter. If no error takes place, with successful finish determined at step S10, the program returns to step S1.

When an error stop takes place, an initialization operation is performed by returning the cell drum origin 562 to the initial point 564 in a predetermined CW rotation. The rotational direction flag A is set to A=1 according to the initialization rotational direction. At step S12, the end of the initialization operation is detected, and the program goes to step S13, where a determination is made of whether or not the rotational direction flag is set to A=1 and the destination flag is set to B=0.

If A=1, B=0, the program goes to step S14, and it is recognized that the cartridge stays at the destination of the accessor 30. If A=1, B=1 with the condition at step S13 not satisfied, the program goes to step S15, and it is recognized that the cartridge stays at the original position of the accessor 30.

The program then goes to step S16, where a recovery processing is performed in response to the cartridge position after initialization. When the cartridge is at the destination at step S13, cartridge pickup by the accessor 30 and transport control are initiated. When the cartridge is at the accessor 30 at its position prior to the error at step S15, a retry operation for unloading control is repeated to transport the cartridge to the operator side. If the error is not recovered even after the specified number of retrials, the program ends abnormally.

FIG. 44 lists the rotational direction of the drum, the transport direction of the cartridge, the rotational direction of the drum at the initialization operation, and the stop position following the initialization operation with the cartridge inserted into the tray 26-1.

FIGS. 40 through 43 show the processes by which the cartridge 16 is placed into the tray 26-1 of the load/unload block 22, but these figures are essentially applied to the processes in which the cartridge 16 is placed into the other tray 26-2. FIG. 44 lists the rotational direction of the drum, the transport direction of the cartridge, the rotational direction of the drum at the initialization operation, and the stop position after the initialization operation with the cartridge inserted into the tray 26-2.

When the cartridge is inserted into the tray 26-2, a counterclockwise rotation (CCW rotation) is made to transport the cartridge from the operator side to the accessor, conversely to the case for the tray 26-1. When the cartridge is transported from the accessor 30 to the operator side, a clockwise rotation (CW rotation) is performed conversely to the tray 26-1 case. In the initialization operation, the rotational direction of the drum is counterclockwise (CCW) in the case of the tray 26-2, conversely to the case of the tray 26-1.

In connection with the flags A, B after initialization, A=0 and B=0 represents the destination position when the initialization is initiated during transportation from the operator side to the accessor 30, and A=0 and B=1 represents the position prior to the error during transportation from the accessor 30 to the operator side.

Figure 45:
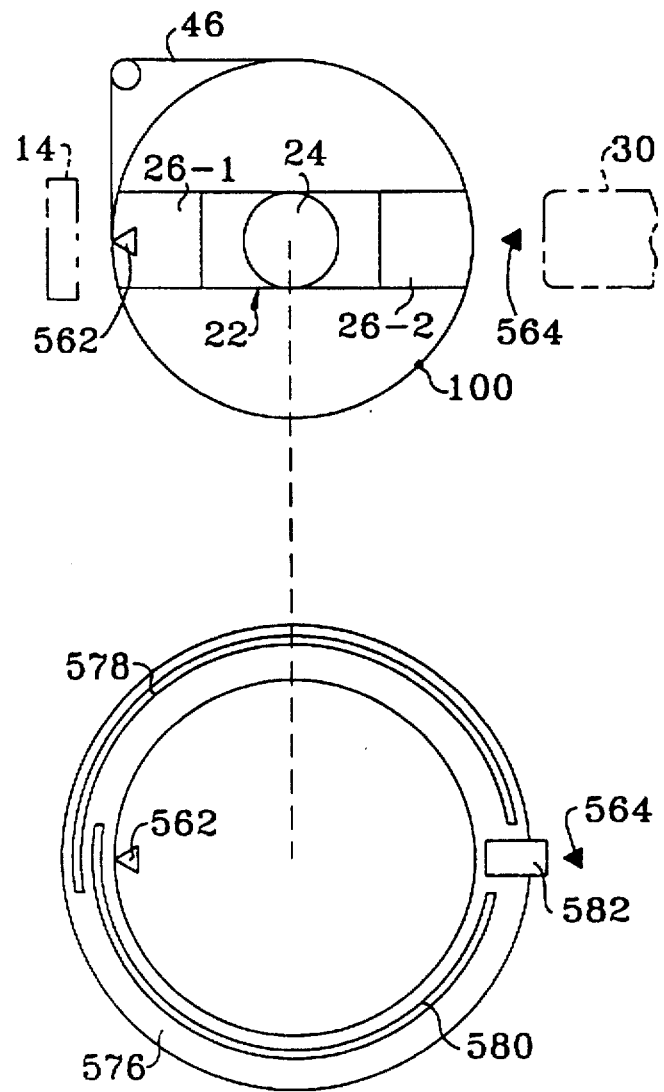
FIG. 45 is an explanatory view showing the position sensing of the cartridge by the sensor during loading and unloading.

FIG. 45 shows another embodiment in which the position of the cartridge on the load/unload block 22 is determined. This embodiment is characterized in that the cartridge position is determined through the initialization operation based on the sensor plate mounted onto the cell drum 18 and the position sensor anchored to a fixed point.

In FIG. 45, the drum origin 562 of the cell drum 18 stays at the load/unload door 14 at the operator side and the initial point 564 is set up at the accessor 30 side. To move the cartridge to the accessor 30 in the loading operation, the load/unload block 22 is rotated by 180° in integral motion with the cell drum 18, with the clutch 24 engaged. In this case, the rotational direction is clockwise (CW). When the cartridge is inserted into the accessor 30 to be delivered out to the operator side, the cell drum 18 is rotated counterclockwise (CCW) by 180° with the clutch 24 engaged.

The cell drum 18 is provided with the sensor plate 576 separately shown. A pair of slit sensor patterns 578 and 580 are formed on the sensor plate 576. The slit pattern 578 runs counterclockwise circumferentially from near the initial point 564 at the accessor 30 to the other end slightly beyond the drum origin 562 of the cell drum 18. The slit pattern 580 runs clockwise circumferentially from near the initial point 564 at the accessor 30 to the other end slightly beyond the drum origin 562.

The position sensor 582 is mounted at the position of the initial point 564 for use with the sensor plate 576. Used as the position sensor 582 is a photosensor having an emitter element and a photosensor element, both allowing the sensor plate 576 to pass therebetween. To detect the two slit patterns 578, 580, a pair of photosensors are employed.

FIG. 46(A) shows the sensor plate 576 of FIG. 45 linearly developed onto a plane for convenience of explanation. FIG. 46(B) shows a detected signal 584 which the position sensor 582 gives at the slit pattern 578, and FIG. 46(C) shows a detected signal 586 derived from the slit pattern 580.

The detected signal of the slit pattern 578 is at a logical 0 at the initial point 564, transitioned to a logical 1 level at the start of the slit, kept at a logical 1 level beyond the cell drum origin 562, and then shifted to a logical 0 level. The detected signal 586 of the slit pattern 580 is kept at a logical 0 level from the initial point 564 to slightly before the drum origin 562, and then transitioned to a logical 1 level, kept at a logical 1 level slightly before the initial point 564, and then shifted back to a logical 0 level.

The cartridge position is th us determined from the 2-bit information of the detected signals 584, 586 from the slit patterns 578, 580. Namely, when the cell drum origin 562 is positioned at the initial point 564 at the accessor 30 side, determined by the position of the position sensor 582, detected signals are "11." When the drum origin 562 is at the operator side, the detected signals are "00." When the cartridge is somewhere between both, the detected signals are "10" or "01."

Figure 47B:
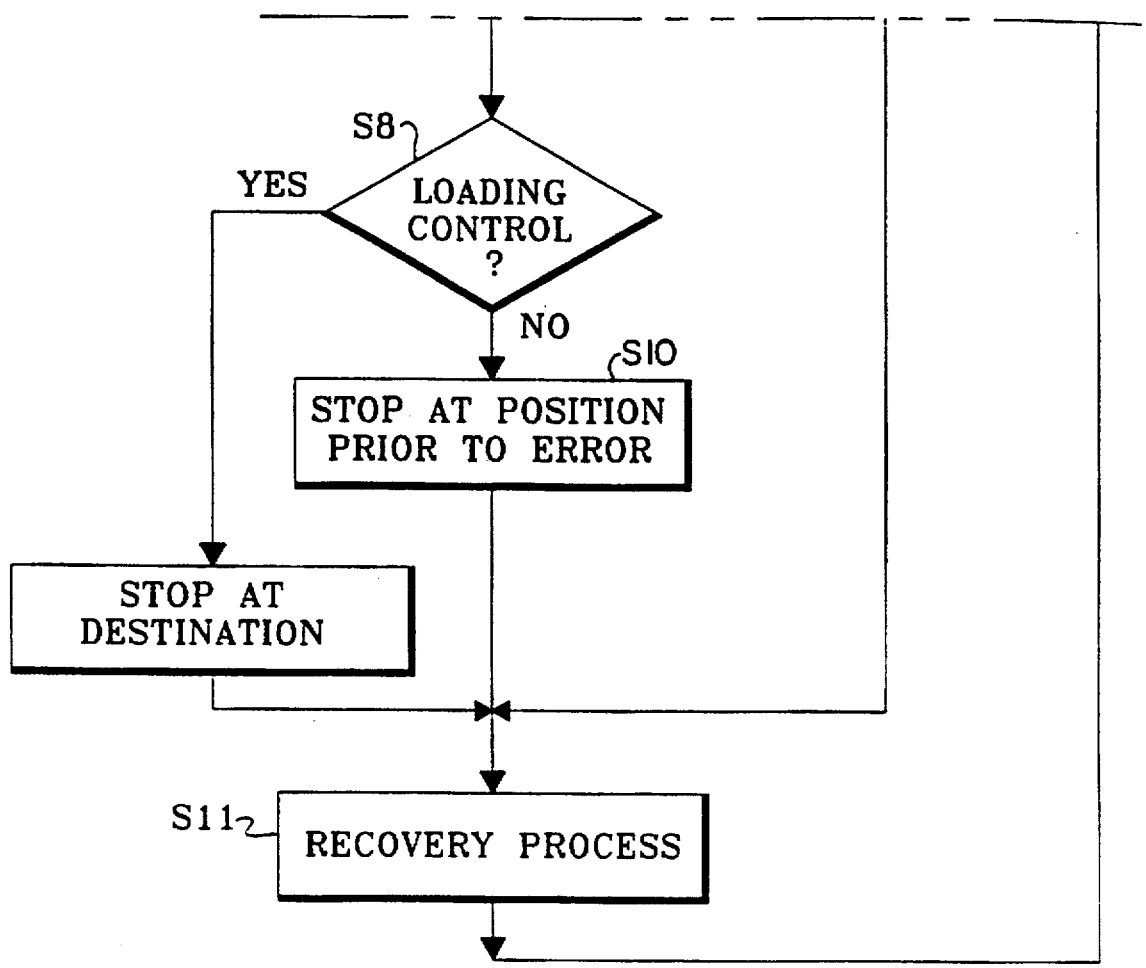

The flow diagram in FIG. 47 shows the initialization operation in an error stop that takes place in the loading or unloading operation using the sensor plate 576 and the position sensor 582 in FIG. 45. When at step S1, a loading or unloading instruction is detected, and the program goes to step S2, where the loading control or unloading control is performed. At step S3, an error stop of the cell drum 18 during loading or unloading is checked. When a successful end is confirmed at step S4, the program returns to step S1.

When an error stop of the cell drum 18 takes place during loading or unloading, the program goes to step S5, where the initialization operation is performed by returning to the initial point by a predetermined CW rotation. The end of the initialization operation is detected at step S6, and the program goes to step S7, where a determination is made of whether the detected pattern is "00" or not.

At step S7, a determination is also made whether the detected pattern of the position sensor 582 at the end of the initialization is "11" or not. The program goes to step S8, where a determination is made of whether the operation is the loading control or not. When the operation is a loading control operation and the detected pattern is "11," the program goes to step S9. After initialization, it is recognized that the cartridge is at the accessor 30 side as its destination.

When the detected pattern is "11," and the operation is an unloading operation, the program goes to step S10, where it is recognized that the cartridge is at the accessor side prior to the occurrence of the error. Depending on the result at step S9 or S10, a necessary recovery operation is performed at step S11. On the other hand, when the detected pattern is other than "11" at step S7, it means an abnormal end of the initialization operation. A necessary recovery operation in connection with the abnormal end in the initialization operation is performed at step S11.

6. Cartridge transport control at input/output

Figure 48:
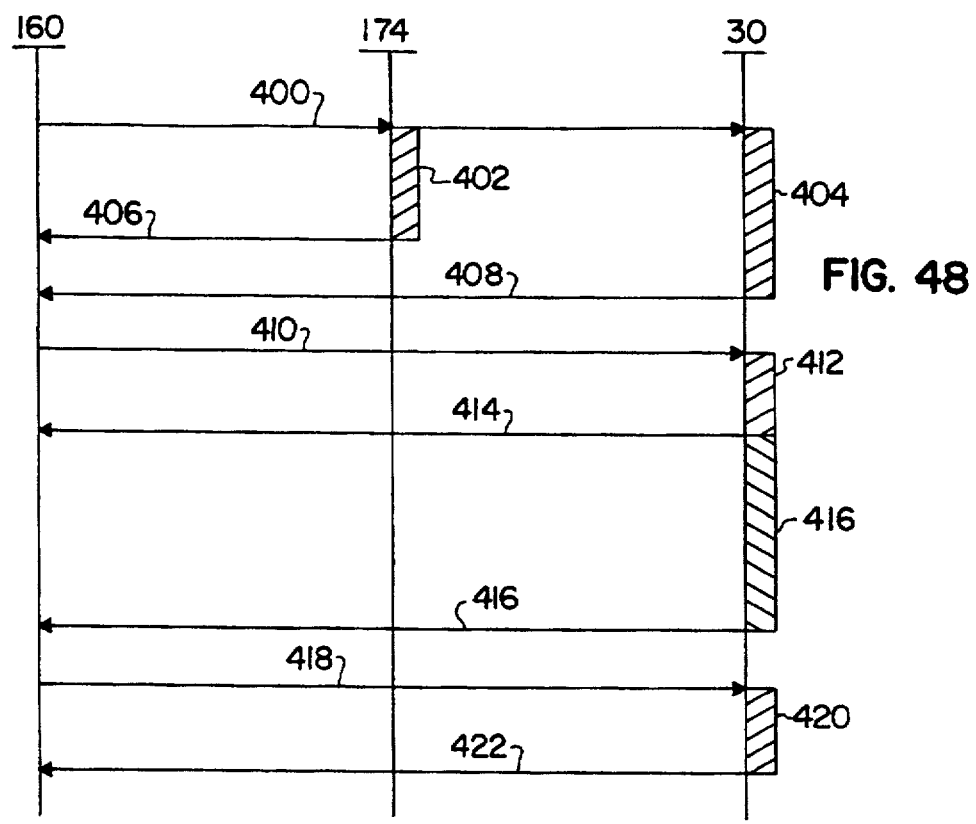
FIG. 48 is a timing diagram showing the basic cartridge transport control from the drum to the drive.

FIG. 48 is a basic timing diagram showing the cartridge transport control in connection with normal input processing by the medium transport control block 194 in the CPU 176 in FIG. 7.

As shown in FIG. 5, using a key table, the directors 156-1 and 156-2 in the library apparatus 150 store one or a plurality of From Addresses and To Addresses as command parameters issued along with move commands from the host computers 152-1, 152-2.

Waiting for an empty state of the accessor 30, the directors 156-1, 156-2 issue to the controller 160 cartridge transport instructions one after another based on the address information stored in the keying table. Alternatively, the keying table may be provided in the controller 160, and the controller 160 itself may issue the cartridge transport instructions one after another in response to the reception of From Addresses and To Addresses from the directors.

In FIG. 48, the controller 160 recognizes that the drum driving block 174 or the accessor 30 is empty, and issues From Address/To Address instruction 400 first. This instruction may be an instruction to move a cartridge from the cell drum to an optical disk drive unit. Upon receiving the transport instruction from the controller 160, the drum driving block 174 performs a rotation action 402 to the cell drum 18 to a selected position in a manner that allows the cell column to which the cell of the From Address belongs to be positioned to the accessor 30.

When the rotation ends, a status response 406 is returned to the controller 160. At the same time, the accessor 30 performs a transport action 404 to the cell position corresponding to the From Addresses among the cell columns in the cell drum, namely, to the selected position. When the accessor 30 has reached the selected position of the cell column, a status response 408 is returned to the controller 160.

When the controller 160 recognizes both the status response 406 from the drum driving block 174 and the status response 408 from the accessor 30, the controller 160 issues a cartridge pickup instruction 410 to the accessor 30. Upon receiving the cartridge pickup instruction 410, the accessor 30 performs a cartridge pickup operation 412 from the cell specified by the From Address of the cell drum.

When the cartridge pickup operation ends, a status response 414 is returned to the controller 160. In succession, the accessor 30 performs a transport action 416 to the optical disk drive unit specified by the To Address, and returns a status response 416 when the transport action ends. Upon receiving the status response 416, the controller 160 issues to the accessor 30 an insertion instruction 418 to the optical disk drive unit. The accessor 30 performs the insertion action 420 to the drive unit, and returns a status response 422 as a final device end.

In the cartridge transport operation shown in FIG. 48, the transport action 404 of the accessor 30 to the selected position ends after the rotation action 402 of the drum driving block 174 to the selected position is complete. The accessor 30 thus needs no waiting time after its movement to the selected position, and immediately starts the pickup action 412 and the movement action 416 to the To Address.

Figure 49:
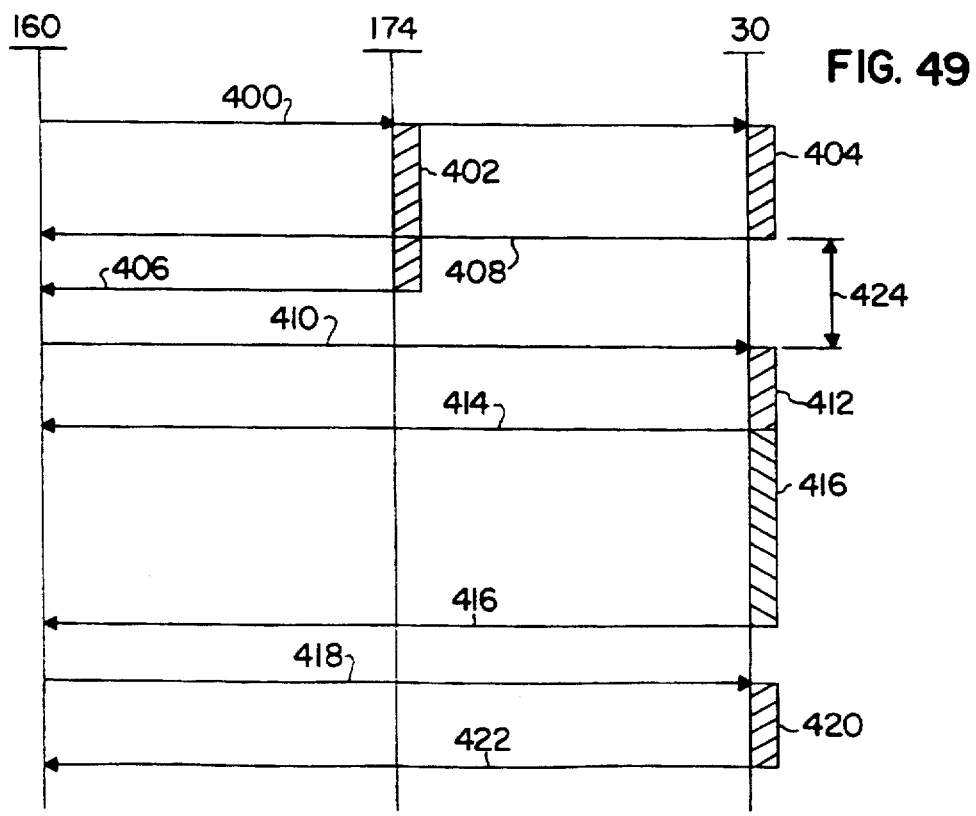
FIG. 49 is a timing diagram showing the transport control in which the accessor is forced to wait for the completion of the drum rotation.

In contrast, in the operation in FIG. 49, the rotation action 402 of the drum driving block 174 to the selected position takes time. The status response 406 is yet to be issued at the moment the transport action 404 of the accessor 30 to the selected position is complete. The accessor 30 which has already completed its movement to the selected position suffers waiting time 424 before picking up the medium from the cell drum, because the drum driving block 174 must complete its rotation first. The time required for the transport of the cartridge is prolonged depending on the waiting time 424 during which the accessor 30 must wait before picking up the medium from the cell drum. This degrades performance of the library apparatus accordingly.

In the cartridge transport control according to the present invention, taking advantage of the idling time of the drum driving block 174 during which the accessor 30 only operates to perform the cartridge pickup operation 412 and the transport action 416 to the To Address, the drum driving block 174 is rotated beforehand so that the drum rotation time for the next transportation is shortened.

Figure 50:
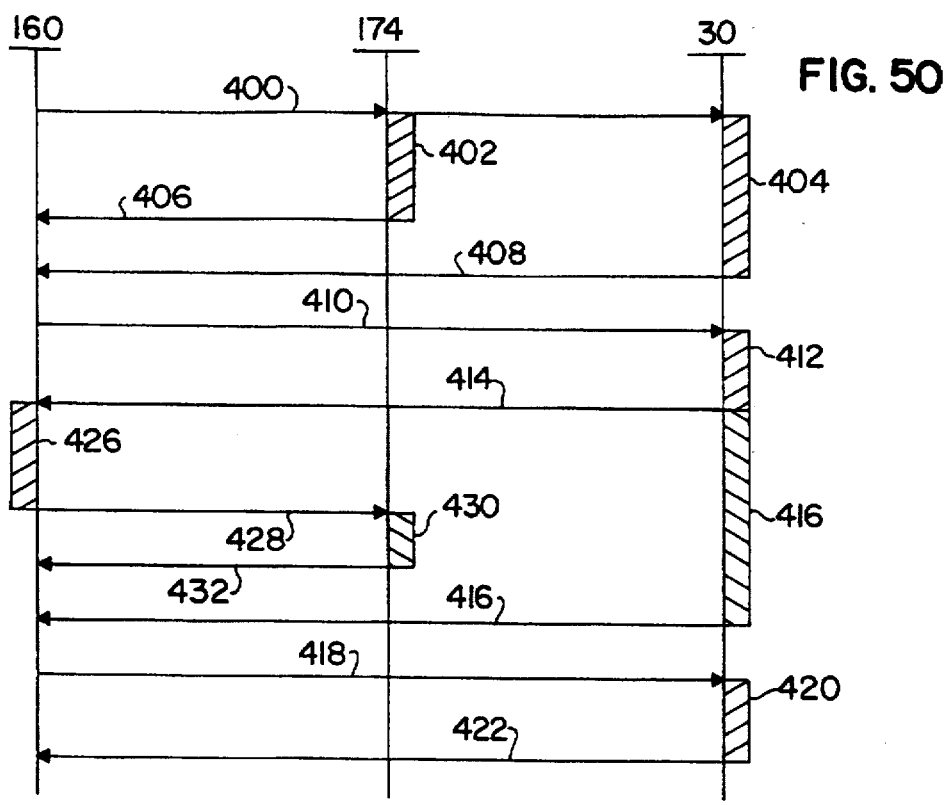
FIG. 50 is a timing diagram showing the cell drum rotation control for the cartridge transportation, taking advantage of the idling time that takes place during the accessor transportation operation.

FIG. 50 is a timing diagram in which the cell drum is rotated beforehand for the next transport action, taking advantage of the idling time of the drum driving block 174. The sequence of this timing diagram from the From Address/To Address instruction 400 the controller 160 issues, to the transport action in which the accessor 30 transports the cartridge from the From Address to the To Address remains unchanged from those in FIG. 47.

Furthermore, when the accessor 30 performs the transport action 416 to the optical disk drive unit as the To Address after the pickup operation of the cartridge from the cell drum, the controller 160 performs a computing process 426 for determining the angle of rotation of the cell drum for the next transportation when the status response 414 of the medium pickup operation 412 is received.

Based on the computing result, a drum rotation instruction 428 is issued to the drum driving block 174, and a drum rotation 430 is performed to place the cell column from which a cartridge pickup is performed at the next movement closer to the accessor 30. The computation of the position of the cell drum for the next movement may be made with a view to positioning the cell column of the From Address for the next movement to the accessor 30. Alternatively, the cell drum may be rotated to a position which offers a minimum average transport time the cell drum needs to arrive at the accessor 30 as will be described later.

In the next cartridge transportation operation, taking advantage of the previous idling time of the drum driving block 174, the cell column as the From Address of the cell drum may be rotated to the pickup position of the accessor 30, or the cell drum may be rotated to a position which imposes a minimum rotation time. As a result, when the controller 160 issues a From Address/To Address instruction, the accessor 30 has no waiting time arising from drum rotation as in FIG. 49. The time required for the transportation of the cartridge is minimized and improved performance of the library apparatus thus results.

Figure 51:
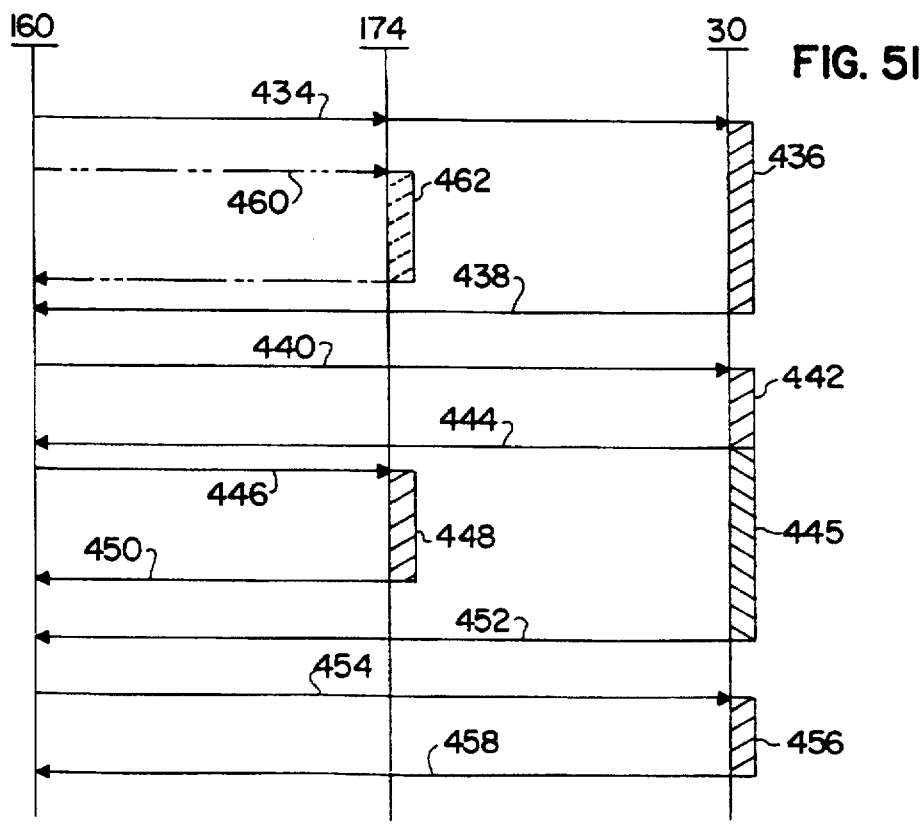
FIG. 51 is a timing diagram showing the cartridge transportation control from the drive to the cell.

FIGS. 48 through 50 exemplify the cartridge transportation control from the cell drum 18 to the optical disk drive unit. FIG. 51 is a timing diagram illustrating the transport control where a cartridge is picked up from an optical disk drive unit and then inserted back into the cell drum.

The controller 160 issues a From Address/To Address instruction 434 to the drum driving block 174 and the accessor 30 when the optical disk drive unit ejects the cartridge after a read or write operation. In this case, the From Address is the cell address of the optical disk drive unit that has ejected the cartridge, and the To Address is a predetermined cell address of the cell drum 18.

Upon receiving the From Address/To Address 434, the accessor 30 performs a transportation action 436 to the optical disk drive unit having the From Address, and returns a status response 438 when the transport ends. In response, the controller 160 issues a cartridge pickup instruction 440. The accessor 30 performs a cartridge pickup operation 442, and returns a status response 444 upon completion of the pickup operation.

The accessor 30 initiates a transportation action 444 toward the cell having the To Address. Upon receiving the status response 444 indicative of the end of the cartridge pickup action 442, the controller 160 issues a drum rotation instruction 446 to the drum driving block 174. In response, the drum driving block 174 performs a drum rotation 448 to position the cell column including the cell specified by the To Address to the accessor 30, and then returns a status response 450 upon completion of the rotation.

When the controller 160 receives a status response 452 after the transportation of the accessor 30 following the end of the drum rotation 448, the controller 160 issues an insertion instruction 454 to the cell drum, and the medium insertion action 456 is performed. A status response 458 is returned upon completion of the medium insertion. In the cartridge movement from the optical disk drive unit to the cell drum, the drum rotation action 448 is performed after the end of the cartridge pickup by the accessor from the drive. Alternatively, the controller 160 may issue the drum rotation instruction 460 to perform the drum rotation 462 when issuing the From Address/To Address instruction 434 if the drum driving block 174 is empty.

By providing the rotation instruction to the drum driving block 174 early, both the time the accessor 30 needs to travel to the optical disk drive unit and the time the accessor 30 needs to travel to the cell position after picking up the cartridge are taken advantage of to position the cell column having the destination cell to the accessor 30. This saves time for the rotation of the cell drum.

Figure 52B:
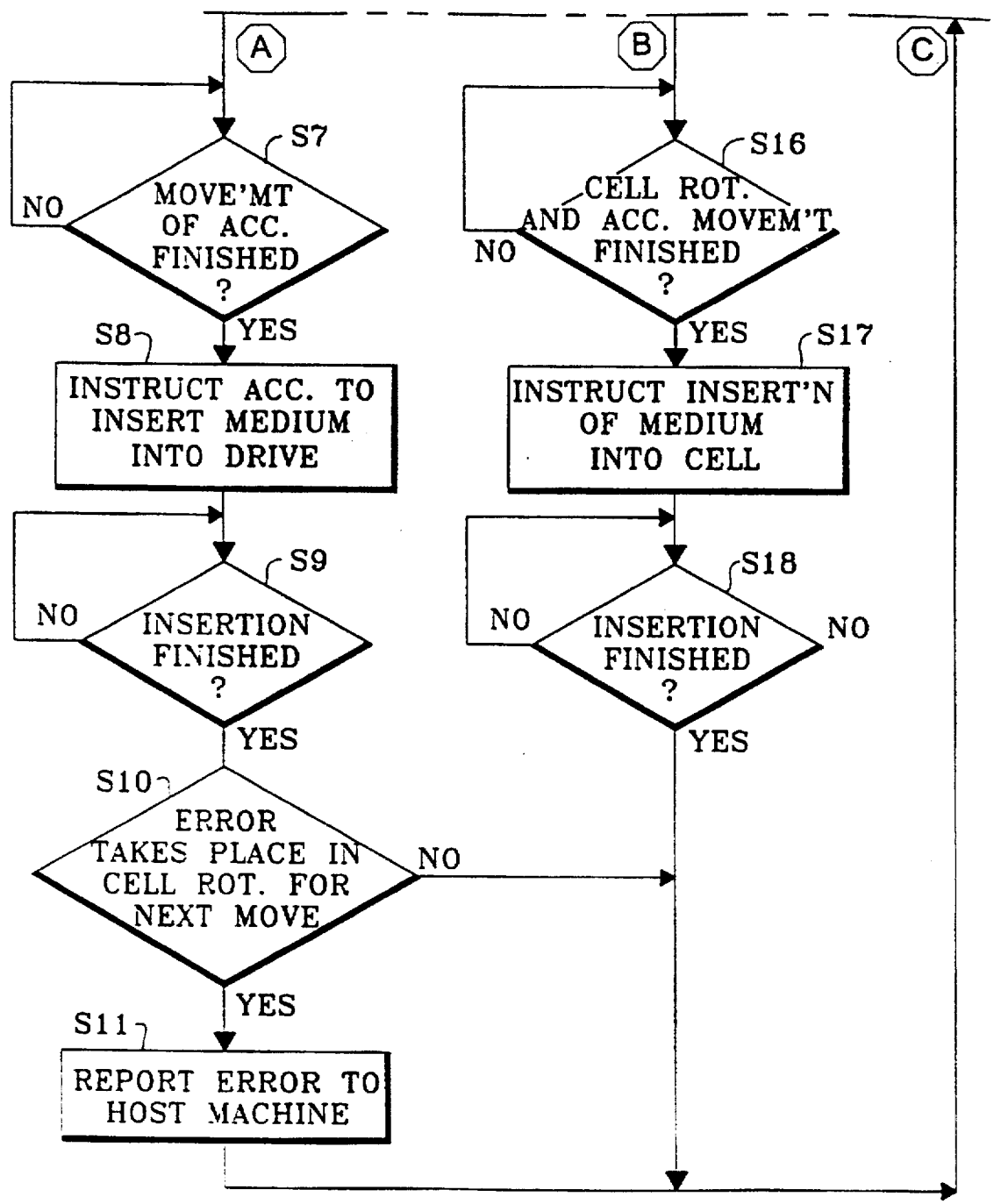

FIG. 52 is a flow diagram illustrating the cartridge transport control of FIGS. 50 and 51.

At step S1, the From Address and To Address are extracted from the keying table as command parameters for the move command. At step S2, a determination is made of whether or not the movement is from the cell drum to the optical disk drive unit. When it is from the cell drum to the optical disk drive unit, steps S3 through S11 are executed. When it is from the optical disk unit to the cell drum, steps S12 through S18 are executed.

For the movement from the cell drum to the optical disk drive unit, at step S3, cell drum rotation of the From Address to the pickup position is instructed, and the movement of the accessor 30 to the From Address is instructed at the same time. If at step S4, cell drum rotation and movement of the accessor is found to be complete, the program goes to step S5, where the medium pickup by the accessor is instructed.

In response, the accessor 30 picks up the cartridge from the specified cell and transports it to the drive unit. At step S6, a pre-rotation instruction of the cell drum 18 is given after the minimum time of travel to the cell position is computed. If at step S7, the end of movement of the accessor 30 to the optical disk drive unit is detected, the accessor 30 is instructed to insert the cartridge into the optical disk drive unit.

When the completion of cartridge insertion is verified at step S9, a determination is made, at steps 10, of whether or not an error has been generated in the cell drum rotation for the next move performed at step S6. When no error has been generated, the program returns to step S1, where the next move command is extracted for analysis. When an error takes place in pre-rotation of the cell drum at step S6, the error is reported to host machines at step S11.

The error reporting at step S11 would be a step that is made in the form of an abnormal end as a result of pre-rotation action at step S6. If the error reporting was made to the host machines at step S6, however, the cartridge transport control that is executed in parallel by the accessor 30 would be interrupted. After the accessor 30 completes transportation of the cartridge at step S9, the error reporting to the host machines is performed at step S11. In this arrangement, if an error takes place in the pre-rotation of the cell drum at step S6, the cartridge transportation under way in parallel will successfully finish rather than be interrupted on its way.

When the movement from the optical disk drive unit to the cell drum 18 is detected at S2, the program goes to step S12, where the accessor 30 is instructed to move to the pickup position of the optical disk drive unit of the From Address. If the end of the movement of the accessor is detected at step S13, the accessor 30 is instructed to pick up the medium at step S14.

The accessor 30 is instructed to move to the cell drum insertion position of the To Address at step S15. At the same time, the drum driving block is instructed to rotate the cell drum 18 so that the return cell position specified by the From Address is positioned to the accessor 30. When the end of the cell drum rotation and the movement of the accessor is detected at step S16, the accessor 30 is instructed to insert the medium into the cell at step S17. When the insertion of the medium is verified at step S18, the program completes a series of steps and returns to step S1 for the next movement.

Figure 53:
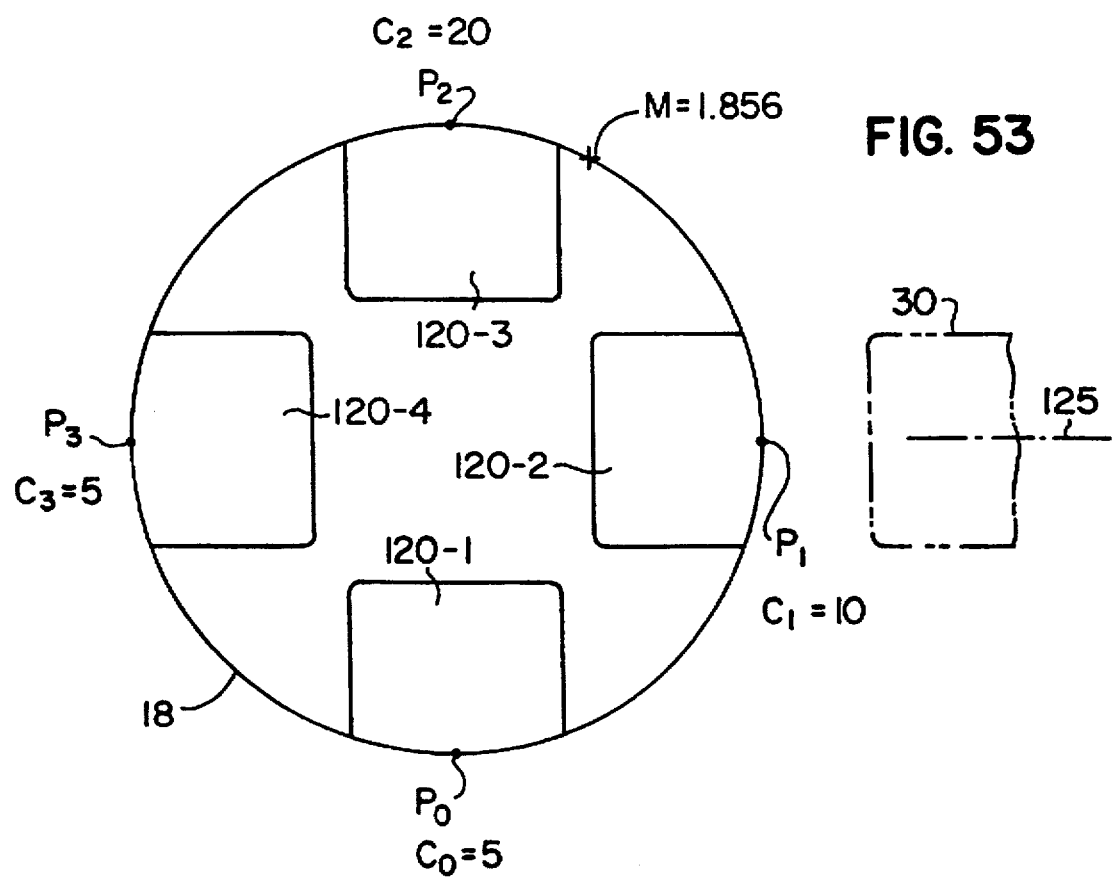
FIG. 53 shows the computation principle for determining the position of the minimum average travel time for the cell drum to be positioned to the accessor, using the idling time of the cell drum.

FIG. 53 shows the computation principle for determining the cell position of the cell drum of the minimum time of travel, taking advantage of the idling time at step S6 in FIG. 52. The cell drum 18 has, for example, four cell columns 120-1 through 120-4 which are mounted 90° apart. The cell drum 18 is rotated so that one of the cell columns 120-1 through 120-4 is positioned to the cartridge insertion position 125 of the accessor 30 according to the transport instruction based on a move command.

The positions of the cell columns 120-1 through 120-4 are designated number positions P0, P1, P2 and P3, respectively. As for the position numbers P0 through P3, if the number of cell columns are n, numbers 0, 1, 2, ..., n-1 are used. In this case, the number of cell columns is n=4, thus, position numbers P0 through P3 are defined as follows: P0=0, P1=1, P2=2, P3=3. The number of accesses in which the cell columns 120-1 through 120-4 make to the accessor 30 are designated C0, C1, C2 and C3, respectively.

Let M represent the position which gives a minimum average travel time to the cell column for it to be positioned to the cartridge insertion position 125 of the accessor 30, in the cartridge transport operation from the cell drum 18. The position M of the minimum travel time is calculated by the following equation:

$$M=\{\Sigma(Pk \times Ck)\}/\Sigma Ck$$

where k=0, 1, 2, ..., n-1

As shown in FIG. 53, for example, assuming that the number of accesses of the cell columns 120-1 through 120-4 are C0=5 times, C1=10 times, C2=20 times, and C3=5 times, respectively, the minimum travel time position M=65/35=1.86. In this case, the positions of the cell columns P0 through P3 are integers 0 through 3, and M=2 if the resulting M is rounded off.

Therefore, the minimum travel time position M is 2, namely the position number P2 of the cell column 120-3. The cell column 120-3 is positioned beforehand to the position 125 of the accessor 30 in preparation for the next movement.

Figure 54:
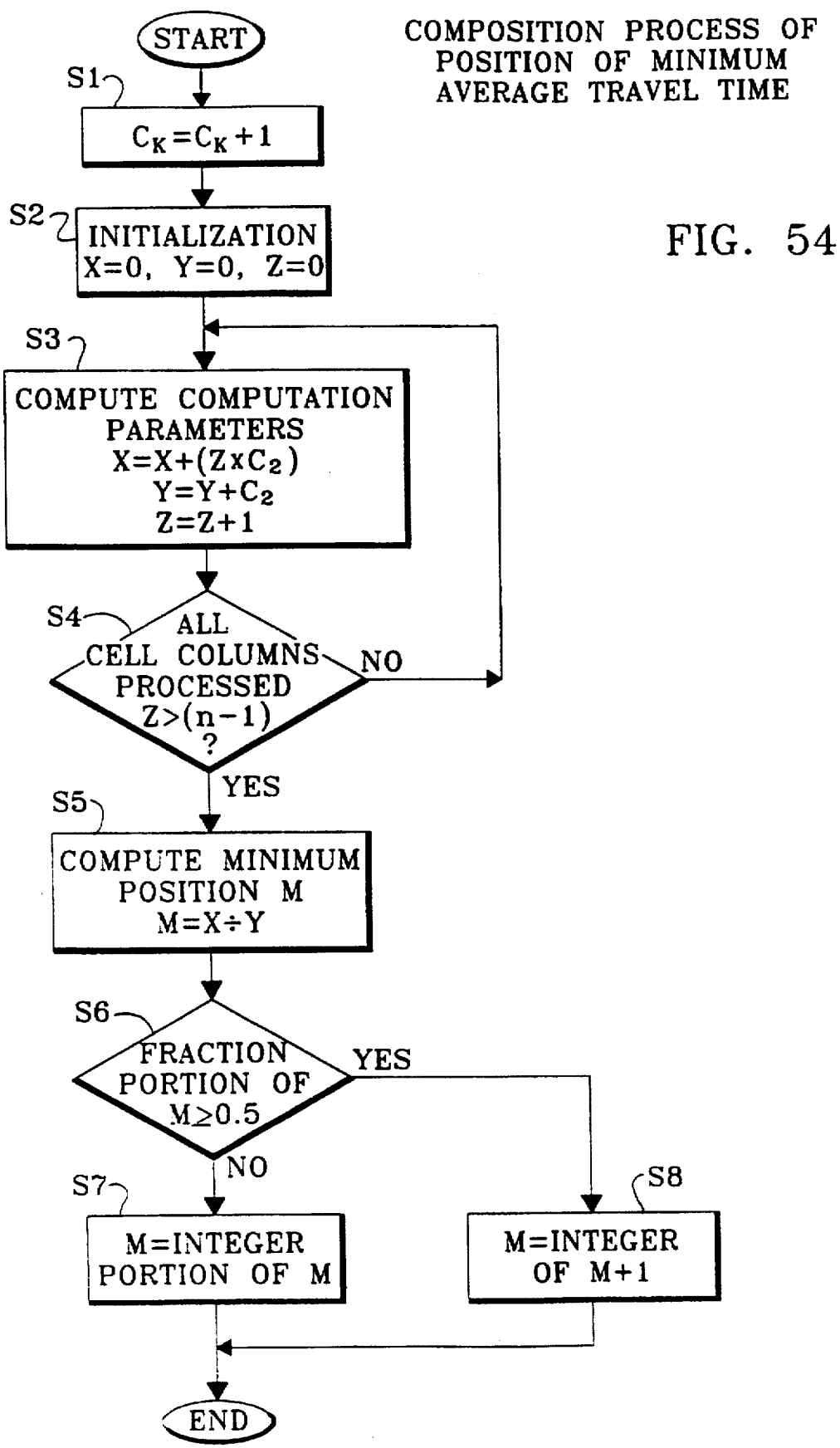
FIG. 54 is a flow diagram for determining the position of the minimum average travel time of FIG. 53.

FIG. 54 shows a subroutine in which the computation process for determining the minimum travel time position M at step S6 in FIG. 52 is detailed.

At step S1, the number of accesses Ck corresponding to the cell column having the position number k currently positioned to the accessor 30 is incremented by 1. At step S2, working variables X, Y, and Z are individually initialized to 0. The working variable X represents the grand sum of the product of the stop position number k and the respective number of accesses Ck. The working variable Y represents the sum of the numbers of accesses. The working variable Z represents a pointer, and varies from 0 to n-1 when the number of cell columns is n. The pointer represents the cell position of interest for computation.

When the working variables are initialized, the program goes to step S3, where computation parameters are computed. As for the working variable X representing the grand sum of the products of the stop position numbers and the number of accesses, the pointer Z is multiplied by the number of accesses at the stop position number k=Z, and the resulting product is added to the preceding working variable X to determine the grand sum.

First, the working variable X at the right-hand side is 0. Next, the current number of accesses Ck is added to the working variable Y representing the grand sum of accesses.

First, the working variable Y is 0. In succession, the pointer Z is incremented by 1. First, Z was also 0, and now Z is 1. At step S4, a determination is made of whether or not all positions of the cell columns are processed. Specifically, the completion of the process is verified when the working pointer Z exceeds the value n-1.

By repeating steps S3 and S4, working variables X and Y are determined for every stop position number k. At step S5, the minimum travel time position M is determined by dividing the working variable X by the working variable Y. Since the resulting position M includes a fraction, the program goes to step S6, where the position M is rounded off to be an integer.

Specifically, if the fraction portion of the resulting position M is smaller than 0.5, the program goes to step S7, where the fraction is completely dropped. The resulting integer portion is the minimum travel time position M. On the other hand, if the fraction is equal to or greater than 0.5, the program goes to step S8, where 1 is added to the integer portion. The resulting integer is treated as the minimum travel time position M.

Figure 55:
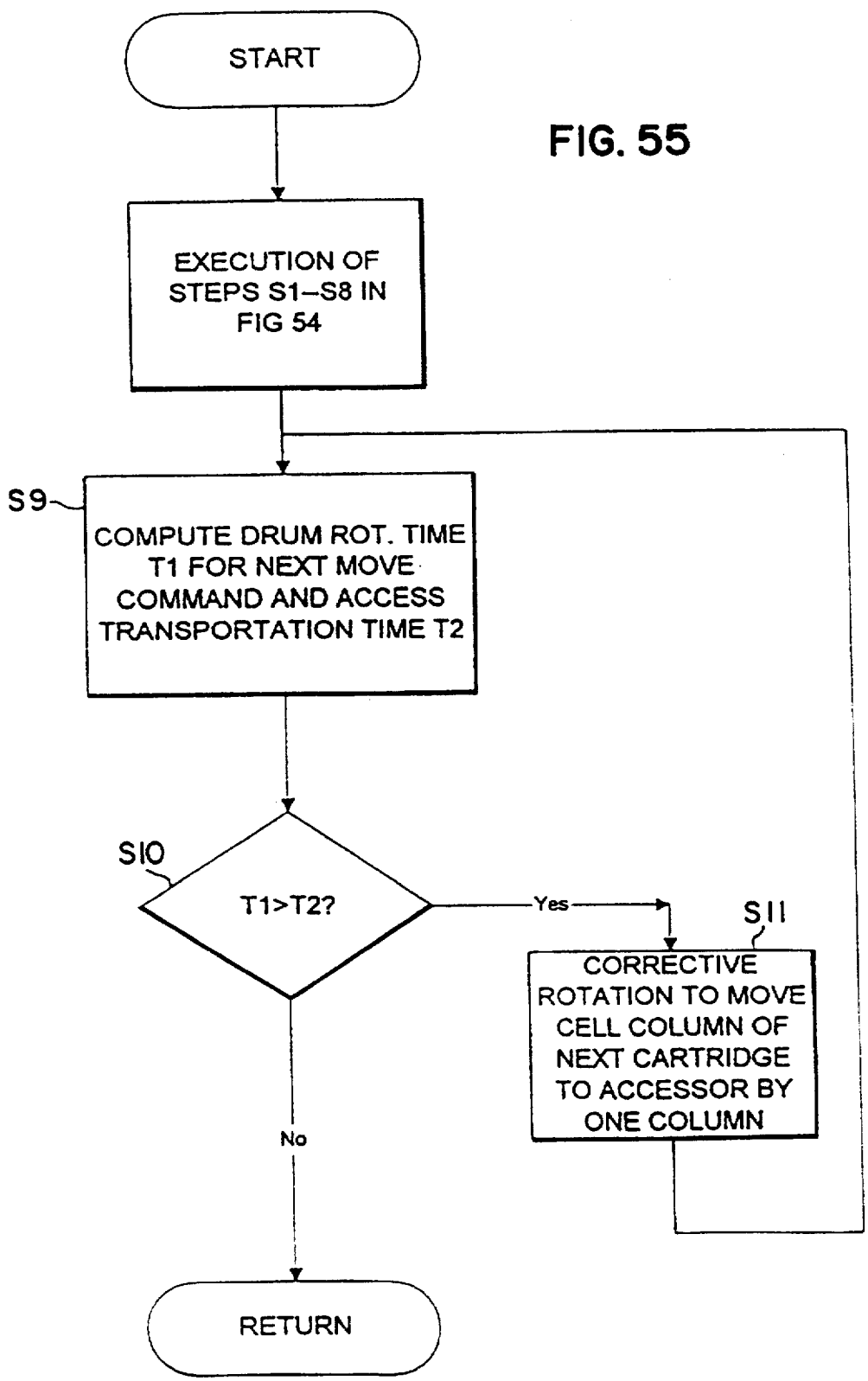
FIG. 55 is a flow diagram for performing a corrective rotation.

FIG. 55 shows a correction process that is further performed after the position M is positioned to the accessor 30 based on the minimum average travel time position M resulting from FIG. 54. When steps S1 through S8 are complete, the program goes to step S9. Step S9 calculates a travel time T1 for positioning the cell drum to the accessor based on the From Address and the To Address provided by the next move command, and a travel time T2 for moving the accessor 30 to the cartridge pickup position from the cell.

The cell rotation time T1 and the accessor transportation time T2 are calculated based on the position information of the current position and the target position. To simplify the calculation, it is a good idea to prepare tabled information about travel time for every angle of rotation and distance of travel. At step S10, the cell drum rotation time T1 and the access transportation time T2 are compared.

When the cell drum rotation time T1 is longer than the accessor transportation time T2, this means there is a waiting time for the accessor, and then the program goes to step S11. At step S11, the resulting position M currently positioned to the accessor 30 is corrected by rotating, by 1 cell column (equal to 90°) closer to the accessor 30, the cell column of the cell which has to be positioned to the accessor 30 in the next transportation of a cartridge.

After the corrective rotation is performed at step S11, the program returns to step S9, where an adjusted cell rotation time T1 and accessor transportation time T2 are calculated. If the cell rotation time T1 is shorter than the accessor transportation time T2, no waiting time occurs. Then, the correction process ends, and the program returns to steps S3 through S11 in the main routine in FIG. 51.

The cell drum is pre-rotated based on the minimum average travel time M, and further, the cell drum rotation time and the accessor transportation time in the next cartridge transportation operation are compared. The cell drum is correctively rotated based on the comparison result so that the accessor is not forced to wait until the completion of the drum rotation. This allows the accessor to start the next cartridge transportation operation in a timely manner immediately when the current cartridge transportation by the accessor is complete. Therefore, the cartridge transportation time required is substantially shortened.

7. Optimum servo control of drum rotation

In the library apparatus of the present invention shown in FIG. 3, the clutch 24 is connected with the cell drum 18 so that both are integrally rotated during cartridge loading and unloading operations. In the servo control positioning of the cell drum 18 with the motor 20 as its driving source, inertia load is varied between the separate rotation where the clutch 24 is disengaged from the cell drum and the integral rotation where the load/unload block 22 is integrated with the cell drum 18 via the clutch 24.

The servo system for rotating a load typically sets up optimum value for the servo gain so that optimum PID control performance, for example, is achieved under a predicted inertia load. When inertial load is varied due to the clutch connection, the performance of the servo control will be degraded because the optimum servo gain for the inertia load does not work any more.

According to the present invention, when inertia load is varied between clutch engagement and clutch disengagement between the cell drum 18 and the load/unload block 22, control performance gained at the optimum servo gain set at the initial setting is maintained by modifying internal parameters in the servo loop.

Figure 56:
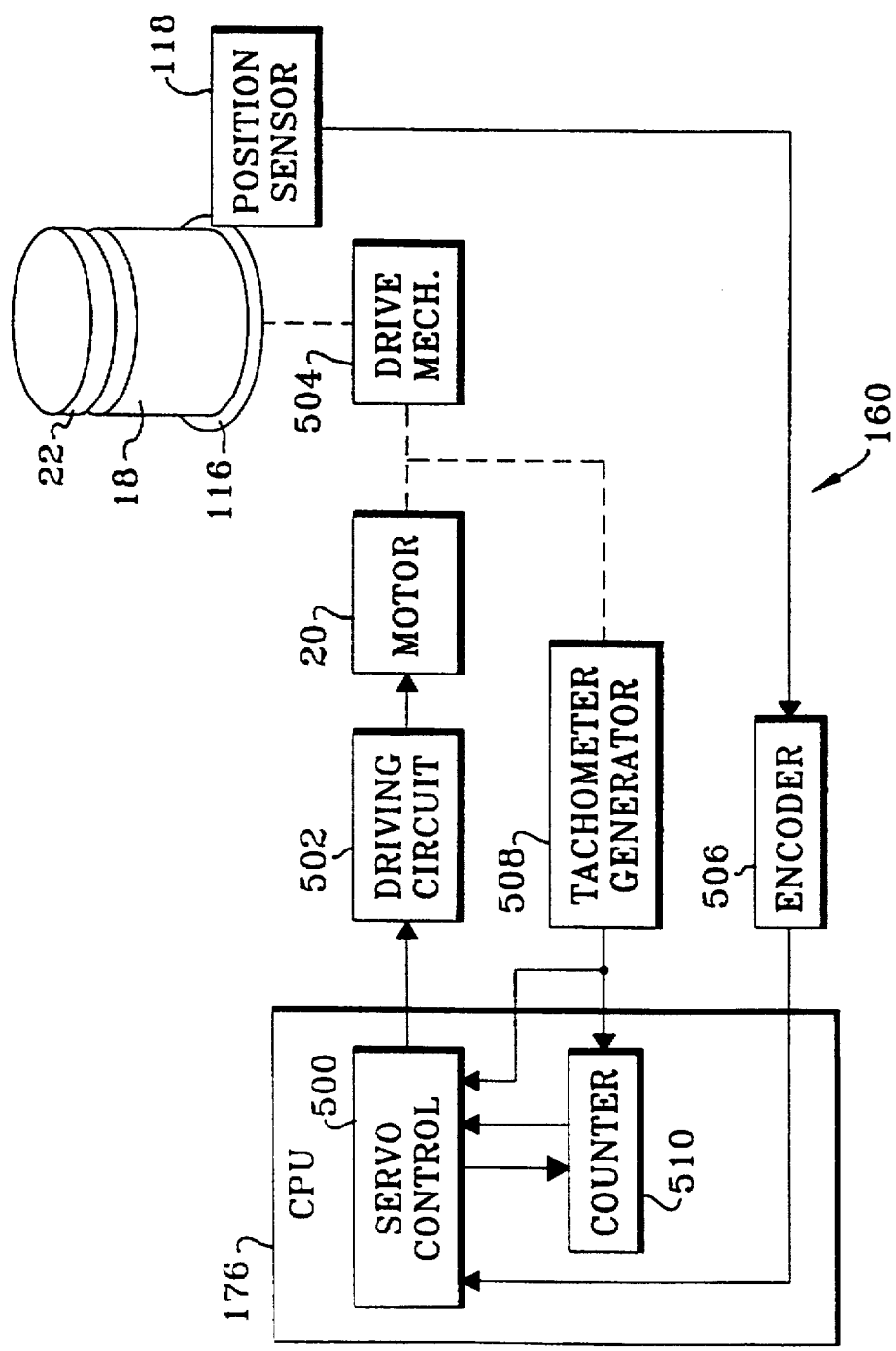
FIG. 56 is a diagram showing the servo system for driving the cell drum.

FIG. 56 shows the driving circuit of the cell drum 18 using the CPU 176 in the controller 160 in FIG. 6. This driving circuit remains unchanged from the embodiment for the positioning control using the timing belt in FIG. 26, except that the driving circuit here contains a servo control block 500 in the CPU 176.

Figure 57:
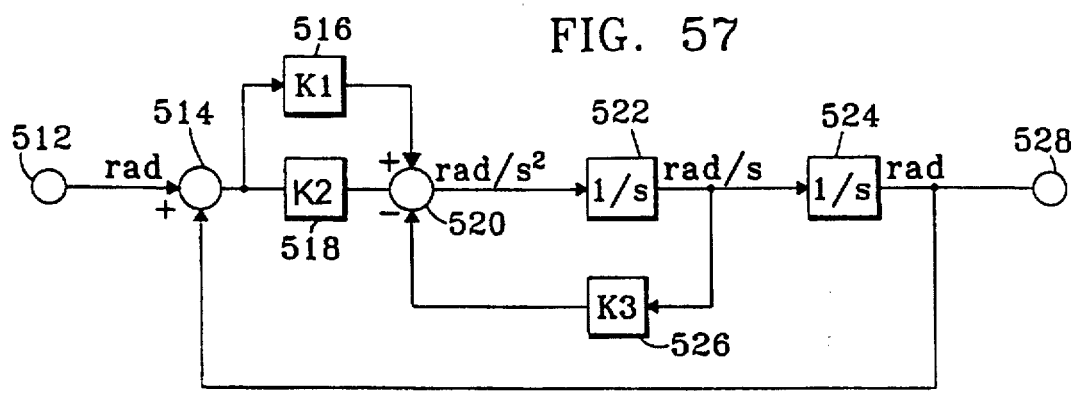
FIG. 57 shows the transfer function of the servo system adjusted for the optimum gain at the initial setting.

FIG. 57 is a system diagram of the transfer function of the servo loop used for servo controlling the cell drum 18. A target position is fed to an input 512. The target position is given in an angle of rotation (rad). A summing point 514 picks up a difference between the target position from the input 512 and the current position of a load. Connected to the summing point 514 are an integrator 516 for setting a proportional gain K1 and a proportional element 518 for setting a proportional gain K2. A summing point 520 determines a difference by summing the output of the integrator 516, the output of the proportional element 518 and the feedback signal obtained by multiplying the rotational speed of the load (rad/s) by a derivative gain K3 set by a differentiator 526.

The difference signal from the summing point 520 is the final control signal. This signal is a speed (rad/s) of the motor 20 as a mover in a block 522, and an angle of rotation of the motor 20 as a mover in a block 524, and then fed mechanically to the load side via an output 528. It is now assumed that servo gains K1, K2, and K3 in such a PID servo loop are set to optimum values.

Figure 58:
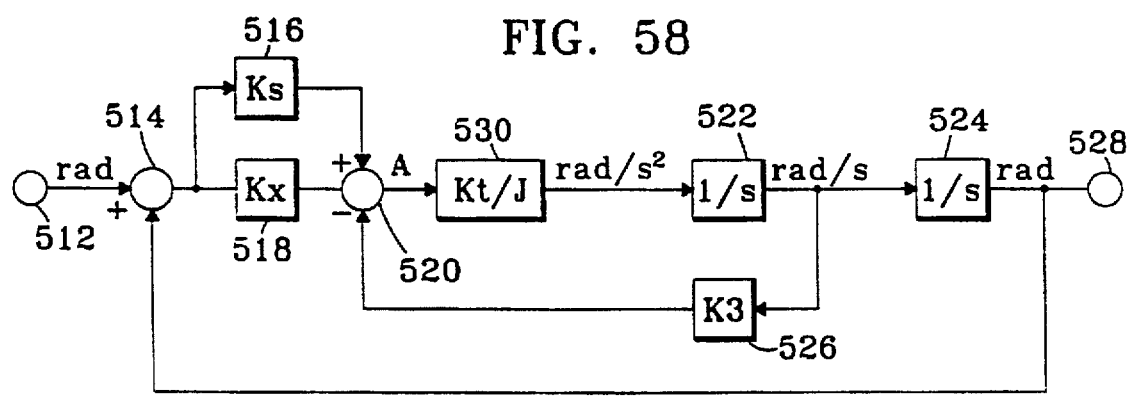
FIG. 58 shows the transfer function of FIG. 57 in terms of real inertia load and torque coefficient.

FIG. 58 shows the transfer function of the servo system of FIG. 56 incorporating an inertia load J and a torque coefficient Kt with the load/unload block 22 disengaged from the clutch. In this case, if the gains of the servo system are set to optimum values, the following equations hold with FIG. 57.

$$K1=(Kt\times J)\times Ks$$
$$K2=(Kt\times J)\times Kx \qquad (1)$$
$$K3=(Kt\times J)\times Kv$$

Figure 59:
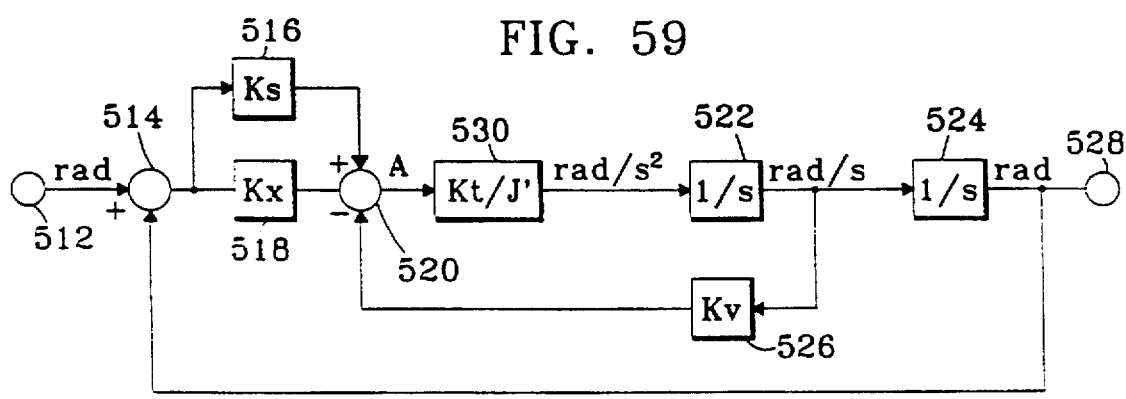
FIG. 59 shows the transfer function of the servo system with inertia load varied.

FIG. 59 shows the transfer function of FIG. 58 with the load/unload block 22 engaged with the cell drum 18 by the clutch. In this case, the transfer function is influenced by an increased inertia load J' and block coefficient Kt. Assuming now servo gains K1', K2', and K3', the following equations hold.

$$K1'=(Kt\times J')\times Ks$$
$$K2'=(Kt\times J')\times Kx \qquad (2)$$
$$K3'=(Kt\times J')\times Kv$$

The gains of the servo system thus change in the following rate of change when inertia load changes with or without the load/unload block 22 engaged.

$$K1/K1'=(Kt/J)\times Ks/\{(Kt'/J)\times Ks\}=J'/J$$

$$K2/K2'=(Kt/J)\times Kx/\{(Kt'/J)\times Kx\}=J'/J \qquad (3)$$

$$K3/K3'=(Kt/J)\times Kv/\{(Kt'/J)\times KV\}=J'/J$$

By multiplying each of servo system gains K1', K2' and K3' with the clutch connected in FIG. 59, by the division of the inertia load J without the clutch engaged by the inertia load J' with the clutch engaged (J'/J), the initially set optimum control with the clutch disengaged is maintained.

According to the present invention, as described above, the optimum servo gain setting is maintained regardless of inertia change with the load/unload block connected or disconnected with the cell drum 18. Once optimum servo gains are set at a predetermined inertia load at the initial state, control performance as good as in the initial optimum servo gain setting is maintained even with inertia load changed.

Figure 60:
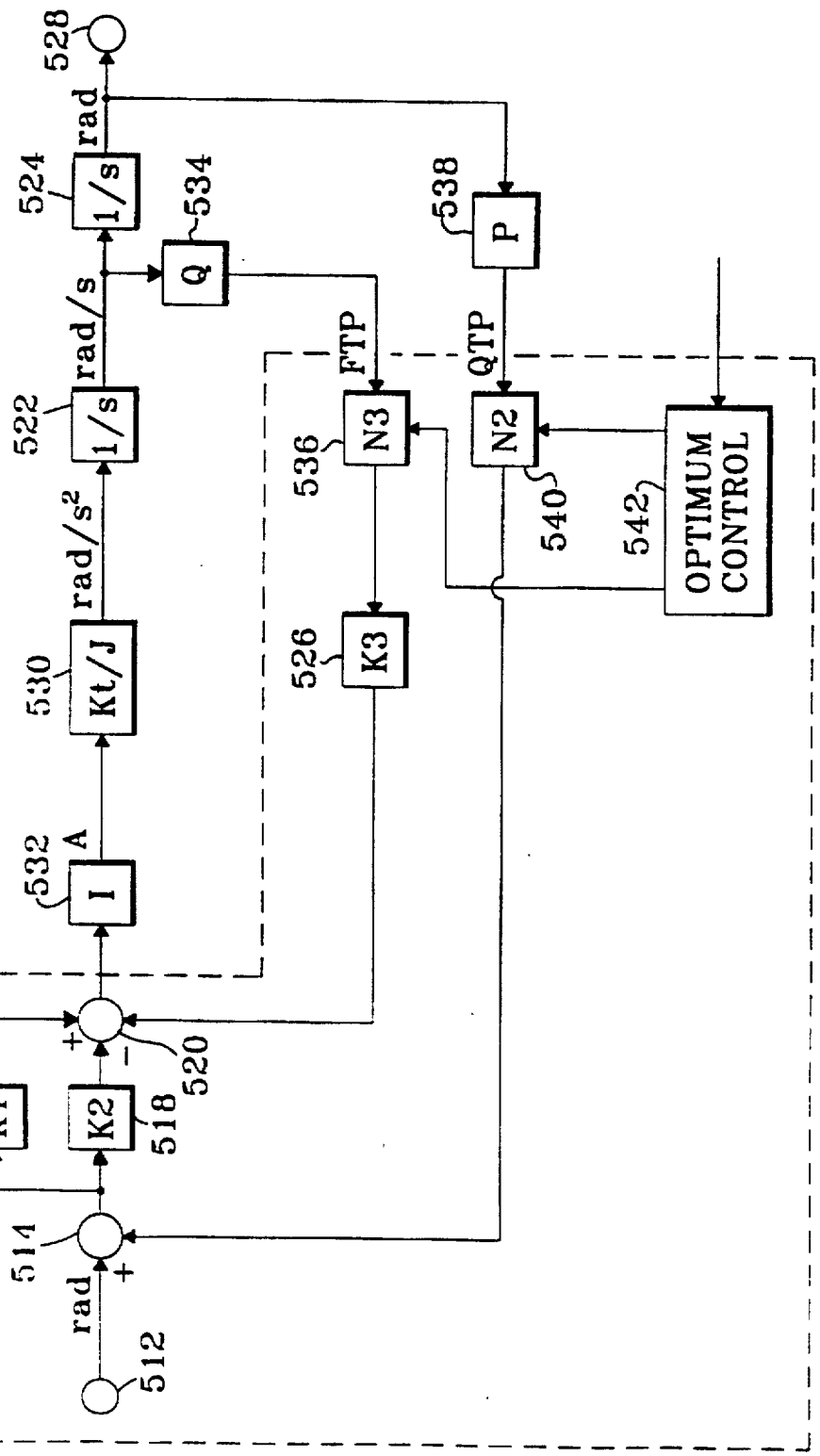
FIG. 60 shows the transfer function of an embodiment wherein the optimum gain is varied based on the ratio of the initially set inertia load to the real inertia load.

FIG. 60 shows an embodiment of the servo system according to the present invention, wherein a correction is made to inertia load change to maintain control performance that is gained at the initially set optimum servo gains. The transfer function of the servo system corresponds to the block diagram in FIG. 56. A servo control block implemented into CPU 212 is essentially equivalent to the PID loop in FIG. 57. A coefficient setter 540 is disposed in the position loop fed back from a position sensor 538. A coefficient setter 536 is disposed in the speed loop fed back from a speed sensor 534.

A current converter 532 which converts the control signal into a current signal is connected to the summing point 520 to which the final inspection signal is output. This corresponds to the drive circuit 502 in FIG. 55. Connected to the current converter 532 is a driving source 530 defined by inertia load J and torque coefficient Kt of the motor. This corresponds to the motor 20 in FIG. 55. The rotation of the motor 20 is the speed component (rad/s) in the block 522 or the position component (rad) in the block 524, and is mechanically transmitted to the load side via the output 528.

The speed sensor 534 that feeds a speed signal to the speed loop is specifically a tachometer generator 508 feeding a pulse signal FTP. The speed signal is represented as the frequency of the pulse signal. A position signal P from the position sensor 538 is the count provided by the counter 510 in FIG. 55.

When the position sensor 118 detects the home position edge on the sensor plate 116 mounted on the cell drum 18, the position sensor 118 resets the counter 510 via the encoder 506 as the absolute reference position. Relative to the absolute reference position, the counter 510 counts the pulses the tachometer generator 508 gives when the motor 20 rotates. Thus, the position information is obtained as the count relative to the absolute reference position.

Optimum control block 542 can modify values set at both the coefficient setter 540 disposed in the position loop and the coefficient setter 536 disposed in the speed loop. The optimum control block 542 modifies a set value N2 at the coefficient setter 536 in response to a change in the inertia load associated with the clutch engagement or disengagement according to the cartridge loading/unloading instruction.

Specifically, set values N2, N3 at coefficient setters 540, 536 are calculated so that the relationship with FIG. 57 remains equal based on the inertia load at the initial setting. For example, as for the coefficient N2 for the position loop, N2 is calculated by the following equation.

$$N2 = (K2 \times Je)/(K2 \times P \times I \times Kt) \quad (4)$$
$$= Je/(P \times I \times Kt)$$

Let J represent the inertia load at real inertia driving. Servo gain K2' then is, $$K2'=P \times N2 \times K2 \times I \times (Kt/J) \quad (5)$$

Substituting N2 in Equation (4) into Equation (5), the following equation results.

$$K2' = P \times Je/(P \times I \times Kt) \times K2 \times I(Kt/J) \quad (6)$$
$$= (Je/J)K2$$

As is apparent from Equation (6), if the initially set optimum gain K2 is multiplied by the division of the initial inertia load Je by the real inertia load J, and if the resulting K2' is used as the real servo gain, the optimum control that is achieved by the initial setting will be recovered.

If in FIG. 60, the coefficient N2 set for the position loop is multiplied by (Je/J) to be N2', the corrected state in the same manner as in Equation (6) with servo gain K2' will be achieved.

$$N2'=(Je/J) \times N2 \quad (7)$$

The coefficient N3 set for the speed loop may be handled in the same manner, and the following relationship will result.

$$N3 = (K3 \times Je)/(K3 \times P \times I \times Kt) \quad (8)$$
$$= Je/(Q \times I \times Kt)$$

The speed loop gain K3' for the speed loop at the real inertia load J is $$K3'=Q \times N3 \times K3 \times I \times (Kt/J) \quad (9)$$

Substituting N3 in Equation (8) into Equation (9), $$K3'=P \times Je/(Q \times I \times Kt) \times K3 \times I \times (Kt/J) \; K3'=(Je/J) \times N3 \quad (10)$$

thus $$N3'=(Je/J) \times N3 \quad (11)$$

The optimum control block 542 may set up the inertia load J1 with the load/unload block 22 disconnected and the inertia load J2 with the load/unload block 22 connected, with respect to the inertia load Je at the initial setting. The optimum control block 542 simply multiplies the initially set coefficients N2, N3 by (Je/J1) when the load/unload block 22 is disconnected or by (Je/J2) when the load/unload block 22 is connected.

Figure 61:
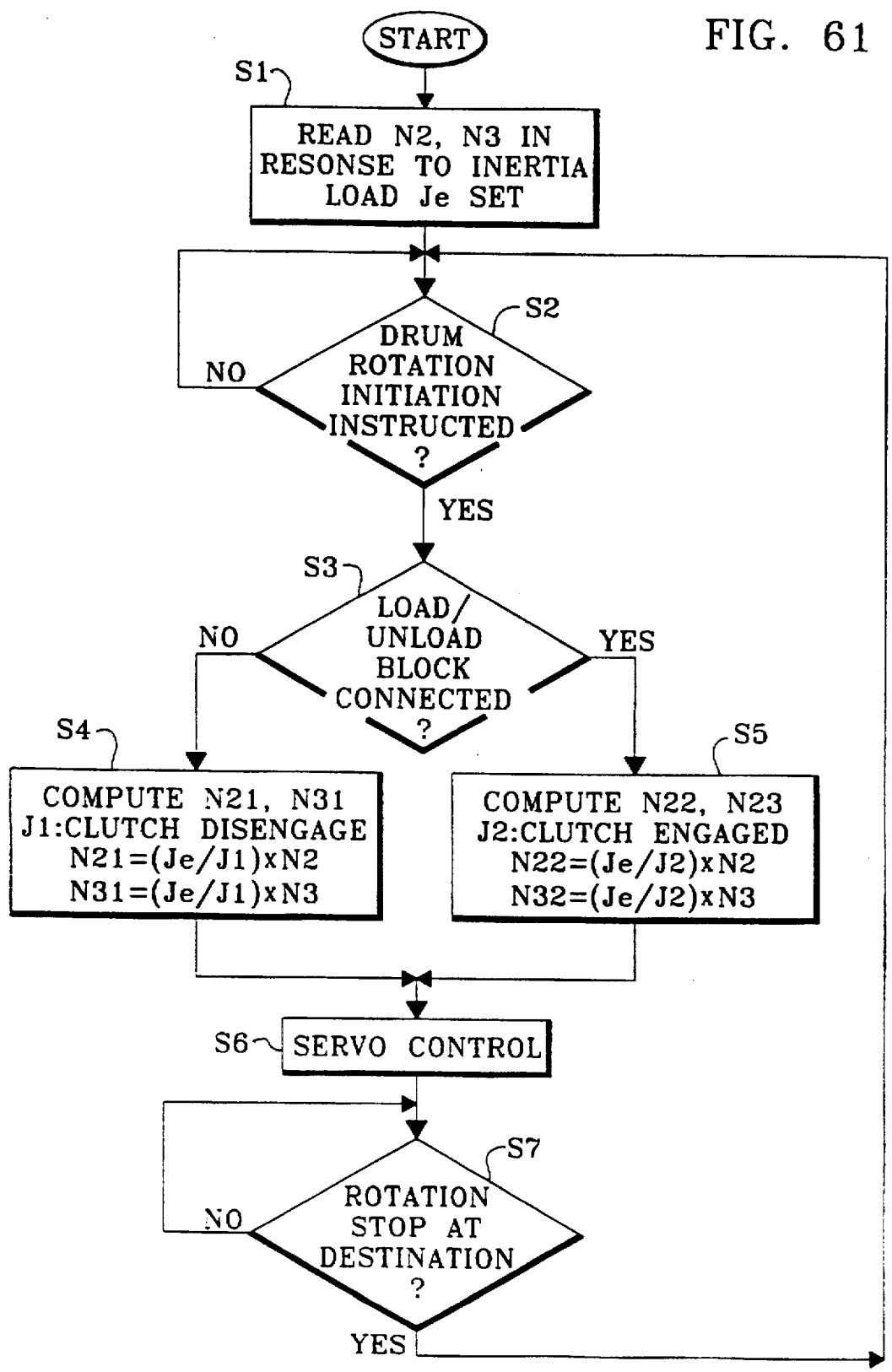
FIG. 61 is a flow diagram showing the drum rotation optimum control process applied to the embodiment in FIG. 60.

FIG. 61 shows the optimum control process by the optimum control block 542 in connection with the embodiment having the transfer function of FIG. 60. At step S1, the coefficients N2, N3 corresponding to the initially set inertia load Je are read. At step S2, a determination is made of whether or not a cell drum driving instruction is issued. When a driving instruction is made, a determination is made of whether or not the load/unload block 22 is connected at step S3.

When the load/unload block 22 is disconnected, the program goes to step S4. At step S4, coefficients N21, N31 of the real inertia load in the disconnected state are determined by multiplying the initially set coefficients N2, N3 by (Je/J1), and they are set to the coefficient setters 540, 536. When the load/unload block 22 is connected, the program goes to step S5. At step S5, coefficients N22, N32 of the real inertia load in the connected state are determined by multiplying the initially set coefficients N2, N3 by (Je/J2), and they are set to the coefficient setters 540, 536.

After the coefficient setting is completed according to the inertia load state in step S4 or S5, the program goes to step S6. At step S6, the optimum servo control is performed in the following sequence: a target position for positioning to the accessor 30 is fed to the input 512, the difference relative to the current position by the position sensor 538 is determined at the summing point 514, and the cell drum is rotated to the target position by means of PID control including the proportional, integral and differential control by the speed loop. When the stop of rotation at the target position is detected at step S7, the program returns to step S2 in preparation of the next initiation instruction.

The control in FIG. 60 is performed in the form of optimum control by changing the coefficient N2, N3 in accordance with the change of inertial load associated with the disconnection or connection of the load/unload block 22. The loading or unloading to the cell drum 18 affects inertia load. Since the change of inertia load due to loading or unloading is known, the coefficients N2, N3 may be modified accordingly to achieve the optimum control performance that is gained at the initial setting.

8. Additional aspects of the invention

Figure 64:
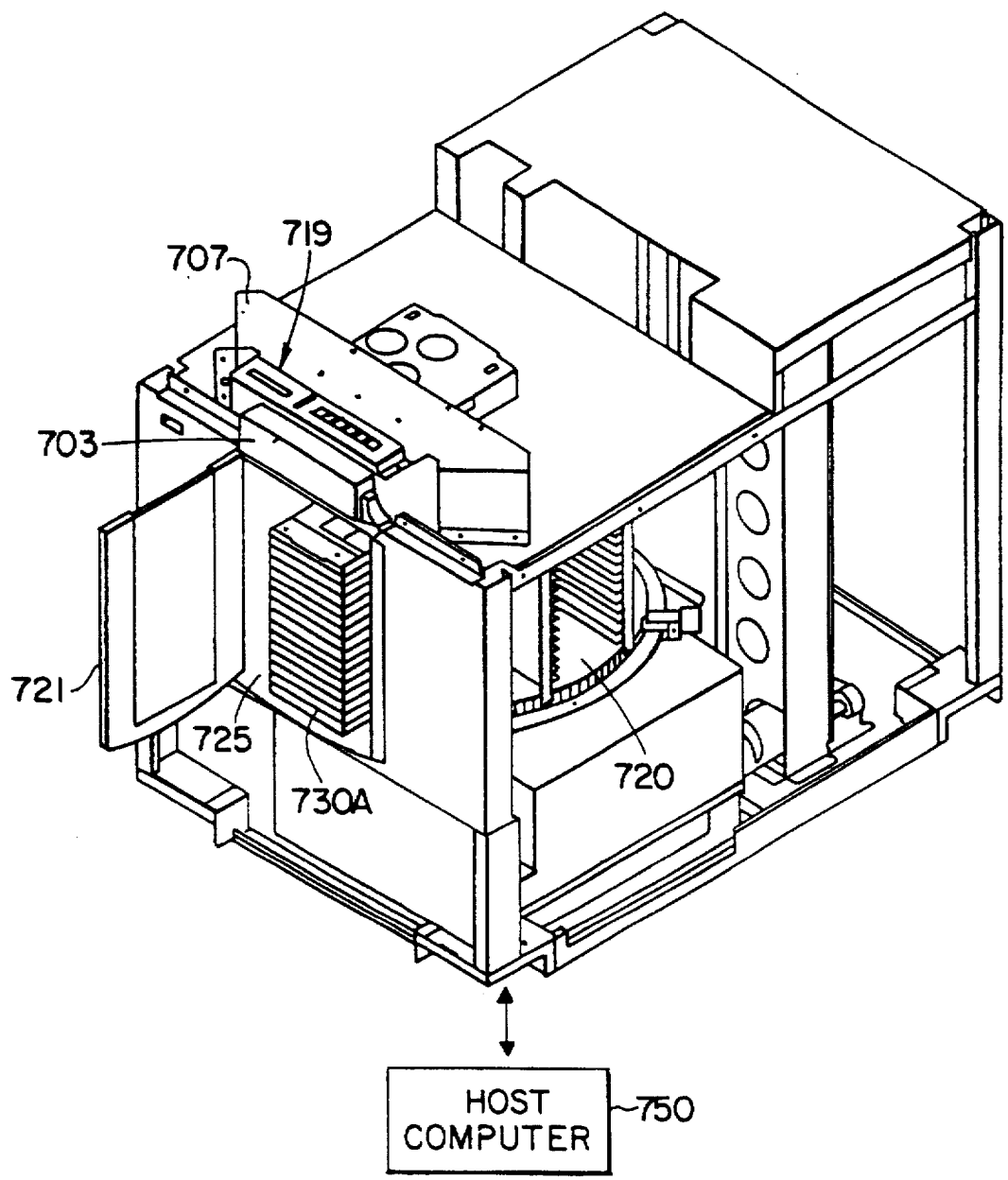
FIG. 64 is an explanatory diagram concerning additional principles of the present invention.
Figure 84B:
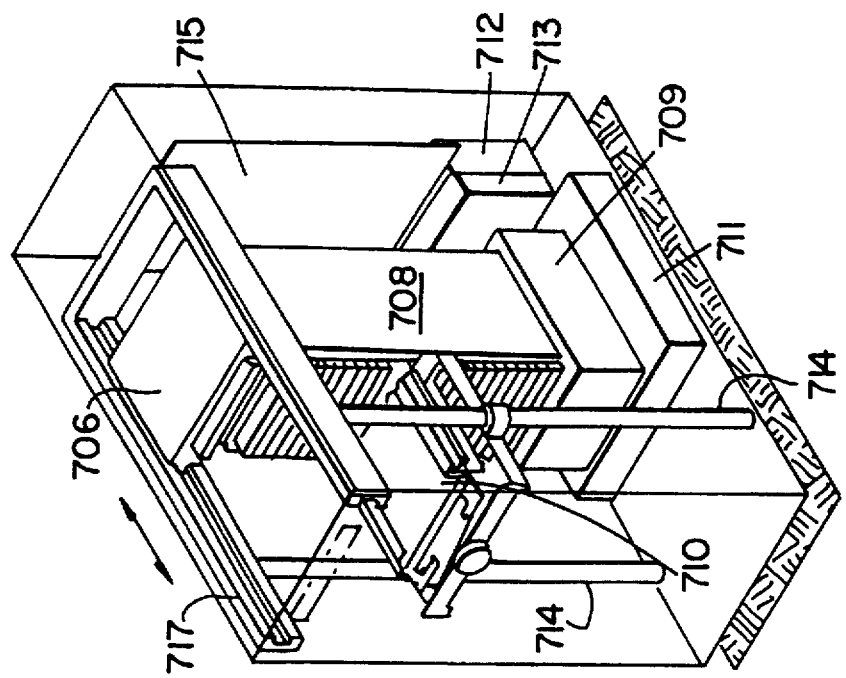
FIGS. 84(A) and 84(B) are explanatory diagrams showing a conventional optical disk library.
Figure 84A:
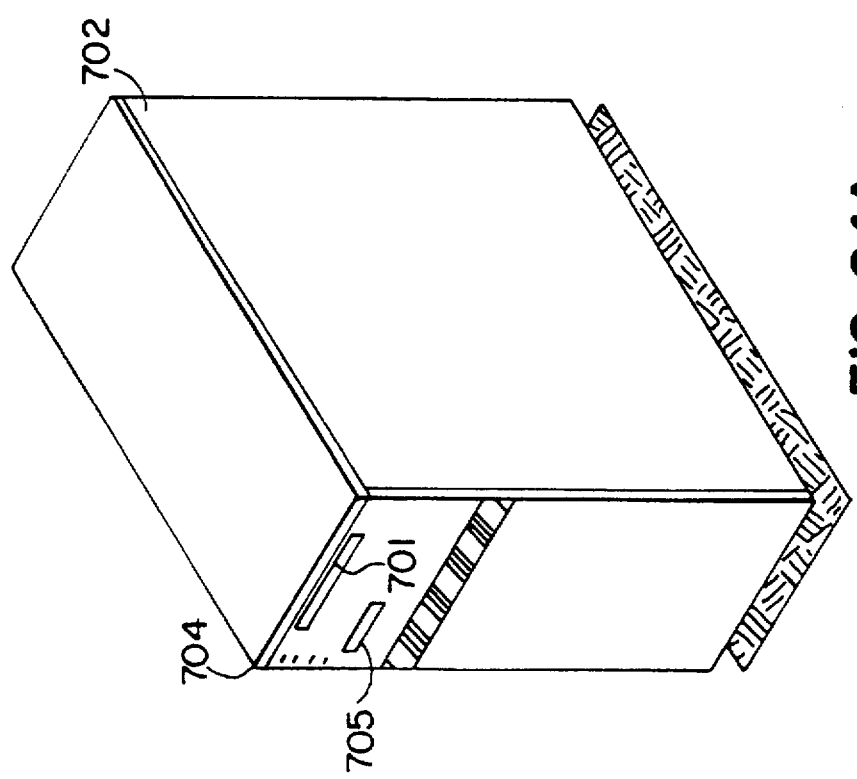

FIG. 64 is an explanatory diagram concerning additional principles of the present invention. In FIG. 64, components identical to those shown in FIG. 84 are assigned the same reference numerals unless otherwise shown. Reference numeral 719 denotes an operator panel, 721 denotes a direct entry/exit (DEE) door, 725 denotes an opening, 730A denotes a cartridge type recording medium, and 750 denotes a host computer.

The library includes a CAS 707 for inserting or ejecting cartridge type recording media, a cartridge stowage having a plurality of cells and stowing and preserving cartridge type recording media in the cells, a drive for at least reproducing information from a cartridge type recording medium, an accessor for carrying a cartridge type recording medium and accessing the CAS 707, cartridge stowage or drive, and an accessor control unit for controlling the accessor and others.

A drum-shaped rotatable cell drum 720 is used as a cartridge stowage. Furthermore, an opening 725 is formed as part of the housing and opposed to the cell drum. Through the opening 725, cartridge type recording media are mounted or demounted simultaneously. A DEE door 721 (which may be any suitable design) is formed to cover the opening 725. A DEE feature is included to mount (i.e., remove) or demount cartridge type recording media 730A simultaneously and directly in or from the cell drum through the opening 725. The accessor control unit includes a message notifying means for notifying a host computer 750 of a message saying that DEE processing is under way.

The accessor control unit includes a cell information updating means that performs cell checking on a cell column in the cell drum 720 subjected to DEE processing, determines whether cartridge type recording media are stowed in cells, and updates cell information concerning the cells. The accessor control unit includes a cartridge demounting control means that performs cell checking on a cell column in the cell drum 720 subjected to DEE processing, and determines whether another cartridge type recording medium is stowed in the cell in which the cartridge type recording medium carried to the drive has been stowed; that is, the source cell of the cartridge type recording medium carried to the drive. If another cartridge type recording medium is stowed, the cartridge demounting control means removes the cartridge type recording medium and places it in the CAS 707.

The accessor control unit includes a cartridge sorting control means that performs cell checking on a cell column in the cell drum subjected to DEE processing, and determines whether new cartridge type recording media are stowed in cells during DEE processing. If new cartridge type recording media are stowed, the cartridge sorting control means carries and sorts the new cartridge type recording media in the order in which the first cartridge type recording medium is stowed in an empty cell closest to the drive. The accessor control unit also includes a DEE control means for controlling DEE processing so that after DEE process cartridge rearranging is performed on one cell column, it is then performed on other cell columns, if desired.

Referring again to FIG. 64, the operation of the present invention will be described generally.

To start DEE processing, an operator designates DEE at the operator panel 719 and selects a cell column in or from which cartridge type recording media are to be inserted or removed. Entry information, that is information entered at the operator panel 719, is detected by the accessor control unit. The accessor control unit rotates the cell drum 720 according to the entry information.

The cell drum 720 is rotated until the cell column selected at the operator panel 719 is opposed to the DEE door 721. Thereafter, the accessor control unit gives an instruction to the DEE feature, and the DEE feature opens the DEE door 721.

When the DEE door 721 opens, the operator mounts or demounts cartridge type recording media 730A (which hereinafter may be referred to as cartridges) simultaneously and directly in or from the cell drum 720 through the opening 725 provided by the DEE door 721.

When the simultaneous mounting or demounting of cartridges is completed, the operator closes the DEE door 721 and terminates DEE. When a DEE End key on the operator panel 719 is pressed, DEE is terminated. When the DEE End key is not pressed but another cell column is selected, DEE is restarted for the other cell column continuously.

For the second DEE processing, after the DEE door 721 is closed at the end of the first DEE, a cell column to be subjected to DEE is selected at the operator panel 719, and the DEE door 721 is opened to mount or demount cartridges through the DEE door 721. When the mounting or demounting of cartridges is completed, the DEE door 721 is closed and the DEE End key on the operator panel 719 is pressed. By repeating this procedure, DEE is restarted for each cell column in the cell drum 720 in order to mount or demount cartridges simultaneously.

As mentioned above, when the DEE End key on the operator panel 719 is pressed, DEE processing is terminated. The accessor control unit controls the accessor and performs cell checking on a cell column whose cell contents have changed (a cell column whose cells are subjected to simultaneous mounting or demounting of cartridges during DEE).

As for cell checking, if the cells in a plurality of cell columns have the contents thereof changed, cell checking is executed for each of the cell columns. Information resulting from cell checking is acquired by the access control unit and used to update the cell information residing in the access control unit.

After cell checking is completed, if another cartridge type recording medium (mounted during DEE) is present in a cell in which a cartridge carried to the drive has been stowed; the other cartridge is ejected to the outside by the CAS 707. In this case, unless the other cartridge is ejected, the cartridge carried to the drive cannot be returned to the cell drum 720. Unnecessary cartridges mounted during DEE processing are ejected to the outside by the CAS 707.

The DEE processing is performed as mentioned above. During the DEE process, when a library receives a command (is accessed by) from the host computer 750, a message "DEE is in progress" is returned as a response to the host computer 750 that has issued the command. With the response, the host computer 750 becomes aware of the fact that DEE processing is under way in the library.

The library requests the host computer 750 to issue an Initialize Element Status command. In response to the request, the host computer 750 issues the Initialize Element Status command to the library.

In response to the command sent from the host computer 750, the library initializes cell information concerning a cell column whose cells are changed during DEE processing (when accessed thereafter, the library cannot identify cells whose contents are changed during DEE processing and therefore retains cell information updated during DEE processing).

The library notifies host computers other than the host computer having issued the command of the fact that the cell information has been updated. The host computer 750 having been notified of the fact that the cell information has been updated issues a Read Element Status command to the library, and acquires updated cell information to update the cell information residing in the host computer 750.

The library notifies the host computer 750 having accessed the library of updated cell information. With the notification, the host computer 750 updates the cell information residing therein.

9. Cartridge sorting

During DEE processing, the DEE door 721 is opened to insert or remove cartridges 730A simultaneously and directly in or from the cell drum 720. When the cartridges are stowed in arbitrary cells of a cell column in the cell drum 720, the cartridges cannot be used efficiently during normal operation.

Assuming that a cartridge is demounted from a certain cell and carried to a drive, it takes considerable time to carry a cartridge stowed in a cell away from storage to the drive. Thus, processing efficiency is poor. The accessor control unit therefore sorts and rearranges cartridges newly mounted during DEE processing.

During sorting, the accessor control unit performs cell checking on a cell column in the cell drum 720 subjected to DEE and determines whether new cartridges are stowed in the cells of the cell column during DEE. When new cartridges are present, the cartridges are carried and sorted such that the first cartridge is stowed in an empty cell closest to the drive. The accessor control unit automatically updates cell information concerning the cells whose contents are sorted.

As mentioned above, since a library automatically achieves DEE processing and subsequent cell information updating, a job to be run by a host computer is simplified. As a result, the number of software packages to be run under the host computer can be reduced, and the running time of the job in the host computer can be shortened.

A host computer can always be made aware of the fact that DEE is under way in a library. This helps improve processing efficiency of the host computer. When DEE is performed, cartridges newly mounted during DEE are sorted and rearranged automatically. This helps reduce the time required for transporting a cartridge from a cell drum to a drive. Consequently, improved efficiency is ensured for processing after DEE.

An embodiment of the present invention will now be described in more detail in conjunction with the drawings. The embodiment described below is concerned with an optical disk library. FIGS. 65 to 75 show this embodiment of the present invention. In FIGS. 65 to 75, components identical to those shown in FIGS. 64 bear the same reference numerals. The reference numerals in FIGS. 65 to 75 denote the components described below.

Reference numeral 719 (FIG. 65) denotes an operator panel, 720 denotes a cell drum, 721 denotes a direct entry/exit (hereinafter DEE) door, 722 denotes operation buttons, 724 denotes a balance weight, 725 denotes an opening, 730 denotes an optical disk cartridge, 731 (FIG. 68) denotes a shutter, 732 denotes a cartridge case, 733 denotes a Write Protect tab, 734 denotes a disk medium, 735 denotes an identifier, and 736 denotes a recess. Reference numeral 740 (FIG. 69) denotes a DEE feature, 741 denotes a drive controller, 742 denotes a drive unit, 743 denotes an accessor mechanical controller, 744 denotes an accessor control unit, 745 denotes an interface control unit, 747 and 751 denote memories, 748 and 752 denote cell information tables, and 750 denotes a host computer.

Figure 65:
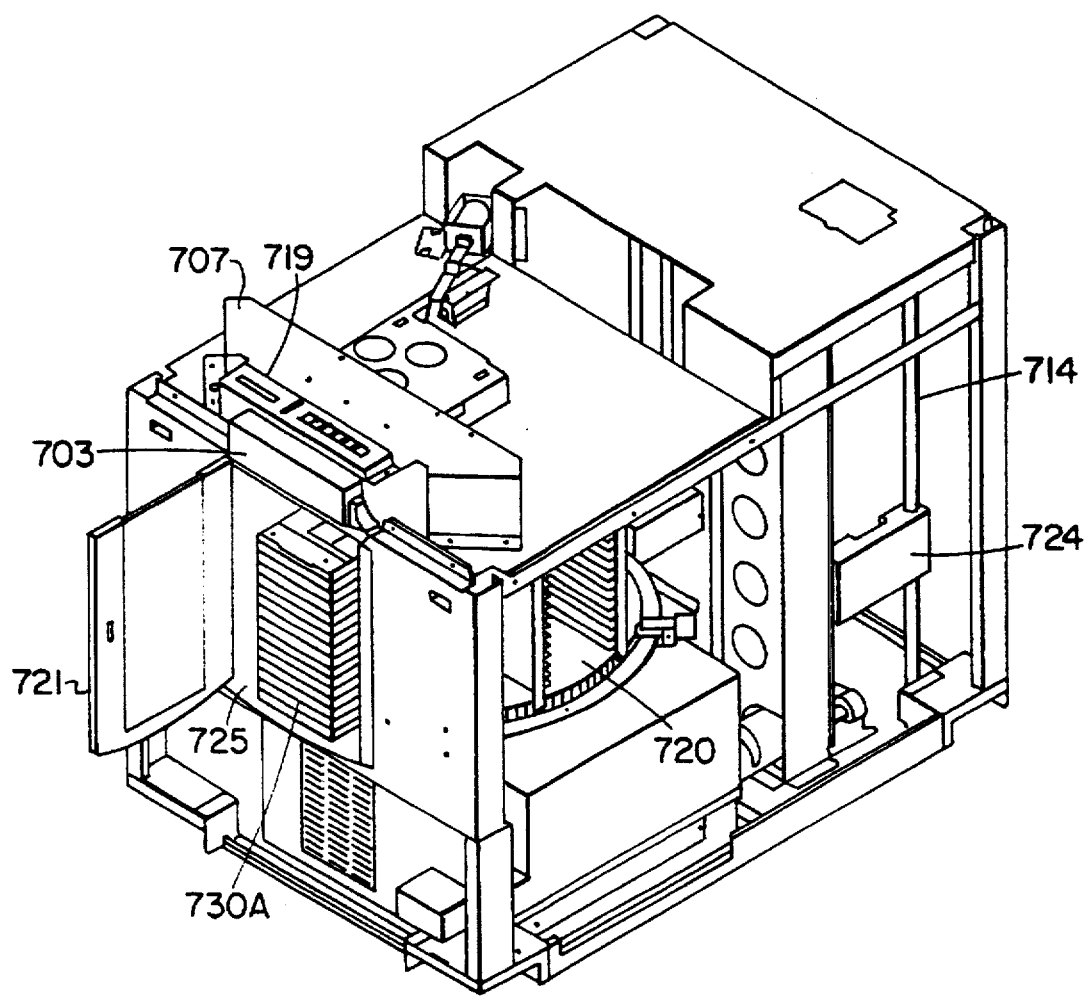
FIG. 65 is a first view showing the configuration of an optical disk library in accordance with additional aspects of the invention.
Figure 66:
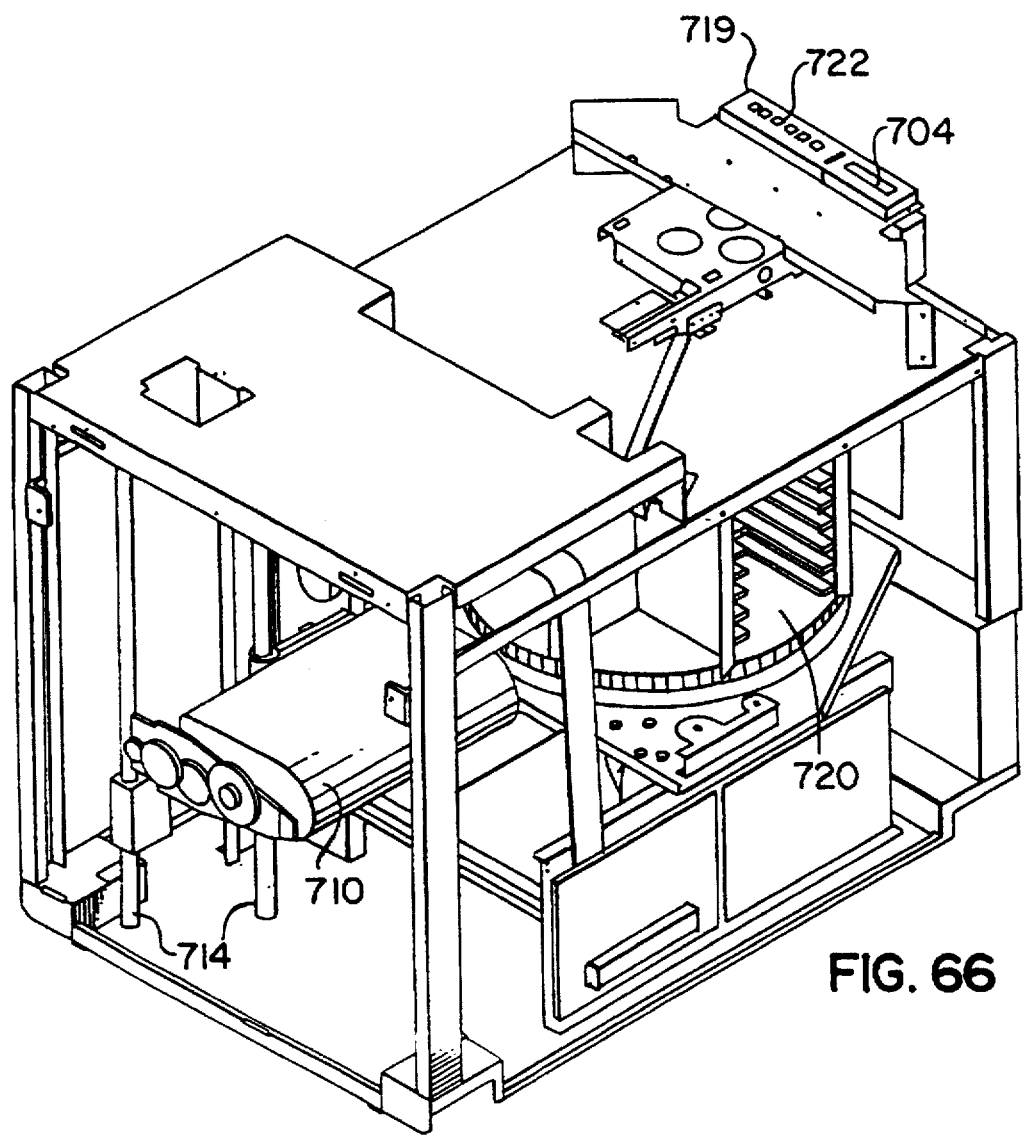
FIG. 66 is a second view showing the configuration of an optical disk library in accordance with the embodiment of FIG. 65.
Figure 67:
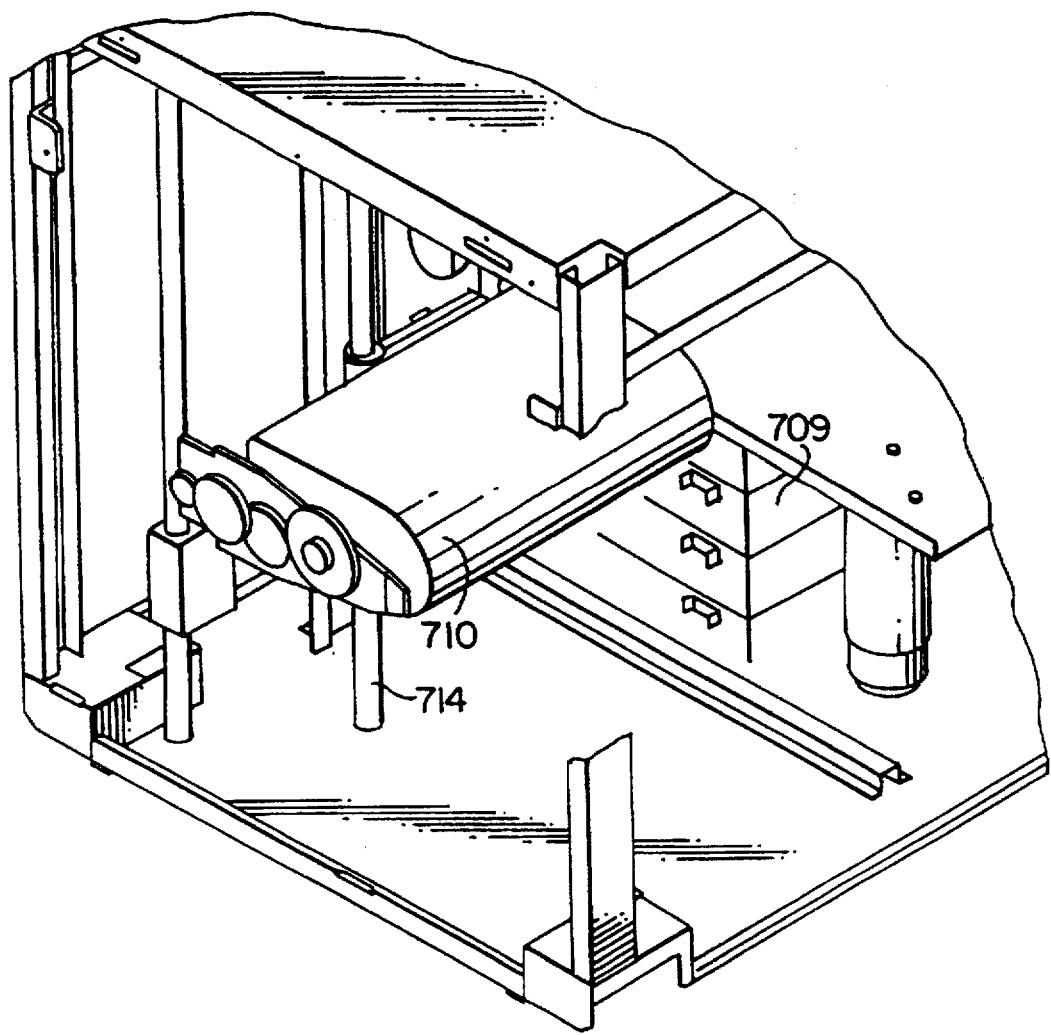
FIG. 67 is a third view showing a portion of the configuration of the optical disk library shown in FIG. 66.

FIGS. 65, 66 and 67 show the overall configuration of one embodiment of the optical disk library. The CAS 707, cell drum 720, accessor 710, optical disk drives 709, guide shaft 714, and balance weight 724 are incorporated in the housing of the optical disk library. The DEE door 721 and cartridge port 703 are formed on the front surface of the housing. The operator panel 719 having the LCD panel and operation buttons 722 is formed on the top of the housing.

The optical disk drive 709 records or reproduces data in or from an optical disk cartridge. The cell drum 720 has numerous cells for stowing optical disk cartridges, and can be rotated to a predetermined position when driven by a cell drum motor. Each of the cells stows one optical disk cartridge.

The CAS 707 receives an optical disk cartridge inserted by an operator through the cartridge port 703, carries it, and hands it to the accessor 710, or receives a used optical disk cartridge from the accessor 710, carries it to the predetermined position, and ejects it to the outside through the cartridge port 703. The accessor 710 is raised or lowered along the guide shafts 714 by driving a motor in an accessor driving mechanism. The accessor 710 accesses the CAS 707, cell drum 720, or optical disk drives 709 and carries an optical disk cartridge. The balance weight 724 is linked with the accessor 710 by way of a rope or the like and moved (raised or lowered) along the guide shafts 714 in a direction opposite to a direction in which the accessor 710 is moved. The balance weight 724 contributes to smooth raising or lowering of the accessor 710.

The cartridge port 703 is used to insert an optical disk cartridge from the outside or eject a used optical disk cartridge to the outside. Optical disk cartridges can be inserted or ejected one by one through the cartridge port 703.

The DEE door 721 is formed on the front surface of the housing and has one edge thereof rotatably fixed to (for example, hinged on) the housing so that the other edge can be swung open.

When the DEE door 721 is opened, the cell drum 720 is visible through the opening 785. Optical disk cartridges can be inserted or removed directly in or from the cell drum 720 through the opening 725.

The DEE door 721 is dedicated to DEE processing involving optical disk cartridges. Optical disk cartridges can be mounted or demounted simultaneously and directly in or from the cell drum 720 without using the CAS 707.

The operator panel 719 is used by an operator, and includes the LCD panel 705 and operation buttons 722. The LCD panel 705 displays various states of the library (for example, a power-on state, an online state, and a busy state) or gives an alarm. The operation buttons 722 (switch buttons and key buttons) are pressed by an operator.

FIGS. 68A and 68B are explanatory diagrams showing an optical disk cartridge. FIG. 68A shows an optical disk cartridge with the shutter closed. FIG. 68B shows the optical disk cartridge with the shutter open.

The optical disk cartridge 730 consists of the disk medium 734 and the cartridge case 732 containing the disk medium 734. The cartridge case 732 has the shutter 731, Write Protect tab 733, identifier 735, and recesses 736. The shutter 731 can slide over the cartridge case 732 and is normally closed in order to confine the disk medium 734 in the cartridge case 732. When the shutter is opened by means of a driving mechanism, the disk medium 734 is exposed to the outside so that data can be read or written by means of a head.

Figure 69:
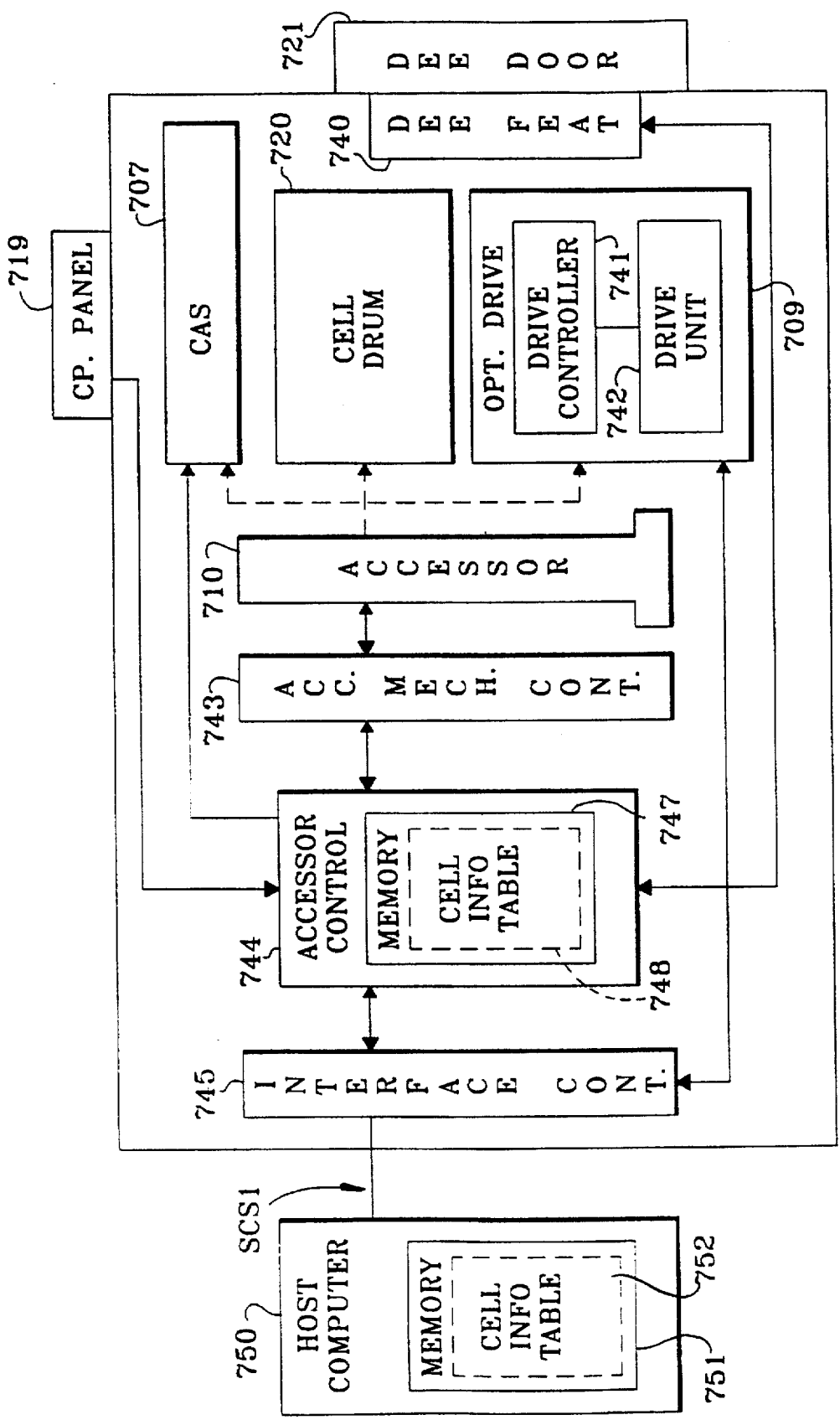
FIG. 69 is a block diagram showing a control system for aspects of the present invention.

FIG. 69 is a block diagram of this embodiment of the optical disk library. Referring to FIG. 69, the control system in the optical disk library will be described.

The optical disk library includes the CAS 707, optical disk drives 709, accessor 710, cell drum 720, DEE feature 740, DEE door 721, and operator panel 719. For controlling these components, the control system includes the interface control unit 745, accessor control unit 744, and accessor mechanical controller 743.

The optical disk drive 709 includes the drive controller 741 and drive unit 742. The drive controller 741 controls the drive unit 742. The accessor control unit 744 includes a microprocessor and the memory 747. The cell information table 748 is set in the memory 747.

For operating the optical disk library, the optical disk library is linked to the host computer (or host computers) 750 by way of a SCSI cable. The host computer 750 has memory 751 in which the cell information table 752 is set to be used for the management of cell information by the host computer. These components will be described below.

The DEE feature 740 is dedicated to DEE processing, and performs DEE under the control of the accessor control unit 744. The DEE feature includes, for example, a DEE door locking mechanism and a cell drum locking mechanism and is responsible for various movements to be made to mount or demount optical disk cartridges through the DEE door 721.

The interface control unit 745 is linked to the host computer 750 by way of the SCSI cable and controls interfaces with the host computer 750. The accessor control unit 744 receives a command issued by the host computer 750 via the interface control unit 745, and controls the accessor 710, operator panel 719, and DEE feature 740.

The accessor control unit 744 has the memory 747 and manages the cell information table 748 set in the memory 747. Assuming that DEE processing is carried out, the accessor control unit 744 controls the DEE door 721 and DEE feature 740 so that optical disk cartridges can be mounted or demounted. After DEE processing is completed, the accessor control unit 744 performs cell checking and cell information updating (of which details will be described later).

The accessor mechanical controller 743 controls the accessor 710 and the mechanicals such as a cell motor for rotating the cell drum 720 according to an instruction given by the accessor control unit 744.

10. DEE Processing

Figure 70:
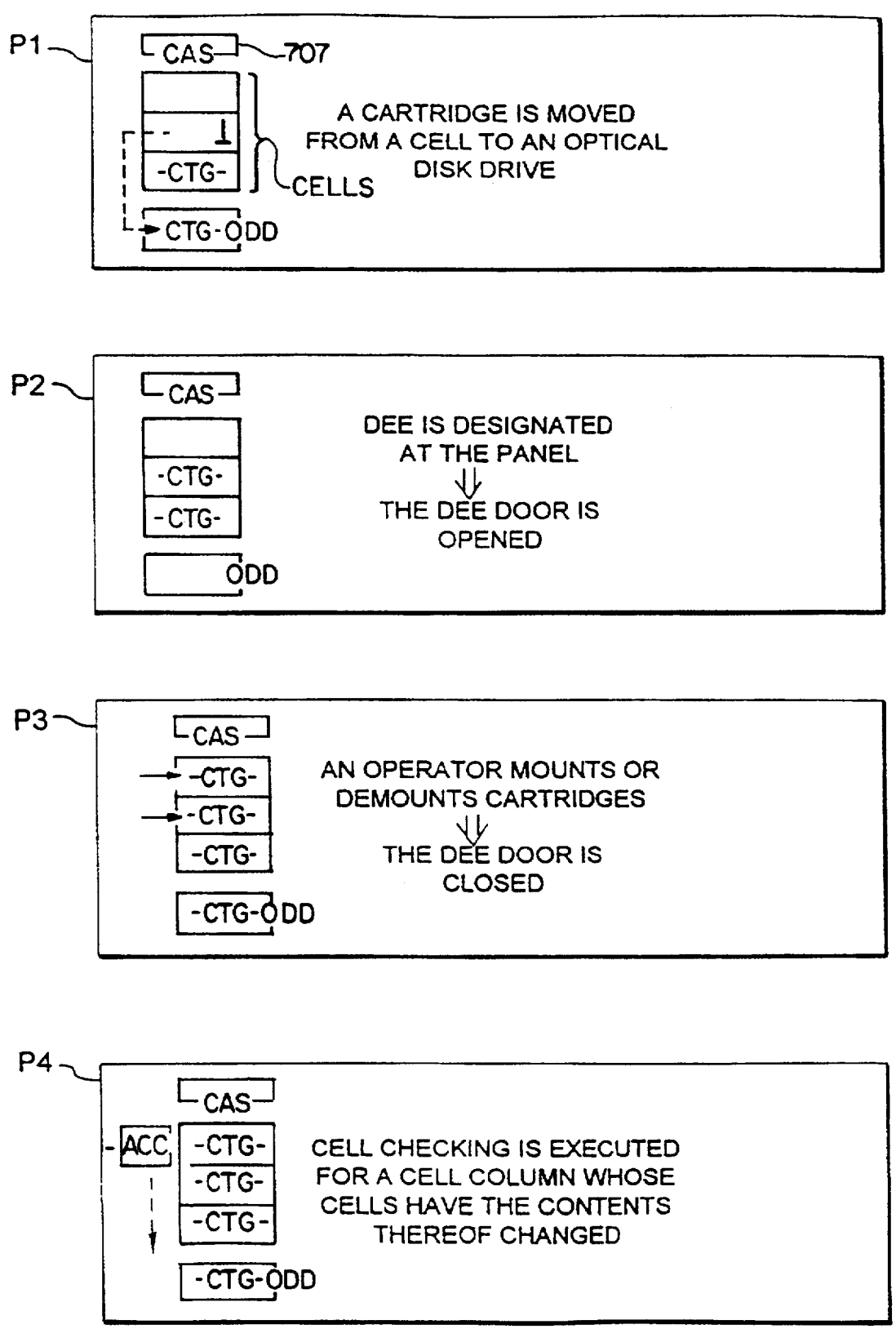
FIG. 70 is a first explanatory diagram concerning direct entry/exit (DEE) processing in accordance with the invention.

FIGS. 70 and 71 are explanatory diagrams concerning DEE processing, in which P1 to P8 indicate processing steps. CTG denotes an optical disk cartridge (which may hereinafter be referred to as a cartridge), and ODD denotes an optical disk drive.

In normal operation, an optical disk cartridge is demounted from a certain cell (for example, cell 1) in the cell drum 720, and then inserted (carried) to the optical disk drive 709. The process is shown at P1. The optical disk drive 709 records or reproduces data in or from the inserted cartridge.

For starting DEE processing in the above state, an operator designates DEE at the operator panel 719 and selects a cell column in or from which cartridges are mounted or demounted. Entry information, that is, information entered at the operator panel 719, is detected by the accessor control unit 744. The accessor control unit 744 gives an instruction to the accessor mechanical controller 743 according to the entry information, and thus drives the cell motor to rotate the cell drum 720. In this case, the cell drum 720 is rotated until the cell column in the cell drum 720 selected at the operator panel 719 is opposed to the DEE door 721.

Thereafter, the accessor control unit 744 gives an instruction to the DEE feature 740. The DEE feature 740 opens the DEE door 721. At step P2, when the optical disk library receives an SCSI command from the host computer 750 (or, is accessed by the host computer), a message "DEE is in progress" is returned to the host computer 750 having issued the command.

When the DEE door 721 opens as mentioned above, the operator mounts or demounts cartridges directly in or from the cell drum 720 through the opening 725 provided by the DEE door 721. When the simultaneous mounting or demounting of cartridges is completed, the operator closes the DEE door 721 so as to terminate DEE processing. When the operator presses a DEE End key on the operator panel 719, DEE processing is terminated. However, when another cell column is selected, the foregoing procedure is repeated.

For the second DEE processing, after the DEE door 721 is closed at the end of the first DEE, the operator selects another cell column in the cell drum 720 to be subjected to DEE at the operator panel 719. The DEE door 721 is then opened in order to mount or demount cartridges simultaneously. When completing the mounting or demounting work, the operator closes the DEE door 721 and presses the DEE End key on the operator panel 719. By repeating the above procedure, DEE processing is performed on each of the cell columns in the cell drum 720. Thus, simultaneous mounting or demounting of cartridges is achieved.

At step P3, when receiving an SCSI command from the host computer 750, the optical disk library returns the message "DEE is in progress" to the host computer 750 having issued the command.

When the DEE End key on the operator panel 719 is pressed as mentioned above, the accessor mechanical controller 743 drives the accessor 710 according to an instruction sent from the accessor control unit 744 so that cell checking will be performed on the cell column containing the cells whose contents are changed (a cell column subjected to simultaneous mounting or demounting of cartridges during DEE).

As for cell checking, when the cells in a plurality of cell columns have the contents thereof changed, cell checking is executed for each of the cell columns. Information resulting from cell checking is acquired by the accessor control unit 744 and stored in the cell information table 748 set in the memory 747 in order to update existing cell information (information concerning whether cartridges are mounted in cells).

At step P4, the optical disk library having received the SCSI command from the host computer 750 returns the message "DEE is in progress" to the host computer 750 having issued the command.

After cell checking is completed, if another cartridge (mounted during DEE) is present in the cell (for example cell 2) in which the cartridge carried to the optical disk drive 709 has been stowed; that is, the source cell of the cartridge carried to the optical disk drive 709, the other cartridge is ejected to the outside by means of the CAS 707.

Unless the other cartridge is ejected, the cartridge inserted to the optical disk drive 709 cannot be returned to the cell drum 720. Unnecessary cartridges mounted during simultaneous mounting or demounting of cartridges must be ejected to the outside by means of the CAS 707.

When a cartridge is inserted into another optical disk drive 709, if another cartridge is mounted in the cell in which the cartridge has been stowed; that is, the source cell of the cartridge, the other cartridge is also ejected to the outside by means of the CAS 707.

At step P5, when receiving an SCSI command from the host computer 750, the optical disk library returns the message "DEE is in progress" to the host computer having issued the command. The accessor control unit 744 in the optical disk library requests the host computer 750 to issue an Initialize Element Status command. After the command terminates normally, the optical disk library can carry cartridges. The Initialize Element Status command is a command for requesting that the states of all elements be retrieved and the information be placed in memory.

The host computer 750 issues the Initialize Element Status command to the optical disk library. When the optical disk library is linked to a plurality of host computers, none of the host computers is asked to issue the command, although any of the host computers have the ability to issue the command.

In response to the command sent from the host computer 750, the optical disk library initializes cell information concerning cells whose contents are changed during DEE processing (when accessed thereafter, the optical disk library cannot identify cells whose contents are changed during DEE and therefore retains cell information updated during DEE).

Host computers other than the host computer having issued the command are notified of the fact that the optical disk library has updated its cell information.

The host computer 750, having been notified of the fact that cell information has been updated, issues a Read Element Status command to the optical disk library, collects updated cell information, and updates the cell information in the cell information table set in the memory 751 therein.

The optical disk library notifies a host computer gaining access to the optical disk library of the updated cell information. On receipt of the notification, the host computer 750 updates the cell information in the cell information table 752 set in the memory 751 thereof. The Read Element Status command is a command for requesting a host computer to send information concerning the status of elements.

Figure 72B:
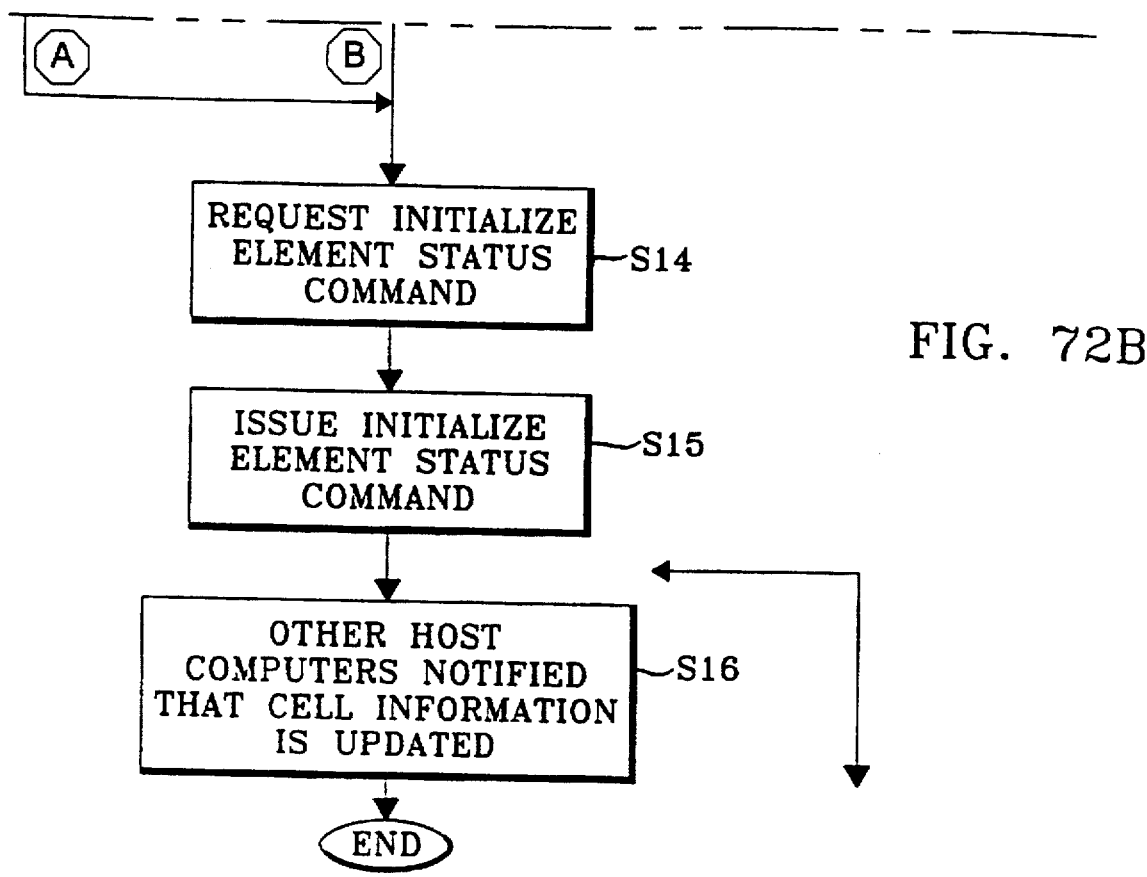
FIG. 72 (A, B) is a flowchart describing DEE processing in accordance with the invention.

FIG. 72 is a flowchart further describing DEE processing. S1 to S16 denote processing steps.

In the normal operation mode, a cartridge is demounted from a first cell in the cell drum 720 and carried to and inserted into the optical disk drive 709 (S1). The optical disk drive 709 records or reproduces data in or from the inserted cartridge.

To start DEE processing in the above state (S2), an operator designates DEE at the operator panel 719 (S3) and selects a cell column in or from which cartridges are mounted or demounted (S4).

Entry information, that is information entered at the operator panel 719, is detected by the accessor control unit 744. The accessor control unit 744 gives an instruction to the accessor mechanical controller 743 according to the entry information and drives the cell motor to rotate the cell drum 720.

The cell drum 720 is rotated until the cell column in the cell drum 720 selected at the operator panel 19 is opposed to the DEE door 721, and then stopped (S5).

The accessor control unit 744 gives an instruction to the DEE feature 740, whereby the DEE feature 740 opens the DEE door 721 (S6). As mentioned above, when the DEE door 721 opens, the operator mounts or demounts cartridges directly on or from the cell drum 720 through the opening 720 provided by the DEE door 721 (S7).

When mounting or demounting is completed, the operator closes the DEE door 721 (S8) and thus completes the DEE work. When the DEE End key on the operator panel 719 is pressed, DEE processing is terminated (S9). However, if another cell column is selected, the procedure starting at step S4 is repeated.

By repeating the above procedure, DEE processing is carried out for the respective cell columns in the cell drum 720. Thus, direct mounting or demounting of multiple cartridges is achieved.

Cell checking is performed as previously described. After cell checking is completed, if a second cartridge (mounted during DEE) is present in the source cell of the cartridge carried to the optical disk drive 709 (S11), the second cartridge is ejected to the outside by means of the CAS 707 (S12).

In this case, unless the second cartridge is ejected, the cartridge inserted to the optical disk drive 709 cannot be returned to the cell drum 720. Unnecessary or unwanted cartridges mounted during simultaneous mounting or demounting of cartridges must be ejected to the outside by means of the CAS 707.

If one cartridge is inserted to another optical disk drive 709, and another cartridge is mounted in the source cell of the cartridge, the other cartridge is also ejected to the outside by means of the CAS 707.

The accessor control unit 744 determines whether other cartridges are in the cells allotted to the cartridges currently in all optical disk drives (S13). As long as another cartridge is present, cartridge ejecting is repeated, During the procedure from step S3 to S13, when the optical disk library receives an SCSI command from the host computer 750, the accessor control unit 744 returns the message "DEE is in progress" to the host computer having issued the command.

The accessor control unit 744 in the optical disk library requests the host computer 750 to issue an Initialize Element Status command (S14). In response to the request, the host computer 750 issues the Initialize Element Status command to the optical disk library (S15).

In response to the command sent from the host computer 750, the optical disk library initializes cell information concerning cells whose contents are changed during DEE (when accessed afterward, the optical disk library cannot identify cells whose contents are changed during DEE and therefore retains cell information updated during DEE).

The optical disk library notifies the host computers other than the one having issued the command of the fact that cell information has been updated. In response to the command sent from the host computer, the optical disk library initializes cell information concerning cells whose contents are changed during DEE (when accessed afterward, the optical disk library cannot identify the cells whose contents are changed during DEE and therefore retains cell information updated during DEE).

The optical disk library notifies host computers other than the one having issued the command of the fact that cell information has been updated (S16).

During DEE processing, cartridges can be carried to cells located behind the cells (or opposed to the accessor) selected for DEE. Reading or writing can be executed in a drive even during DEE. When reading or writing is completed, if a cell allotted to a read or written cartridge is opposed to the accessor, the cartridge can be returned to the cell immediately.

Figure 73A:
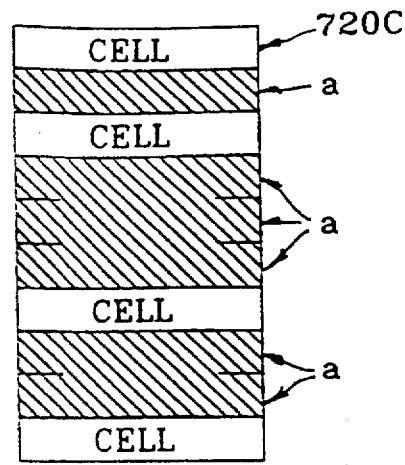
FIGS. 73(A), 73(B) and 73(C) are first explanatory diagrams concerning the sorting of cartridges in accordance with the invention.
Figure 73B:
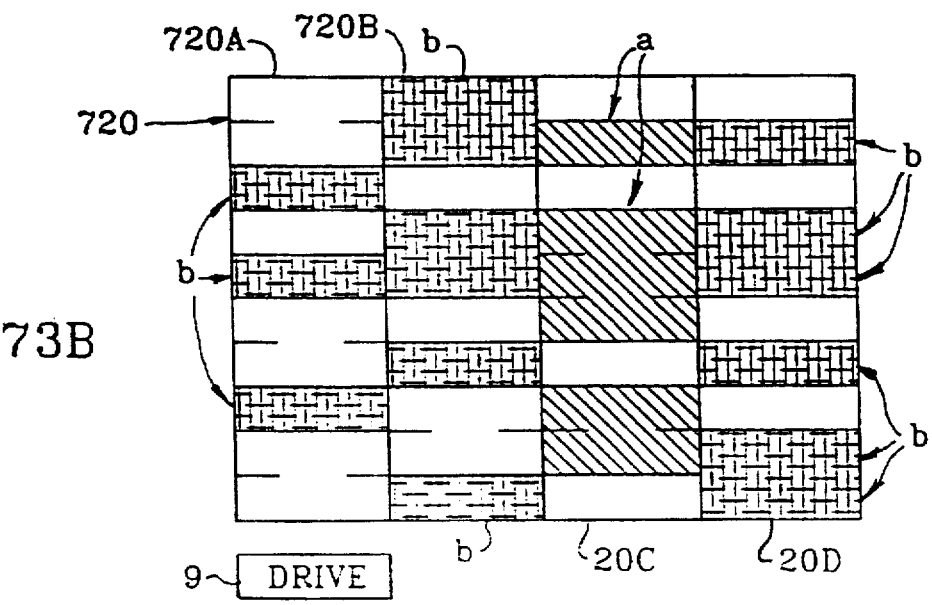
Figure 73C:
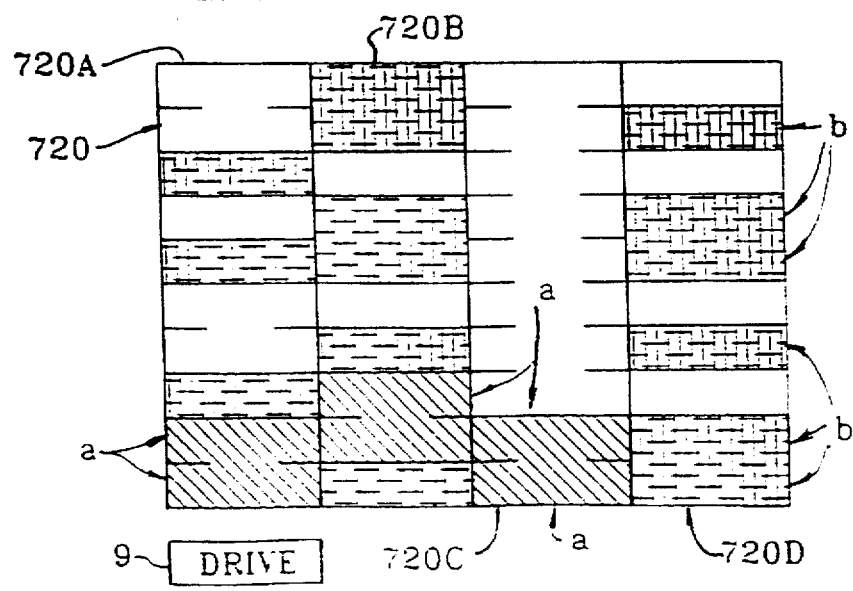
Figure 74:
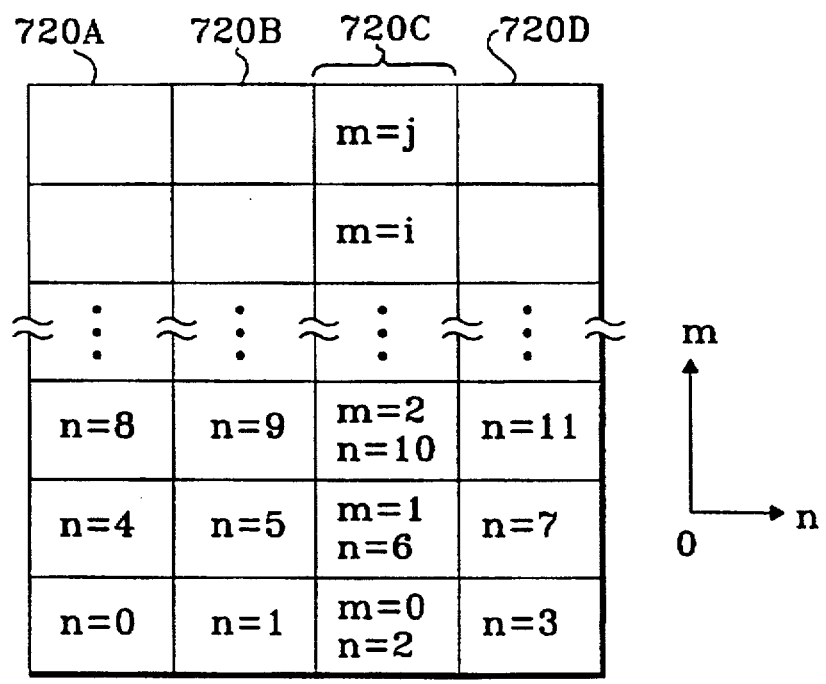
FIG. 74 is a second explanatory diagram concerning the sorting of cartridges in accordance with the invention.
Figure 75:
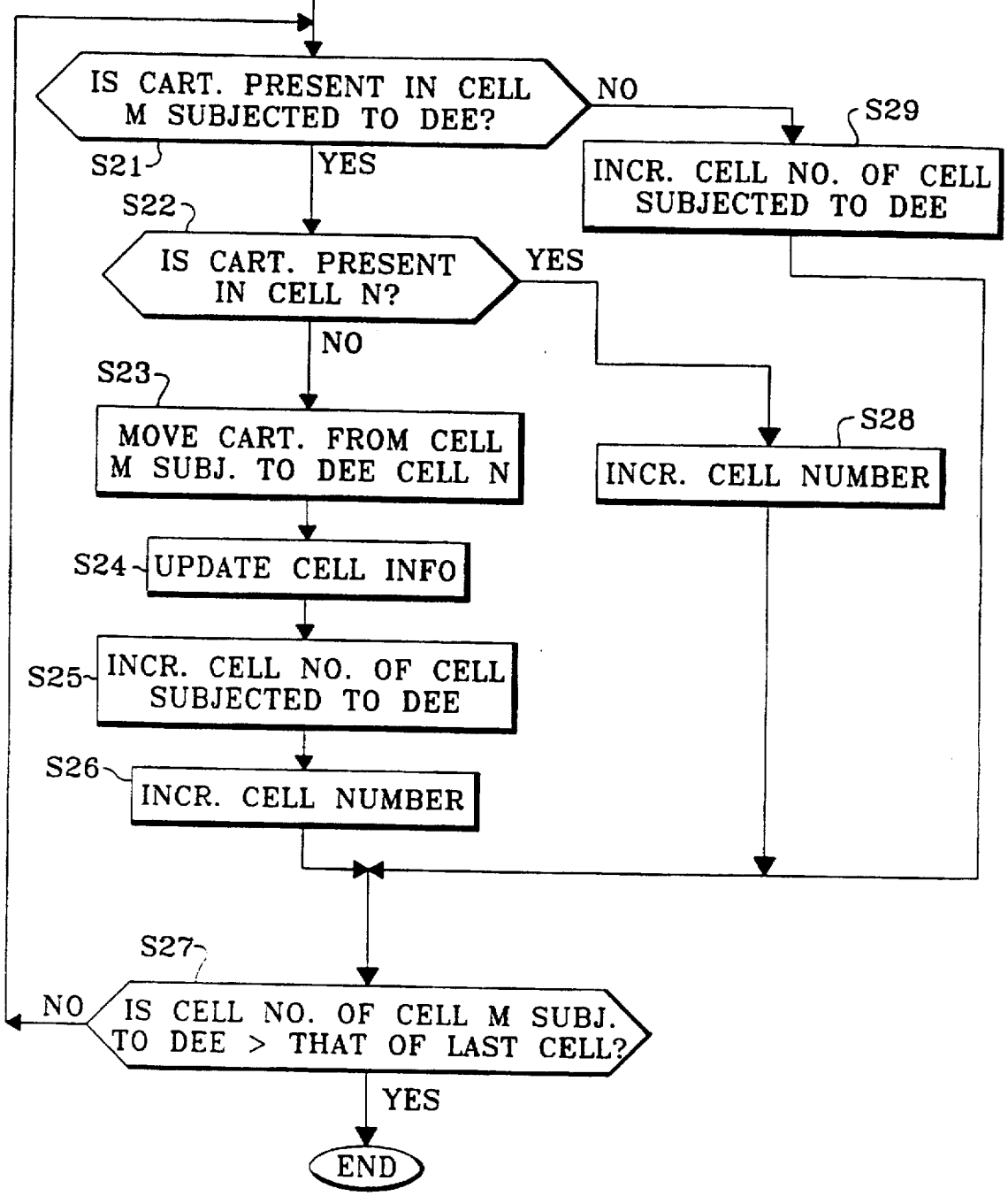
FIG. 75 is a flowchart describing sorting of cartridges in accordance with the invention.

FIGS. 73A to 73C are explanatory diagrams concerning the sorting of cartridges. FIG. 73A shows cartridges stowed in a cell column 720(C), which is to be subjected to DEE processing. FIG. 73B shows cartridges stowed in all the cells in cell columns 720(A), 720(B), 720(C) and 720(D) of the cell drum 720. FIG. 73C shows the cell drum 720 in which cartridges have been sorted. FIG. 74 shows a cell arrangement used to understand the sorting of cartridges. FIG. 75 is a flowchart describing the sorting of cartridges.

Sorting of cartridges will be described in conjunction with FIGS. 73, 74 and 75. In FIGS. 73A to 73C, "a" denotes a cartridge stowed in a cell during DEE processing, and "b" denotes a cartridge that has already been stowed in a cell when DEE is started.

During DEE processing, the DEE door 721 is opened to mount or demount cartridges simultaneously and directly in or from the cell drum 720. In this case, when cartridges are mounted in arbitrary cells of a cell column in the cell drum 720, the cartridges cannot be used efficiently during normal operation.

Assuming that a cartridge is demounted from a certain cell and carried to the optical disk drive 709, it takes an unnecessary amount of time to carry a cartridge which is present in a cell located away from the optical disk drive 709, to the optical disk drive 709. Cartridges are mounted in the cell drum 720 at random during DEE processing. For using cartridges mounted during DEE, they cannot be used efficiently. For efficient use, the cartridges are sorted.

Assuming that cartridges are mounted in arbitrary cells in a cell column, by executing DEE processing as shown in FIG. 73A, cartridges are stowed randomly in the cells, as shown in FIG. 73B.

When the cartridges are sorted, they are arranged as shown in FIG. 73C. After sorting, the cartridges stowed during DEE are arranged so that the first cartridge is located closest to the optical disk drive 709.

As shown in FIGS. 65 and 69, the optical disk library has the cell drum 720. The cell drum 720 contains the plurality of cell columns 720(A) to 720(D) (FIG. 73) (arrays of cells lined vertically). For example, four cell columns are installed. Each cell column is composed of numerous cells. Each of the cells in each cell column stows one cartridge.

Cell information indicating whether a cartridge 730 (FIG. 65) is stowed in a cell is stored in the cell information table 748 in the memory 747 set in the accessor control unit 744. When cartridges are newly mounted or demounted by executing DEE processing, the cell information in the cell information table 748 is updated. Cell information concerning all cells can be acquired from the cell information table 748.

Information concerning cartridges mounted or demounted during DEE is stored in the memory 747 in the accessor control unit 744. Even after the cell information in the cell information table 748 is updated, the information concerning the cartridges can be retrieved. The accessor control unit 744 sorts the cartridges newly mounted or demounted during DEE so as to facilitate efficiency in subsequent processing.

An example of sorting cartridges will be described more particularly. The sorting is executed by the accessor control unit 744.

When four cell columns are installed, cells are arranged as shown in FIG. 74. Cells in a cell column subjected to DEE processing are numbered m=0, m=1, m=2, etc., m=i, and m=j in the order starting with the lowest cell. All cells are numbered n=0, n=1, n=2, n=3, n=4, and etc., in the order starting with the cell closest to the optical disk drive.

Cells m are source cells and cells n are destination cells. During sorting, it is determined whether cartridges are stowed in cells in the cell column subjected to DEE in ascending order of the m values.

As a result, if cartridges are stowed, it is determined whether another cartridge is stowed in the destination cell n of a cartridge. If another cartridge is not present, the cartridge is moved to the destination cell n.

Referring to the flowchart of FIG. 75, sorting of cartridges will be described. S21 to S27 denote processing steps. An m or n value corresponds to the cell number listed in FIG. 74.

The accessor control unit 744 sorts cartridges mounted or demounted during DEE processing according to the cell information in the memory 747 as described below.

It is determined whether a cartridge (medium) is present in a cell m (initially, m=0) in a cell column subjected to DEE (S21). As a result, if no cartridge is present in the cell m, the cell number m is incremented by one (m=m+1) (S29). If a cartridge is present in the cell m, it is determined whether a cartridge (medium) is present in a destination cell n (initially, n=0) (S22).

As a result, if a cartridge is present in the cell n, the cell number n is incremented (n=n+1) (S28). If no cartridge is present, the cartridge in the cell m is moved to the cell n (S23). The accessor control unit 744 then updates the cell information table 748 stored in the memory 747 with respect to cell information concerning the cell whose cartridge is moved (S24).

The accessor control unit 744 then increments the cell number m (m=m+1) (S25) and the cell number n (n=n+1) (S26) respectively. When the above sequence is executed for the last cell in the cell column subjected to DEE processing (S27), sorting of cartridges is terminated.

Figure 76:
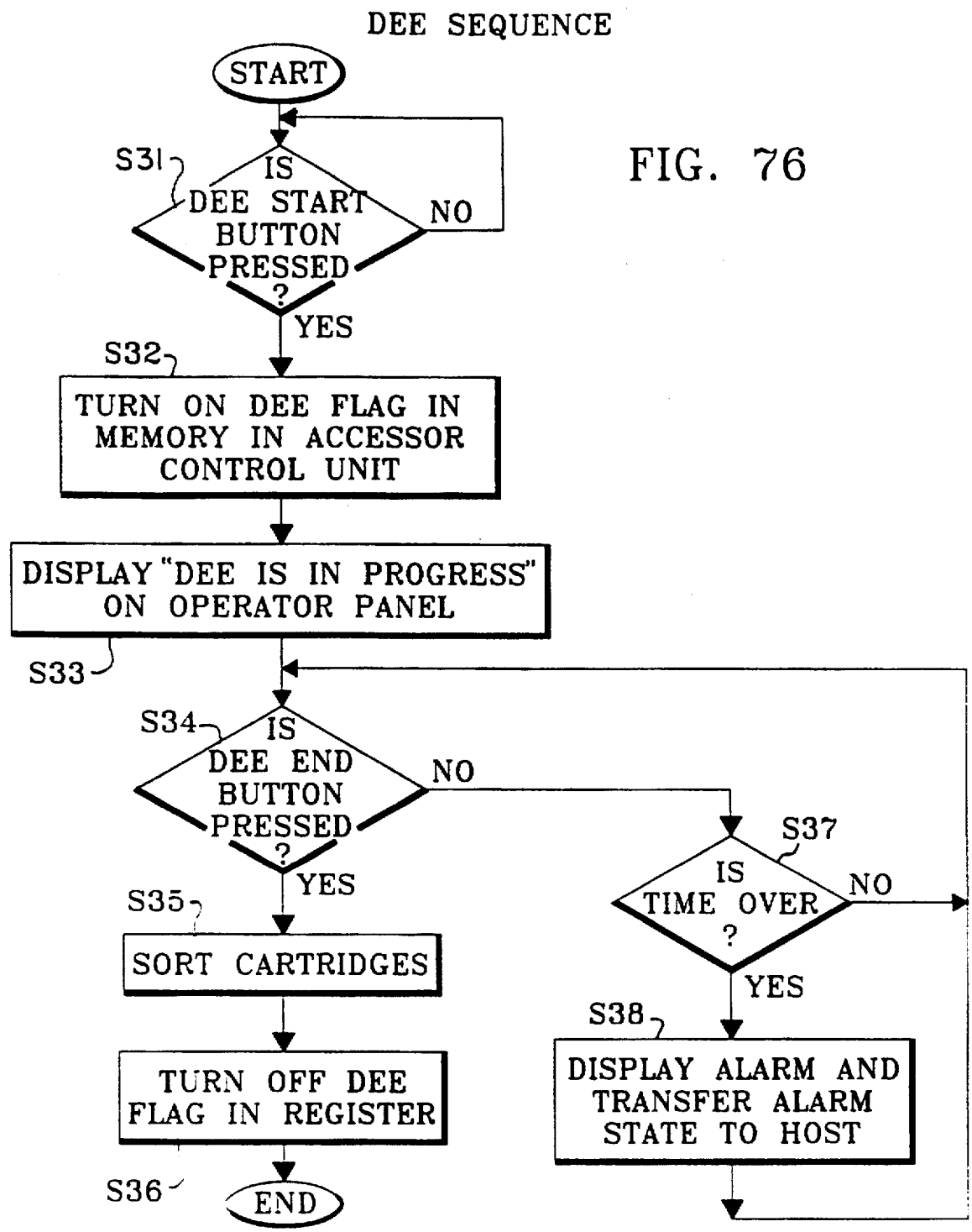
FIG. 76 is a flowchart describing a sequence proceeding during DEE processing in accordance with the invention.

FIG. 76 is a flowchart describing a sequence carried out during DEE work. Referring to FIG. 76, the sequence carried out in the library during DEE work or work performed by an operator will be described. S31 to S38 denote processing steps.

A microprocessor incorporated in the accessor control unit 744 monitors whether any operation button on the operator panel 719 is pressed (S31). When it is detected that a DEE Start button is pressed, a DEE flag in a register reserved in the memory 747 in the accessor control unit 744 is turned on (S32).

Under the control of the accessor control unit 744, a message "DEE is in progress" is displayed on the operator panel 719 (S33). The operator opens the DEE door 721 to mount or demount cartridges. The operator then closes the DEE door 721 and presses a DEE End button on the operator panel 719 (S34).

When the microprocessor in the accessor control unit 744 detects the above state, it starts sorting the cartridges (S35). When cartridge sorting is completed, the microprocessor turns off the DEE flag in the register (S36).

When it is found at step S34 that the DEE End button is not pressed, the microprocessor starts counting down to detect the passage of given time after the DEE Start button is pressed (S37). If DEE processing is not started despite the passage of the given time, an alarm is displayed on the operator panel 719 and the alarm state is transferred to the host computer 750 (S38).

Figure 77:
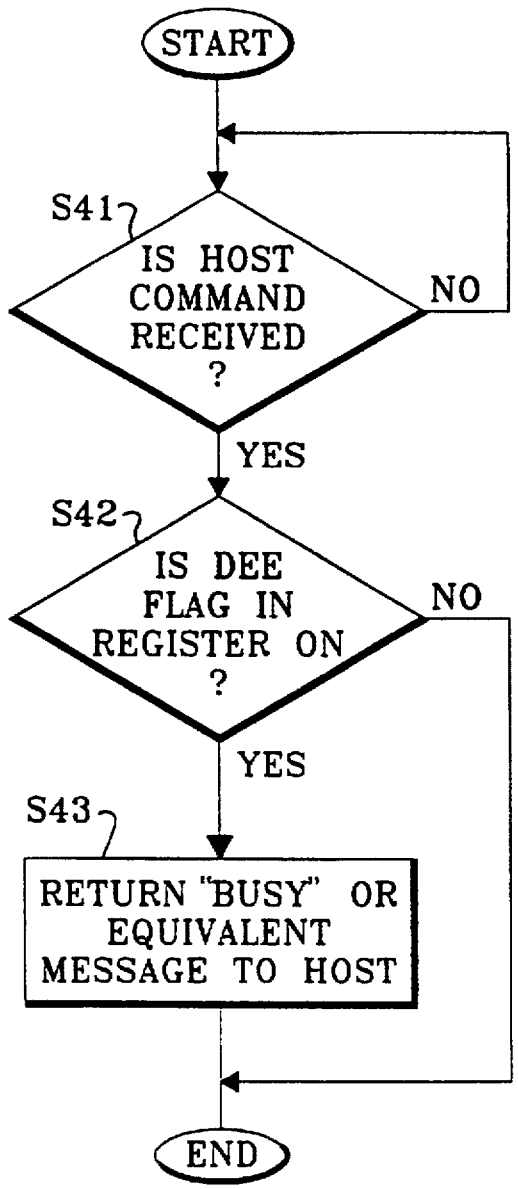
FIG. 77 is a flowchart describing interfaces with a host computer provided during DEE processing in accordance with the invention.

FIG. 77 is a flowchart describing interfaces with a host computer during DEE work. Referring to FIG. 77, the interfaces with a host computer during DEE work performed by an operator will be described. S41 to S43 denote processing steps.

When executing DEE processing, the microprocessor in the accessor control unit 744 acts on the host computer 750 as described below. The interface control unit 745 monitors whether a host command (a Cartridge Read, Write, or Move command) is received from the host computer 750 (S41).

When a host command is received, it is determined whether the DEE flag in the register reserved in the memory 747 in the accessor control unit 744 is on (S42).

When the DEE flag is on, it means that an operator is engaged in DEE work. A "busy state" response is returned to the host computer 750. The response may be replaced by the message "DEE is in progress" (S43). When it is found at step S42 that the DEE flag is off, the host command received is executed.

The number of cell columns in a cell drum is four in the aforesaid embodiment. Alternatively, the present invention can apply to a cell drum having any number of cell columns.

11. Cell drum/DEE door interlocks and skew prevention

Figure 78A:
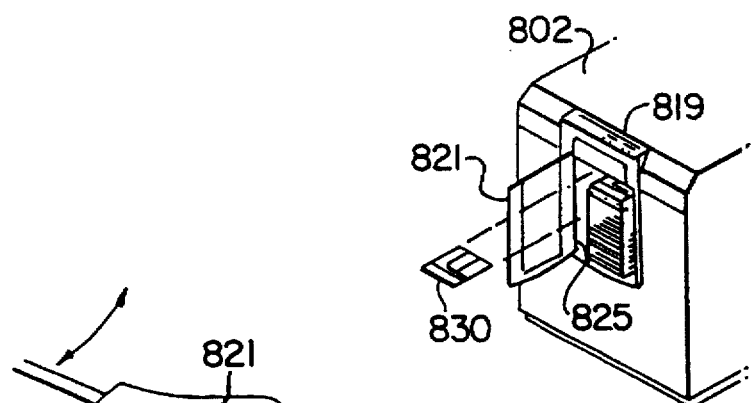
FIGS. 78(A), 78(B) and 78(C) are explanatory diagrams showing door and cell drum lock and unlock features of the present invention.
Figure 78B:
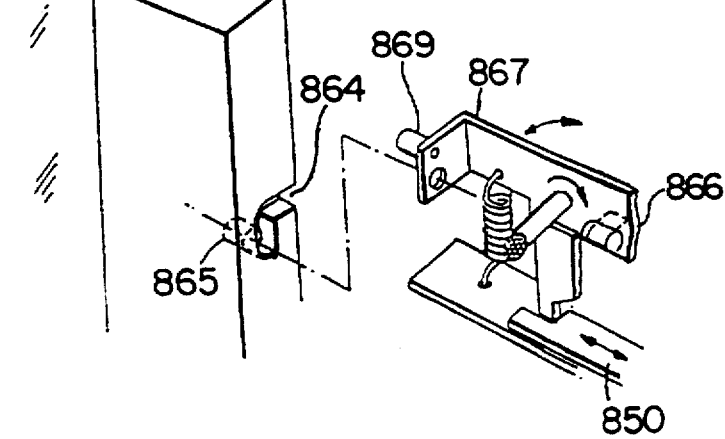
Figure 78C:
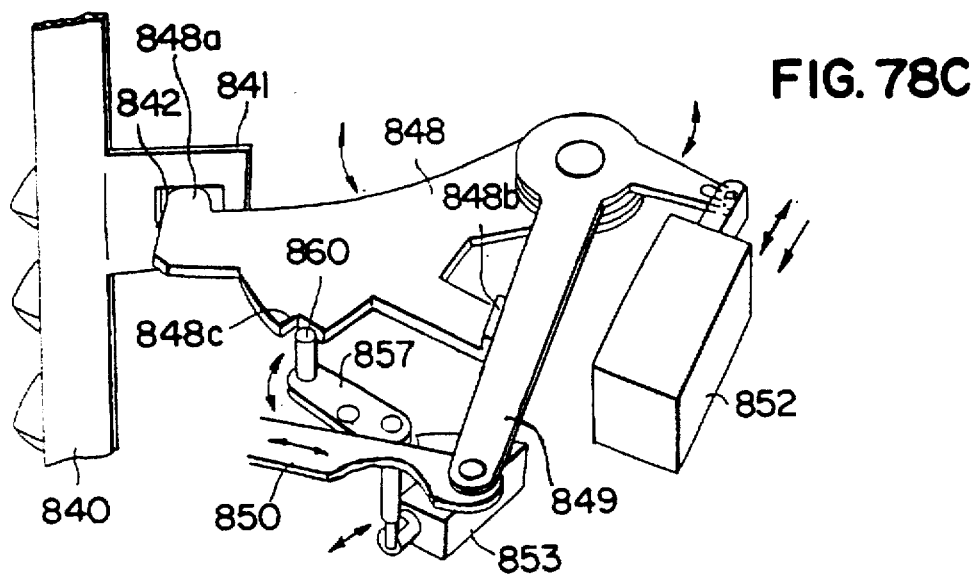

FIGS. 78(A), 78(B) and 78(C) are explanatory diagrams concerning additional principles of the present invention. In FIG. 78, reference numeral 802 denotes a housing, 821 denotes a direct entry/exit (DEE) door, 840 denotes a second plate, and 841 denotes a projection. Reference numeral 842 denotes a locking hole, 848 denotes a lock strip, 848a denotes a locking jut, 848b denotes an L-shaped section, 848c denotes a notch. Reference numeral 849 is denotes a lever, 850 denotes a link, 852 and 853 denote solenoids, 857 denotes a latch actuator, 860 denotes a latch bar, 864 denotes a locking recess, 865 denotes a light emitter of a photosensor, 866 denotes a light receiver for the photosensor, 867 denotes a DEE door locking member, and 869 denotes a lock bar.

The DEE door 821 has a shape corresponding generally to each cell column in a cell drum 820, and has a size permitting simultaneous mounting or demounting of cartridges. In the cell drum 820, a locking member (the second plate 840 having the projection 841) having the locking hole 842 into which part of the cell drum locking mechanism is fitted to lock the rotation of the cell drum 820 is installed in each cell column. The cell drum locking mechanism includes the solenoid 852 for synchronizing locking of the rotation of a cell drum 820 with unlocking of the DEE door locking mechanism.

The DEE door 821 has the light emitter 865 and the DEE door locking mechanism has the light receiver 866. The locked or unlocked state of the DEE door 821 is therefore detectable. The cell drum locking mechanism has the solenoid 853 that when the DEE door 821 is closed, unlocks the cell drum locking mechanism in response to a detection signal sent from the photosensor.

Using the DEE door 821 and DEE feature, cartridges are mounted or demounted simultaneously as described below. First, an operator uses the operator panel to open the DEE door 821. The accessor control unit gives a DEE Door Open instruction to the DEE feature. In response to the instruction, the DEE feature drives the solenoid 852.

When the solenoid 852 operates, first, the cell drum locking mechanism is locked to lock the rotation of the cell drum 820. The DEE door locking mechanism is then unlocked, whereby the DEE door 821 opens.

When the DEE door 821 opens, light emanating from the light emitter 865 does not enter the light receiver 866. The accessor control unit detects this state and recognizes that the DEE door 821 is open.

The operator then mounts or demounts cartridges simultaneously in or from the cell drum 820 through the opening 825 provided by the DEE door 821. When this work is completed, the operator closes the DEE door 821 manually. The DEE door 821 is thus closed, and the DEE door locking mechanism is automatically locked.

When the DEE door 821 is closed completely, the light emanating from the light emitter 865 enters the light receiver 866. The accessor control unit detects this state and recognizes that the DEE door 821 is closed. At this time, the accessor control unit gives an instruction to the DEE feature so that the cell drum locking mechanism will be unlocked.

In response to the instruction, the DEE feature drives the solenoid 853 to unlatch the locking strip 848 and to unlock the cell drum locking mechanism. In this state, the cell drum 820 is rotatable and normal operation is enabled.

When the DEE door 821 is opened as mentioned above, the cell drum 820 is locked and disabled from rotating. This means that safety is guaranteed during simultaneous mounting or demounting of cartridges.

When the DEE door 821 is closed, the solenoids 852 and 853 are not energized. At this time, the lock strip 848 is freed from the latch bar 860. The locking jut 848a is removed from the locking hole 842. In other words, the cell drum 820 is unlocked.

When the DEE door 821 is opened, the solenoid 752 is driven. This causes the lever 849 to move. The L-shaped section 848b of the lock strip 848 is pressed, whereby the lock strip 848 moves. With the movement of the lock strip 848, the locking jut 848a of the lock strip 848 is fitted into the locking hole 842. The cell drum locking mechanism is locked.

With the movement of the lock strip 848, the latch bar 860 engages with the notch 848c so as to latch the locked state of the cell drum locking mechanism. Thereafter, the DEE door locking mechanism is unlocked. The DEE door 821 then opens, enabling simultaneous mounting or demounting of cartridges.

When the cell drum 820 is locked, if the operator or the like closes the DEE door 821, the accessor control unit drives the solenoid 853. This causes the latch actuator 857 that is driven by the solenoid 853 to move. The latch bar 860 is therefore freed from the notch 848c. The locked state of the cell drum locking mechanism is unlatched.

At this time, the lock strip 848 moves. The locking jut 848a is removed from the locking hole 842. The cell drum 820 is therefore unlocked. In this state, normal operation is enabled.

When the DEE door 821 is closed, the DEE door locking mechanism is locked. The solenoids 852 and 853 are not driven. At this time, the lock bar 869 is inserted to a given position of the locking recess 864. Light emanating from the light emitter 865 of the photosensor enters the light receiver 866 of the photosensor. The accessor control unit recognizes that the DEE door 821 is locked.

When the operator uses the operator panel to open the DEE door 821, the solenoid 852 is driven to move the link 850. This cause the DEE door locking member 867 to move. The lock bar 869 comes off from the locking recess 864. As a result, the DEE door 821 is unlocked and opened.

As mentioned above, when the DEE door locking mechanism is unlocked, light emanating from the light emitter 865 of the photosensor does not enter the light receiver 866 of the photosensor. This state is recognized by the accessor control unit. When the DEE door locking mechanism is locked, the cell drum locking mechanism is unlocked. Normal operation is enabled.

When cartridges are inserted into cells in a cell drum 820, if, for example, a cartridge is inserted askew over two vertically adjoining cells, the tip of the cartridge hits the skew mounting preventing member. The cartridge cannot therefore be inserted to a given position.

When a cartridge is inserted inversely, both edges of the cartridge hit an inverse mounting preventing mechanism.

The cartridge cannot therefore be inserted to a right position.

When a cartridge is inserted normally, the tip of the cartridge is positioned at the deep end of a cell. In this state, the cartridge is retained a t the right (normal) position.

These aspects of the invention will be described din more detail in conjunction with FIGS. 78 to 83.

Reference numerals 838 (FIG. 75A), 845 (FIG. 80), 846, 858, and 868 (FIG. 81) denote axes of rotation, and 839 (FIG. 79) denotes a first plate.

Reference numerals 855 (FIG. 80) and 856 denote springs, 870 (FIG. 81) denotes a hole, 871 and 874 denote notches, 872 denotes a spring, 873 denotes a fixing member, 876 (FIG. 82) denotes a blade spring, 877 denotes a projection, 878 denotes a plate, 879 denotes a skew mounting preventing member, and 880 (FIG. 83) denotes a cartridge butting member.

When the DEE door 821 is opened, the cell drum 820 becomes visible through the opening. Through the opening 825, optical disk cartridges can be mounted or demounted directly in or from the cell drum 820.

The DEE door 821 is designed to allow work on optical disk cartridges during DEE processing. Optical disk cartridges can be mounted or demounted simultaneously and directly in or from the cell drum 820 without using the cartridge access station.

Figure 79:
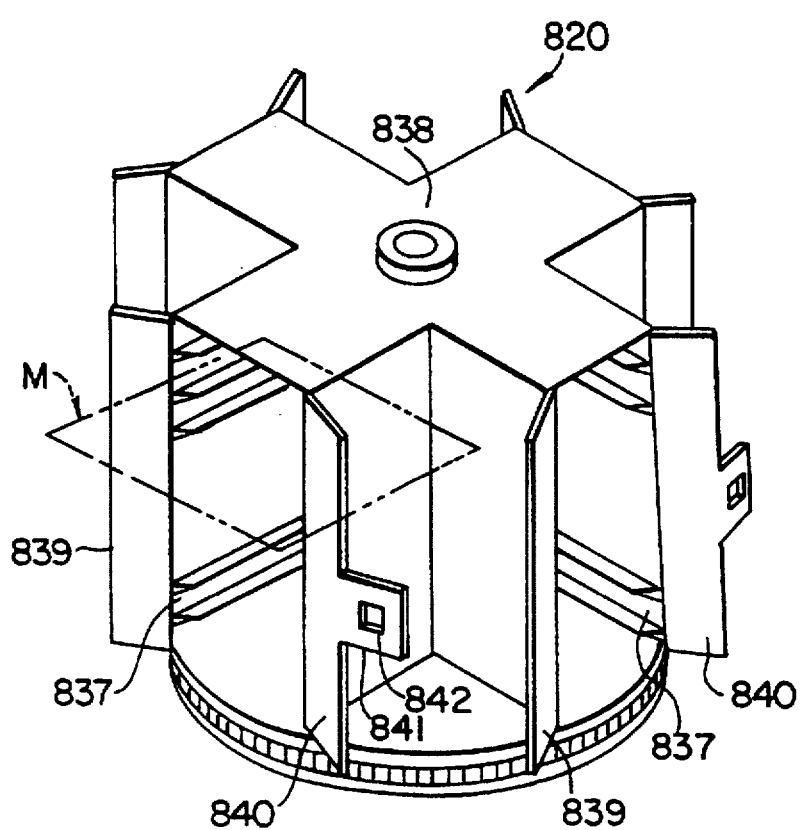
FIG. 79 shows a cell drum used with the features of FIGS. 78(A), 78(B) and 78(C).
Figure 80:
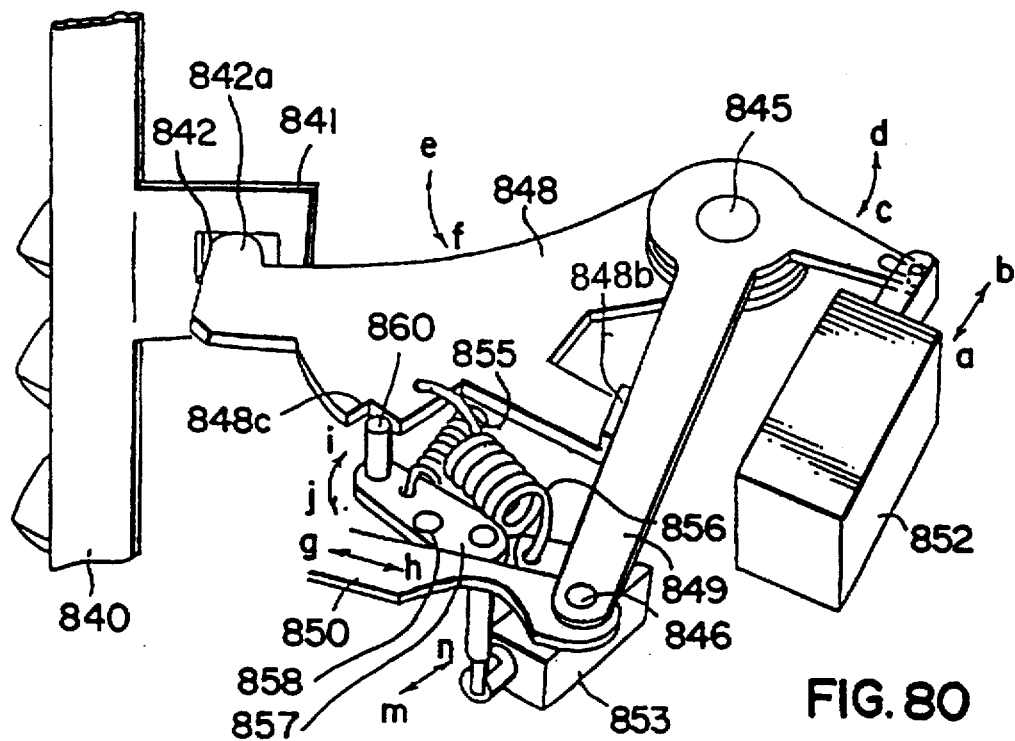
FIG. 80 is an explanatory diagram showing a cell drum locking mechanism in accordance with the invention.

FIG. 79 shows the structure of the cell drum. FIG. 80 is an explanatory diagram showing the cell drum locking mechanism.

As described previously, the optical disk library of this embodiment has the DEE door 821 formed on the front surface of the housing 802 so that optical disk cartridges can be mounted or demounted simultaneously. An operator or machine can mount optical disk cartridges externally and directly in the cell drum 820 or demount used optical disk cartridges.

For simultaneously mounting or demounting of optical disk cartridges, safety must be guaranteed with the DEE door 821 open. When the DEE door 821 is open, the cell drum 820 must be locked so that it does not rotate.

A cell drum locking mechanism is therefore installed so that when the DEE door 821 is opened, the rotation of the cell drum 820 can be locked automatically. Moreover, the DEE door 821 is provided with a DEE door locking mechanism. The cell drum locking mechanism and DEE door locking mechanism are interlocked with each other.

For opening the DEE door 821, first, an operator uses the operator panel 819 to open the DEE door 821. An internal control unit (accessor control unit) then transmits a signal so as to lock the cell drum locking mechanism. Thus, the cell drum 820 is disabled from rotating.

Thereafter, the DEE door locking mechanism is unlocked. Thus, safety is guaranteed for simultaneously mounting or demounting optical disk cartridges.

The cell drum locking mechanism and DEE door locking mechanism constitute the DEE feature.

The cell drum 820 (FIG. 79) is shaped like a drum and rotated with the axis 838 as a rotation center by means of a driving motor. The cell drum 820 has numerous cells 837. The cells 837 are lined in columns, thus forming cell columns.

The number of cell columns in FIG. 79 is four. A non-cell section is interposed between cell columns. When the cell drum 820 is viewed from above, the cell columns are seen arranged in the form of a cross. The non-cell sections correspond to the spaces in the cell drum defined with the cross structure.

The first plate 839 and the second plate 840 are attached to both edges of each cell column in the cell drum 820 so that the plates can open obliquely outward. In other words, the entrance of each cell column is covered with the first plate 839 and the second plate 840 that can open obliquely outward. Part of the second plate 840 is formed as the projection 841 having the locking hole 842.

The cell drum locking mechanism is, as shown in FIG. 80, composed of the lock strip 848, lever 849, link 850, latch actuator 857, springs 855 and 856, and solenoids 852 and 853. These components will be described below.

The lock strip 848 can turn in directions of arrows e and f with the axis 845 fixed to the library as a rotation center. The locking jut 848a, L-shaped section 848b, and notch 848c are formed as parts of the lock strip 848.

One end of the spring 856 is fixed to the lock strip 848. The spring 856 pulls the lock strip 848 in a direction of arrow f. The other end of the spring 856 is fixed to the library.

The lever 849 can turn in the directions of arrows c and d with the axis 845 fixed to the library as a rotation center. One end of the lever 849 is secured to a plunger of the solenoid 852, and the other end thereof is secured rotatably to the link 850 via the axis 846.

One end of the link 850 is secured rotatably to the lever 849 via the axis 846. The link 850 can move in the directions of arrows g and h. The other end of the ink 850 is coupled to the DEE door locking mechanism. That is to say, the cell drum locking mechanism and DEE door locking mechanism are interlocked via the link 850.

The latch actuator 857 can turn in the directions of arrows i and j with the axis 858 fixed to the library as a rotation center. The latch bar 860 that engages with the notch 848c is resting on one end of the latch actuator 857. The other end of the latch actuator 857 is secured to a plunger of the solenoid 853.

The spring 855 is fixed to part of the latch actuator 857, and constantly pulls the latch actuator 857 in a direction of the arrow i. The other end of the spring 855 is fixed to the library.

The movements made by the cell drum locking mechanism will be described below.

When the DEE door 821 (FIG. 78) of the optical disk library is closed, the solenoids 852 (FIG. 80) and 853 are not driven. At this time, the plunger of the solenoid 852 moves in the direction of the arrow b, and the plunger of the solenoid 853 moves in the direction of the arrow m.

The latch bar 860 is disengaged from the notch 848c (the latch bar 860 is away from the notch 848c). The lock strip 848 is pulled in the direction of the arrow f by means of the spring 856. The locking jut 848a is therefore removed from the locking hole 842. The cell drum 820 is unlocked.

When an operator uses the operator panel 819 (FIG. 78) to open the DEE door 821, the solenoid 852 is driven. The plunger of the solenoid 852 moves in the direction of the arrow a (FIG. 80). This causes the lever 849 to move in the direction of the arrow c. The L-shaped section 848b is pressed, whereby the lock strip 848 is turned in the direction of the arrow e.

The locking jut 848a is therefore fitted into the locking hole 842. At this time, the lock strip 848 turns in the direction of the arrow e. The latch bar 860 engages with the notch 848c.

In this state, the latch actuator 857 is pulled in the direction of the arrow i by means of the spring 855. The engagement of the latch bar 860 with the notch 848c is therefore retained. The cell drum 820 is locked, and the locked state is latched.

Under these circumstances, the DEE door 821 is open. Optical disk cartridges can be mounted or demounted simultaneously. The solenoid 852 is driven transiently in order to lock the cell drum 820. Thereafter, the solenoid 852 is not driven. The solenoid 853 has not been driven at this point.

When the cell drum 820 is locked, if the operator closes the DEE door 821 manually, the solenoid 853 is driven. The plunger of the solenoid 853 moves in the direction of the arrow n. The latch actuator 857 is turned in the direction of the arrow j.

As a result, the latch bar 860 disengages from the notch 848c. The locked state is unlatched. The lock strip 848 is pulled by the spring 856 and turned in the direction of the arrow f. When the lock strip 848 is turned, the locking jut 848a is freed from the locking hole 842 and the cell drum 820 is unlocked.

The solenoid 853 is driven transiently and not driven afterward. When the locking jut 848a is freed from the locking hole 842, the latch bar 860 is away from the notch 848c. Even when pulled in the direction of the arrow i by the spring 855, the lock strip 848 remains unlatched.

57

Figure 81:
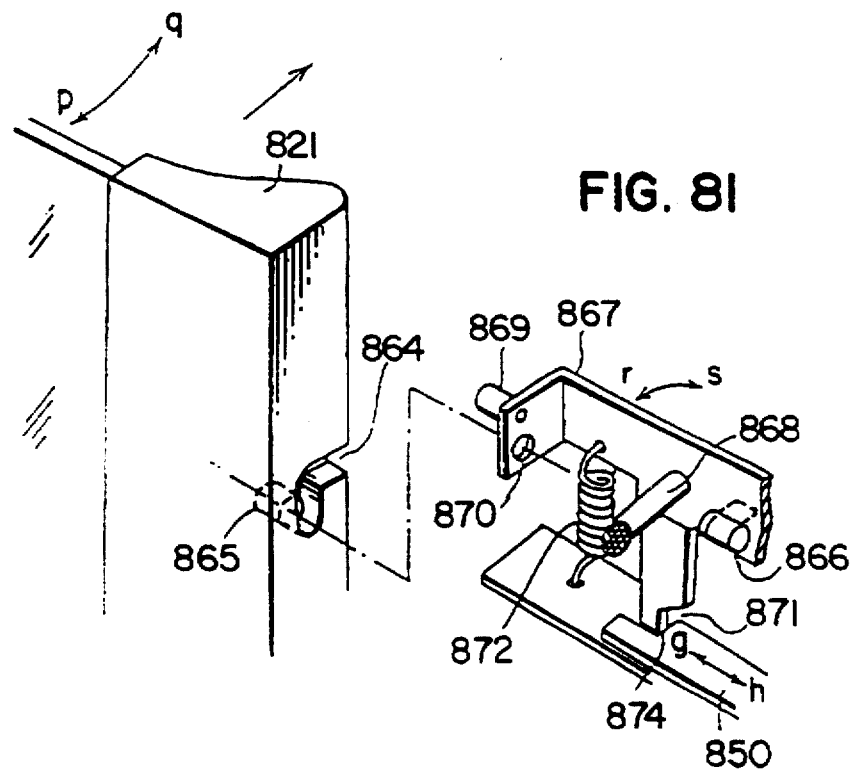
FIG. 81 is an explanatory diagram showing a DEE door locking mechanism in accordance with the invention.

FIG. 81 is an explanatory diagram concerning the DEE door locking mechanism. The DEE door 821 formed on the front surface of the optical disk library and the DEE door locking mechanism will be described below.

As described previously, the DEE door 821 has one edge thereof secured to the housing and the other edge thereof held free. The DEE door 821 can be opened or closed in directions of arrows p and q in FIG. 81. The free edge of the DEE door 821 has the locking recess 864 for locking the DEE door 821.

The locking recess 864 is shaped substantially like the letter L. One end of the locking recess 864 is a free end opening to the outside, and the other end is terminated with the light emitter 865 of the photosensor.

The DEE door locking member 867 is located in the vicinity of the DEE door 821. The DEE door locking member 867 can turn in directions of the arrows r and s with the axis 868 fixed to the library as a rotation center.

The DEE door locking member 867 has the lock bar 869, hole 870, and notch 871. The light receiver 866 of the photosensor is attached to the DEE door locking member 867.

The lock bar 869 is inserted into the locking recess 864 in the DEE door 821. The lock bar 849 enters the locking recess 864 from the free end and is locked at a given position.

The hole 870 is designed to transmit light emanating from the light emitter 865 of the photosensor. When the DEE door 821 is locked, the light emanating from the light emitter 865 of the photosensor propagates through the hole 870 and enters the light receiver 866 of the photosensor.

The spring 872 is interposed between the DEE door locking member 867 and fixing member 873. The spring 872 pulls the DEE door locking member 867 in the direction of the arrow r. The notch 871 of the DEE door locking member 867 engages with the notch 874 formed at the distal end of the link 850 included in the cell drum locking mechanism.

When the DEE door 821 is closed, the DEE door 821 is turned in a direction of the arrow q in FIG. 81. The DEE door locking mechanism is locked. In the locked state, the solenoids 852 and 853 are not driven. The link 850 is moved in a direction of the arrow h.

The DEE door locking member 867 is pulled by the spring 872 and turned in the direction of the arrow r. The lock bar 869 is inserted to the given position of the locking recess 864. At this time, light emanating from the light emitter 865 of the photosensor enters the light receiver 866 of the photosensor. Based on a signal sent from the light receiver 866 of the photosensor, the accessor control unit (which will be described later) recognizes that the DEE door 821 is locked.

Thereafter, when the operator uses the operator panel 819 to open the DEE door 821, the solenoid 852 included in the cell drum locking mechanism is driven under the control of the accessor control unit. This causes the link 850 to move in the direction of the arrow g.

The DEE door locking member 867 therefore moves in the direction of the arrow s, whereby the lock bar 869 is freed from the locking recess 864. As a result, the locking mechanism for the DEE door 821 is unlocked and the DEE door 821 becomes open.

As mentioned above, when the DEE door locking mechanism is unlocked, the light emanating from the light emitter 865 of the photosensor does not enter the light receiver 866 of the photosensor. This state is recognized by the accessor

58 control unit. Before the DEE door locking mechanism is unlocked, the cell drum locking mechanism is locked.

FIGS. 82(A) to 82(C) are explanatory diagrams concerning the cartridge incorrect mounting preventing mechanism. FIG. 82(A) shows a section M in FIG. 79. FIG. 82(B) shows the section M in the direction of arrow N in FIG. 82(A). FIG. 82(C) shows the section M in an X-Y direction. FIGS. 83(A) to 83(C) are additional explanatory diagrams concerning the cartridge incorrect mounting preventing mechanism. FIG. 83(A) shows a cartridge inserted askew. FIG. 83B shows a cartridge inserted inversely. FIG. 83(C) shows a cartridge inserted normally.

Referring to FIGS. 82(A) to 82(C), the cartridge incorrect mounting preventing mechanism formed in the cell drum 820 will now be described.

Conceivable incorrect mounting of an optical disk cartridge includes skew mounting (mounting in vertically adjoining cells) and inverse mounting. Each cell therefore has a cartridge incorrect mounting preventing mechanism for preventing an optical disk cartridge which is inserted askew or inversely, from advancing toward a cell position.

As described previously, the cell drum 820 has four cell columns. Each cell column consists of numerous cells 837 in which optical disk cartridges are mounted. Each cell 837 has the cartridge incorrect mounting preventing mechanism.

Specifically, each cell column has a plurality of plates 878. The cells 837 are separated from one another by means of pairs of the plates 878. A pair of blade springs 876 each having the projection 877 at the distal end thereof is interposed between each pair of plates 878.

The projections 877 serving as the distal ends of the paired blade springs 876 function as a cartridge inverse mounting preventing mechanism for preventing an optical disk cartridge which is inserted inversely from advancing toward the deep end of a cell.

The projections 877 engage with the recesses 736 (See FIG. 68) formed in both side surfaces of an optical disk cartridge, providing a force for holding the optical disk cartridge at a give position. By mechanically limiting the flexibility of the paired blade springs 876, inverse mounting of an optical disk cartridge is prevented.

The paired plates 878 of each cell 837 allow an optical disk cartridge inserted askew (over two vertically adjoining cells) to advance toward an installed position. For preventing this, a skew mounting preventing member 879 for preventing an optical disk cartridge from being mounted askew is located at the deep end of each cell 837. The skew mounting preventing member 879 is interposed between each pair of blade springs 876.

When the optical disk cartridges 730 (FIG. 83) are inserted into the cells 837 in the cell drum 820, if, for example, an optical disk cartridge 730 is inserted askew in the cells 837 (over two vertically adjoining cells), as shown in FIG. 82(A), the tip of the optical disk cartridge 730 hits the skew mounting preventing member 879. The optical disk cartridge 730 cannot therefore be inserted to the given position. Thus, the optical disk cartridge 730 is prevented from being mounted askew (over two vertically adjoining cells).

When an optical disk cartridge 730 is inserted inversely, as in FIG. 83(B), both edges of the optical disk cartridge 730 hit the paired projections 877, and the optical disk cartridge 730 cannot be inserted to the desired position. Thus, the optical disk cartridge 730 is prevented from being mounted inversely.

When an optical disk cartridge 730 is inserted normally, as shown in FIG. 83(C), the tip of the optical disk cartridge 730 is inserted to the deep end of the cell 837. The paired projections 877 engage with the recesses 736 (See FIG. 68) formed in both edges of the cartridge case 732 of the cartridge 730. In this state, the optical disk cartridge is held at the right (normal) position.

A cartridge butting member 880 (FIG. 83) is formed on the reverse surface (facing the inside of the library) of the DEE door 821. This is provided so that when an optical disk cartridge 730 is inserted incorrectly, the DEE door 821 will not be closed fully.

Even when the DEE door 821 is opened and an optical disk cartridge 730 is inserted to a cell 837 in a correct orientation, but is not pushed in completely, as in FIG. 83C, the back end of the optical disk cartridge 730 projects beyond the entrance of the cell 837. In this case, when the DEE door 821 is closed, the cartridge butting member 880 presses the back end of the optical disk cartridge. The optical disk cartridge 730 can therefore be fully inserted.

The present invention is not limited to an optical disk library but may be adaptable to a magnetic tape library for automatically mounting, demounting, or preserving magnetic tape cartridges, or recording or reproducing data in or from a magnetic tape cartridge.

The advantages of the invention are now apparent. The load/unload block rotates collinearly with the cell drum, and the rotation of the cell drum is used to drive the load/unload block. Yhe load/unload block needs no dedicated driving block nor dedicated control block. The present invention thus offers a simplified construction and control, an enhanced reliability and ease of use, and a substantial size and cost reduction.

The driving mechanism constructed of the timing belt fixed to the cell drum at one point offers a precision positioning control even if the belt is of a low-rigidity type. The construction of the driving mechanism is thus simplified, achieving a cost reduction and an improved reliability.

By using the sensor and the home position edge indicative of the absolute reference position, when belt stretches due to the belt driving are taken into account, an improved detection accuracy results. Thus, stop accuracy is also enhanced.

The cell drum is pre-rotated to a position that shortens the drum rotation time for the next medium transportation, in the idling time during which only the accessor is moving the medium. This reduces the time requirement for cartridge transportation, and substantially improves general transportation time that is important to the library apparatus.

Servo loop parameters are switched to cope with the changes of inertia load associated with connecting and disconnecting the load/unload block and the cell drum. Thus, the optimum control performance that is gained at the initial setting is maintained, improving positioning accuracy and shortening transportation time.

Cartridges mounted or demounted during DEE work are sorted automatically at the completion of the DEE work. During sorting, cartridges mounted in a cell drum during DEE work are fetched and moved sequentially to empty cells close to an optical disk drive. This sorting of cartridges contributes to speedup of carrying a cartridge to an optical disk drive. The employment of a DEE feature enables simultaneous mounting or demounting of cartridges.

A cell drum locking mechanism and DEE door locking mechanism which have simple structures cooperate each other to change a locked state into an unlocked state and vice versa. Thus, an inexpensive and compact library can be realized, and the reliability and safety of the library is improved.

Skewed and inverse insertions of storage media are prevented, which improves the operation of the library apparatus.

While the principles of the invention have been described above in connection with specific apparatus and applicatins, it is to be understood that this description is made only by way of example and not as a limitation on the scope of the invention.

We claim:

1. A library apparatus comprising:
   rotating storage means having on its drum surface a plurality of cell columns, each including a plurality of cells vertically arranged for accommodating a plurality of storage media;
   driving means for rotating the rotating storage means;
   reproducing means for at least reproducing information on a selected one of said storage media;
   medium transport means for transporting said selected storage media between said rotating storage means and said reproducing means; and
   load/unload means disposed collinealy with said rotating storage means for transporting said storage media between a load/unload opening opened to outside of the library apparatus and a setup position of said medium transport means, by rotating around a vertical axis of said load/unload means in a horizontal plane;
   wherein said load/unload means is collinealy connected to an axis of rotation of said rotating storage means, is selectively engaged with said rotating storage means via clutch means, and is integrally rotated with said rotating storage means by said driving means.

2. The library apparatus according to claim 1, wherein said load/unload means is collinearly disposed above said rotating storage means and has at least a pair of medium trays on the circumferential portion of said load/unload means.

3. The library apparatus according to claim 2, wherein said load/unload means has a pair of medium trays on its circumferential portion, one tray 180° angularly spaced from the other along a line that runs diagonally across the axis of rotation of said rotating storage means.

4. The library apparatus according to claim 2, wherein said load/unload means is provided with four medium trays with one tray 90° angularly spaced from the next on the circumferential portion of said load/unload means.

5. A library apparatus comprising:
   rotating storage means having on its drum surface a plurality of cell columns, each including a plurality of cells vertically arranged for accommodating a plurality of storage media;
   driving means for rotating the rotating storage means;
   reproducing means for at least reproducing information on a selected one of said storage media;
   medium transport means for transporting said selected storage media between said rotating storage means and said reproducing means;
   load/unload means disposed collinearly with said rotating storage means for transporting said storage media between a load/unload opening opened to outside of the library apparatus and a setup position of said medium transport means, by rotating around a vertical axis of said load/unload means in a horizontal plane;

wherein said load/unload means selectively engaged with said rotating storage means via clutch means including:
- a first gear rigidly attached to the axis of rotation of said rotating storage means,
- a second gear rigidly attached to the axis of rotation of said load/unload means and closely disposed to said first gear in a manner that both gears are collinear,
- a clutch gear for transmitting rotation by engaging with both said first gear and said second gear, and
- a gear clutch switching mechanism for switching said clutch gear between its engagement position and disengagement position.

6. A library apparatus comprising:

rotating storage means having on its drum surface a plurality of cell columns, each including a plurality of cells vertically arranged for accommodating a plurality of storage media;

driving means for rotating the rotating storage means;

reproducing means for at least reproducing information on a selected one of said storage media;

medium transport means for transporting said selected storage media between said rotating storage means and said reproducing means;

load/unload means disposed collinearly with said rotating storage means for transporting said storage media between a load/unload opening opened to outside of the library apparatus and a setup position of said medium transport means by rotating around a vertical axis of said load/unload means in a horizontal plane;

wherein said load/unload means is disposed in an offset position from the axis of rotation of said rotating storage means via a clutch means, and said clutch means comprises a first gear rigidly attached to the axis of rotation of said rotating storage means, a second gear rigidly attached to the axis of rotation of said load/unload means and closely disposed to said first gear in a manner that both gears are collinear, a clutch gear for transmitting rotation by engaging with both said first gear and said second gear, and a gear clutch switching mechanism for switching said clutch gear between its engagement position and disengagement position.

7. A library apparatus comprising:

rotating storage means having on its drum surface a plurality of cell columns, each including a plurality of cells vertically arranged for accommodating a plurality of storage media;

driving means for rotating the rotating storage means;

reproducing means for at least reproducing information on a selected one of said storage media;

medium transport means for transporting said selected storage media between said rotating storage means and said reproducing means; and load/unload means disposed collinearly with said rotating storage means for transporting said storage media between a load/unload opening opened to outside of the library apparatus and a setup position of said medium transport means by rotating around a vertical axis of said load/unload means in a horizontal plane;

wherein said load/unload means is rigidly connected to said rotating storage means and is integrally rotated with said rotating storage means by said driving means;

loading control means, when the loading of a storage medium inserted into said load/unload means to a specified cell position in said rotating storage means is instructed, for allowing said medium transport means to draw said storage medium from said load/unload means, after rotating said rotating storage means by 180°, and to transport said storage medium to the cell level that contains the specified cell position, and for allowing said rotating storage means to rotate until the cell column to which the specified cell belongs faces the position of said medium transport means, and unloading control means, when the unloading of the storage medium from the specified cell in said rotating storage means is instructed, for allowing said medium transport means to move to the specified cell, for rotating said rotating storage means until the cell column to which the specified cell belongs faces the position of said medium transport means in order to pick up the storage medium from the specified cell, for allowing said medium transport means to transport the picked storage medium to said load/unload means to insert the storage medium into said load/unload means, and after the insertion, for rotating said rotating storage means by 180° to allow said storage medium to be pulled out of said load/unload means.

8. A library apparatus comprising:

rotating storage means having on its drum surface a plurality of cell columns, each including a plurality of cells vertically arranged for accommodating a plurality of storage media;

driving means for rotating the rotating storage means;

reproducing means for at least reproducing information on a selected one of said storage media;

medium transport means for transporting said selected storage media between said rotating storage means and said reproducing means, said medium transport control means performing control such that when transportation of the storage medium between said rotating storage means and said reproducing means is instructed, the storage medium is shifted from an initial position (From Address) to a selected position (To Address) by means of rotational motion of said rotating storage means and transport motion of said medium transport means, and when said medium transport means remains stationary, said rotating storage means is rotated until it is positioned to its optimum position for the next transportation of a medium; and load/unload means disposed collinearly with said rotating storage means for transporting said storage media between a load/unload opening opened to outside of the library apparatus and a setup position of said medium transport means, by rotating around a vertical axis of said load/unload means in a horizontal plane;

wherein while said medium transport means is not in motion for transportation of the medium, said medium transport control means rotates said rotating storage means to a position from which average time required to travel to the pickup position of each cell is minimum;

wherein said medium transport control means determines the sum of the products of the access occurrences $C0.0+C1.1+\ldots+Cn-1.n-1$, in which cell columns in said rotating storage means are moved to the medium pickup position $C0, C1, \ldots, Cn-1$, and the respective position numbers designating the cell positions $0, 1, \ldots, n-1$, and divides the sum $C0.0+C1.1+\ldots+Cn=1.n-1$ of the products by the sum of the total number of accesses $C0+C1+\ldots+Cn-1$ to determine position number M representing the position of the minimum average traveling time.

9. A library apparatus comprising:

rotating storage means having on its drum surface a plurality of cell columns, each including a plurality of cells vertically arranged for accommodating a plurality of storage media;

driving means for rotating the rotating storage means;

reproducing means for at least reproducing information on a selected one of said storage media;

medium transport means for transporting said selected storage media between said rotating storage means and said reproducing means, said medium transport control means performing control such that when transportation of the storage medium between said rotating storage means and said reproducing means is instructed, the storage medium is shifted from an initial position (From Address) to a selected position (To Address) by means of rotational motion of said rotating storage means and transport motion of said medium transport means, and when said medium transport means remains stationary, said rotating storage means is rotated until it is positioned to its optimum position for the next transportation of a medium; and load/unload means disposed collinearly with said rotating storage means for transporting said storage media between a load/unload opening opened to outside of the library apparatus and a setup position of said medium transport means, by rotating around a vertical axis of said load/unload means in a horizontal plane;

wherein when an error occurs in the control of said rotating storage means during the transportation of a medium by said medium transport means, said medium transport control means holds an error reporting to a host machine until said medium transport means completes the transportation of the medium, and reports the error when said medium transport means completes the transportation.

10. The library apparatus according to claim 1, wherein said clutch means allows said load/unload means to be engaged with said rotating storage means for integral rotation during loading or unloading of said storage media, and allows said load/unload means to be selectively disengaged from said rotating storage means.

11. The library apparatus according to claim 5, wherein said clutch switching means comprises:

an arm member having two ends and being pivotally supported at one said end and supporting said clutch gear on its other said end, a spring member for urging said arm member in the direction that allows said clutch gear to be disengaged, and an electromagnetic solenoid which, when conducting, urges said arm member toward the engagement position of said clutch gear.

12. The library apparatus according to claim 5, wherein the number of teeth of said first gear is set to be equal to the number of teeth of said second gear to achieve a gear ratio of 1.

13. The library apparatus according to claim 5, wherein a first idler gear that is in mesh with said first gear and a second idler gear that is in mesh with said second gear are rigidly and collinearly engaged by said clutch gear to provide a gear ratio of other than 1.

14. The library apparatus according to claim 5, wherein said clutch means further comprises a ring member which is collinear with and integrally rotated with said load/unload means, and which has notches on its internal circumference in the positions corresponding to said medium trays, and a roller that rolls on the inner circumference of said ring member on said arm member of said clutch gear whereby said roller is engaged with one of said notches in the course of rotation of said ring member, said clutch gear is put out of engagement with said first and second gears, and where said roller is out of said notch in the course of rotation of said ring member, said clutch gear is put into engagement with said first and second gears, and said clutch switching mechanism is driven only while said roller is out of said notch.

15. The library apparatus according to claim 1, wherein said driving means comprises a timing belt that couples a driving pulley to said rotating storage means, whereby said timing belt is tied, at its one point, to said rotating storage means, and allows said rotating storage means to rotate in a reciprocating manner within a predetermined angle of rotation.

16. The library apparatus according to claim 15, wherein said driving means comprises a tension mechanism to keep belt tension constant to compensate for stretch of said timing belt.

17. The library apparatus according to claim 16, wherein said tension mechanism comprises a pivotally movable arm member that supports one of a plurality of idle pulleys coupled with said timing belt and a spring member that urges said arm to tension said timing belt.

18. The library apparatus according to claim 15, wherein said driving means comprises:

a sensor member provided with rectangular slits indicative of the positions of said cell columns of said rotating storage means and a home position edge indicative of the absolute reference position where stretches of said timing belt are of equal distance in a reciprocating rotation, and a sensor for detecting said rectangular slits and the home position edge of said sensor member.

19. The library apparatus according to claim 15, wherein said driving means comprises:

a sensor member provided with rectangular slits indicative of the positions of said cell columns of the rotating storage means and a home position edge indicative of the absolute reference position where stretch of the timing belt is minimum, and a sensor for detecting said rectangular slits and said home position edge of said sensor member.

20. The library apparatus according to any of claims 18 or 19, wherein said driving means further comprises:

a pulse generator block for generating output pulses proportional to the rotation of said rotating storage means, a counter block for counting said output pulses of said pulse generator block, reset means for setting the absolute reference position by resetting said counter block to zero in response to the sensing of said home position edge by said sensor, measurement adjustment means, in a measurement adjustment mode, for obtaining two counts provided by said counter block when said sensor detects two edge detection outputs from said rectangular slits, for averaging said two counts to determine the center position of said rectangular slit as the desired cell position, and for storing the resulting cell position, and position control means, in normal rotation, for comparing the counts provided by said counter block with the stored cell position provided said measurement adjustment means, and for positioning a particular cell column of said rotating storage means against said medium transport means.

21. The library apparatus according to claim 7, wherein said loading control means, when the loading of a storage medium inserted into said load/unload means to said reproducing means is instructed, for allowing said medium transport means to draw said storage medium from said load/unload means, after rotating said rotating storage means by 180°, and to transport the storage medium to said reproducing means, and said unloading control means, when the unloading of the storage medium from said reproducing means is instructed, for allowing said medium transport means to move to said reproducing means in order to pick up the storage medium from said reproducing means, for allowing said medium transport means to transport the picked storage medium to said load/unload means to insert the storage medium into said load/unload means, and after the insertion, for rotating said rotating storage means by 180° to allow the storage medium to be pulled out of said load/unload means.

22. The library apparatus according to any of claims 7 or 21 comprising error recovery means for rotating said rotating storage means by 180° to allow the storage medium to be taken out of said load/unload means when, in the course of loading control by said loading control means, said medium transport means fails to pick up the storage medium from said load/unload means.

23. The library apparatus according to claim 1 comprising:

loading control means, when the loading of a storage medium inserted into said load/unload means to a specified cell position in said rotating storage means is instructed, for allowing said medium transport means to draw the storage medium from said load/unload means, after rotating said rotating storage means by 180° with said clutch means connected, and to transport the storage medium to the cell level that contains the specified cell position, and for allowing said rotating storage means to rotate until the cell column to which the specified cell belongs faces the position of said medium transport means, and unloading control means, when the unloading of the storage medium from the specified cell in said rotating storage means is instructed, for allowing said medium transport means to move to the specified cell, for rotating said rotating storage means until the cell column to which the specified cell belongs faces the position of said medium transport means in order to pick up the storage medium from the specified cell, for allowing said medium transport means to transport the picked storage medium to said load/unload means to insert the storage medium into said load/unload means, and after the insertion, for rotating said rotating storage means by 180° with said clutch means connected, to allow the storage medium to be pulled out of said load/unload means.

24. The library apparatus according to claim 23, wherein said loading control means, when the loading of a storage medium inserted into said load/unload means to said reproducing means is instructed, for allowing said medium transport means to draw the storage medium from said load/unload means, after rotating said rotating storage means by 180° with said clutch means connected, and to transport the storage medium to said reproducing means, and said unloading control means, when the unloading of the storage medium from said reproducing means is instructed, for allowing said medium transport means to move to said reproducing means in order to pick up the storage medium from said reproducing means, for allowing said medium transport means to transport the picked storage medium to said load/unload means to insert the storage medium into said load/unload means, and after the insertion, for rotating said rotating storage means by 180° with said clutch means connected, to allow the storage medium to be pulled out of said load/unload means.

25. The library apparatus according to any of claims 23 or 24 comprising error recovery means for rotating said rotating storage means by 180° with said clutch means connected, to allow the storage medium to be taken out of said load/unload means when, in the course of loading control by said loading control means, said medium transport means fails to pick up the storage medium from said load/unload means and ends with an unsuccessful result.

26. The library apparatus according to claim 23 further comprising:

a door for closing or opening the load/unload opening, an opening switch for instructing opening of the door, a sensor for sensing insertion of the storage medium into said load/unload means and for sensing closing action of the door after the insertion of the storage medium, means for issuing storage medium transportation instruction to said loading control means in response to the sensed output by said sensor, and means for opening said door when the storage medium is unloaded by said unloading control means.

27. The library apparatus according to claim 7 comprising medium position determining means for determining the position of the medium in said load/unload block that is rotated integrally with said rotating storage means with said clutch means in its connected state under control of said loading control means or said unloading control means.

28. The library apparatus according to claim 27 comprising a first register for storing rotation information indicative of the rotational direction (CW or CCW) of said load/unload block during loading or unloading, and a second register for storing transport direction information indicative of the starting point and destination point of the medium based on loading or unloading instruction, whereby the current position of the storage medium is recognized based on stored information in said first and second registers.

29. The library apparatus according to claim 27, wherein said medium position determining means comprises a sensor member having sensor patterns indicative of the angle of rotation of the load/unload means and a sensor for sensing the position of the medium in the load/unload block which is rotated integrally with the rotating storage means, based on the sensor patterns of the sensor member.

30. The library apparatus according to claim 27, wherein position initializing means is provided to cause said rotating storage means to rotate back to its predetermined initial position for positioning in succession to an error-triggered suspension of said load/unload means when the occurrence of an error in said rotating storage means suspends said load/unload block while it is in motion, whereby whether the storage medium in said load/unload means is currently at its starting point or destination point is determined referring to the medium position determining means when said position initializing means performs initializing by rotation.

31. The library apparatus according to claim 1 comprising medium transport control means which performs optimum control in which, when transportation of the storage medium between said rotating storage means and said reproducing means is instructed, the storage medium is shifted from an initial position (From Address) to a selected position (To Address) by means of rotational motion of said rotating storage means and transport motion of said medium transport means, and when said medium transport means remains stationary, said rotating storage means is rotated until it is positioned to its optimum position for the next transportation of a medium.

32. The library apparatus according to claim 31, wherein while said medium transport means is not in motion for transportation of the medium, said medium transport control means rotates said rotating storage means to a position from which average time required to travel to the pickup position of each cell is minimum.

33. The library apparatus according to claim 8, wherein said medium transport control means rounds off the calculated result to determine the position number of the minimum traveling time.

34. The library apparatus according to claim 8, wherein said medium transport control means calculates rotation time T1 said rotating storage means requires from the position of the minimum traveling time to transport the next medium and transportation time T2 by the medium transport means, and when the rotation time T1 exceeds the transportation time T2, said medium transport control means rotates said rotating storage means so that the cell column to which the next specified cell belongs is set to be closer to the insertion position of said medium transport means by one cell column.

35. The library apparatus according to claim 1, comprising:

servo means for setting optimum servo gains K1, K2, K3 in servo control of a predetermined inertia loading Je, and gain modifying means for compensating for less than optimum servo gains by multiplying the servo gains K1, K2, K3 by Je/J, where J is the real inertia load.

36. The library apparatus according to claim 35, wherein said gain modifying means modifies the servo gains K1, K2, K3 by multiplying by Je/J1 and results in K11, K12, K13 based on inertial loading J1 with said clutch means disengaged, and sets K11, K12, K13, and modifies the servo gains K1, K2, K3 by multiplying by Je/J2 and results in K21, K22, K23 based on inertia loading J2 with said clutch means engaged, and sets K21, K22, K33.

37. The library apparatus according to claim 35, wherein said servo means is PID servo means provided with integral control with integral gain, derivative control with derivative gain K2, and proportional control with proportional gain.

38. The library apparatus according to claim 35, wherein said servo means is position servo means, said position servo means forming a position control loop constructed of a position sensor for sensing position P, a coefficient setter for performing correction by multiplying the sensed position P by a coefficient N2, a proportional element for setting the proportional gain K2, a current converter for generating a current signal I proportional to the proportional gain K2 of the proportional element and a load which is subjected to positional change according to an acceleration responsive to inertia loading driven by the output current of the current converter, and said gain modifying means multiplies the coefficient N2 of the coefficient setter by and sets the result.

39. The library apparatus according to claim 35, wherein said servo means is speed servo means, said speed servo means forming a speed servo control loop constructed of a speed sensor for sensing speed Q, a coefficient setter for performing correction by multiplying the sensed speed Q by a coefficient N3, a derivative element for setting the derivative gain K3, a current converter for generating a current signal I proportional to the derivative gain K3 of the derivative element and a load which is subjected to a speed according to an acceleration responsive to inertia loading driven by the output current of the current converter, and said gain modifying means multiplies the coefficient N3 of the coefficient setter by and sets the result.

* * * * *

UNITED STATES PATENT AND TRADEMARK OFFICE
CERTIFICATE OF CORRECTION

PATENT NO. : 5,757,738

DATED : May 26, 1998

INVENTOR(S) : Ohba et al.

It is certified that error appears in the above-identified patent and that said Letters Patent is hereby corrected as shown below:

Column 20, line 22, delete "450" and insert

--45°-- therefor

Column 22, line 63, before "The" start a new paragraph

Column 32, line 53, delete "th us" and insert

--thus-- therefor

Column 64, line 17, after "rotation" insert

-- θ --

UNITED STATES PATENT AND TRADEMARK OFFICE
CERTIFICATE OF CORRECTION

PATENT NO. : 5,757,738
DATED : May 26, 1998
INVENTOR(S) : Ohba et al.

It is certified that error appears in the above-identified patent and that said Letters Patent is hereby corrected as shown below:

Column 67, line 18, between "number" and "of" insert --M--

Column 67, line 23, between "position" and "of" insert --M--

Column 68, line 9, between "gain" and "," insert --K1--

Column 68, line 10, between "control" and "with" insert --K3--

Column 68, line 10, after "gain" insert --K3--

UNITED STATES PATENT AND TRADEMARK OFFICE
CERTIFICATE OF CORRECTION

PATENT NO. : 5,757,738                    Page 3 of 4
DATED : May 26, 1998
INVENTOR(S) : Ohba et al.

It is certified that error appears in the above-identified patent and that said Letters Patent is hereby corrected as shown below:

Column 68, line 21, between "acceleration" and "responsive" insert --Kt/J--

Column 68, line 22, between "loading" and "driven" insert --J--

Column 68, line 25, between "by" and "and" insert --Je/J--

Column 68, line 36, between "acceleration" and "responsive" insert --Kt/J--

Column 68, line 36, between "loading" and "driven" insert --J--

UNITED STATES PATENT AND TRADEMARK OFFICE
CERTIFICATE OF CORRECTION

PATENT NO. : 5,757,738
DATED : May 26, 1998
INVENTOR(S) : Ohba et al.

It is certified that error appears in the above-identified patent and that said Letters Patent is hereby corrected as shown below:

Column 68, line 39, between "by" and "and"

insert --Je/J--

Signed and Sealed this

Seventeenth Day of November, 1998

Attest:

BRUCE LEHMAN

Attesting Officer

Commissioner of Patents and Trademarks